(12) United States Patent
Sasaki et al.

(10) Patent No.: US 10,067,640 B2
(45) Date of Patent: Sep. 4, 2018

(54) CONTROLLING AN AIR CONDITIONER OVER A NETWORK

(71) Applicant: PANASONIC INTELLECTUAL PROPERTY CORPORATION OF AMERICA, Torrance, CA (US)

(72) Inventors: Takamitsu Sasaki, Osaka (JP); Minehisa Nagata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 416 days.

(21) Appl. No.: 14/541,545

(22) Filed: Nov. 14, 2014

(65) Prior Publication Data

US 2015/0143249 A1 May 21, 2015

Related U.S. Application Data

(63) Continuation of application No. PCT/JP2013/003197, filed on May 20, 2013.
(Continued)

(51) Int. Cl.
*G06F 3/0482* (2013.01)
*G06F 17/30* (2006.01)
(Continued)

(52) U.S. Cl.
CPC ............ *G06F 3/0482* (2013.01); *F24F 11/30* (2018.01); *G06F 3/0488* (2013.01);
(Continued)

(58) Field of Classification Search
CPC ...... G06F 17/30; G06F 3/04847; G05B 15/00
See application file for complete search history.

(56) References Cited

U.S. PATENT DOCUMENTS 7,567,844 B2 * 7/2009 Thomas ................. G05B 15/02
348/143
7,730,223 B1 * 6/2010 Bavor .................... G06F 3/0481
709/223
(Continued)

FOREIGN PATENT DOCUMENTS

CN 102012079 4/2011
CN 102293011 12/2011
(Continued)

OTHER PUBLICATIONS

Search report from PCT/JP2013/003197, dated Aug. 20, 2013.
(Continued)

*Primary Examiner* — Jennifer To
*Assistant Examiner* — Jasmine Wan
(74) *Attorney, Agent, or Firm* — Greenblum & Bernstein, P.L.C.

(57) ABSTRACT

In the case where selection of an icon representing an air conditioner is sensed in a region corresponding to a first room on the floor plan that is larger than a predetermined area, the region corresponding to the first room is switched to an adjustment region for changing the set temperature of the air conditioner. In the case where selection of the icon representing the air conditioner is sensed in a region corresponding to a second room on the floor plan that is equal to or smaller than the predetermined area, an adjustment screen for changing the set temperature of the air conditioner installed in the region corresponding to the second room is displayed on the display screen.

18 Claims, 117 Drawing Sheets

Related U.S. Application Data

(60) Provisional application No. 61/766,900, filed on Feb. 20, 2013.

(51) Int. Cl.

| | | |
|---|---|---|
| *G06F 3/0488* | (2013.01) | |
| *H04L 29/08* | (2006.01) | |
| *H04L 12/28* | (2006.01) | |
| *H04L 12/64* | (2006.01) | |
| *F24F 11/30* | (2018.01) | |
| *G06F 3/0484* | (2013.01) | |
| *F24F 110/10* | (2018.01) | |
| *F24F 11/56* | (2018.01) | |
| *F24F 11/52* | (2018.01) | |

(52) U.S. Cl.
CPC ...... *G06F 3/04847* (2013.01); *H04L 12/2803* (2013.01); *H04L 12/6418* (2013.01); *H04L 67/025* (2013.01); *F24F 11/52* (2018.01); *F24F 11/56* (2018.01); *F24F 2110/10* (2018.01); *G05B 2219/2642* (2013.01)

(56) References Cited

U.S. PATENT DOCUMENTS

| | | | |
|---|---|---|---|
| 8,579,452 B2 | 11/2013 | Diederiks et al. | |
| 2002/0091812 A1* | 7/2002 | Ando | H04L 12/2809 709/223 |
| 2003/0038730 A1 | 2/2003 | Imafuku et al. | |
| 2006/0004605 A1* | 1/2006 | Donoghue | G06Q 10/10 705/2 |
| 2007/0130376 A1* | 6/2007 | Moon | G06F 3/1204 710/8 |
| 2008/0211779 A1* | 9/2008 | Pryor | G01C 21/3664 345/173 |
| 2008/0316730 A1 | 12/2008 | Diederiks et al. | |
| 2009/0307255 A1* | 12/2009 | Park | G06Q 10/10 |
| 2010/0070089 A1* | 3/2010 | Harrod | F24F 11/0086 700/277 |
| 2010/0107112 A1* | 4/2010 | Jennings | G06F 1/3203 715/777 |
| 2011/0055752 A1* | 3/2011 | Rubinstein | G06F 3/0485 715/784 |
| 2011/0082602 A1* | 4/2011 | Tanaka | F24F 11/006 700/300 |
| 2011/0234607 A1 | 9/2011 | Katsukura et al. | |
| 2012/0013548 A1* | 1/2012 | Choi | B60K 35/00 345/173 |
| 2012/0091213 A1* | 4/2012 | Altonen | H05B 37/02 236/51 |
| 2012/0092251 A1 | 4/2012 | Hashimoto et al. | |
| 2013/0005250 A1 | 1/2013 | Kim et al. | |
| 2013/0144443 A1* | 6/2013 | Casson | G01D 4/004 700/276 |
| 2014/0043791 A1 | 2/2014 | Diederiks et al. | |
| 2014/0058569 A1 | 2/2014 | Kuroiwa | |
| 2014/0068486 A1* | 3/2014 | Sellers | G06F 3/04847 715/771 |
| 2014/0232273 A1 | 8/2014 | Sasaki et al. | |
| 2014/0236320 A1 | 8/2014 | Sasaki et al. | |
| 2014/0236325 A1 | 8/2014 | Sasaki et al. | |
| 2014/0236326 A1 | 8/2014 | Sasaki et al. | |
| 2014/0236327 A1 | 8/2014 | Sasaki et al. | |
| 2014/0236358 A1 | 8/2014 | Sasaki et al. | |
| 2014/0336824 A1 | 11/2014 | Sasaki et al. | |
| 2014/0359468 A1 | 12/2014 | Sasaki et al. | |
| 2015/0005952 A1 | 1/2015 | Sasaki et al. | |
| 2015/0007038 A1 | 1/2015 | Sasaki et al. | |

FOREIGN PATENT DOCUMENTS

| | | |
|---|---|---|
| CN | 102662380 | 9/2012 |
| CN | 102769724 | 11/2012 |
| JP | 10-160229 | 6/1998 |
| JP | 2000-138979 | 5/2000 |
| JP | 2003-052093 | 2/2003 |
| JP | 2007-104567 | 4/2007 |
| JP | 2007-158574 | 6/2007 |
| JP | 2009-521090 A | 5/2009 |
| JP | 2009-213107 | 9/2009 |
| JP | 2011-161031 | 8/2011 |
| JP | 2012-010062 | 1/2012 |
| JP | 5128489 B2 | 11/2012 |
| JP | 2013-076493 | 4/2013 |
| JP | 2013-097519 | 5/2013 |
| WO | 2011/013514 | 2/2011 |
| WO | 2012/153391 | 11/2012 |

OTHER PUBLICATIONS

U.S. Appl. No. 14/580,819 to Takamitsu Sasaki et al., filed Dec. 23, 2014.

U.S. Appl. No. 14/602,589 to Takamitsu Sasaki et al., filed Jan. 22, 2015.

U.S. Appl. No. 14/582,418 to Takamitsu Sasaki et al., filed Dec. 24, 2014.

U.S. Appl. No. 14/482,424 to Takamitsu Sasaki et al., filed Sep. 10, 2014.

U.S. Appl. No. 14/482,404 to Takamitsu Sasaki et al., filed Sep. 10, 2014.

U.S. Appl. No. 14/546,397 to Takamitsu Sasaki et al., filed Nov. 18, 2014.

U.S. Appl. No. 14/482,453 to Takamitsu Sasaki et al., filed Sep. 10, 2014.

U.S. Appl. No. 14/482,440 to Takamitsu Sasaki et al., filed Sep. 10, 2014.

U.S. Appl. No. 14/482,391 to Takamitsu Sasaki et al., filed Sep. 10, 2014.

U.S. Appl. No. 14/542,893 to Takamitsu Sasaki et al., filed Nov. 17, 2014.

U.S. Appl. No. 14/514,650 to Masashi Sugiyama et al., filed Oct. 15, 2014.

\* cited by examiner

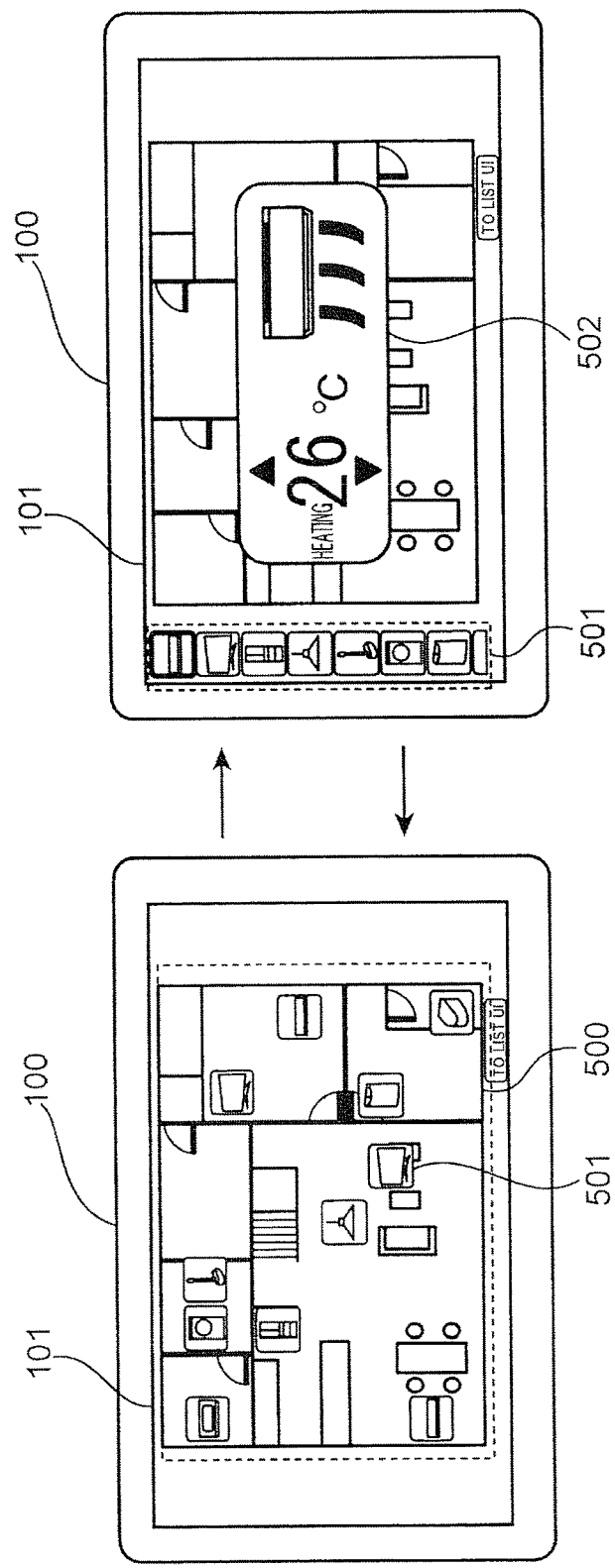

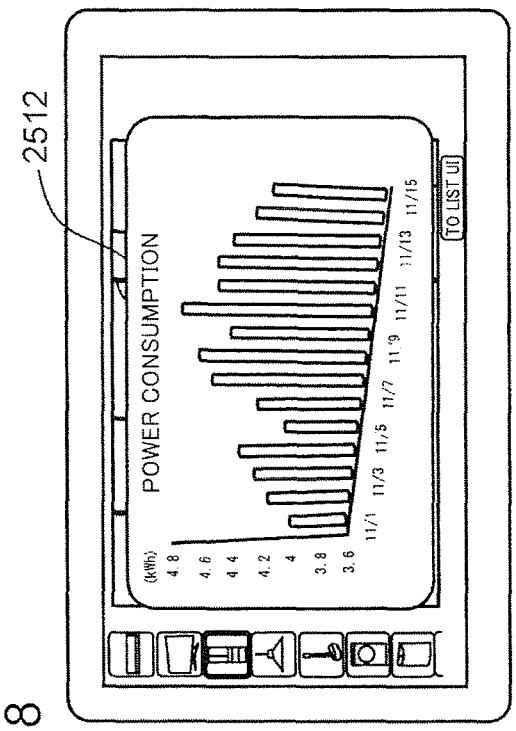
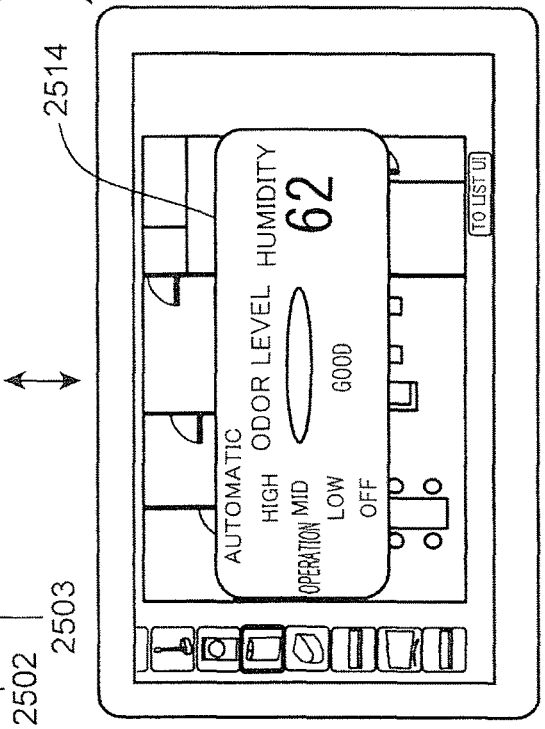
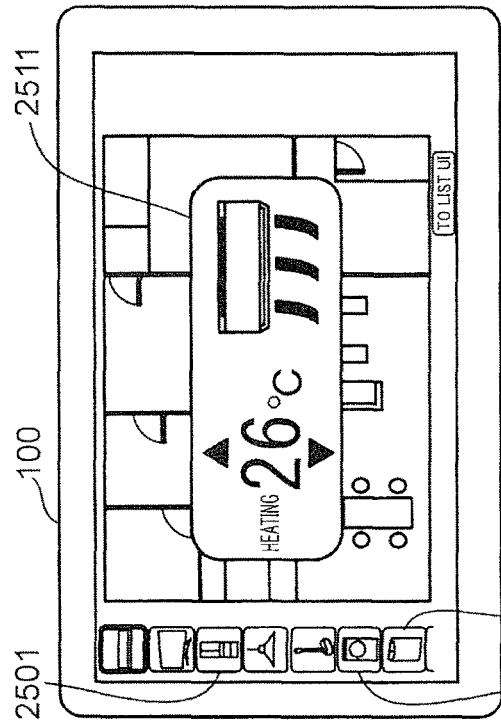
FIG.28

| VERTEX ID | VERTEX COORDINATE |
|---|---|
| A | (X0,Y0,Z1) |
| B | (X20,Y0,Z1) |
| C | (X40,Y0,Z1) |
| ... | |
| P | (X150,Y100,Z1) |

| ROOM ID | ROOM TYPE | ROOM COORDINATE |
|---------|-----------|-----------------|
| A | LIVING ROOM | (F,G,H,I,L,O,N) |
| B | BEDROOM | (J,K,M,L,I) |
| C | BATH | (A,B,G,F) |
| D | STAIRCASE | (H,I,R,Q) |
| ... | | |

| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE |
| B | ILLUMINATION | HH-LC710A | (X30,Y150,Z1) | ON/OFF CONTROL AND DIMMER CONTROL | DEVICE |
| C | REFRIGERATOR | NR-F557XV | (X50,Y200,Z1) | POWER CONSUMPTION STATE MANAGEMENT | SERVER |
| ... | | | | | |

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | (X30,Y150,Z1) | ON/OFF CONTROL AND DIMMER CONTROL | DEVICE | 192.168.0.6 |
| C | REFRIGERATOR | NR-F557XV | (X50,Y200,Z1) | POWER CONSUMPTION STATE MANAGEMENT | SERVER | 192.168.0.7 |
| ... | | | | | | |

3100

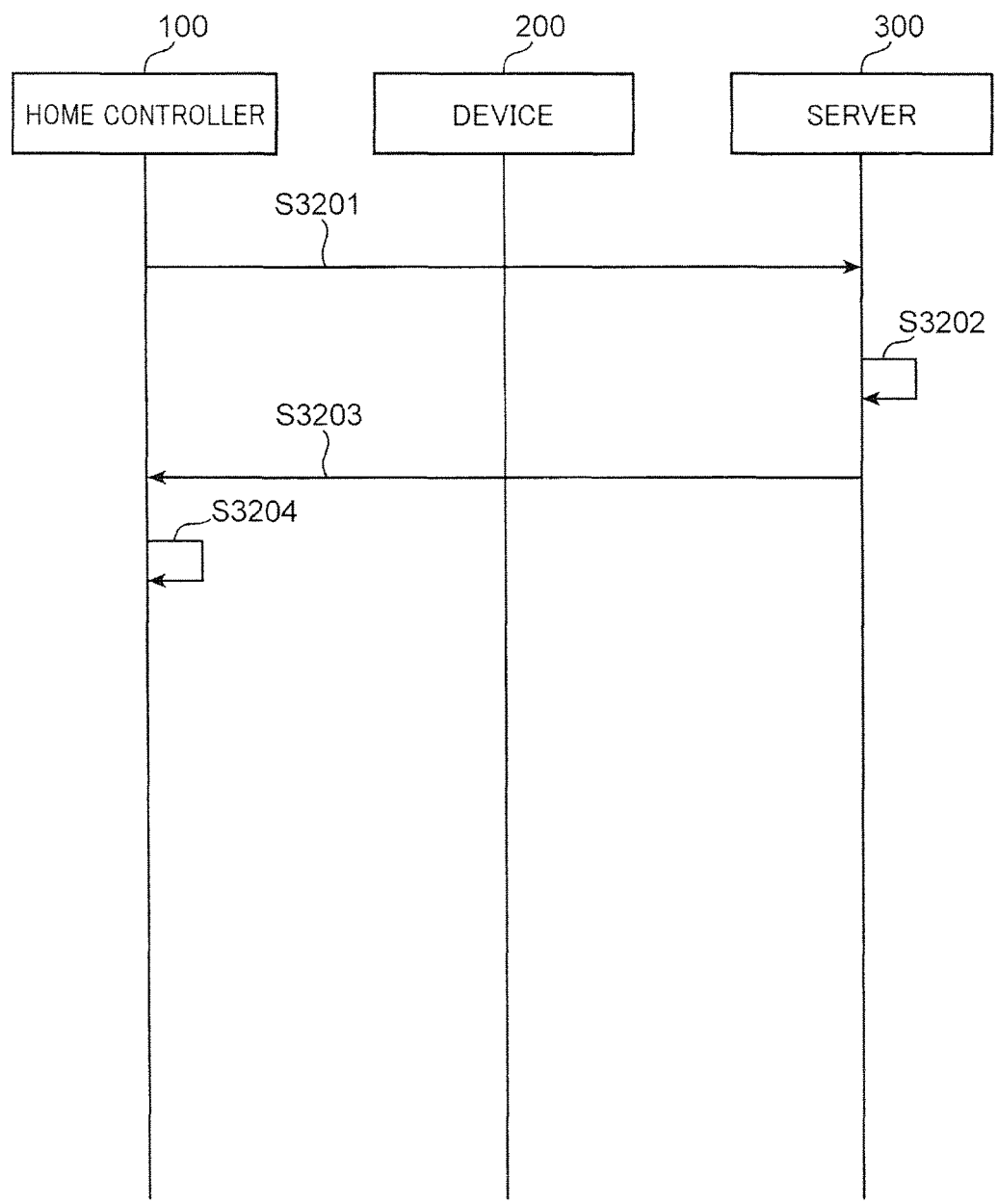

| ROOM ID | ROOM TYPE | FLOOR LEVEL | DISPLAY POSITION |
|---------|-----------|-------------|------------------|
| A | LIVING ROOM | FIRST FLOOR | FIRST CELL ON FIRST FLOOR |
| B | BEDROOM | SECOND FLOOR | FIRST CELL ON SECOND FLOOR |
| C | BATH | FIRST FLOOR | FOURTH CELL ON FIRST FLOOR |
| D | STAIRCASE | FIRST FLOOR<br>SECOND FLOOR | SEVENTH CELL ON FIRST FLOOR<br>SECOND CELL ON SECOND FLOOR |
| ... | | | |

FIG.70

| 4701 | 4702 | 4703 | 4704 | 4705 | 4706 |
|---|---|---|---|---|---|
| DEVICE ID | DEVICE TYPE | MODEL NUMBER | ARRANGEMENT | CAPABILITY INFORMATION | CONTROL COMMAND TRANSMISSION DESTINATION |
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE |
| B | ILLUMINATION | HH-LC710A | LIVING ROOM | ON/OFF CONTROL AND DIMMER CONTROL | DEVICE |
| C | REFRIGERATOR | NR-F557XV | KITCHEN | POWER CONSUMPTION STATE MANAGEMENT | SERVER |
| ⋮ | | | | | |

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | LIVING ROOM | ON/OFF CONTROL AND DIMMER CONTROL | DEVICE | 192.168.0.6 |
| C | REFRIGERATOR | NR-F557XV | KITCHEN | POWER CONSUMPTION STATE MANAGEMENT | SERVER | 192.168.0.7 |
| ⋮ | | | | | | |

3100

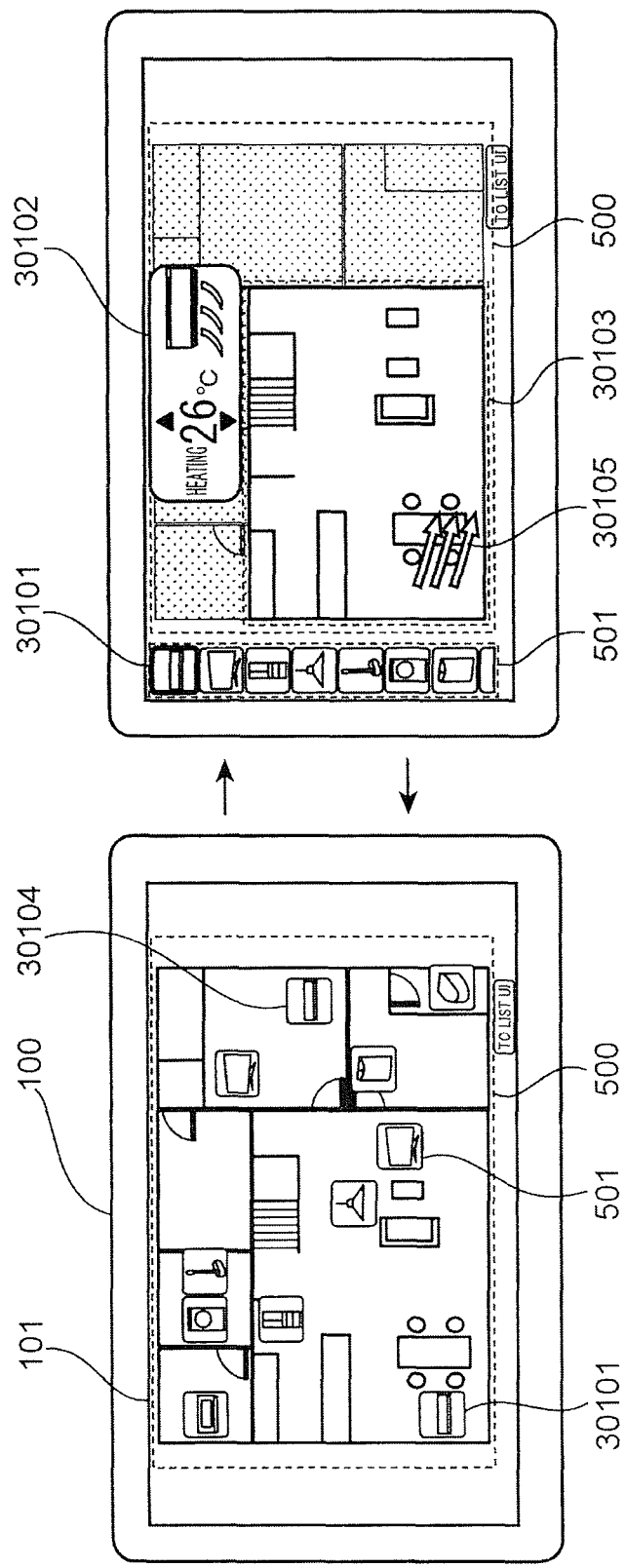

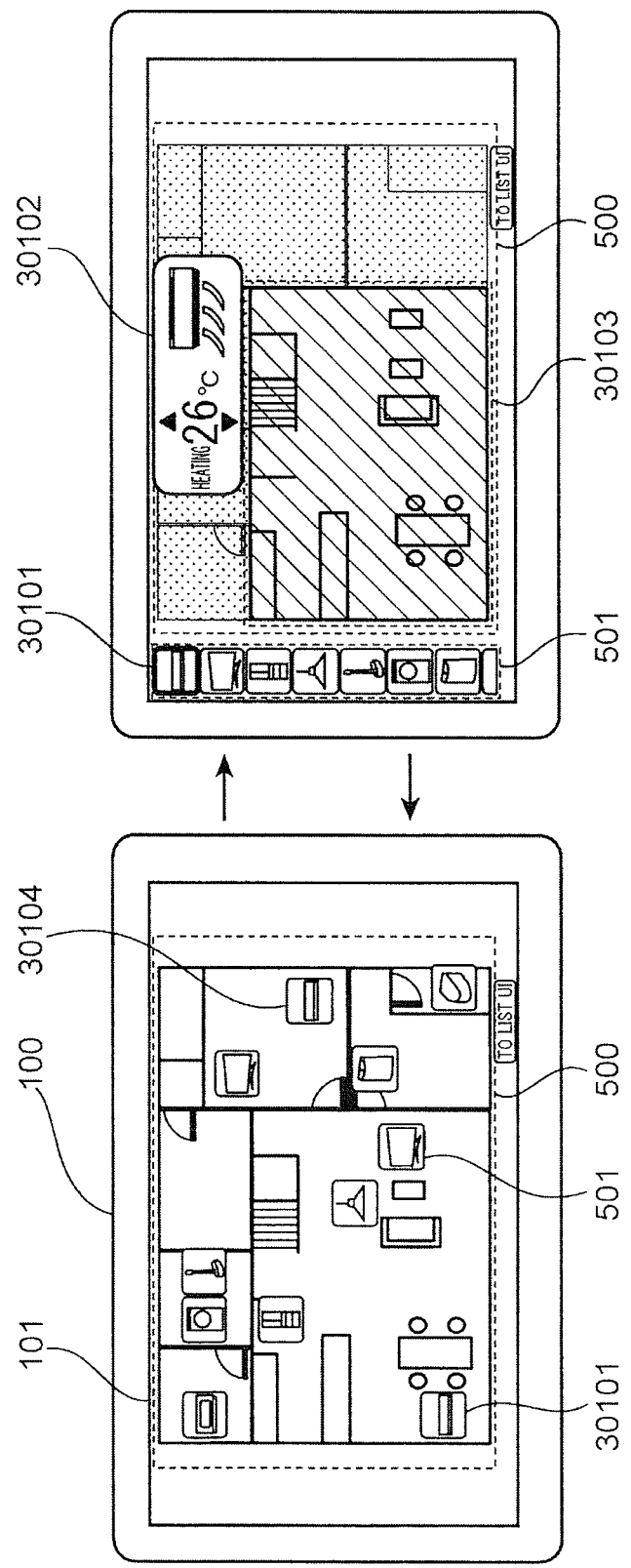

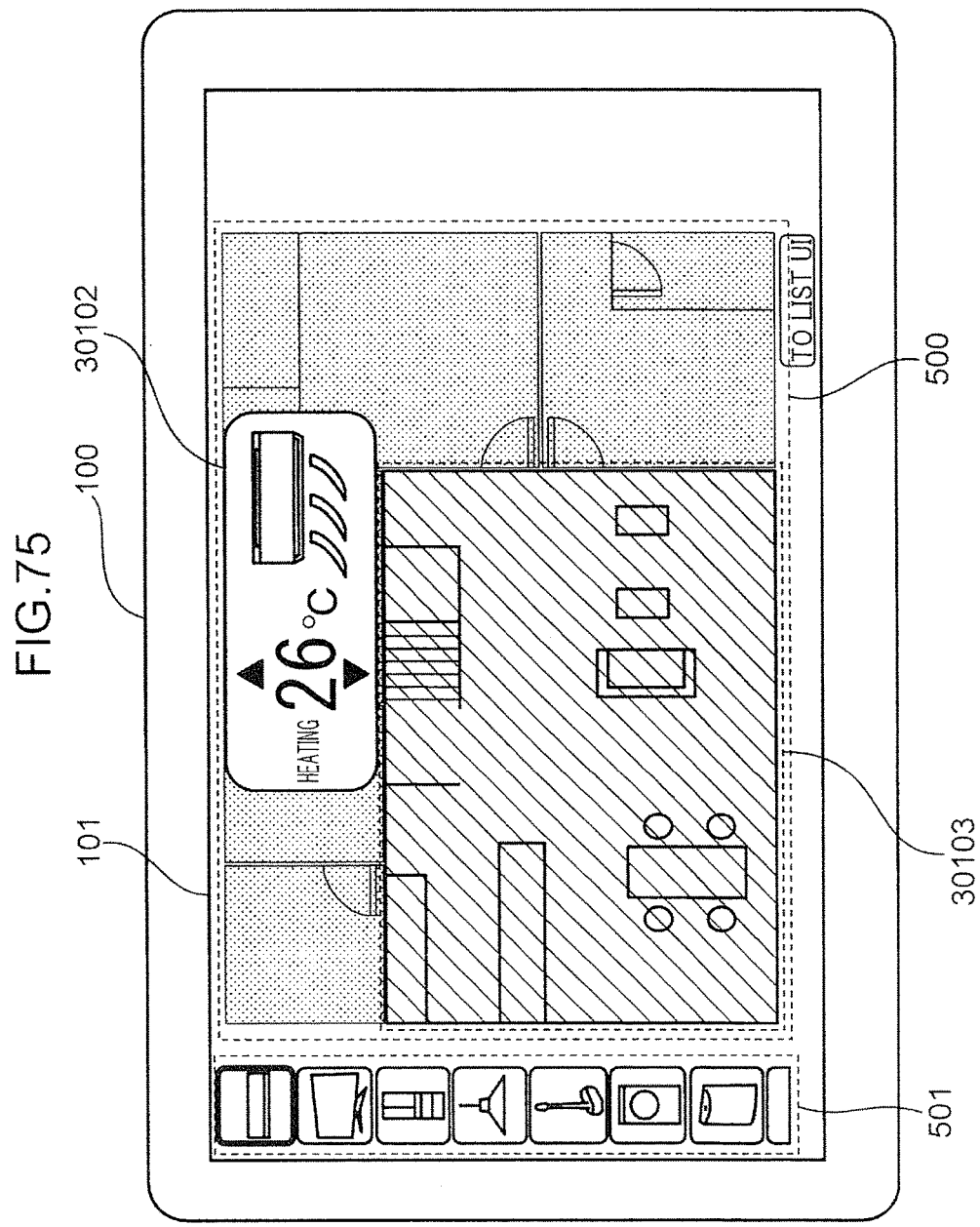

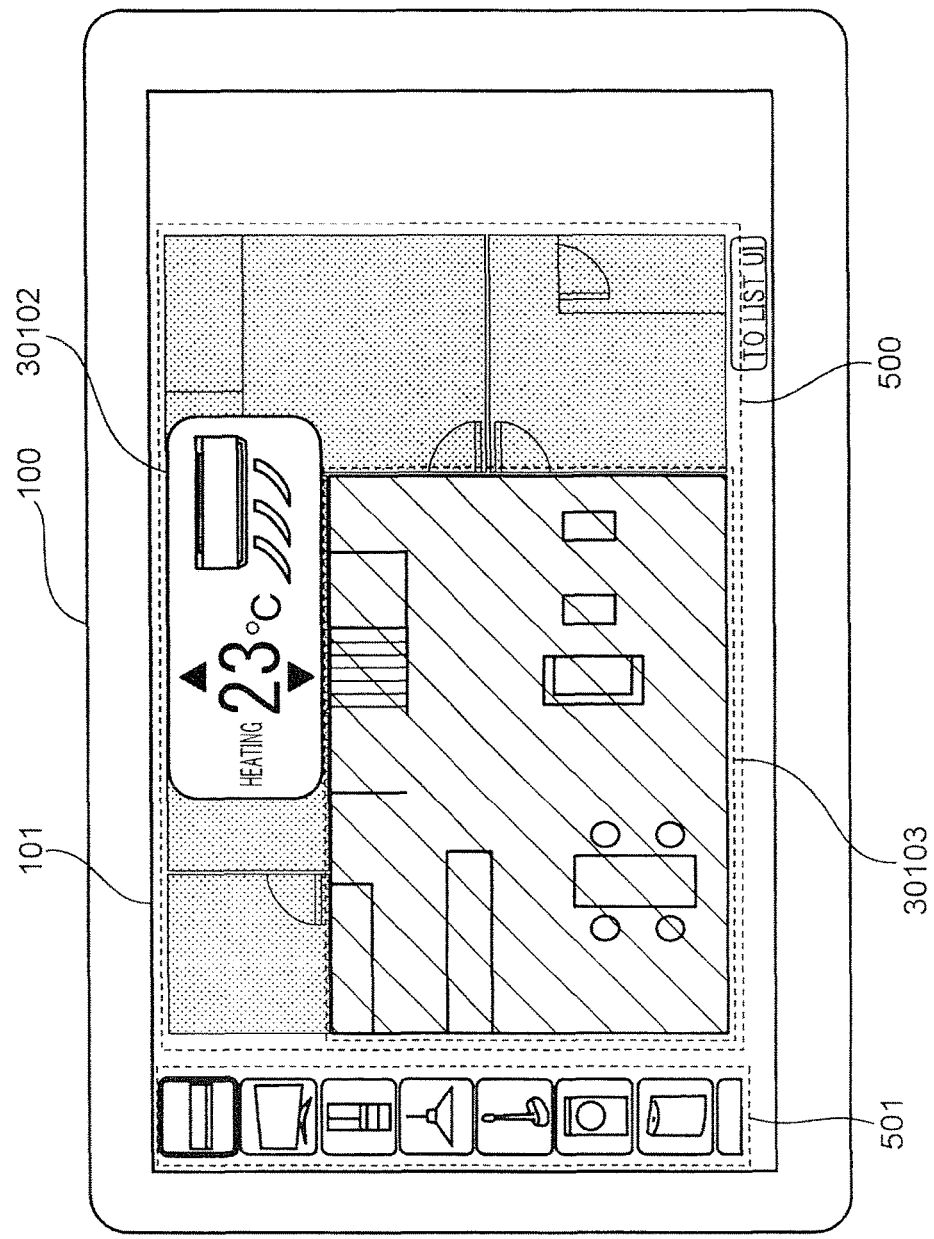

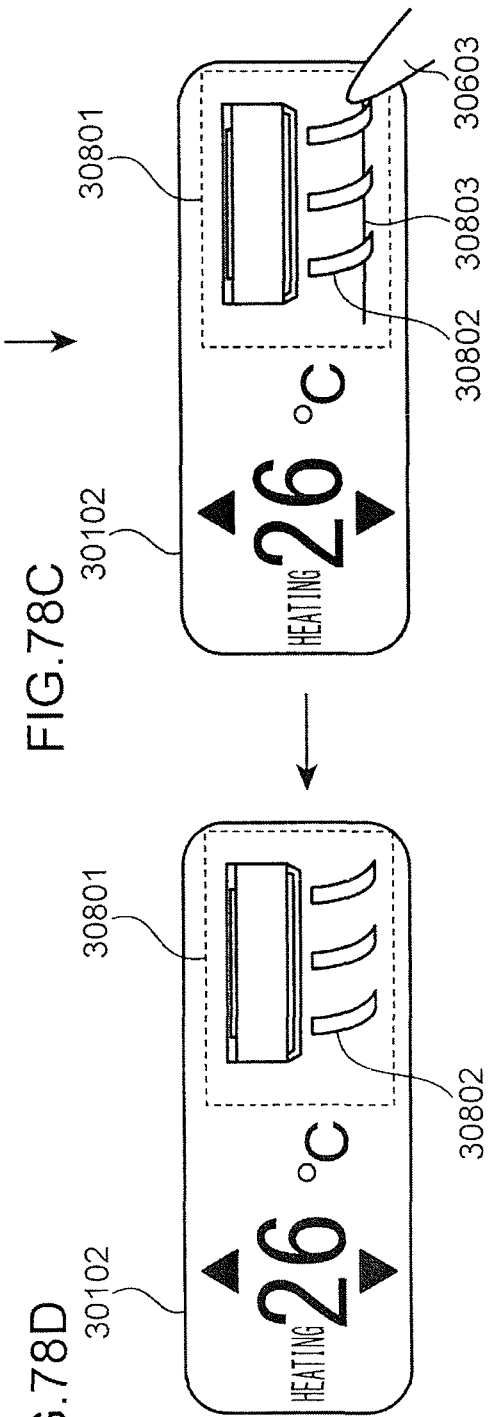
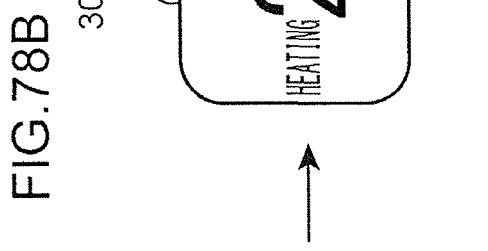
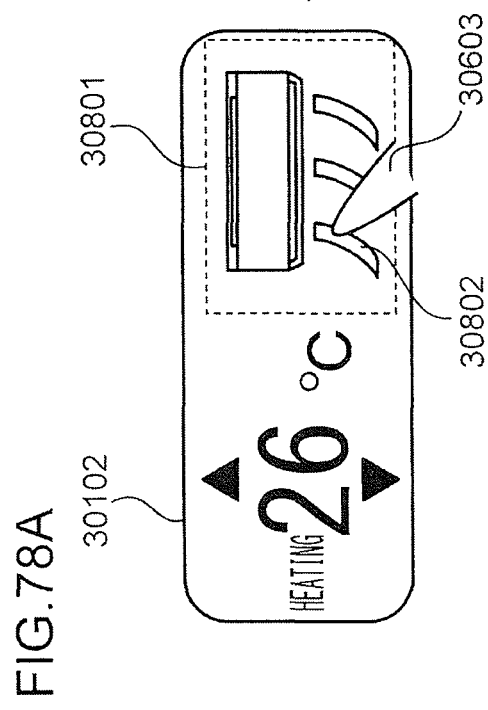

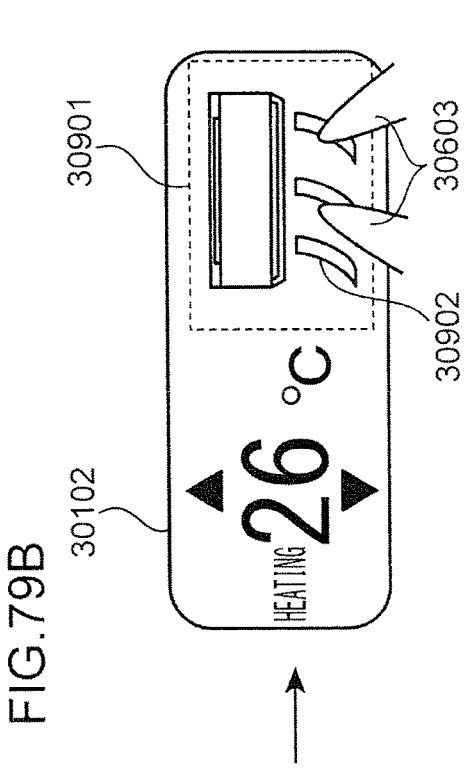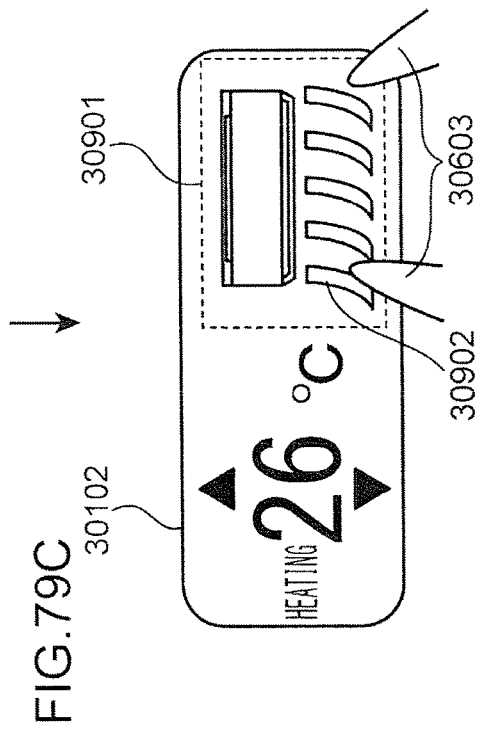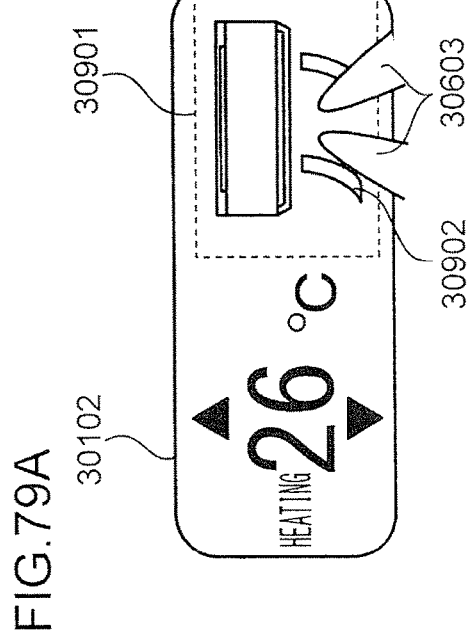

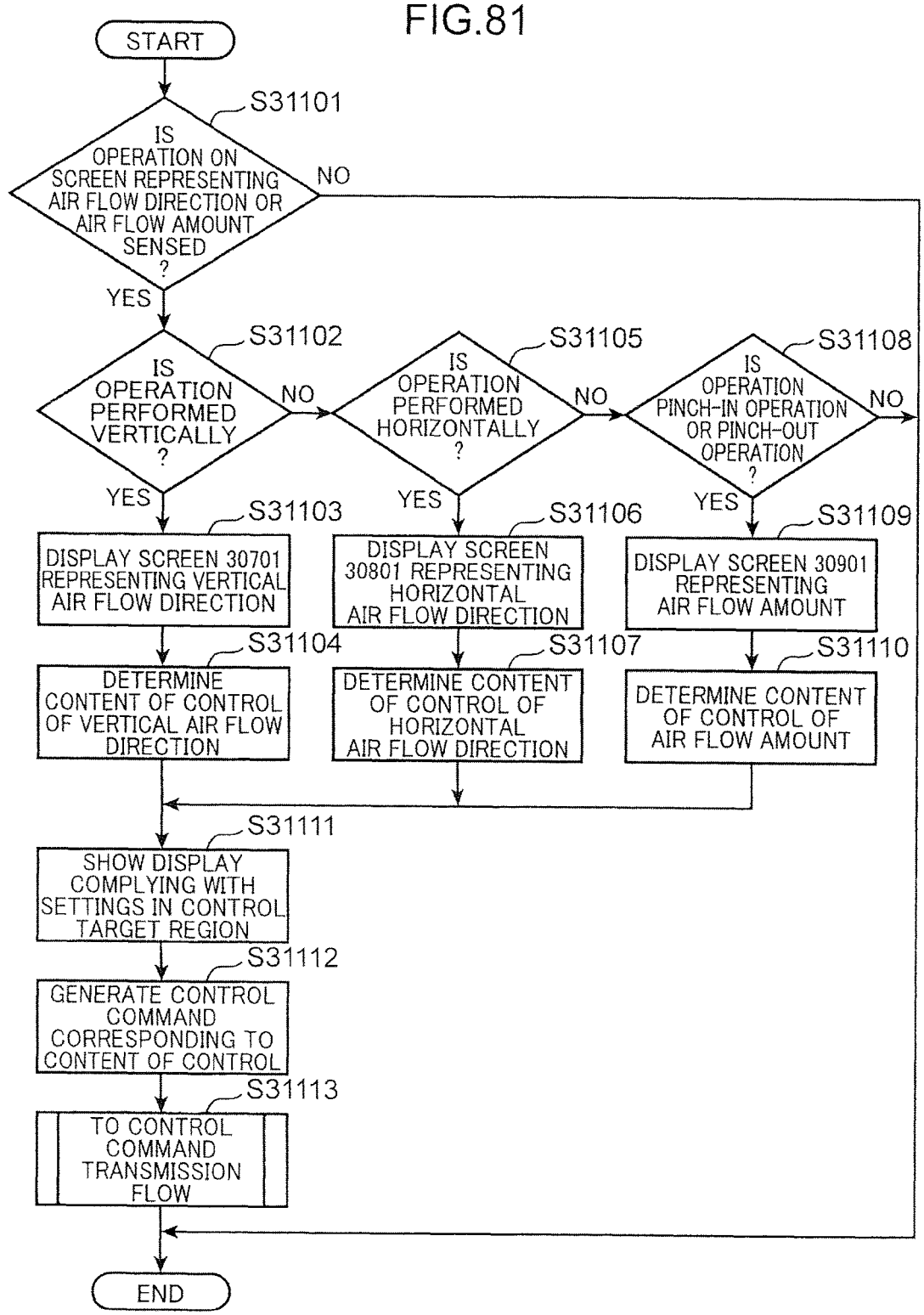

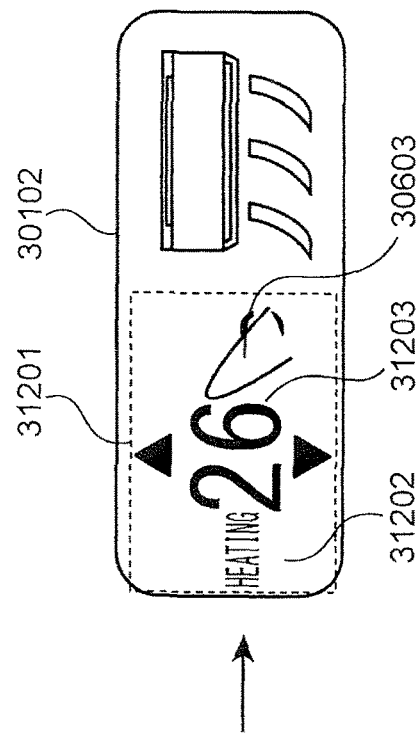
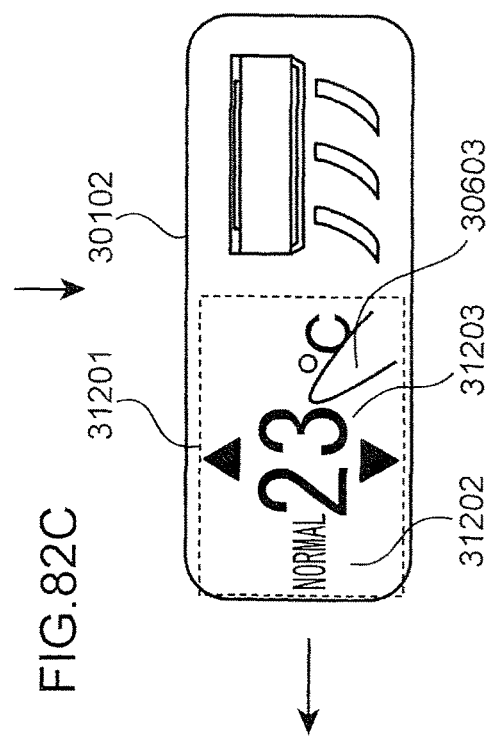
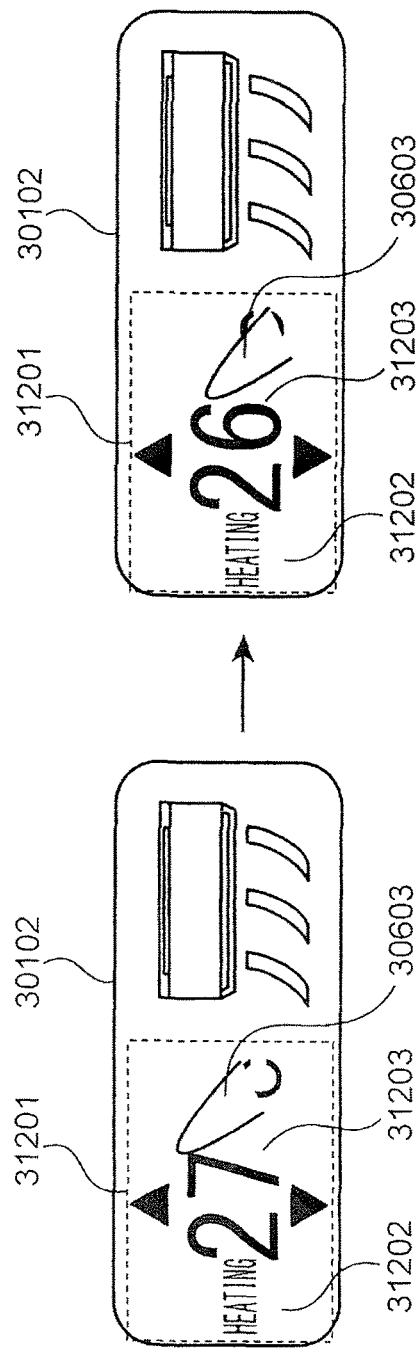
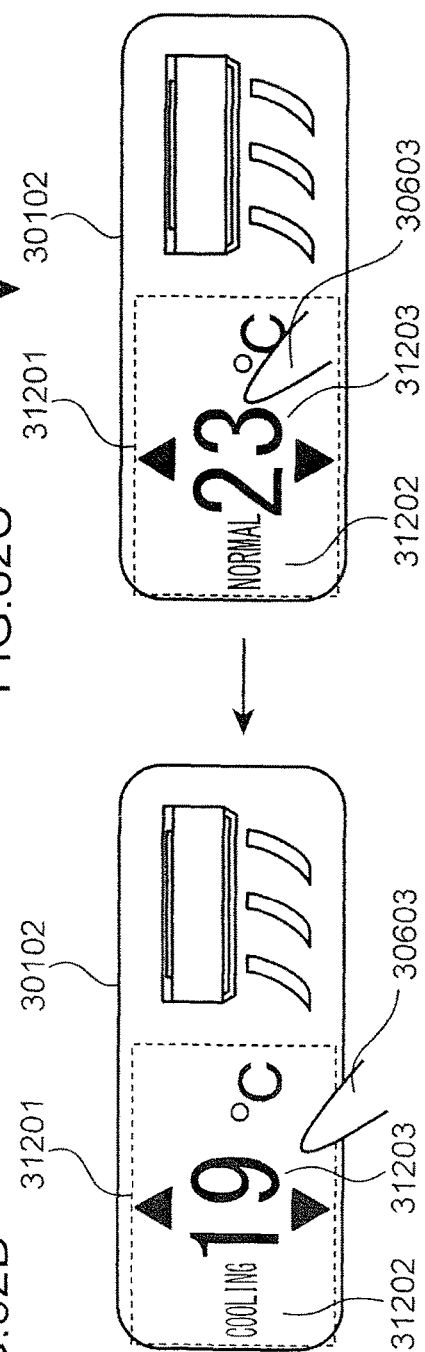
FIG.82A
FIG.82B
FIG.82C
FIG.82D

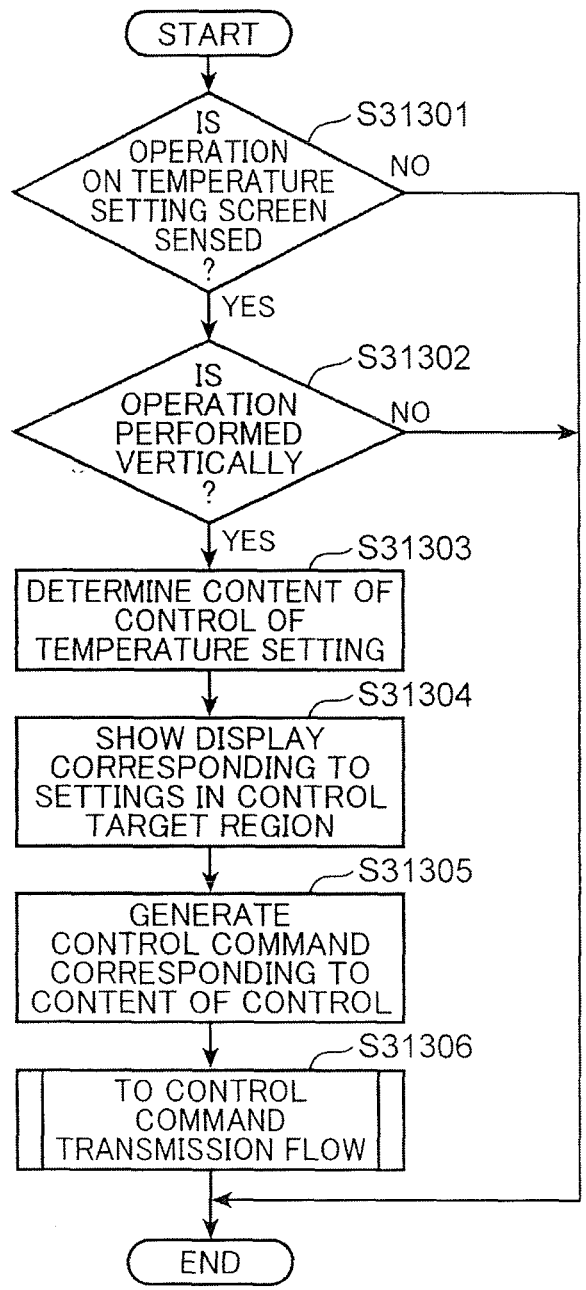

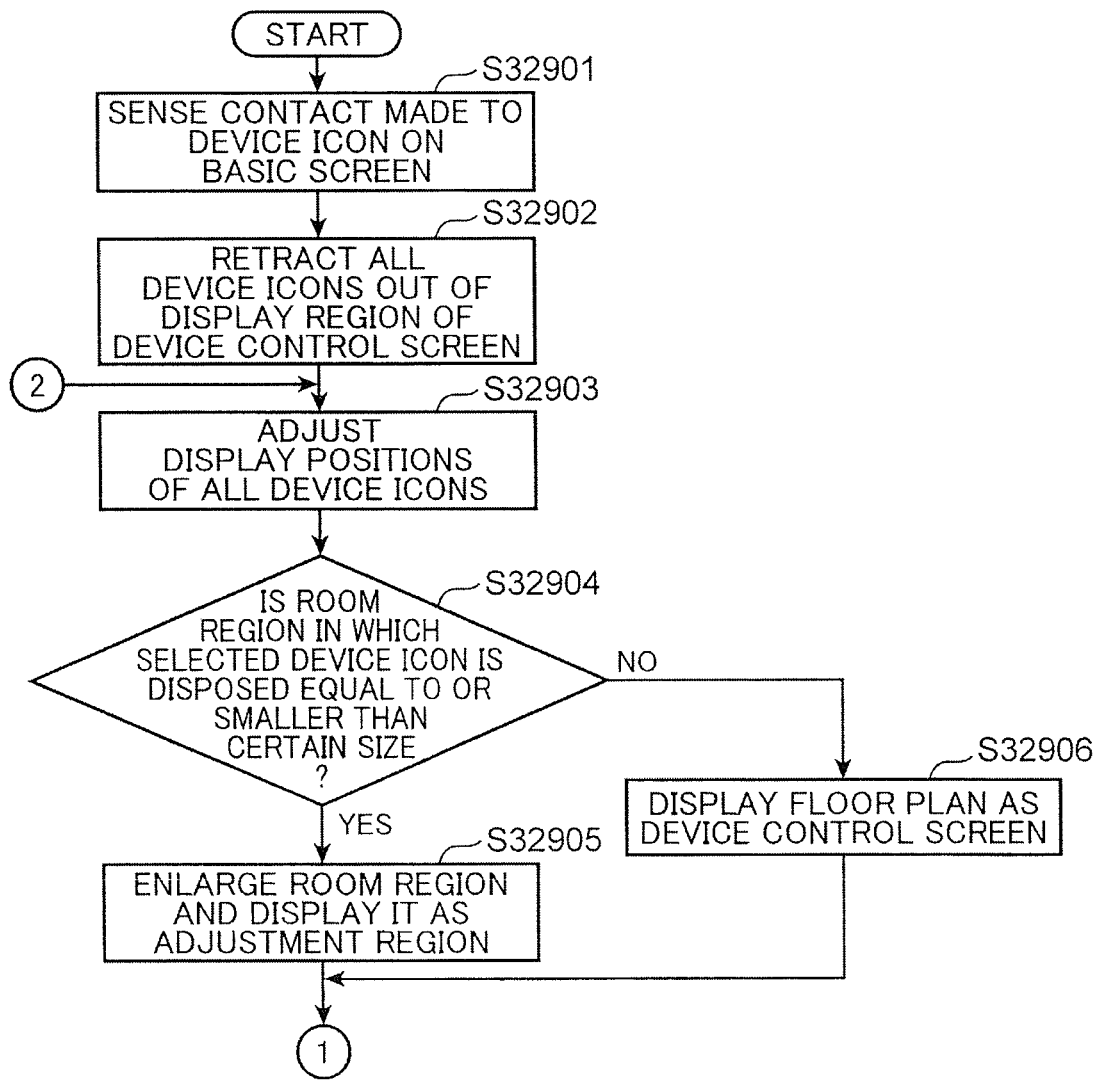

| ROOM ID | ROOM TYPE | SPACE COORDINATES | AREA: SQUARE METERS |
|---------|-----------|-------------------|---------------------|
| A | LIVING ROOM | (F,G,H,I,L,O,N) | 24.3 |
| B | BED ROOM | (J,K,M,L,I) | 9.7 |
| C | BATHROOM | (A,B,G,F) | 5.0 |
| ... | | | |

FIG.102

Table 33200A:

| DEVICE ID 33201 | DEVICE TYPE 33202 | MODEL NUMBER 33203 | ARRANGEMENT 33204 | CAPABILITY INFORMATION 33205 | CONTROL COMMAND TRANSMISSION DESTINATION 33206 | CORRESPONDING AREA: SQUARE METERS 33207 |
|---|---|---|---|---|---|---|
| A | AIR CONDITIONER | CS-X403C | (X10,Y80,Z1) | TEMPERATURE CONTROL AIR FLOW DIRECTION CONTROL AIR FLOW AMOUNT CONTROL | DEVICE | 22.7 (4.0kW) |
| B | ILLUMINATION | HH-LC710A | (X60,Y60,Z1) | ON/OFF CONTROL DIMMER CONTROL | DEVICE | 16.2 (5000lm・73W) |
| C | REFRIGERATOR | NR-F557XV | (X30,Y30,Z1) | POWER CONSUMPTION STATE MANAGEMENT | SERVER | — |
| ... | | | | | | |

Table 33200B:

| DEVICE ID 33208 | FRONT DIRECTION (DEGREES) 33209 | AIR FLOW DIRECTION (RELATIVE ANGLE FROM FRONT DIRECTION) 33210 |
|---|---|---|
| A | 0 DEGREES | 45 DEGREES |

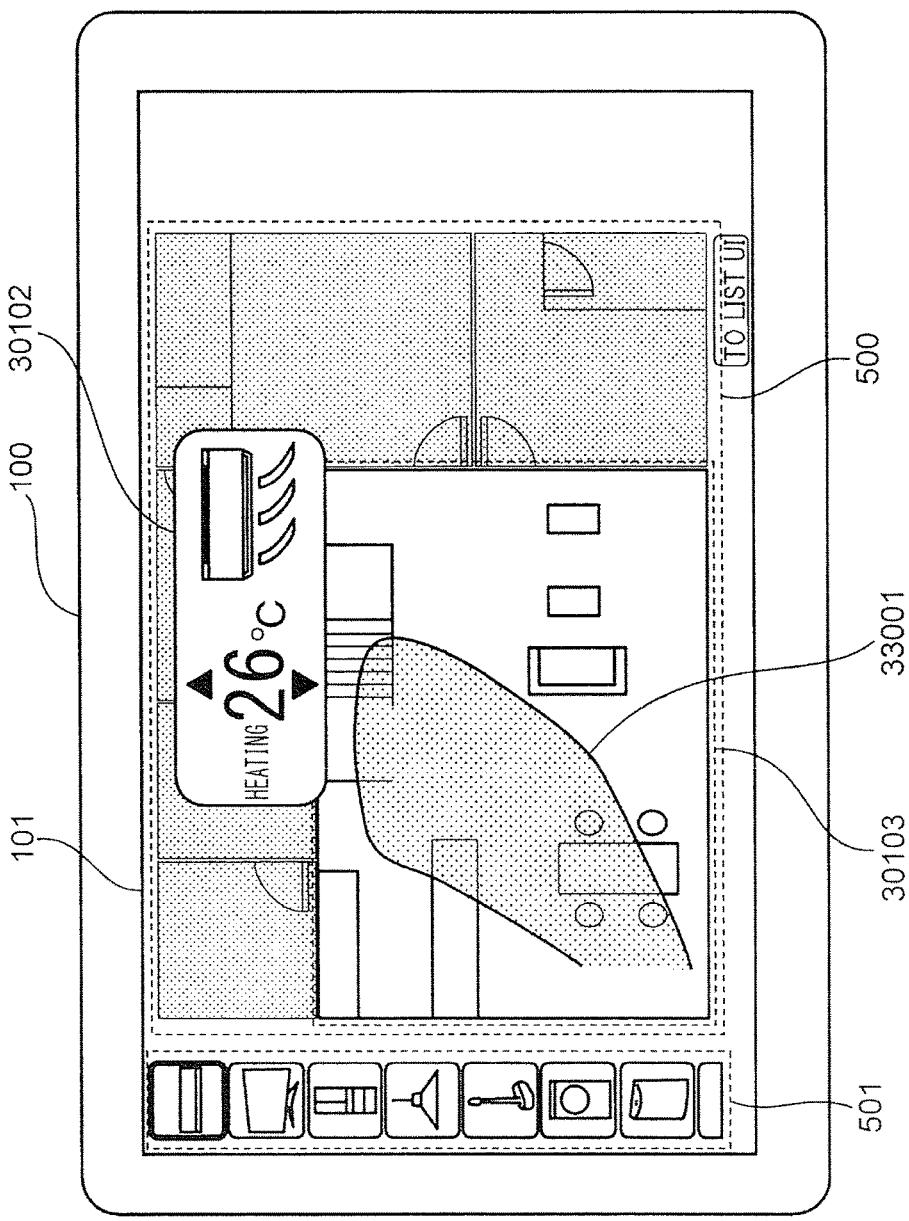

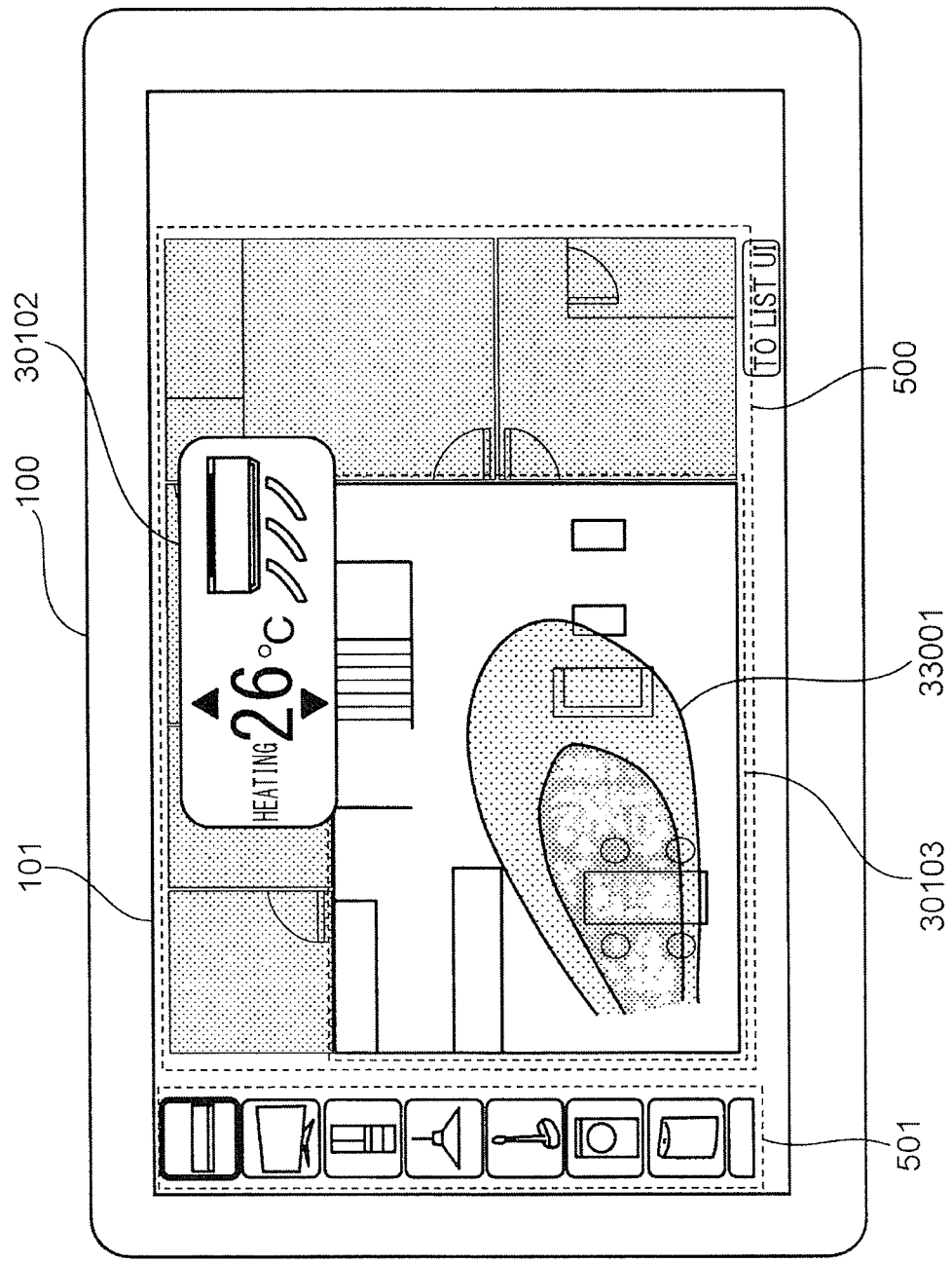

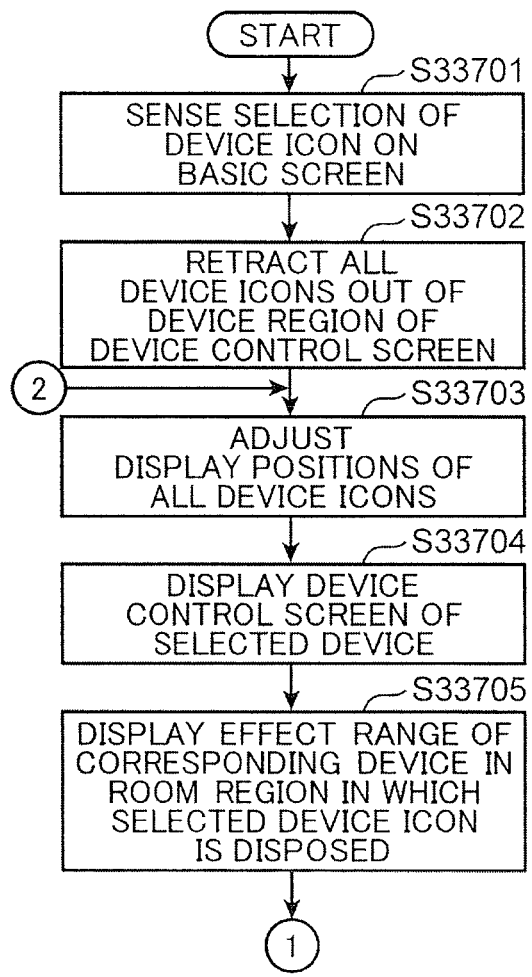

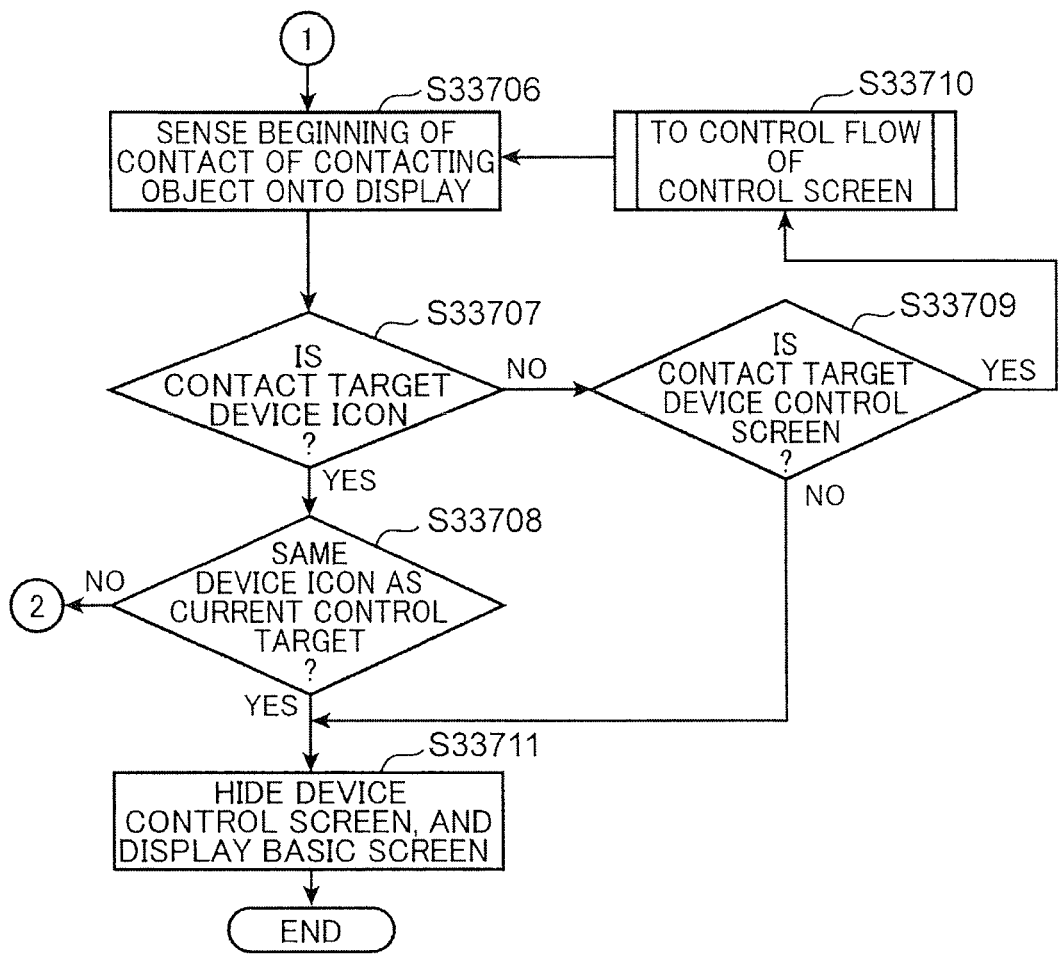

CONTROLLING AN AIR CONDITIONER OVER A NETWORK

RELATED APPLICATIONS

This application is a Continuation of International Application No. PCT/JP2013/003197, filed May 20, 2013, which claims the benefit of U.S. Provisional application No. 61/766,900, filed Feb. 20, 2013, the disclosures of which are incorporated by reference herein in their entireties.

TECHNICAL FIELD

The present disclosure relates to a control method for an information apparatus and a computer-readable recording medium.

BACKGROUND ART

Technologies for remotely monitoring or remotely controlling one or more target devices using one remote controller are proposed.

Patent Document 1 discloses a technology for remotely operating one or more target devices from a monitor of a television set. Specifically, icons for the one or more target devices are displayed on the right side of a monitor screen. When a desired one of the icons is selected (i), a floor plan is displayed on the left side of the monitor screen (ii). When a pointer is moved to the location of installation of a target device desired to be operated in the floor plan (iii), an operation screen for the target device selected by moving the pointer is displayed on the monitor screen (iv) (paragraphs [0138] to [0140] and FIGS. 25A and 25B).

Patent Document 2 discloses a technology for controlling one or more target devices using a single remote controller. Specifically, a floor plan of each room and the condition within the room are displayed on a liquid crystal monitor of the remote controller. For example, the liquid crystal monitor displays a illumination mark displayed in the case where an illumination device of a certain room is turned on, a room temperature mark that indicates the current temperature of a certain room, a lock mark in the shape of a hatched window displayed in the case where a window of a certain room is locked, a device/facility mark that indicates the status or the like of a control target object, a mark that indicates the amount of hot water in the case where the control target is a bath, and so forth (paragraphs [0037] to [0041] and FIG. 6).

Patent Document 3 relates to a technology for remotely controlling and remotely monitoring open/close operation and the state of an electric building material (such as a hallway door or a skylight). Specifically, a monitor screen of a personal computer displays floor plans for first and second floors of a property, a picture of the electric building material (such as a hallway door or a skylight) and a state display icon that indicates the open/close state of the electric building material are displayed at the corresponding position on the floor plans. When the state display icon is selected, an operation screen for the selected electric building material is displayed in another window. The operation screen includes an open operation button, a close operation button, an operation monitor screen, and a button for hiding the operation screen (paragraph [0025] and FIGS. 4, 5, and 6).

Patent Document 4 discloses a user interface including a floor plan and an icon. Examples of the icon include an icon representing a receptacle, an icon representing a digital image frame, and an icon representing an illumination device (FIGS. 7 and 8B).

Patent Document 5 discloses a user interface of an illumination system. When an icon associated with a certain light source is dragged into a target region on a screen and moved toward the center of the target region, the intensity of light from the corresponding light source is increased.

However, Patent Documents 1 to 5 described above need a further improvement.

Patent Document 1: Japanese Patent Application Laid-open No. 2007-104567

Patent Document 2: Japanese Patent Application Laid-open No. 2000-138979

Patent Document 3: Japanese Patent Application Laid-open No. 2009-213107

Patent Document 4: U.S. Pat. No. 7,730,223

Patent Document 5: Japanese Patent No. 5128489

SUMMARY OF THE INVENTION

In one general aspect, the techniques disclosed here future that in the case where selection of an icon representing an air conditioner is sensed in a region corresponding to a first room on the floor plan that is larger than a predetermined area, the region corresponding to the first room is switched to an adjustment region for changing the set temperature of the air conditioner, and in the case where selection of the icon representing the air conditioner is sensed in a region corresponding to a second room on the floor plan that is equal to or smaller than the predetermined area, an adjustment screen for changing the set temperature of the air conditioner installed in the region corresponding to the second room is displayed on the display screen.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 18 is a diagram showing an example of transition between the basic screen of the home controller and the display state of the device control screen according to the present disclosure.

FIG. 28 is a diagram showing how the home controller successively transitions among the display states of the device control screens for different devices according to the present disclosure.

FIG. 31 is a diagram showing the configuration of vertex information according to the present disclosure.

FIG. 32 is a diagram showing the configuration of room information according to the present disclosure.

FIG. 34 is a diagram showing the configuration of a device list managed by the server according to the present disclosure.

FIG. 35 is a diagram showing the configuration of a device list managed by the home controller according to the present disclosure.

FIG. 36 is a sequence diagram showing the flow of a process for the home controller to acquire the home information from the server according to the present disclosure.

FIG. 68 is a diagram showing the configuration of room information shown in FIG. 67.

FIG. 70 is a diagram showing the configuration of a device list managed by the server for a case where the floor plan shown in FIG. 52 is adopted.

FIG. 71 is a diagram showing the configuration of a device list managed by the home controller for a case where the floor plan shown in FIG. 52 is adopted.

FIG. 72 is a diagram showing transition between a display state of the basic screen and a display state of an air conditioner control screen which is the device control screen of an air conditioner, according to the present disclosure.

FIG. 74 is a diagram showing screen transition between a display state of the basic screen and a display state of the air conditioner control screen in which information on the operation state of the air conditioner is displayed in a control target region, according to the present disclosure.

FIG. 75 is a diagram showing the configuration of a display state of the air conditioner control screen obtained when the temperature is set high, according to the present disclosure.

FIG. 76 is a diagram showing the configuration of a display state of the air conditioner control screen obtained when the temperature is set low, according to the present disclosure.

FIG. 78A to 78D are diagrams showing an example of operating a horizontal air flow direction of the air conditioner using the air conditioner control screen, according to the present disclosure.

FIG. 79A to 79C are diagrams showing an example of operating an air flow amount of the air conditioner using the air conditioner control screen, according to the present disclosure.

FIG. 81 is a flowchart showing S31010 of FIG. 80B, a control flow of the device control screen, according to the present disclosure.

FIG. 82A to 82D are diagrams showing an example of operating a set temperature of the air conditioner using the air conditioner control screen, according to the present disclosure.

FIG. 83 is a flowchart showing S31010 of FIG. 80B, a control flow of the device control screen, according to the present disclosure.

FIG. 99A is a flowchart showing yet another example of the process for the home controller to control a device, according to the present disclosure.

FIG. 101 is a diagram showing the configuration of room information used in an example of controlling the air conditioner, according to the present disclosure.

FIG. 102 is a diagram showing the configurations of device lists used in the example of controlling the air conditioner, according to the present disclosure.

FIG. 103 is a diagram showing the effect range obtained when the air flow direction is changed, according to the present disclosure.

FIG. 106 is a diagram showing the effect range that represents the levels of effects in a step-like manner, in the present disclosure.

FIG. 107A is a flowchart of yet another process for the home controller to control a device, according to the present disclosure.

FIG. 107B is a flowchart showing yet another process for the home controller to control a device, according to the present disclosure.

Figure 1:
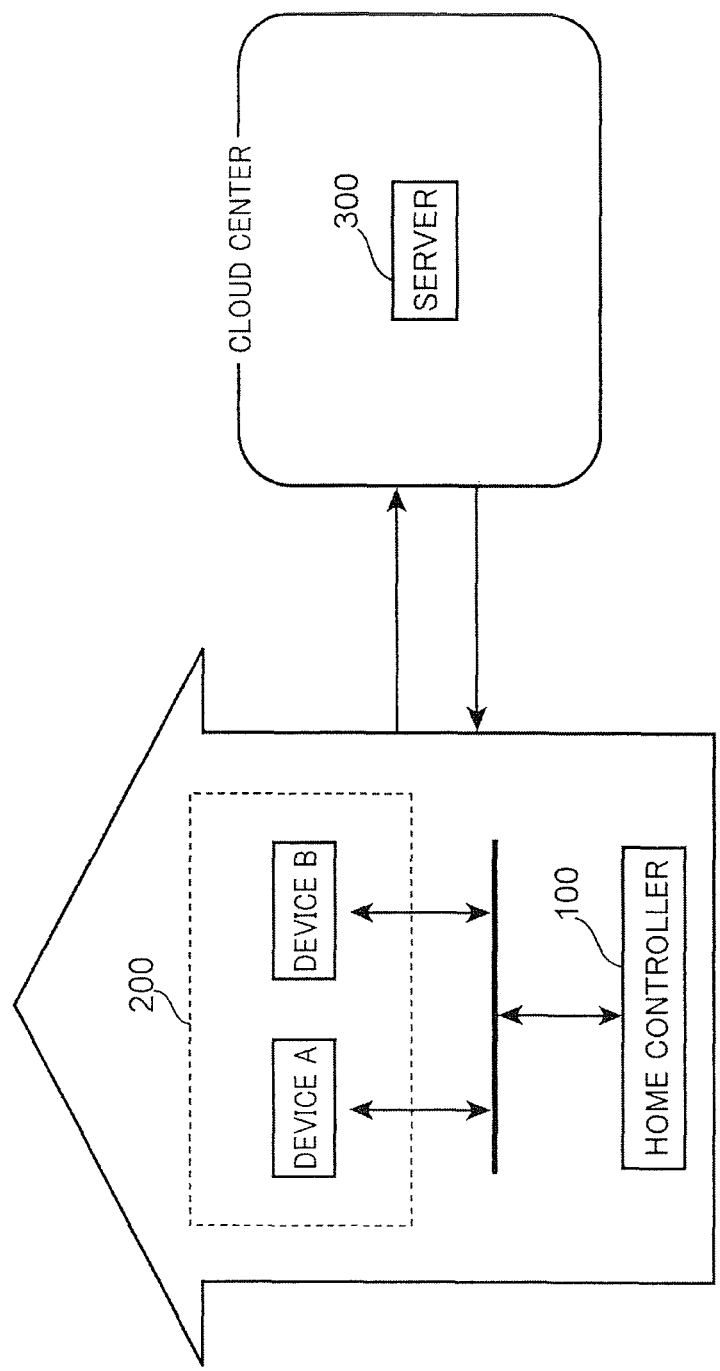
FIG. 1 is a diagram showing an overall configuration of a home control system to which a home controller according to the present disclosure is applied.

DETAILED DESCRIPTION (Story before Inventing Aspect according to Present Disclosure)

First, the point of view of an aspect according to the present disclosure will be described.

In Patent Document 1 described above, icons for one or more target devices are displayed on the right side of a monitor screen, and a floor plan is displayed on the left side of the monitor screen. That is, the icons for the one or more target devices and the floor plan are displayed separately from each other, and the icons for the one or more target devices are not movable. Therefore, the location of installation of a target device desired to be operated in the floor plan is designated by moving a pointer. Then, an operation screen is displayed.

In Patent Document 1 described above, because of the configuration described above, the number of operation steps to be taken to display an operation screen for a desired target device is large, from (i) to (iv) described above. Therefore, when one or more target devices are remotely monitored or remotely controlled using one remote controller, the operation steps (i) to (iv) described above are required to operate each target device, which complicates operation. This requires a larger number of process steps to be taken by a portable information terminal before a desired target device among the one or more target devices is operated simply because remote controllers for the one or more target devices are integrated into one, which requires a larger number of process operations to be performed by a user.

Patent Document 2 described above describes only displaying the state of each target device, and does not describe at all remotely controlling operation of each target device. Therefore, although the one or more target devices can be remotely monitored using one remote controller, the one or more target devices cannot be controlled.

According to Patent Document 3, the open/close operation and state of an electric building material (such as a hallway door or a skylight) are remotely controlled and remotely monitored using a personal computer. However, the content of such remote control operation is limited to simple control such as the open/close operation and does not take unique operations for other home electric appliances into consideration. According to Patent Document 3, the operation screen is displayed at all times by selection of a state display icon.

According to Patent Document 4, for example, the operation screen for an illumination device and the operation screen for a digital image frame are displayed (FIG. 8B). The operation screen for an illumination device includes a button for controlling the ON/OFF operation of the illumination device, a button for setting the brightness of the illumination device, and a button for checking the state of the illumination device. According to Patent Document 4, the operation screen is displayed at all times by selection of each icon.

Patent Document 5 discloses a feature in which, for example, the intensity of light of the illumination device in a room corresponding to the target region is controlled by moving the icon from the outside of the target region to the inside of the target region. Patent Document 5, however, does not consider unique operations for other home electric appliances.

Based on the considerations described above, the inventors have conceived various aspects of the present disclosure to be described below.

One aspect of the present disclosure is a method for controlling an information apparatus, the information apparatus having a display and connected to a network, over which one or more target devices are controlled, the method causing a computer of the information apparatus to:

display a display screen representing a floor plan of a building on the touch-panel display;

display an icon representing each of the one or more target devices on the display screen representing the floor plan, the one or more target devices including an air conditioner;

in the case where selection of an icon representing the air conditioner is sensed in a region corresponding to a first room on the floor plan that is larger than a predetermined area, switch the region corresponding to the first room to an adjustment region for changing a set temperature of the air conditioner;

in the case where selection of the icon representing the air conditioner is sensed in a region corresponding to a second room on the floor plan that is equal to or smaller than the predetermined area, display an adjustment screen for changing the set temperature of an air conditioner installed in the region corresponding to the second room on the display screen; and in the case where it is sensed that a contact to the touch-panel display moves within the adjustment region or adjustment screen, transmit, to the network, a control command for changing the set temperature of the air conditioner in accordance with a movement amount in which the contact moves.

According to this aspect, when selection of the icon representing the air conditioner is sensed in the region corresponding to a first room on the floor plan, the region corresponding to the first room is used as a region for changing the set temperature of the air conditioner.

In other words, instead of displaying another special screen to change the set temperature of the air conditioner, the region itself that corresponds to the first room on the floor plan is also used as the region for changing the set temperature of the air conditioner.

Consequently, the number of steps required to display the operation screen in addition to the floor plan as in Patent Document 1, Patent Document 3 and Patent Document 4 can be reduced, leading to a reduction in the number of process steps of the information apparatus and the number of user operations. As a result, the number of processes of the information apparatus and the number of user operations can be reduced in the case where the remote controllers of the one or more target devices are integrated into one unit, cutting the time required to operate a desired home electric appliance.

Because the region itself that corresponds to the first room on the floor plan is used as the screen for changing the set temperature of the air conditioner as described above, the floor plan can be used not only for displaying the operation state of an illumination device as in Patent Document 2 but also for remotely operating the air conditioner.

However, when the region corresponding to a small room on the floor plan is used as the adjustment region for changing the set temperature of the air conditioner in the room, a sufficient adjustable range cannot be ensured due to the small region corresponding to the room.

According to the present aspect, in the case where selection of the icon representing the air conditioner among the one or more target devices is sensed in the region corresponding to the second room on the floor plan that is equal to or smaller than the predetermined area, the adjustment screen for changing the set temperature of the air conditioner installed in the region corresponding to the second room is displayed on the display screen.

Therefore, in the case where selection of the icon representing the air conditioner among the one or more target devices is sensed within the region corresponding to the first room on the floor plan that is larger than the predetermined area, the region corresponding to the first room is also used as the adjustment region for changing the set temperature of the air conditioner. On the other hand, in the case where selection of the icon representing the air conditioner among the one or more target devices is sensed within the region corresponding to the second room on the floor plan that is equal to or smaller than the predetermined area, the adjustment screen for changing the set temperature of the air conditioner installed in the region corresponding to the second room is displayed separately.

This can limit the use of another operation screen as much as possible while allowing application of the displayed floor plan as the adjustment screen and effective use of the display resources. In addition, since the adjustment screen of the air conditioner is displayed in a small room on the floor plan, a user operation region can sufficiently be ensured. Furthermore, according to this configuration, the set temperature of the air conditioner is changed in accordance with the movement amount in which the contact to the touch-panel display moves. Thus, an intuitive operation of the air conditioner can be realized.

Also in the foregoing aspect, for example, the adjustment screen may be displayed on the region corresponding to the second room in enlargement.

In this case, the screen on which the region corresponding to the second room on the floor plan is displayed in enlargement is used as the adjustment screen. Thus, the region corresponding to the first room and the region corresponding to the second room can be operated in the same manner to ensure the same adjustable range.

In the foregoing aspect, for example, the adjustment screen may be displayed in the middle of the display screen on the display screen.

In this case, the adjustment screen can be highlighted with respect to the display screen by displaying the adjustment screen in the middle of the display screen.

Furthermore, according to the foregoing aspect, in the case where, for example, a movement starting point of the contact is sensed within a range of the adjustment screen, and a movement ending point of the contact is sensed beyond the adjustment screen, a control command for changing the set temperature of the air conditioner in accordance with the movement amount in which the contact moves, including an extra movement amount beyond the adjustment screen, may be transmitted to the network.

In this case, in order to change the set temperature of the air conditioner, a user can use the region outside the adjustment screen. The user can therefore change the set temperature of the air conditioner by effectively utilizing the display having a limited display region. Note that whether the region outside the adjustment screen is used to change the set temperature of the air conditioner or not can be determined based on whether the movement starting point of the contact is located within the range of the adjustment screen.

In addition, according to the foregoing aspect, in the case where, for example, the contact moves beyond the adjustment screen, the set temperature of the air conditioner may not be changed in accordance with an extra movement amount beyond the adjustment screen.

In this case, the range of movement of the contact for changing the set temperature of the air conditioner is limited to the region corresponding to the adjustment screen, preventing excessive increase in the movement amount in which the contact moves and hence in the amount of change of the set temperature of the air conditioner. In addition, changing the set temperature after the contact on the display moves beyond the adjustment screen is likely to make the user uncomfortable; however, placing such limitation can prevent the user from feeling such discomfort. Furthermore, the region outside the adjustment screen does not need to be recognized as the region for changing the set temperature of the air conditioner, reducing the burdens involved in the processes.

Moreover, according to the foregoing aspect, for example, the set temperature of the air conditioner may be changed greater as the movement amount in which the contact moves increases, and the set temperature of the air conditioner may be changed smaller as the movement amount in which the contact moves decreases.

In this case, the set temperature can be changed based on the amount of change associated with the movement amount in which the contact moves, realizing an operation that can easily be understood by the user.

Furthermore, according to the foregoing aspect, in the case where, for example, a movement starting point of the contact is sensed within an adjustment region, and a movement ending point of the contact is sensed beyond the region corresponding to the first room, a control command for changing the set temperature of the air conditioner in accordance with the movement amount in which the contact moves, including an extra movement amount beyond the region corresponding to the first room, may be transmitted to the network.

In this case, in order to change the set temperature of the air conditioner, the user can use the region outside the adjustment region. The user can therefore change the set temperature of the air conditioner by effectively utilizing the display having a limited display region. Note that whether the region outside the adjustment region is used to change the set temperature of the air conditioner or not can be determined based on whether the movement starting point of the contact is located within the range of the adjustment region.

In addition, according to the foregoing aspect, in the case where, for example, the contact moves beyond the region corresponding to the first room, the set temperature of the air conditioner may not be changed in accordance with an extra movement amount beyond the region corresponding to the first room.

In this case, the range of movement of the contact for changing the set temperature of the air conditioner is limited to the adjustment region, preventing excessive increase in the movement amount in which the contact moves and hence in the amount of change of the set temperature of the air conditioner. In addition, placing such limitation can make the user aware of that the scope of change of the set temperature is contained in the room installed with the air conditioner.

Another aspect of the present disclosure is, for example, a method for controlling an information apparatus, the information apparatus having a touch-panel display and connected to a network, over which one or more target devices are controlled, the method causing a computer of the information apparatus to:

display a display screen representing a floor plan of a building on the touch-panel display;

display an icon representing each of the one or more target devices on the display screen representing the floor plan, the one or more target devices including an air conditioner;

in the case where selection of an icon representing the air conditioner is sensed in a region corresponding to a first room on the floor plan that is larger than a predetermined area, display, on the display screen, an adjustment region for changing a set temperature of the air conditioner installed in the region corresponding to the first room;

in the case where selection of the icon representing the air conditioner is sensed in a region corresponding to a second room on the floor plan that is equal to or smaller than the predetermined area, display an adjustment screen for changing the set temperature of an air conditioner installed in the region corresponding to the second room on the display screen; and in the case where it is sensed that a contact to the touch-panel display moves within the adjustment region or adjustment screen, transmit, to the network, a control command for changing the set temperature of the air conditioner in accordance with a movement direction in which the contact moves.

According to this aspect, when selection of the icon representing the air conditioner is sensed in the region corresponding to a first room on the floor plan, the region corresponding to the certain room is used as a region for changing the set temperature of the air conditioner.

In other words, instead of displaying another special screen to change the set temperature of the air conditioner, the region itself that corresponds to the first room on the floor plan is also used as the region for changing the set temperature of the air conditioner.

Consequently, the number of steps required to display the operation screen in addition to the floor plan as in Patent Document 1, Patent Document 3 and Patent Document 4 can be reduced, leading to a reduction in the number of process steps of the information apparatus and the number of user operations. As a result, the number of processes of the information apparatus and the number of user operations can be reduced in the case where the remote controllers of the one or more target devices are integrated into one unit, cutting the time required to operate a desired home electric appliance.

Because the region itself that corresponds to the first room on the floor plan is used as the screen for changing the set temperature of the air conditioner as described above, the floor plan can be used not only for displaying the operation state of an illumination device as in Patent Document 2 but also for remotely operating the air conditioner.

However, when the region corresponding to a small room on the floor plan is used as the adjustment region for changing the set temperature of the air conditioner in the room, a sufficient adjustable range cannot be ensured due to the small region corresponding to the room.

According to the present aspect, in the case where selection of the icon representing the air conditioner among the one or more target devices is sensed in the region corresponding to the second room on the floor plan that is equal to or smaller than the predetermined area, the adjustment screen for changing the set temperature of the air conditioner installed in the region corresponding to the second room is displayed on the display screen.

Therefore, in the case where selection of the icon representing the air conditioner among the one or more target devices is sensed within the region corresponding to the first room on the floor plan that is larger than the predetermined area, the region corresponding to the first room is also used as the adjustment region for changing the set temperature of the air conditioner. On the other hand, in the case where selection of the icon representing the air conditioner among the one or more target devices is sensed within the region corresponding to the second room on the floor plan that is equal to or smaller than the predetermined area, the adjustment screen for changing the set temperature of the air conditioner installed in the region corresponding to the second room is displayed separately.

This can limit the use of another operation screen as much as possible while allowing application of the displayed floor plan as the adjustment screen and effective use of the display resources. In addition, since the adjustment screen of the air conditioner is displayed in a small room on the floor plan, a user operation region can be adjusted adequately. Furthermore, according to this configuration, the set temperature of the air conditioner is changed in accordance with the movement amount in which the contact to the touch-panel display moves. Thus, an intuitive operation of the air conditioner can be realized.

Also in the foregoing another aspect, for example, the adjustment screen may be displayed on the region corresponding to the second room in enlargement.

In the foregoing another aspect, for example, the adjustment screen may be displayed in the middle of the display screen on the display screen.

Furthermore, according to the foregoing another aspect, in the case where, for example, a movement starting point of the contact is sensed within a range of the adjustment screen, and a movement ending point of the contact is sensed beyond the adjustment screen, a control command for changing the set temperature of the air conditioner in accordance with the movement direction in which the contact moves, including an extra movement direction beyond the adjustment screen, may be transmitted to the network.

In addition, according to the foregoing aspect, in the case where, for example, the contact moves beyond the adjustment screen, the set temperature of the air conditioner may not be changed in accordance with an extra movement direction beyond the adjustment screen.

Also in the foregoing another aspect, in the case where, for example, it is sensed that the contact moves upward on the display screen, the set temperature of the air conditioner may be increased, and in the case where it is sensed that the contact moves downward on the display screen, the set temperature of the air conditioner may be decreased.

Furthermore, according to the foregoing another aspect, in the case where, for example, a movement starting point of the contact is sensed within a range of the adjustment region, and a movement ending point of the contact is sensed beyond the region corresponding to the first room, a control command for changing the set temperature of the air conditioner in accordance with the movement distance in which the contact moves, including an extra movement direction beyond the region corresponding to the first room, may be transmitted to the network.

For instance, the region outside the region corresponding to the first room may also be configured as the adjustment region. In such a case, whether the region outside the region corresponding to the first room is the adjustment region or not may be determined based on whether the movement starting point of the contact is located within the range of the adjustment region.

In addition, according to the foregoing another aspect, in the case where, for example, the contact moves beyond the region corresponding to the first room, the set temperature of the air conditioner may not be changed in accordance with an extra movement distance beyond the region corresponding to the first room.

For example, the region outside the region corresponding to the certain room may not be configured as the adjustment region.

(The Present Disclosure)

The present disclosure will be described below with reference to the drawings. In the drawings, the same symbols are used for the same constituent elements.

In the present disclosure, a home controller which can singly control one or more devices will be described.

(Overall Configuration)

FIG. 1 is a diagram showing an overall configuration of a home control system to which a home controller according to the present disclosure is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A portable information terminal such as a smartphone or a tablet terminal may be adopted as the home controller 100. It should be noted, however, that the smartphone and the tablet terminal are merely exemplary, and a portable information terminal of a button type such as a cellular phone may be adopted as the home controller 100.

Figure 2:
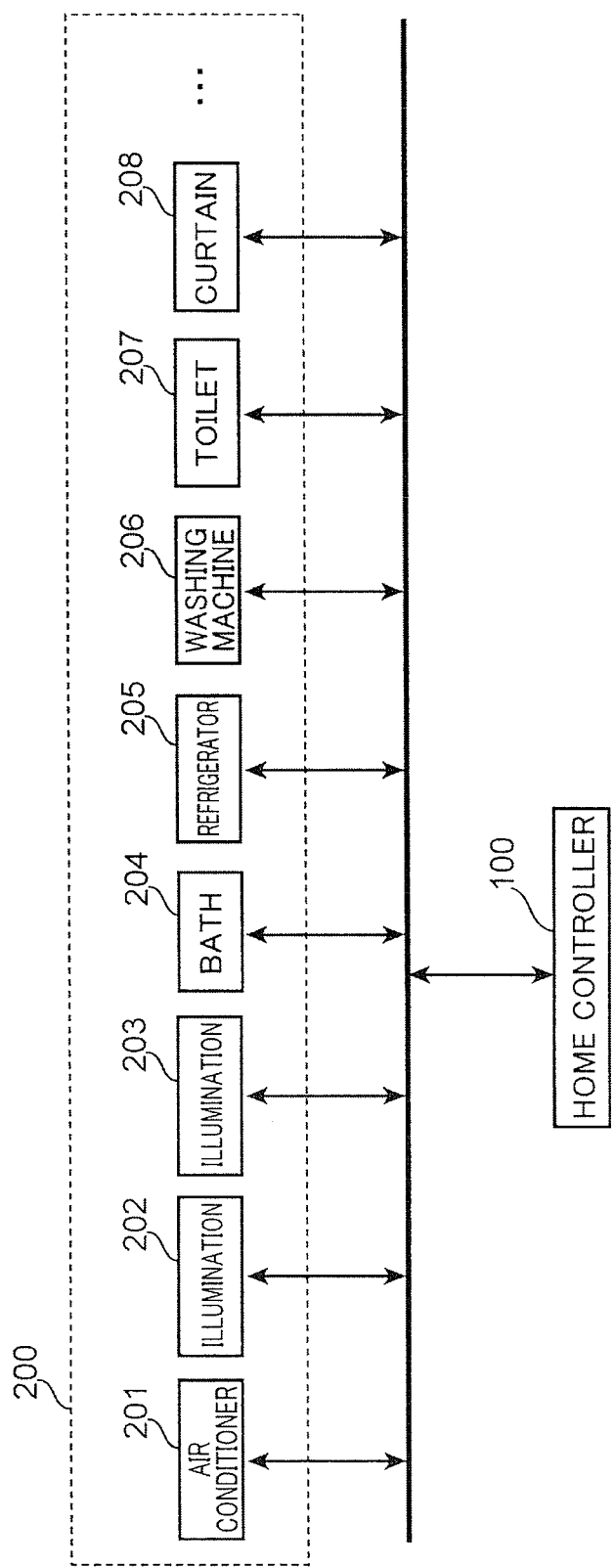
FIG. 2 is a diagram showing main devices to be controlled by the home controller according to the present disclosure.

FIG. 2 is a diagram showing the main devices 200 to be controlled by the home controller 100. The home controller 100 controls the devices 200 such as an air conditioner 201, illumination devices 202 and 203, a bath 204, a refrigerator 205, a washing machine 206, a toilet 207, and a curtain 208.

The devices 200 to be controlled by the home controller 100 may include a plurality of devices 200 of the same type such as the illumination devices 202 and 203.

The devices 200 such as the air conditioner 201 shown in FIG. 2 are merely exemplary, and a television set, a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the present disclosure is not limited thereto, and office devices for use in offices or the like may be adopted as the devices 200. Examples of the office devices include a printer, a personal computer, a scanner, and a copy machine.

Figure 3:
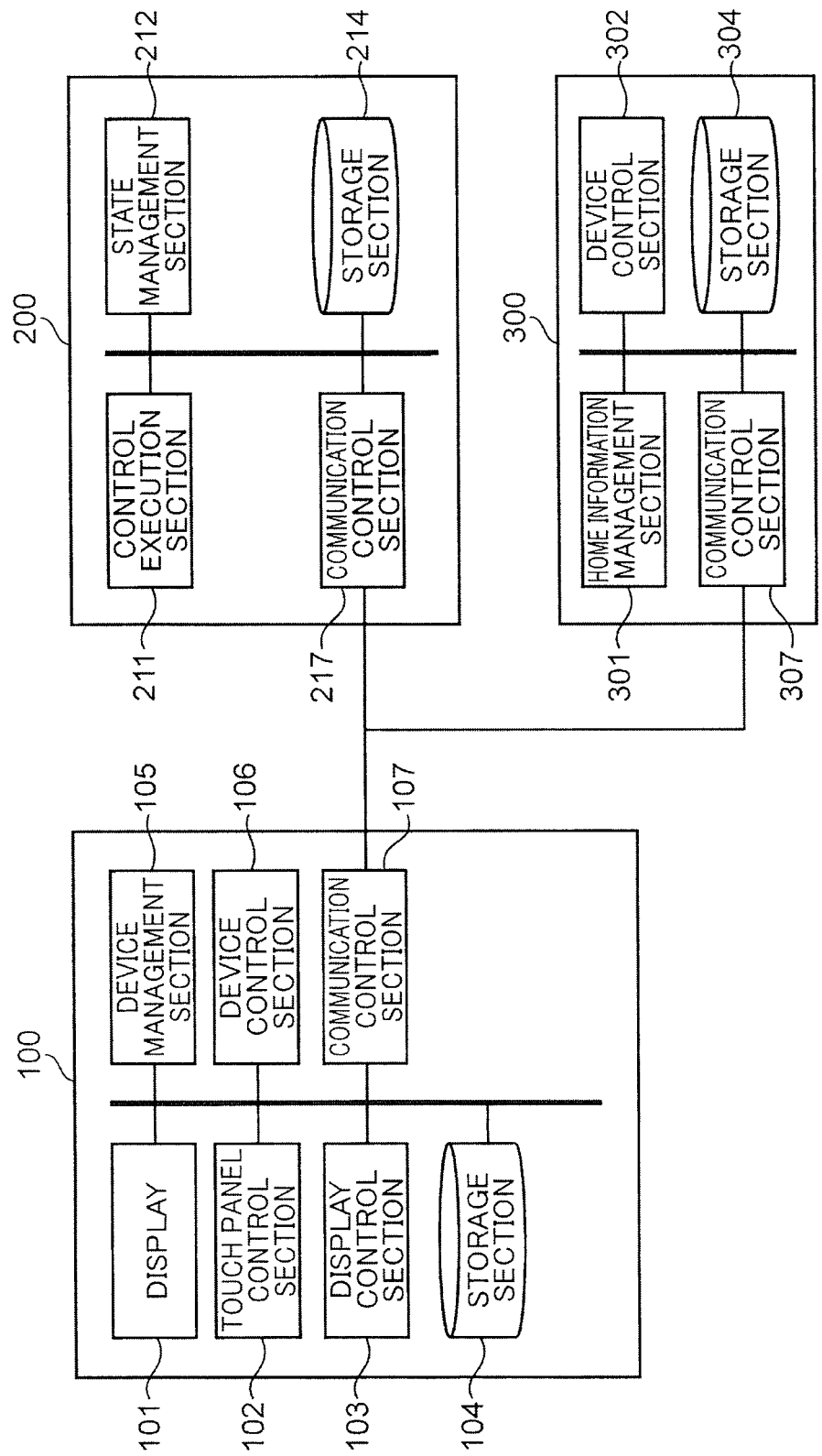
FIG. 3 is a block diagram showing the configuration of the home controller, a device, and a server according to the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 2700 to be discussed later from the server 300, stores the acquired home information 2700 in the storage section 104, and manages the home information 2700. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the present disclosure, a series of operations performed by the user by contacting the display 101 may be replaced with operations of moving a pointer and clicking using an external input device such as a mouse.

As shown in FIG. 3, the device 200 includes a control execution section 211, a state management section 212, a storage section 214, and a communication control section 217. The control execution section 211 receives a control command from the home controller 100 or the server 300, and controls the device 200 in accordance with the received control command. The content of control of the device 200 performed by the control execution section 211 differs in accordance with the type of the device 200. For example, if the device 200 is an illumination device, the control execution section 211 turns on and off the illumination device. In addition, the control execution section 211 transmits the result of execution of the control command and the state of the device 200 to the home controller 100 or the server 300.

The state management section 212 manages the state of the device 200. The content of management of the device 200 performed by the state management section 212 differs in accordance with the type of the device 200. For example, if the device 200 is an illumination device, the state management section 212 manages whether the illumination device is currently turned on or turned off. The storage section 214 stores information related to the state of the device 200 managed by the state management section 212. The communication control section 217 controls communication between the device 200 and the home controller 100 and communication between the device 200 and the server 300. In addition, the communication control section 217 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 2700 to be discussed later for each house or each user account. In addition, the home information management section 301 transmits the home information 2700 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 2700 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
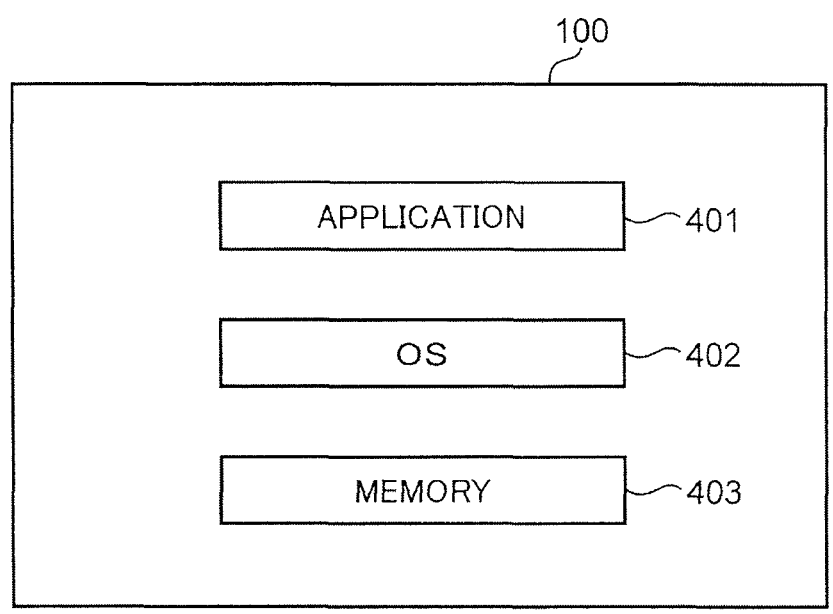
FIG. 4 is a diagram showing a configuration example of the form of implementation of the home controller according to the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the portable information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the portable information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the present disclosure, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any present disclosure, the home controller 100 according to the present disclosure can be embodied. In the present disclosure, the processor and the storage device forming the portable information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
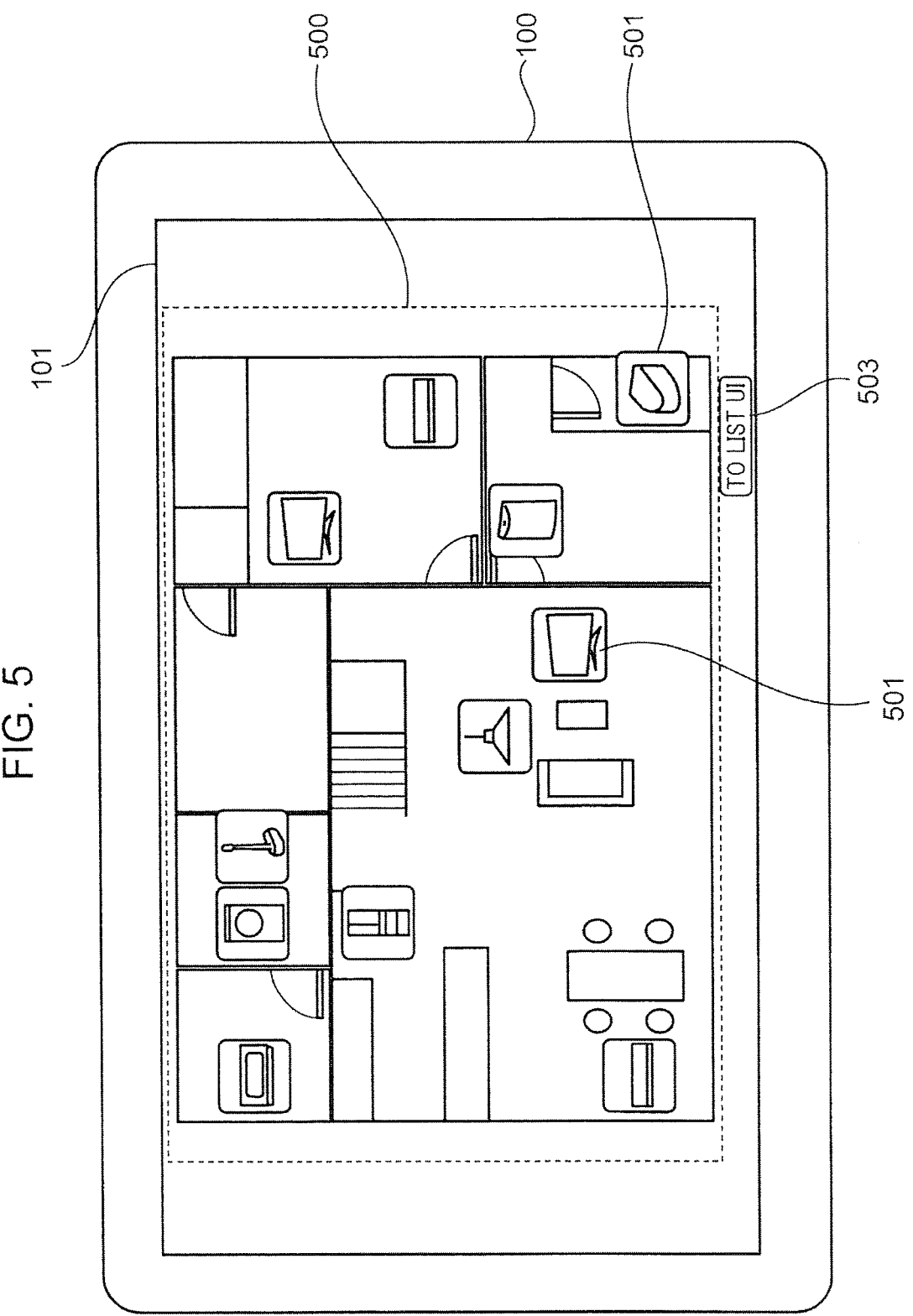
FIG. 5 is a diagram showing the configuration of a basic screen of the home controller according to the present disclosure.
Figure 6:
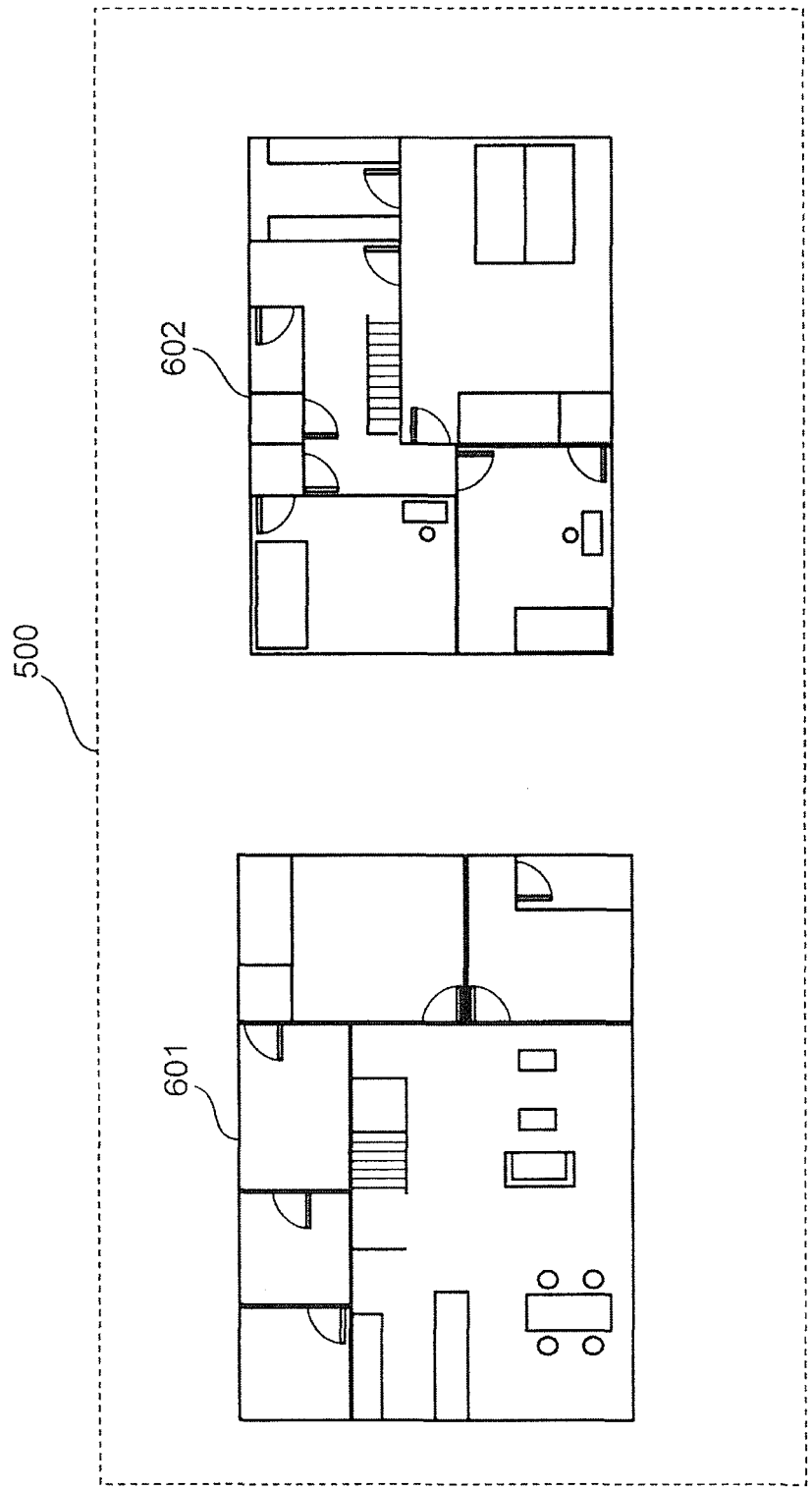
FIG. 6 is a diagram showing an example of a floor plan according to the present disclosure.

FIG. 5 is a diagram showing the configuration of a basic screen of the home controller 100. As shown in FIG. 5, the basic screen of the home controller 100 displayed on the display 101 include a floor plan 500, device icons 501, and a device list display change button 503. The floor plan 500 is a plan view that planarly represents the arrangement and the shape of one or more rooms forming each floor of a house. In the case where the house has one or more floors, the floor plan 500 is prepared for each floor. For example, in the case where the house has two floors, two floor plans 500, namely a floor plan 601 for the first floor and a floor plan 602 for the second floor, are displayed on the display 101 as shown in FIG. 6.

The device icon 501 is an icon displayed as overlapped on the floor plan 500 and representing the device 200. When the touch panel control section 102 senses a tap on the device icon 501 performed by the user, the display control section 103 causes the display 101 to display a device control screen 502 to be discussed later. This allows the user to control the device 200 by operating the device control screen 502.

The device icon 501 is prepared for each device 200. The display control section 103 disposes the device icon 501 on the floor plan 500 on the basis of the actual arrangement of the device 200 within the house. Information as to at what position on the floor plan 500 the device icon 501 is to be disposed is registered in an arrangement 3104 of a device list 3100 to be discussed later. Here, a position on the floor plan 500 corresponding to the actual arrangement position of the device 200 is registered in the arrangement 3104. Thus, the display control section 103 can dispose the device icon 501 at a position on the floor plan 500 corresponding to the actual arrangement position of the device 200 by disposing the device icon 501 at the position registered in the arrangement 3104 of the device list 3100.

In the floor plan 500 shown in FIG. 5, one floor is partitioned into a plurality of rooms by partition lines that indicate partitions between the rooms. This allows the user to recognize what device 200 is disposed in what room at a glance.

In the example of FIG. 5, in addition, schematic images of furniture pieces are displayed at positions on the floor plan 500 corresponding to the actual arrangement positions of the furniture pieces. An image that indicates the movable range of a door is displayed at a position on the floor plan 500 corresponding to the actual arrangement position of the door. An image of a staircase is displayed at a position on the floor plan 500 corresponding to the actual arrangement position of the staircase. This allows the user to recognize the positions of the furniture pieces disposed in each room and the positions of the staircase and the doors on the floor.

The button with a text "TO LIST UI" displayed at the lower right of the basic screen is the device list display change button 503, which is a button for switching the screen display from the basic screen to a device list display screen to be discussed later (see FIG. 24). When the touch panel control section 102 senses a tap on the device list display change button 503 performed by the user, the display control section 103 switches the screen display on the display 101 from the basic screen to the device list display screen. It should be noted, however, that the display control section 103 may hide the device list display change button 503 in the case where a registration is made in the home controller 100 in advance that the device list display screen is not utilized.

In the foregoing description, one device icon 501 is correlated with one device 200. However, the present disclosure is not limited thereto, and one device icon 501 may be correlated with a plurality of devices 200 so that the one device icon 501 may be used in common to the plurality of devices 200. For example, in the case where there are two illumination devices in a living room, the two illumination devices may be represented by one device icon 501.

In this case, when the device icon 501 representing the two illumination devices is tapped on by the user, the display control section 103 causes the display 101 to display a device control screen 502 that allows simultaneous control of the two illumination devices. This allows the user to control the two illumination devices at the same time. A plurality of illumination devices are often disposed in a large room such as the living room. In the case where the user turns on or off the illumination devices in the living room, the user often turns on or off all the illumination devices disposed in the living room, rather than turning on or off some of the illumination devices. In this case, if it is possible to collectively turn on or off all the illumination devices, the number of operations to be performed by the user can be reduced. Thus, one device icon 501 may be correlated with a plurality of devices 200 that are highly likely to be operated by the user at the same time to cause one device control screen 502 to be displayed.

In the case where the device icon 501 represents a plurality of devices 200, the display control section 103 may display the device icon 501 at a position on the floor plan 500 corresponding to the actual arrangement position of one of the devices 200. Alternatively, the display control section 103 may display the device icon 501 representing the plurality of devices 200 at a predetermined location of a room in which the plurality of devices 200 are disposed.

In order to dispose the device icon 501 on the floor plan 500 on the basis of the actual arrangement of the device 200 within the house, the user moves the device icon 501 to an appropriate position on the floor plan 500. The user can move the device icon 501 to a desired position by dragging the device icon 501 while holding down the device icon 501. These operations are executed at the timing when the device icon 501 is added such as when the home controller 100 is initially utilized and when a new device 200 is purchased.

Specifically, when the touch panel control section 102 senses a drag on the device icon 501, the device management section 105 registers the position on the floor plan 500 of the device icon 501 after the movement in the arrangement 3104 of the device list 3100 to be discussed later. This allows a position on the floor plan 500 corresponding to the actual arrangement position of the device 200 to be registered in the arrangement 3104.

The initial display position of the device icon 501 may be determined in advance by the system, and may be a predetermined position outside the display region of the floor plan 500 or a predetermined position within a predetermined room on the floor plan 500, for example. The method of disposing the device icon 501 on the floor plan 500 on the basis of the actual arrangement of the device 200 within the house is not limited thereto, and the method described below may be used.

Figure 7:
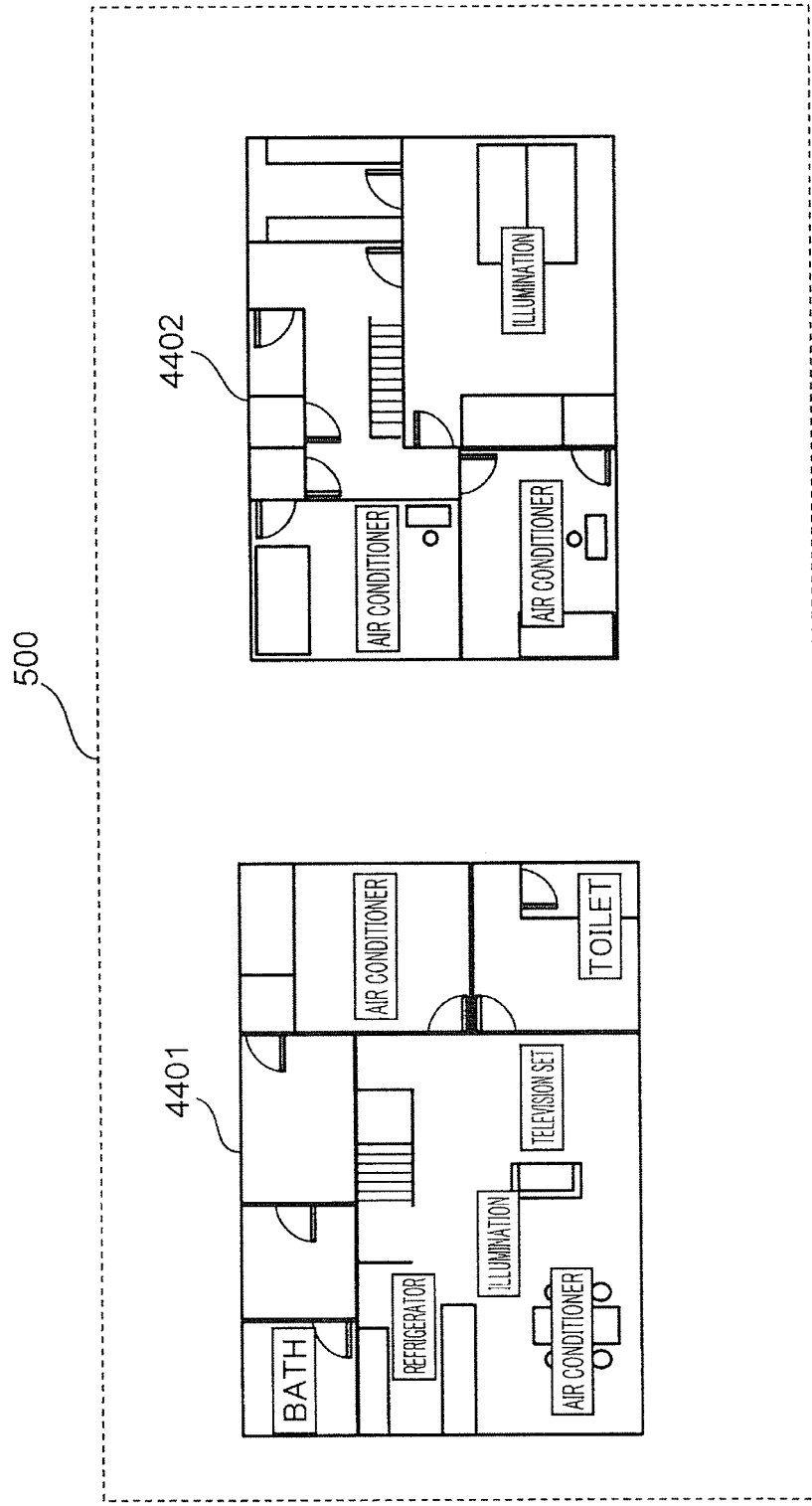
FIG. 7 is a diagram showing an example of the floor plan including arrangement information for device icons as texts according to the present disclosure.
Figure 8:
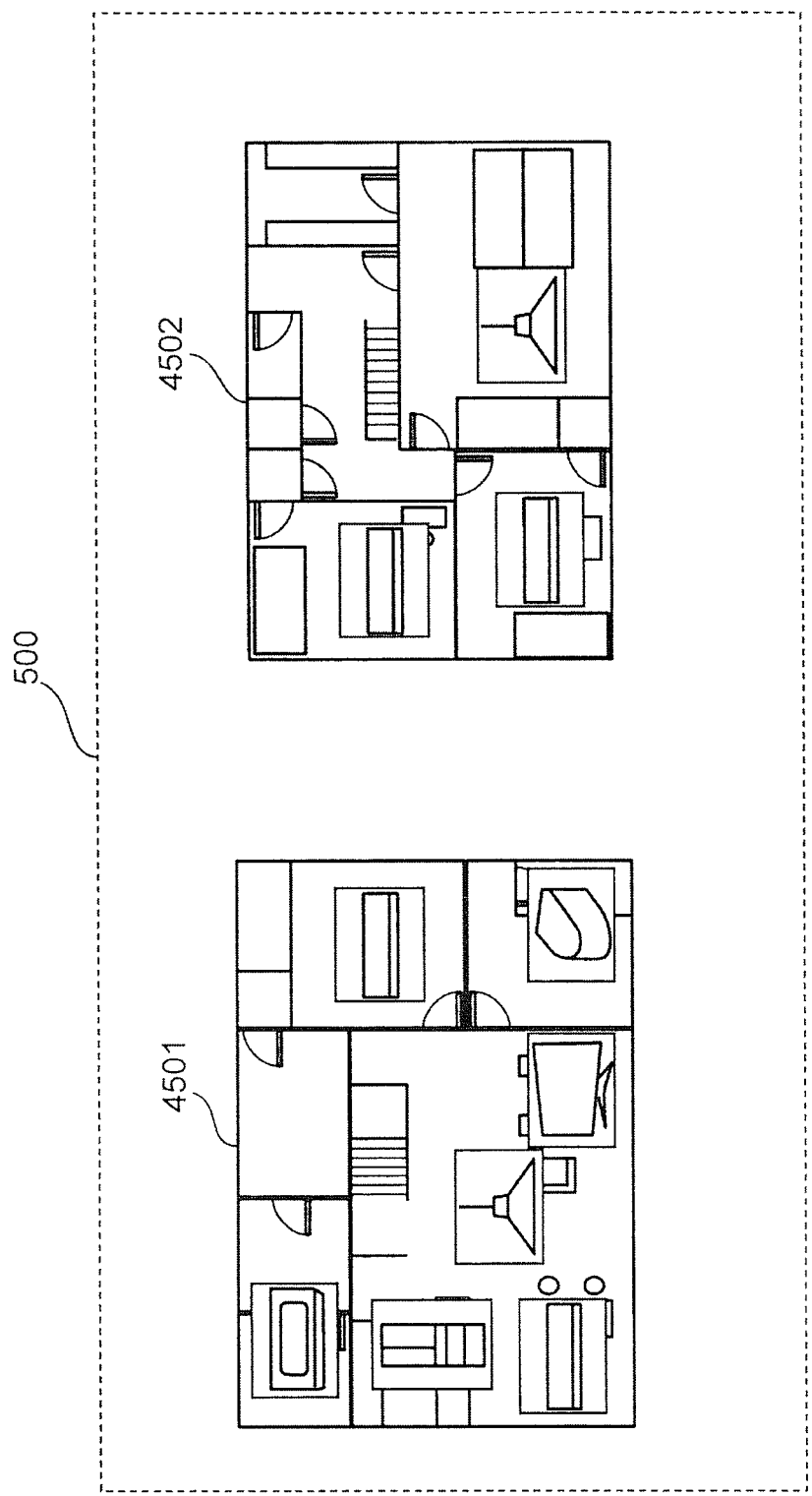
FIG. 8 is a diagram showing an example of the floor plan including arrangement information for device icons as images according to the present disclosure.
Figure 9:
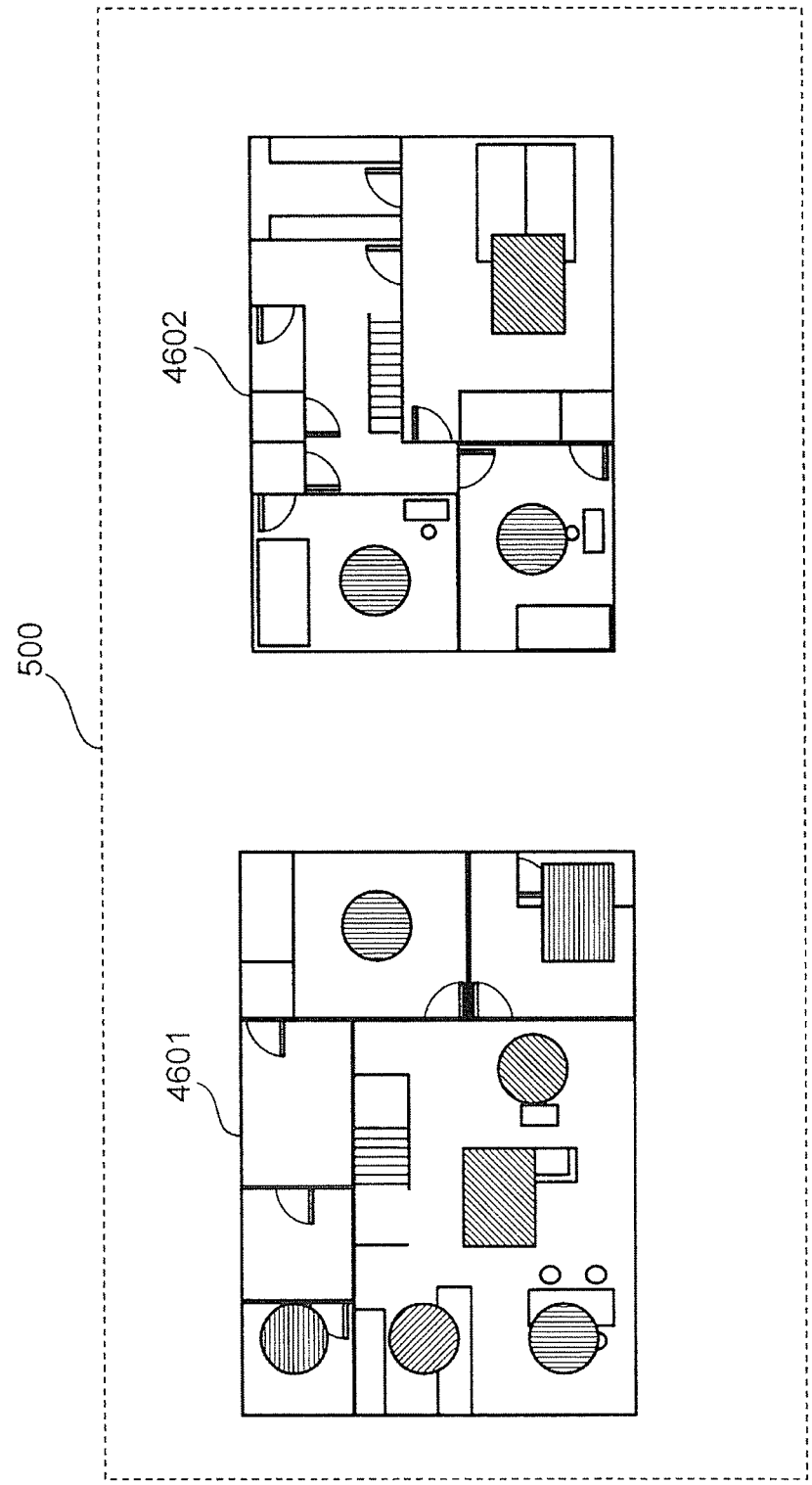
FIG. 9 is a diagram showing an example of the floor plan including arrangement information for device icons as images according to the present disclosure.

As shown in FIGS. 7, 8, and 9, some floor plans 500 include arrangement information for the device icons 501. For example, in the example of the floor plan 500 of FIG. 7, texts that indicate the type of the devices 200 represented by the device icons 501 to be disposed are provided at positions at which the device icons 501 are to be disposed. In the example of the floor plan 500 of FIG. 8, images that indicate the type of the devices 200 represented by the device icons 501 to be disposed are provided at positions at which the device icons 501 are to be disposed. In the example of the floor plan 500 of FIG. 9, simplified images such as circles and rectangles that indicate the type of the devices 200 represented by the device icons 501 to be disposed are provided at positions at which the device icons 501 are to be disposed.

Consequently, in the case where the floor plan 500 includes arrangement information for the device icons 501, the display control section 103 may generate the basic screen of FIG. 5 by automatically disposing the device icons 501 on the floor plan 500 on the basis of the arrangement information included in the floor plan 500. In this case, it is not necessary for the user to perform an operation of moving the device icons 501 to appropriate positions on the floor plan 500.

For example, in an exemplary floor plan 4401 for the first floor of FIG. 7, the display control section 103 detects a position provided with a text "TELEVISION SET", automatically disposes the device icon 501 for the television set at the detected position, and registers the detected position in the arrangement 3104 of the device list 3100.

In an exemplary floor plan 4501 for the first floor of FIG. 8, the display control section 103 detects a position provided with an image for the "television set", automatically disposes the device icon 501 for the television set at the detected position, and registers the detected position in the arrangement 3104 of the device list 3100. In an exemplary floor plan 4601 for the first floor of FIG. 9, the display control section 103 detects a position provided with an image in the shape of a "circle filled with oblique lines", automatically disposes the device icon 501 for the television set at the detected position, and registers the detected position in the arrangement 3104 of the device list 3100.

The display control section 103 may detect the display position of arrangement information by recognizing the arrangement information included in the floor plan 500 using a text recognition technology or an image recognition technology commonly utilized.

Figure 10:
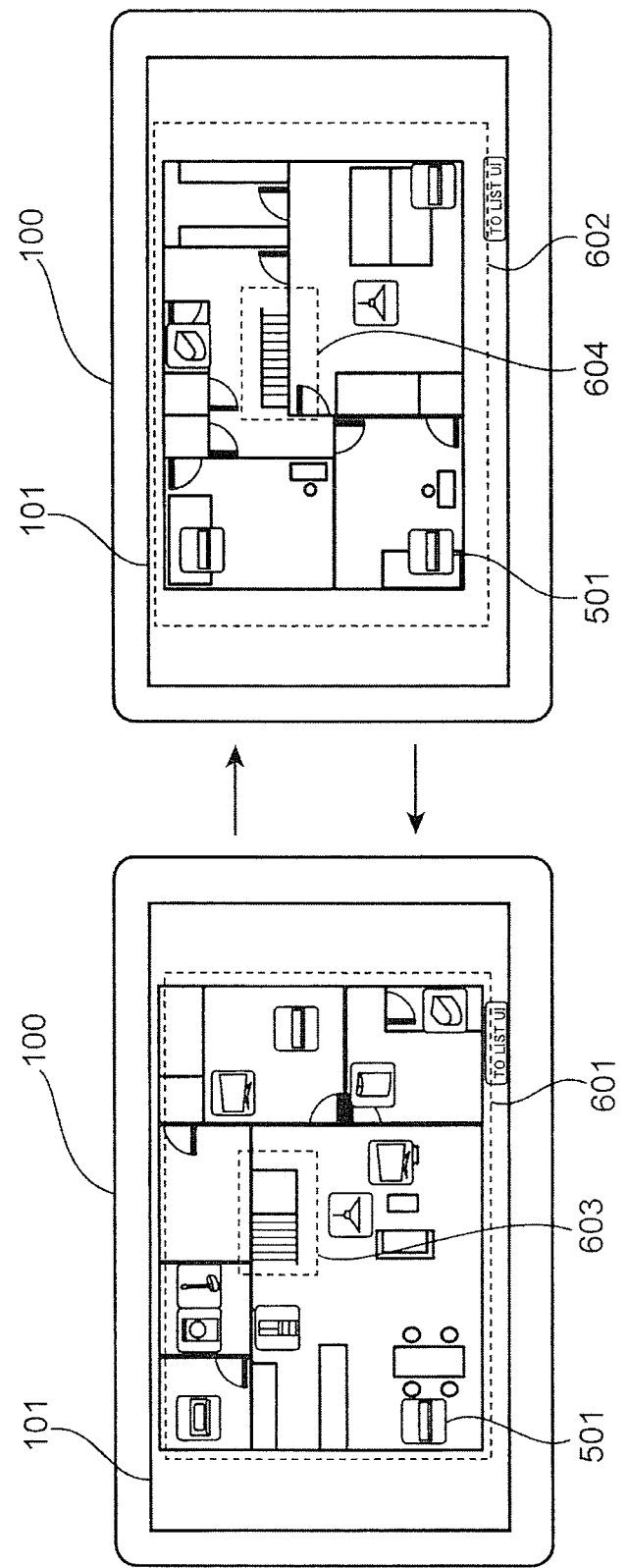
FIG. 10 is a diagram showing an example of transition between a first floor display state and a second floor display state of the basic screen of the home controller according to the present disclosure.

FIG. 10 is a diagram illustrating a method of switching the floor display on the basic screen of the home controller 100. FIG. 10 illustrates a case where the house has two floors, namely the first floor and the second floor. With a floor plan 601 for the first floor displayed on the basic screen of the home controller 100, the touch panel control section 102 senses a tap on a staircase region 603 on the first floor performed by the user. Then, the display control section 103 switches the floor display on the basic screen from the first floor to the second floor. Similarly, with a floor plan 602 for the second floor displayed on the basic screen of the home controller 100, the touch panel control section 102 senses a tap on a staircase region 604 on the second floor performed by the user. Then, the display control section 103 switches the floor display on the basic screen from the second floor to the first floor.

Here, the touch panel control section 102 may judge that the staircase region 603 is tapped on if the position tapped on by the user is positioned within a region surrounded by four vertexes of a staircase registered in a room type 2902 of room information 2900 (see FIG. 32).

Further, the floor display may be switched by not only tapping on the staircase region 603 but also a swipe operation on the display 101. With the floor plan 601 for the first floor displayed on the basic screen of the home controller 100, the touch panel control section 102 senses a swipe operation performed from the right to the left on the display 101 by the user. Then, the display control section 103 switches the floor display on the basic screen from the first floor to the second floor. Similarly, with the floor plan 602 for the second floor displayed on the basic screen of the home controller 100, the touch panel control section 102 senses a swipe operation performed from the left to the right on the display 101 by the user. Then, the display control section 103 switches the floor display on the basic screen from the second floor to the first floor. The floor display may be switched by a swipe operation in the vertical direction.

Figure 11:
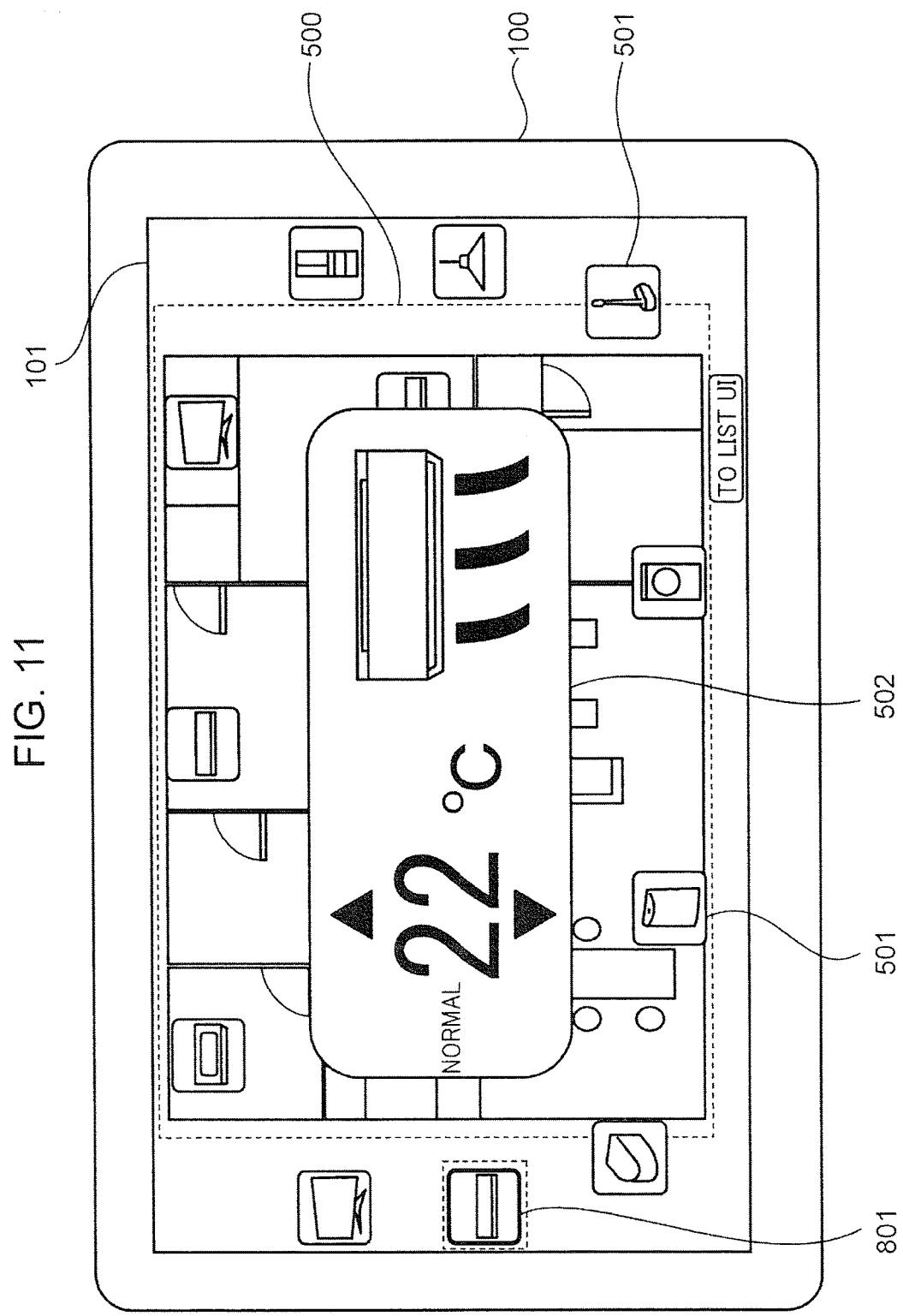
FIG. 11 is a diagram showing the configuration of the display state of a device control screen of the home controller according to the present disclosure.

FIG. 11 is a diagram showing the configuration of the display state of the device control screen 502 of the home controller 100. In the basic screen shown in FIG. 5, when the touch panel control section 102 senses that the user selects the device icon 501, the display control section 103 causes the display 101 to display the device control screen 502 corresponding to the selected device icon 501. The device control screen 502 is a control screen that is specific to each device 200 and that allows control or confirmation of the state of the device 200. For example, in FIG. 11, a device icon 801 for the air conditioner is selected by the user, and the temperature setting and the air flow direction are controlled using the device control screen 502 for the air conditioner.

An image of the air conditioner is displayed in the device control screen 502 to allow the user to immediately recognize that the device control screen 502 corresponds to the air conditioner. This prevents an erroneous operation. An image that indicates the air flow direction is displayed on the lower side of the image of the air conditioner to allow the user to select a desired air flow direction by repeatedly tapping on the image, for example. A numeral displayed within the device control screen 502 indicates the current set temperature of the air conditioner. A button in the shape of a triangle that points upward in the device control screen 502 is a temperature increase button. A button in the shape of a triangle that points downward is a temperature decrease button. Pressing the temperature increase button once increases the set temperature of the air conditioner by a predetermined temperature (for example, 0.5 degrees). Pressing the temperature decrease button once decreases the set temperature of the air conditioner by a predetermined temperature (for example, 0.5 degrees).

Examples of the method of disposing the device icons 501 in the display state of the device control screen 502 include the following methods.

A first method is to dispose the device icons 501 outside the display region of the device control screen 502 as shown in FIG. 11. When the touch panel control section 102 senses that a certain device icon 501 is tapped on by the user, the display control section 103 disposes all the device icons 501 at locations outside the display region of the device control screen 502 and inside the display region of the display 101 irrespective of whether or not the locations are inside the display region of the floor plan 500. In the example of FIG. 11, the device icons 501 are disposed in an elliptical arrangement so as to surround the device control screen 502. That is, when a certain device icon 501 is selected by the user and the device control screen 502 for the device 200 corresponding to the device icon 501 is displayed, the display control section 103 retracts all the device icons 501 out of the display region of the device control screen 502.

This prevents the device icons 501 from being hidden by the device control screen 502. Therefore, in the case where the device control screen 502 for a device 200 is currently displayed and the user attempts to cause the device control screen 502 for another device 200 to be displayed, it is not necessary for the user to temporarily erase the currently displayed device control screen 502 and search for the device icon 501 for the relevant device 200.

Here, the display control section 103 may decide the arrangement position of each device icon 501 on the outer periphery of an ellipse having a shape determined in advance in accordance with the size of the device control screen 502, and dispose the device icon 501 at the decided position, for example. Examples of the method of deciding the arrangement position include a method of arranging all the device icons 501 as display targets at equal intervals on the outer periphery of an ellipse, and a method of disposing the device icons 501 such that the angles formed by lines connecting between adjacent device icons 501 and the center of an ellipse are equal to each other. Alternatively, the display control section 103 may divide the outer periphery of an ellipse into four sections corresponding to the upper, lower, left, and right portions of the device control screen 502, and dispose the device icons 501 such that the number of device icons 501 in each section is the same and the device icons 501 in each section are arranged at equal intervals. The device icon 501 disposed at the closest position on the floor plan 500 may be disposed at the decided arrangement position.

In the foregoing description, the device icons 501 are arranged in an elliptical arrangement. However, the present disclosure is not limited thereto, and the device icons 501 may be arranged in a circular arrangement. Also in this case, the arrangement position of the device icons 501 may be decided using the same method as in the case where the device icons 501 are arranged in an elliptical arrangement. Other examples of the shape of arrangement of the device icons 501 used when the device icons 501 are retracted out of the display region of the device control screen 502 include polygonal arrangements such as triangular, rectangular, and pentagonal arrangements.

Figure 13:
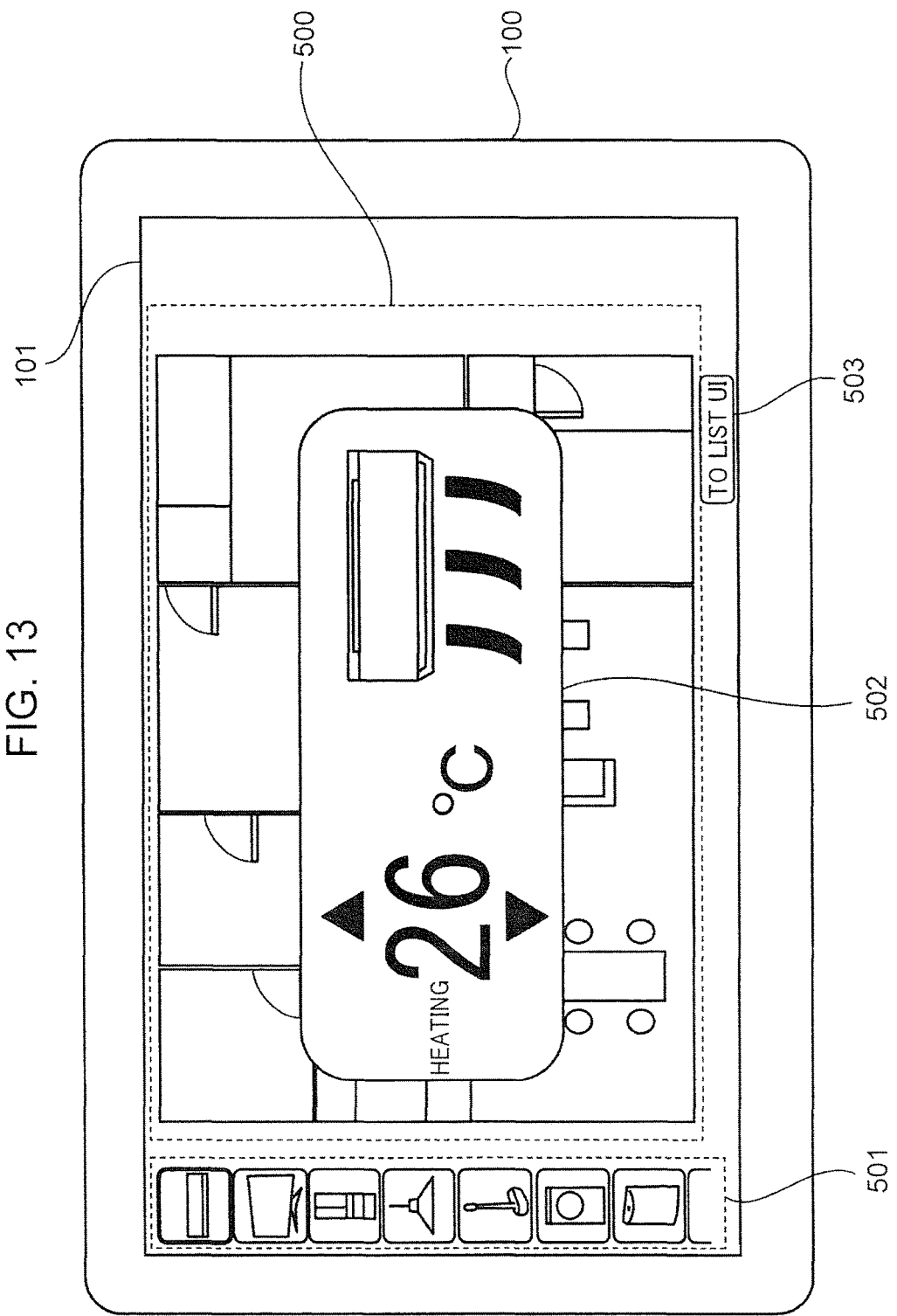
FIG. 13 is a diagram showing the configuration of the display state of a device control screen of the home controller according to the present disclosure.

A second method is to dispose the device icons 501 in one line outside the display region of the device control screen 502 and the floor plan 500 and inside the display region of the display 101 as shown in FIG. 13. When the touch panel control section 102 senses that a certain device icon 501 is tapped on by the user, the display control section 103 disposes all the device icons 501 in one vertical line on the left side of the display region of the floor plan 500. That is, the display control section 103 retracts all the device icons 501 to a vacant space outside the display region of the floor plan 500 and inside the display region of the display 101.

In FIG. 13, the device icons 501 are disposed on the left side of the floor plan 500. However, the present disclosure is not limited thereto, and the device icons 501 may be disposed in one vertical line on the right side of the floor plan 500, or may be disposed in one horizontal line on the upper or lower side of the floor plan 500.

In the case where all the device icons 501 cannot be disposed on the left side of the floor plan 500, the display control section 103 may scroll the device icons 501 upward or downward in accordance with a swipe operation performed upward or downward on the device icons 501 disposed in one vertical line on the left side to cause the device icons 501, which have been hidden, to be displayed within the display 101.

This allows the device icons 501, which have been hidden, to be displayed within the display 101 to allow the user to select the device icons 501. In the case where the device icons 501 are displayed in one horizontal line and all the device icons 501 may not displayed, the display control section 103 may scroll the device icons 501 leftward or rightward in accordance with a swipe operation performed leftward or rightward on the device icons 501 disposed in one horizontal line to cause the device icons 501, which have been hidden, to be displayed within the display 101.

In the display state of the device control screen 502, the display control section 103 may display the device icon 501 selected by the user in a display mode that is different from that for the unselected device icons 501. This allows the user to easily recognize the selected device icon 501.

For example, as shown in FIG. 11, the display control section 103 may display the selected device icon 801 in a color that is different from that of the other unselected device icons 501. Specifically, the display control section 103 may display a background portion of the selected device icon 501 in a color that is different from that of background portions of the unselected device icons 501. It should be noted, however, that such a display mode is merely exemplary, and the display control section 103 may make the selected device icon 501 brighter than the unselected device icons 501, may make the selected device icon 501 denser than the unselected device icons 501, or may cause the selected device icon 501 to flash on and off at a constant cycle.

In the display state of the device control screen 502, the device icon 501 selected by the user may be disposed as distinguished from the unselected device icons 501. This allows the user to easily recognize the selected device icon 501.

Figure 12:
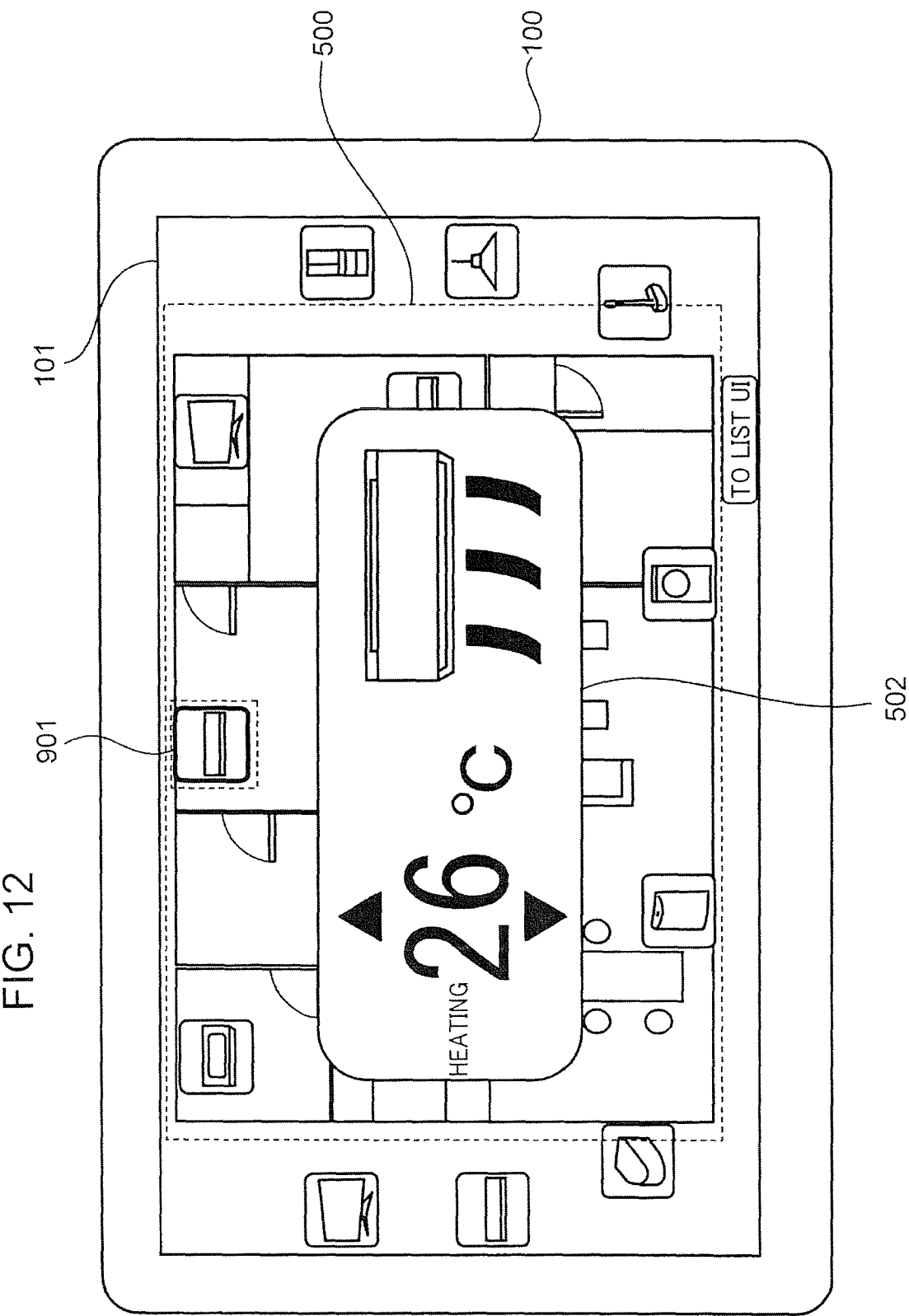
FIG. 12 is a diagram showing a device icon arrangement example of the display state of the device control screen of the home controller according to the present disclosure.

For example, as shown in FIG. 12, the display control section 103 may dispose a selected device icon 901 at the uppermost position on the outer periphery of an ellipse. Besides, for example, the display control section 103 may dispose the selected device icon 501 at a particular position (for example, the lowermost position, the rightmost position, or the leftmost position) on the outer periphery of an ellipse. In any event, the display control section 103 may dispose the device icon 501 selected by the user at a particular location that is easily recognizable by the user.

Figure 14:
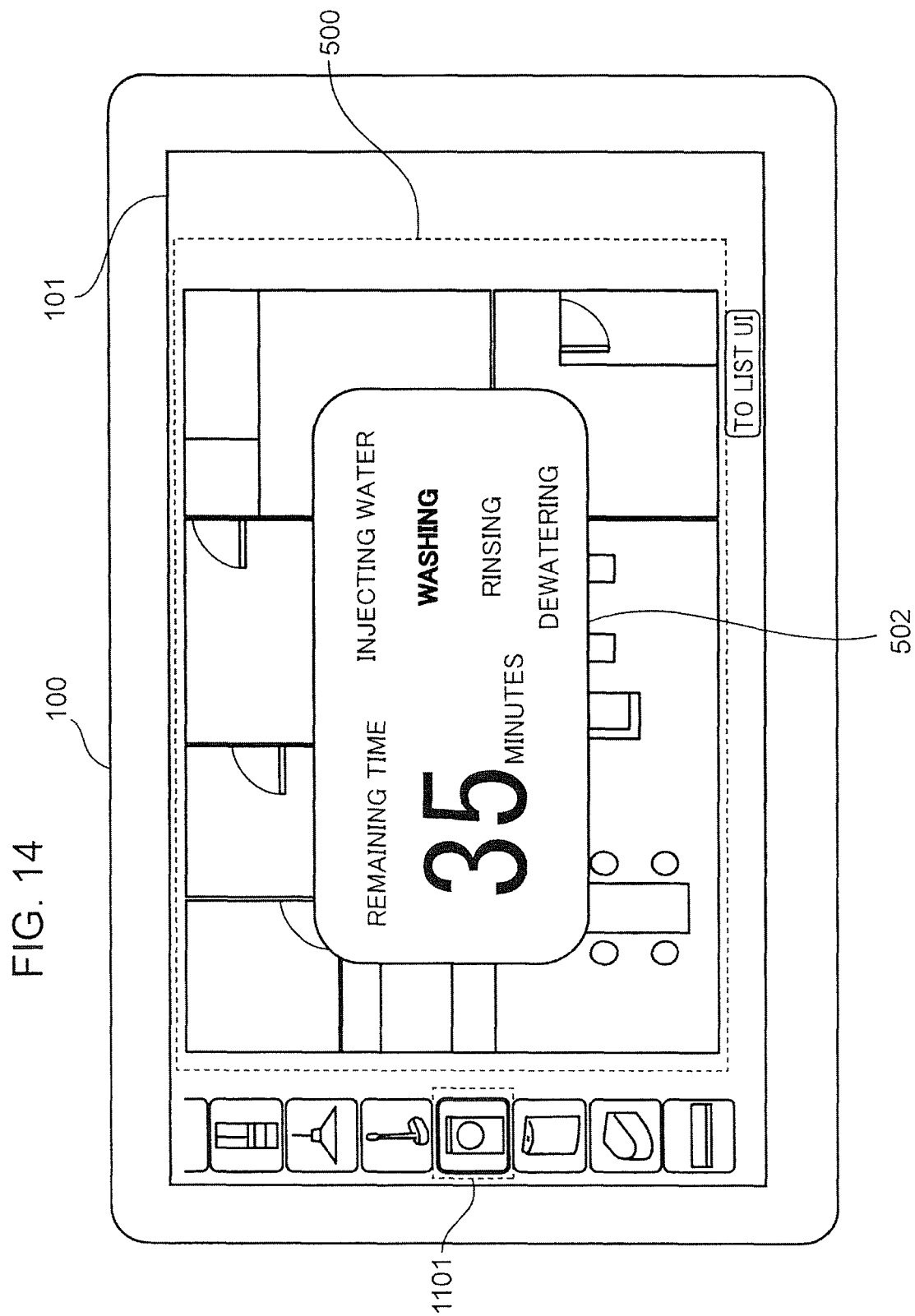
FIG. 14 is a diagram showing a device icon arrangement example of the display state of the device control screen of the home controller according to the present disclosure.

Besides, for example, as shown in FIG. 14, the display control section 103 may scroll an array of the device icons 501 such that a selected device icon 1101 is disposed within the display region of the display 101. In the example of FIG. 14, the device icons 501 are scrolled such that the selected device icon 1101 is disposed at the center of a line of icons displayed in one vertical line on the left side of the floor plan 500. This allows the user to easily recognize the selected device icon 501. Although the device icon 1101 is disposed at the center of the line of icons in FIG. 14, the device icon 1101 may be disposed at any other conspicuous position. For example, the device icon 1101 may be disposed at the top or bottom position of the line of icons.

The order of arrangement of the device icons 501 taken when the device icons 501 are retracted out of the display region of the floor plan 500 may be determined such that devices 200 that are closer in position of arrangement on the floor plan 500 to the device icon 501 selected by the user are disposed to be closer in order of arrangement to the selected device icon 501. Alternatively, the order of arrangement of the device icons 501 may be determined such that the device icons 501 for devices 200 that are more likely to be used together with the device 200 selected by the user are disposed to be closer in order of arrangement to the device icon 501 for the device 200 selected by the user. For example, the television set and the Blu-ray recorder are highly likely to be used together by the user. Therefore, when the device icon 501 for the television set is selected by the user, the device icon 501 for the Blu-ray recorder may be displayed next to the device icon 501 for the television set. In order to embody such a configuration, a table that indicates combinations of devices 200 that are highly likely to be used together may be stored in advance in the storage section 104, and the arrangement of the device icons 501 may be decided in accordance with the table.

In any of the methods of disposing the device icons 501 taken when the device control screen 502 is displayed described above, in addition, the display control section 103 may dispose the device icons 501 as grouped under particular conditions.

Figure 15:
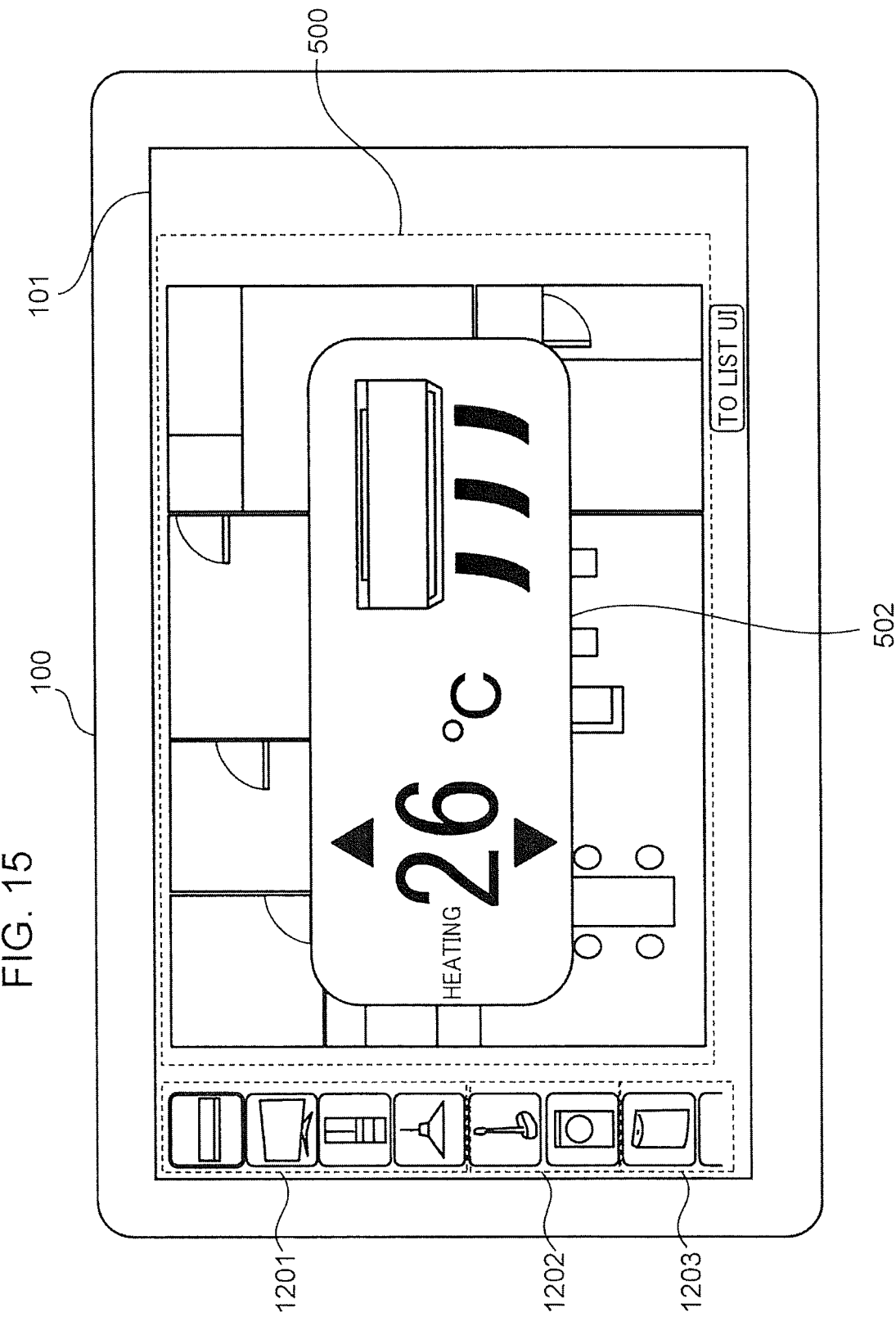
FIG. 15 is a diagram showing a device icon arrangement example of the display state of the device control screen of the home controller according to the present disclosure.

For example, in FIG. 15, the device icons 501 are grouped in accordance with the location at which the devices 200 are disposed. The devices 200 disposed in the living room are grouped as device icons 1201. The devices 200 disposed in a lavatory are grouped as device icons 1202. The devices 200 disposed in a bedroom are grouped as device icons 1203. Then, the display order is set to each group, and the grouped device icons 501 are disposed in one vertical line on the left side of the floor plan 500 in accordance with the display order. The display order of the groups may be determined such that groups that are positioned closer to the room in which the device 200 selected by the user is disposed are closer in display order to the group for the room in which the device 200 selected by the user is disposed.

Besides, the display control section 103 may dispose the device icons 501 as grouped in accordance with the type of the devices 200. For example, in FIG. 16, two device icons 501 for the television set are disposed on the left side of the floor plan 500 as grouped as device icons 2301, and two device icons 501 for the air conditioner are disposed on the left side of the floor plan 500 as grouped as device icons 2302 for the air conditioner. Consequently, the display control section 103 may group the device icons 501 in accordance with the device type by disposing the device icons 501 for the devices 200 of the same type to be continuous.

The display control section 103 may discriminate the type of the devices 200 in accordance with the content registered in a device type 3102 of the device list 3100 (see FIG. 35).

Although the device icons 501 for the devices 200 of the same type are grouped into one group in the foregoing description, the present disclosure is not limited thereto. For example, the display control section 103 may classify the devices 200 into categories matching the device type, group the device icons 501 in accordance with the category, and dispose the device icons 501 on the left side of the floor plan 500 in groups.

Figure 16:
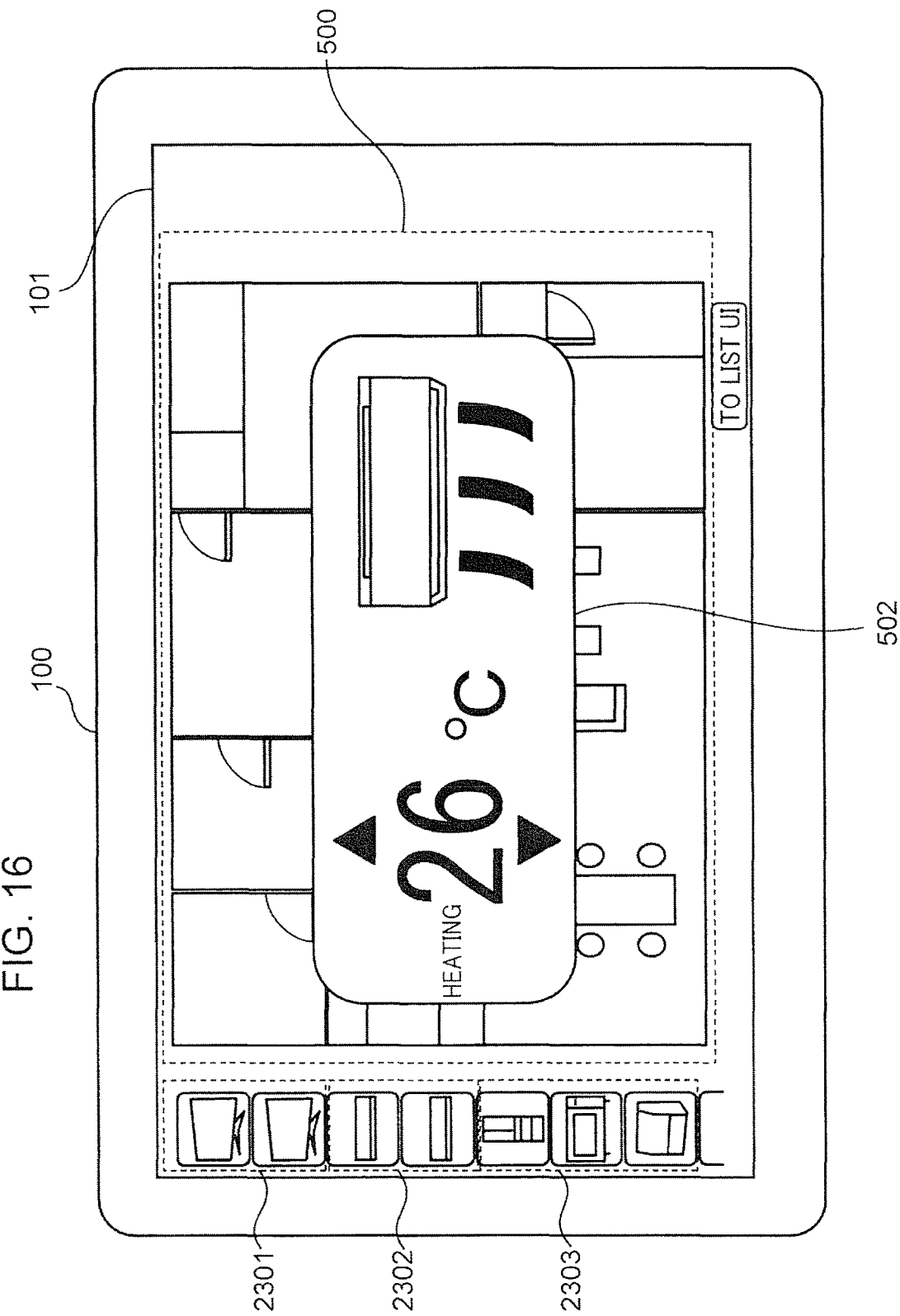
FIG. 16 is a diagram showing a device icon arrangement example of the display state of the device control screen of the home controller according to the present disclosure.

For example, as shown in the lower left of FIG. 16, three device icons 501 for the refrigerator, a microwave oven, and a dish washing/drying machine are classified into a cooking device category, and therefore the three device icons are grouped as device icons 2303 for the cooking devices and disposed on the left side of the floor plan 500.

Examples of the other categories include entertainment devices and air-conditioning devices. The entertainment device category includes devices 200 such as a television set, a recorder, a player, and a home theater system. The air-conditioning device category includes devices 200 such as an air conditioner, an air purifier, a humidifier, a dehumidifier, and a home air circulation system.

For example, if the device icons 501 for the television set, the recorder, the air conditioner, and the air purifier are disposed on the floor plan 500 and the device icon 501 for the television set is selected by the user, the device icons 501 for the television set and the recorder classified into the entertainment device category are grouped into one group and disposed on the left side of the floor plan 500, and the device icons 501 for the air conditioner and the air purifier classified into the air-conditioning device category are grouped into one group and disposed on the left side of the floor plan 500.

The display control section 103 may determine the category of the devices 200 from the content registered in the device type 3102 of the device list 3100. In this case, a classification table for determining the category of the devices 200 from the content registered in the device type 3102 may be stored in advance in the storage section 104, and the display control section 103 may reference the classification table to discriminate the category of the devices 200.

A variety of manners of classifying the devices 200 according to the device type may be adopted besides that described above. For example, as shown in FIG. 24, the devices 200 may be classified into household appliance, air-conditioning, and facility categories.

The method of grouping the device icons 501 on the basis of particular conditions and disposing the device icons 501 as described above may also be applied to the display mode in which the device icons 501 are retracted so as to surround the device control screen 502 as shown in FIG. 11.

Figure 17A:
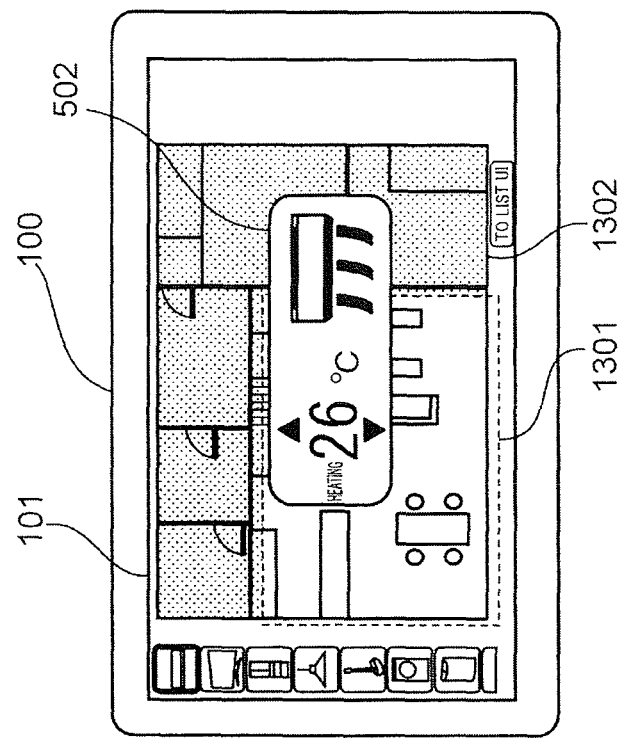
FIG. 17A, 17B are diagrams showing a configuration example of the display state of the device control screen of the home controller according to the present disclosure.
Figure 17B:
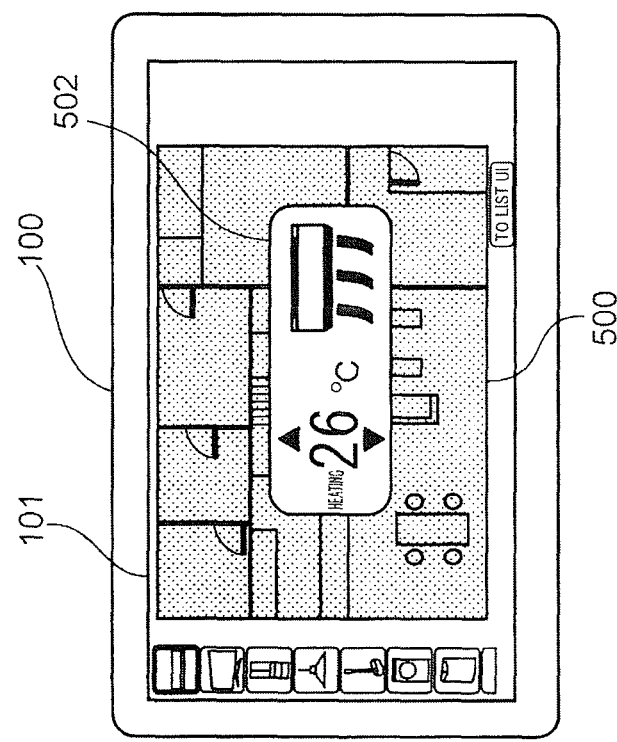

FIGS. 17A and 17B are each a diagram showing a method of displaying the floor plan 500 with the device control screen 502 displayed. As shown in FIGS. 17A and 17B, there are two types of the method of displaying the floor plan 500. In a first display method, as shown in FIG. 17A, the entire floor plan 500 is covered by a translucent gray layer (in the drawing, indicated by dots).

In this case, the background of the device control screen 502 is turned into a gray color to emphasize the device control screen 502, which allows the user to more definitely recognize the device control screen 502. In addition, the gray layer is translucent, and the floor plan 500 is not completely hidden. This allows the device control screen 502 to be operated with presence. The gray layer is image data having a color with low brightness such as gray and set to predetermined transparency.

The display control section 103 may decide the display order of the device control screen 502, the gray layer, and the floor plan 500 such that the device control screen 502 is the uppermost layer and the floor plan 500 is the lowermost layer, and synthesize these images. This prevents the device control screen 502 from being displayed as covered by the gray layer.

In a second display method, as shown in FIG. 17B, a non-control target region 1302 in the floor plan 500 is covered by a translucent gray layer (the region with dots in the drawing), and a control target region 1301 is not covered by the translucent gray layer. This allows the user to operate the device control screen 502 while being conscious of the control target region 1301, which allows operation with presence. Here, the control target region 1301 refers to a region on the floor plan 500 that corresponds to a room in which the device 200 represented by the device icon 501 selected by the user is disposed, and the non-control target region 1302 refers to a region on the floor plan 500 other than the room. For example, in the case where the control target device is the air conditioner installed in the living room, the control target region 1301 is the region on the floor plan 500 corresponding to the living room, and the non-control target region 1302 is the region on the floor plan 500 other than the living room.

For example, it is assumed that the user selects the device icon 501 for the air conditioner with a device ID 3101 of A shown in FIG. 35. In this case, the display control section 103 specifies the position (X10, Y100, Z1) of the air conditioner from the content registered in the arrangement 3104 of the air conditioner. Next, the display control section 103 references the room information 2900 to decide in which room the specified position (X10, Y100, Z1) is positioned. Here, it is assumed that the position (X10, Y100, Z1) is positioned within a region surrounded by vertexes with vertex IDs of F, G, H, I, L, O, and N. Then, the display control section 103 determines that the air conditioner is disposed in the living room with a room ID of A. Then, the display control section 103 generates a gray layer with the region of the living room defined as the control target region 1301 and with the region on the floor plan 500 other than the living room defined as the non-control target region 1302.

Next, transition between the display state of the basic screen and the display state of the device control screen 502 will be described using FIG. 18. In the basic screen shown in the left diagram of FIG. 18, the user selects the device icon 501 for the device 200 (here, the air conditioner) that is desired to be controlled, and the touch panel control section 102 senses the selection. Then, as shown in the right diagram of FIG. 18, the display control section 103 displays the device control screen 502 corresponding to the selected device icon 501 as overlapped on the floor plan 500. This results in transition from the display state of the basic screen to the display state of the device control screen 502.

On the other hand, as shown in the right diagram of FIG. 18, in the display state of the device control screen 502, the user taps on the device icon 501 for the air conditioner corresponding to the device control screen 502 or a location outside the display region of the device control screen 502 (for example, the display region of the floor plan 500 outside the display region of the device control screen 502), and the touch panel control section 102 senses the tap. Then, as shown in the left diagram of FIG. 18, the display control section 103 erases the device control screen 502, and returns from the display state of the device control screen 502 to the display state of the basic screen. At this time, the display control section 103 returns the device icon 501 to the original arrangement position on the floor plan 500.

The operation described above is the same for the floor plan 500 for any floor displayed in the basic screen. For example, as shown in the left diagram of FIG. 19, in the case where the basic screen displays the floor plan 602 for the second floor, the user taps on the device icon 501 for the device 200 (here, the air conditioner) that is desired to be controlled, and the touch panel control section 102 senses the tap. Then, as shown in the right diagram of FIG. 19, the display control section 103 displays the device control screen 502 corresponding to the selected device icon 501 as overlapped on the floor plan 602 for the second floor.

Figure 19:
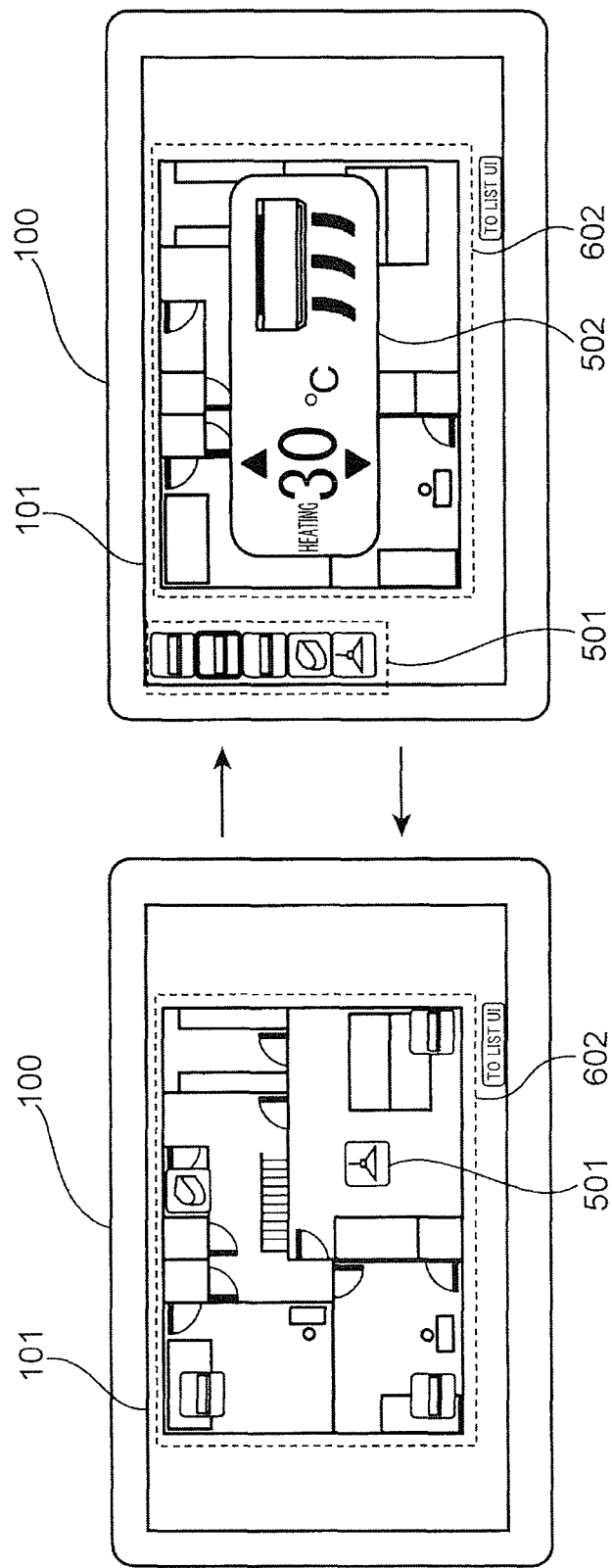
FIG. 19 is a diagram showing an example of transition between the second floor display state of the basic screen of the home controller and the display state of the device control screen for the second floor according to the present disclosure.

On the other hand, as shown in the right diagram of FIG. 19, in the display state of the device control screen 502 for the air conditioner, the user taps on the device icon 501 for the air conditioner corresponding to the device control screen 502 being displayed or a location outside the display region of the device control screen 502 (for example, the display region of the floor plan 500 outside the display region of the device control screen 502), and the touch panel control section 102 senses the tap. Then, as shown in the left diagram of FIG. 19, the display control section 103 erases the device control screen 502, and returns from the display state of the device control screen 502 to the display state of the basic screen in which the floor plan 602 for the second floor is displayed.

Figure 20:
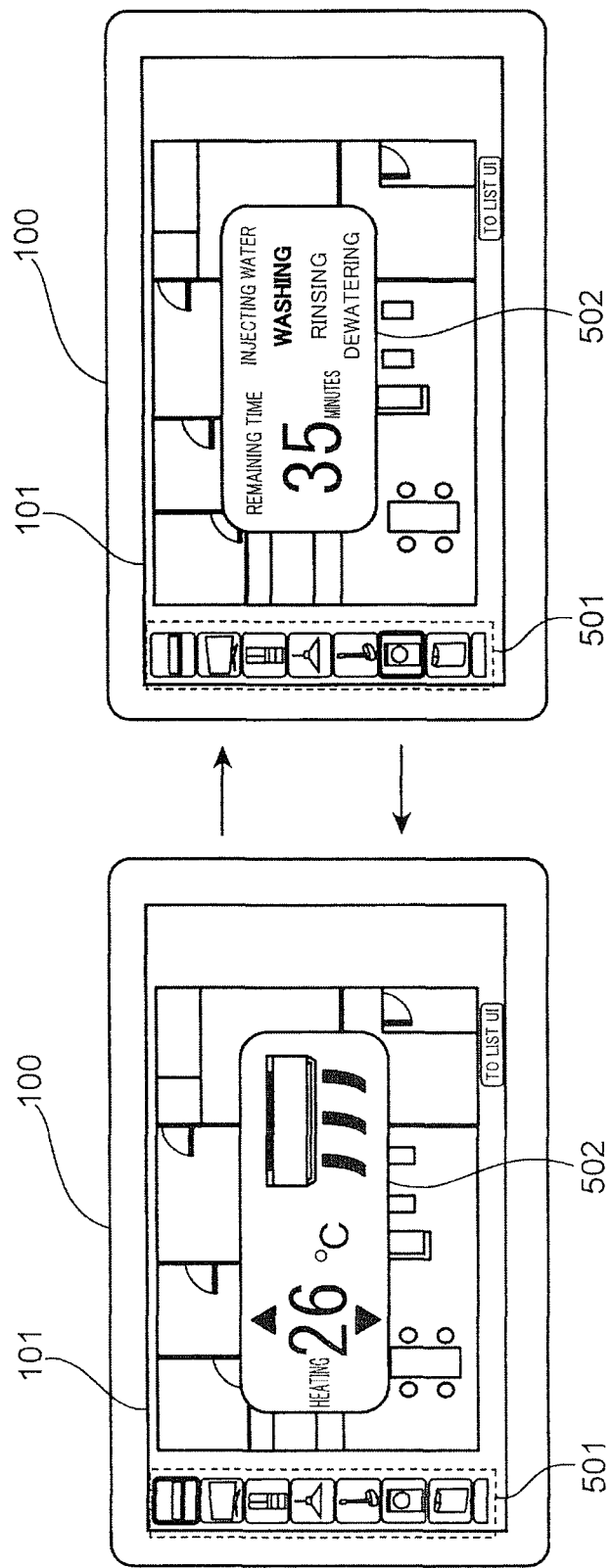
FIG. 20 is a diagram showing an example of transition from the display state of the device control screen of a certain device to the display state of the device control screen of another device according to the present disclosure.

Next, a method of switching from the display state of a certain device control screen 502 to the display state of another device control screen 502 will be described using FIG. 20. As shown in the left diagram of FIG. 20, in the display state of the device control screen 502 for the air conditioner, the user taps on the device icon 501 for the washing machine which is different from the device icon 501 for the air conditioner, and the touch panel control section 102 senses the tap. Then, as shown in the right diagram of FIG. 20, the display control section 103 erases the device control screen 502 which has been displayed, and displays the device control screen 502 corresponding to the device icon 501 for the washing machine as overlapped on the floor plan 500. Switching in the opposite direction is performed in the same manner.

Consequently, when the user successively selects different device icons 501, switching is successively performed between the device control screens 502, which allows the user to successively control different devices 200. That is, in causing another device control screen 502 to be displayed while a certain device control screen 502 is displayed, it is no longer necessary for the user to input an operation of erasing the certain device control screen 502, and switching can be performed between the device control screens 502 with one touch operation.

In the display state of the device control screen 502, in the case where the user taps on the device icon 501 corresponding to the device control screen 502 being displayed, the display control section 103 may only erase the device control screen 502, and may not return to the basic screen. Such screen transition is shown in FIG. 21.

Figure 21:
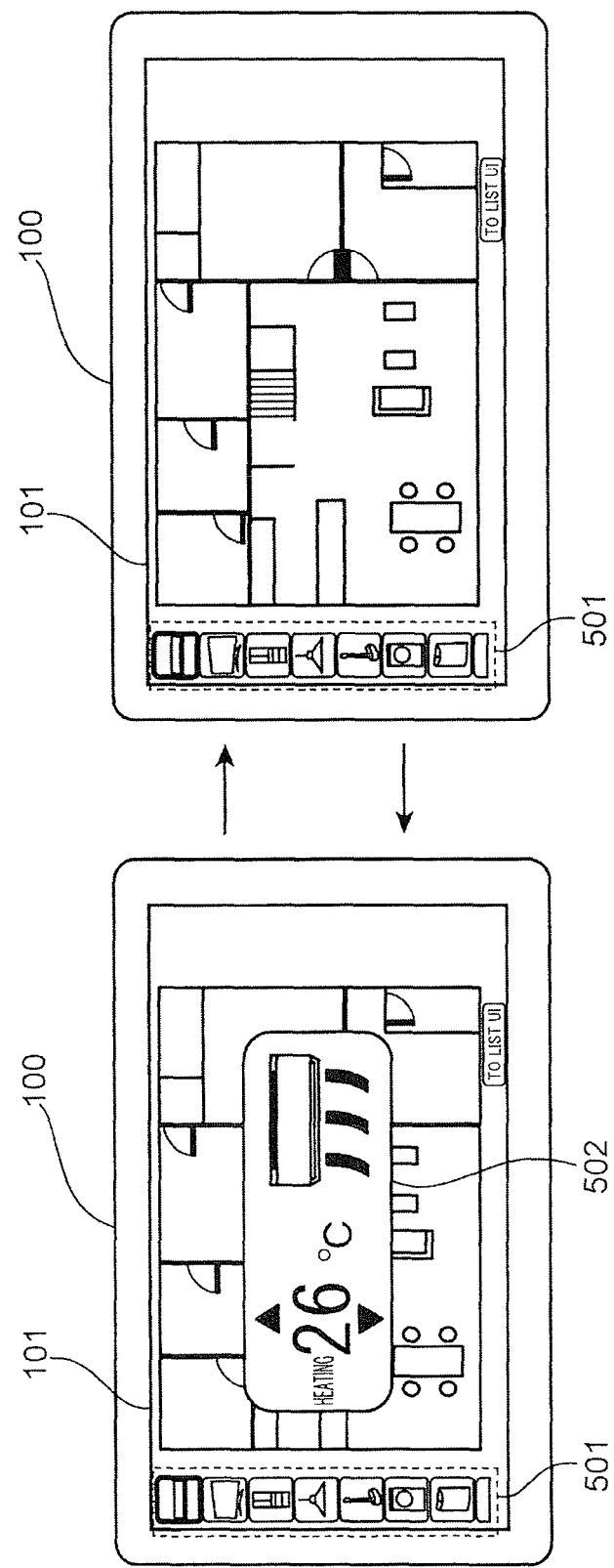
FIG. 21 is a diagram showing an example of transition between the display state and the hidden state of the device control screen of the home controller according to the present disclosure.

In the left diagram of FIG. 21, the device icon 501 for the air conditioner is selected by the user, and therefore the device control screen 502 for the air conditioner is displayed, and all the device icons 501 are displayed in one vertical line on the left side of the floor plan 500. In this state, the user taps on the device icon 501 for the air conditioner, and the touch panel control section 102 senses the tap. Then, as shown in the right diagram of FIG. 21, the display control section 103 erases only the device control screen 502 for the air conditioner with the device icons 501 kept displayed in one vertical line. In this case, the device icons 501 do not move onto the floor plan 500, and therefore a user's desire to cause only the floor plan 500 to be displayed may be met.

On the other hand, in the hidden state of the device control screen 502, the user selects a desired device icon 501, and the touch panel control section 102 senses the selection. Then, the display control section 103 displays the device control screen 502 corresponding to the selected device icon 501. For example, in the right diagram of FIG. 21, when the user selects the device icon 501 for the air conditioner from the device icons 501 disposed in one vertical line on the left side of the floor plan 500, the device control screen 502 for the air conditioner is displayed as shown in the left diagram of FIG. 21.

Figure 22:
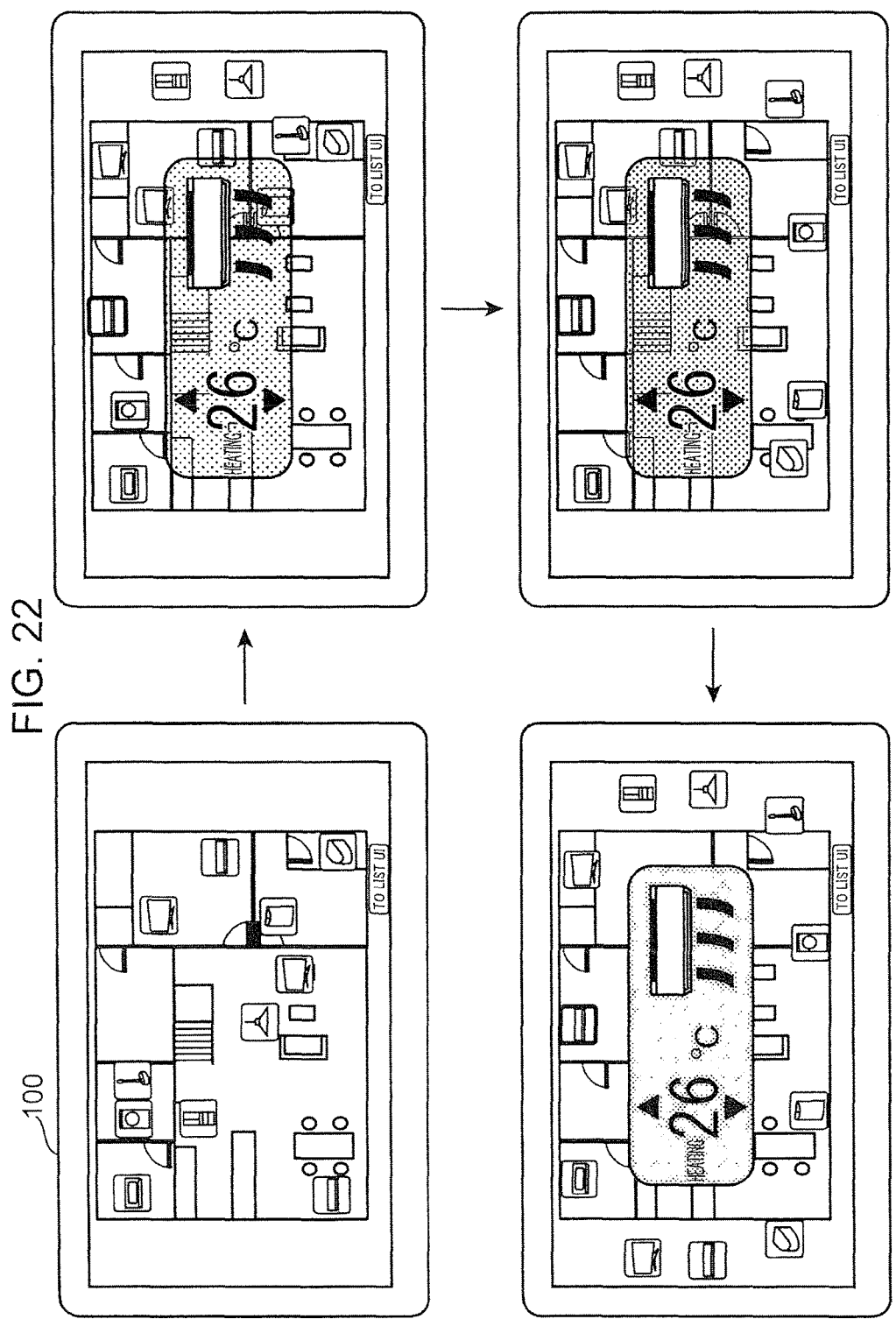
FIG. 22 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 22. As shown in the upper left diagram of FIG. 22, the user selects the device icon 501 for the air conditioner, for example, in the basic screen. Then, the display control section 103 gradually lowers the transparency of the device control screen 502 for the air conditioner in the order of the upper right diagram, the lower right diagram, and the lower left diagram of FIG. 22 to a final transparency of 0. At the same time, the display control section 103 moves all the device icons 501 onto the outer periphery of an ellipse that surrounds the device control screen 502.

Figure 23:
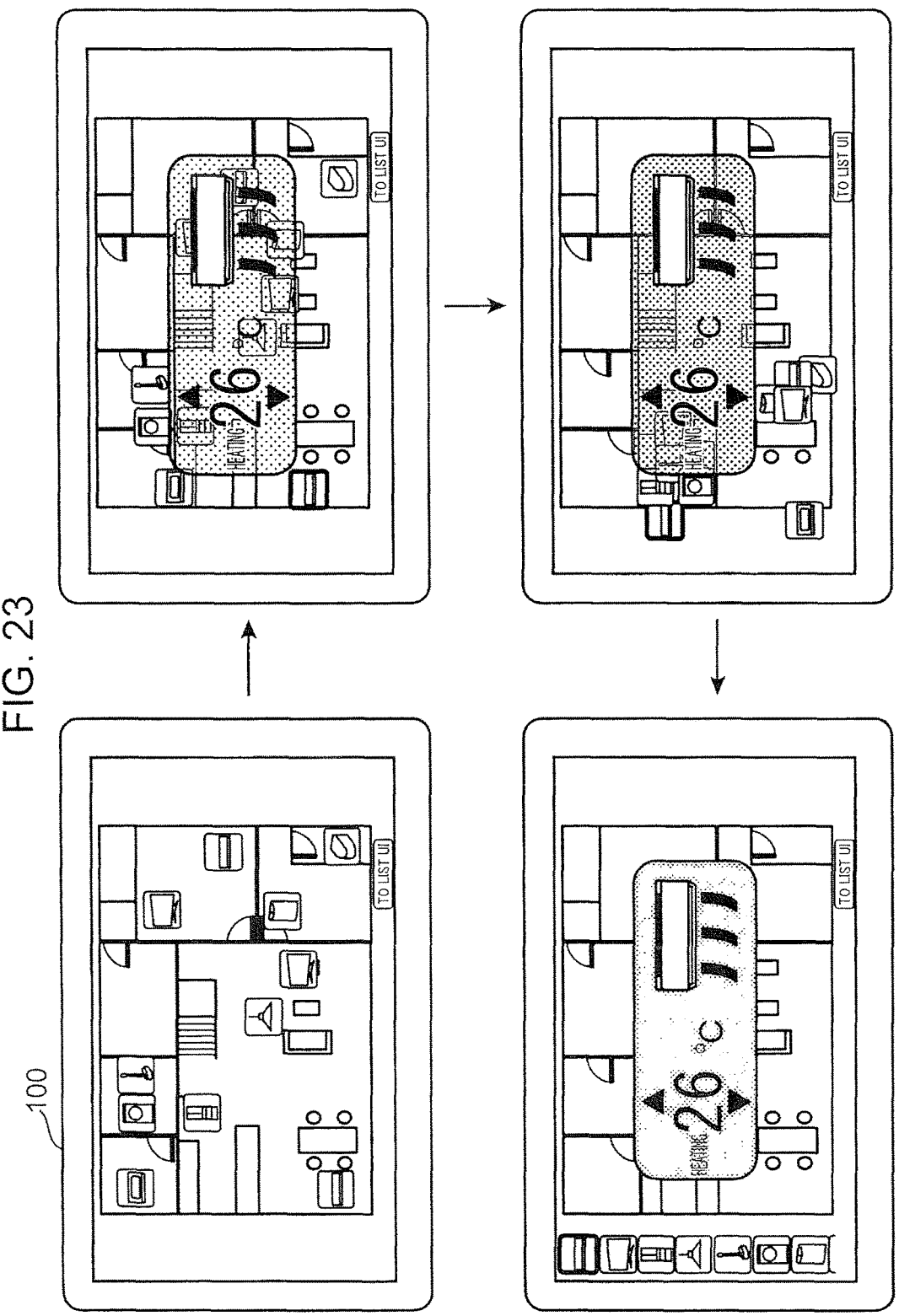
FIG. 23 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 23. As shown in the upper left diagram of FIG. 23, the user selects the device icon 501 for the device 200 which is the air conditioner, for example, in the basic screen. Then, the display control section 103 gradually decreases the transparency of the device control screen 502 for the air conditioner in the order of the upper right diagram, the lower right diagram, and the lower left diagram of FIG. 23 to a final transparency of 0. At the same time, the display control section 103 moves all the device icons to the left side of the floor plan 500.

Consequently, representing the screen transition through an animation can enhance the interest of the user in operating the device control screen 502 through screen rendering shown since the device icon 501 is selected until the device control screen 502 is displayed.

Figure 24:
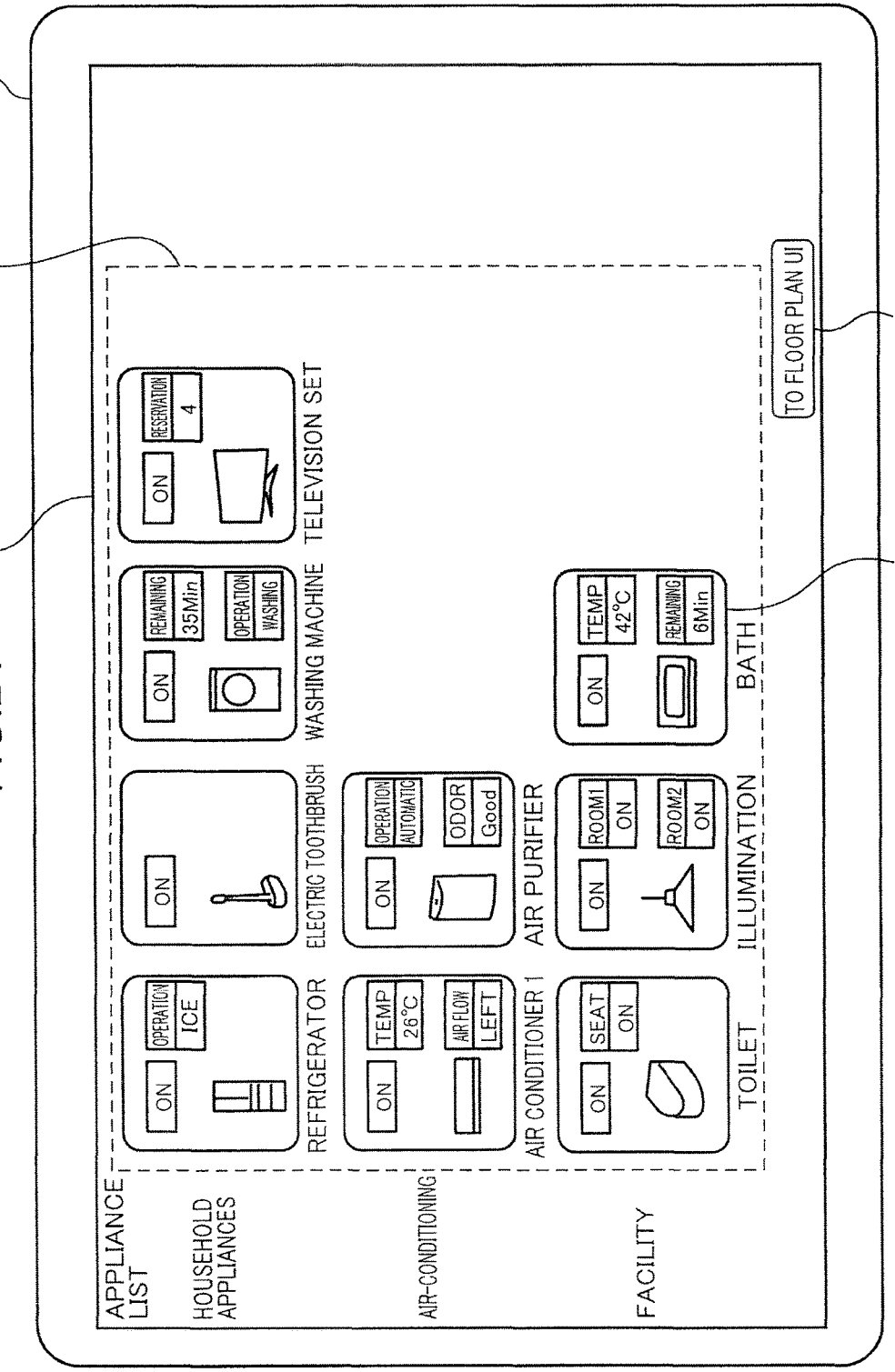
FIG. 24 is a diagram showing the configuration of a device icon list display screen of the home controller according to the present disclosure.

FIG. 24 is a diagram showing the configuration of a device list display screen. The device list display screen is displayed when the user taps on the device list display change button 503 in the basic screen shown in FIG. 5.

As shown in FIG. 24, the device list display screen includes a device list 2000, device details icons 2001, and a basic screen display button 2003.

When the user taps on the device details icon 2001 and the touch panel control section 102 senses the tap, the display control section 103 causes the device control screen 502 to be displayed as overlapped on the device list 2000. This allows the user to cause the device control screen 502 to be displayed and operate the device 200 as in the case where the device icon 501 is tapped on.

The device details icon 2001 is prepared for each device 200. The device details icon 2001 is different from the device icon 501 in representing not only an image representing the device 200 but also the on/off state and the operation state of the device 200. For example, the device details icon 2001 for the refrigerator displayed in the upper left of FIG. 24 displays not only an image of the refrigerator but also "ON", which indicates that the refrigerator is currently turned on, and "OPERATION/ICE", which indicates that the refrigerator is currently making ice.

In the device list 2000, the device details icons 2001 are displayed as classified on the basis of a classification criterion determined in advance. Examples of the classification criterion determined in advance include the type of the device 200, the room in which the device 200 is disposed, and the status of use of the device 200. In FIG. 24, the type of the device 200 is used as the classification criterion, and the device details icons 2001 are classified into three categories, namely the household appliance, air-conditioning, and facility categories.

In the example of FIG. 24, the refrigerator, an electric toothbrush, the washing machine, and the television set are classified into the household appliance category, the air conditioner and the air purifier are classified into the air-conditioning category, and the toilet, the illumination device, and the bath are classified into the facility category. In this case, a classification table that determines into which of the household appliance, air-conditioning, and facility categories each device 200 is classified on the basis of the content registered in the device type 3102 of the device list 3100 (see FIG. 35) is stored in advance in the storage section 104. Then, the display control section 103 may reference the classification table to classify each device into a category.

Returning to FIG. 24, the button with a text "TO FLOOR PLAN UI" displayed at the lower right of the device list 2000 is the basic screen display button 2003. The basic screen display button 2003 is a button for switching the screen from the device list display screen to the basic screen.

Although switching can be made between the basic screen and the device list display screen in the foregoing description, the device list display screen may be utilized as the basic screen in place of the basic screen shown in FIG. 5. In this case, the basic screen display button 2003 may be omitted.

In the foregoing description, one device details icon 2001 is correlated with one device 200. However, the present disclosure is not limited thereto, and one device details icon 2001 may be correlated with a plurality of devices 200 so that the one device details icon 2001 may be used in common to the plurality of devices 200. For example, in the case where there are two illumination devices in a living room, the two illumination devices may be represented by one device details icon 2001.

In this case, when the device details icon 2001 representing the two illumination devices is tapped on by the user, the display control section 103 causes the display 101 to display a device control screen 502 that allows simultaneous control of the two illumination devices. In this case, the same effect as that obtained in the case where one device icon 501 is used in common to a plurality of devices 200 is obtained. In the case where one device details icon 2001 is used in common to a plurality of illumination devices, the device details icon 2001 may display the on/off state and the operation state of each of two illumination devices.

In the basic screen, the device details icon 2001 may be used in place of the device icon 501. In the device list display screen, the device icon 501 may be used in place of the device details icon 2001. In addition, the device control screen 502 displayed in the case where the device details icon 2001 is selected and the device control screen 502 displayed in the case where the device icon 501 is selected may be the same as or different from each other. For example, the device details icon 2001 contains more information than that of the device icon 501, and therefore the device control screen 502 displayed in the case where the device details icon 2001 is selected may include more buttons and states than those of the device control screen 502 displayed in the case where the device icon 501 is selected.

Figure 25:
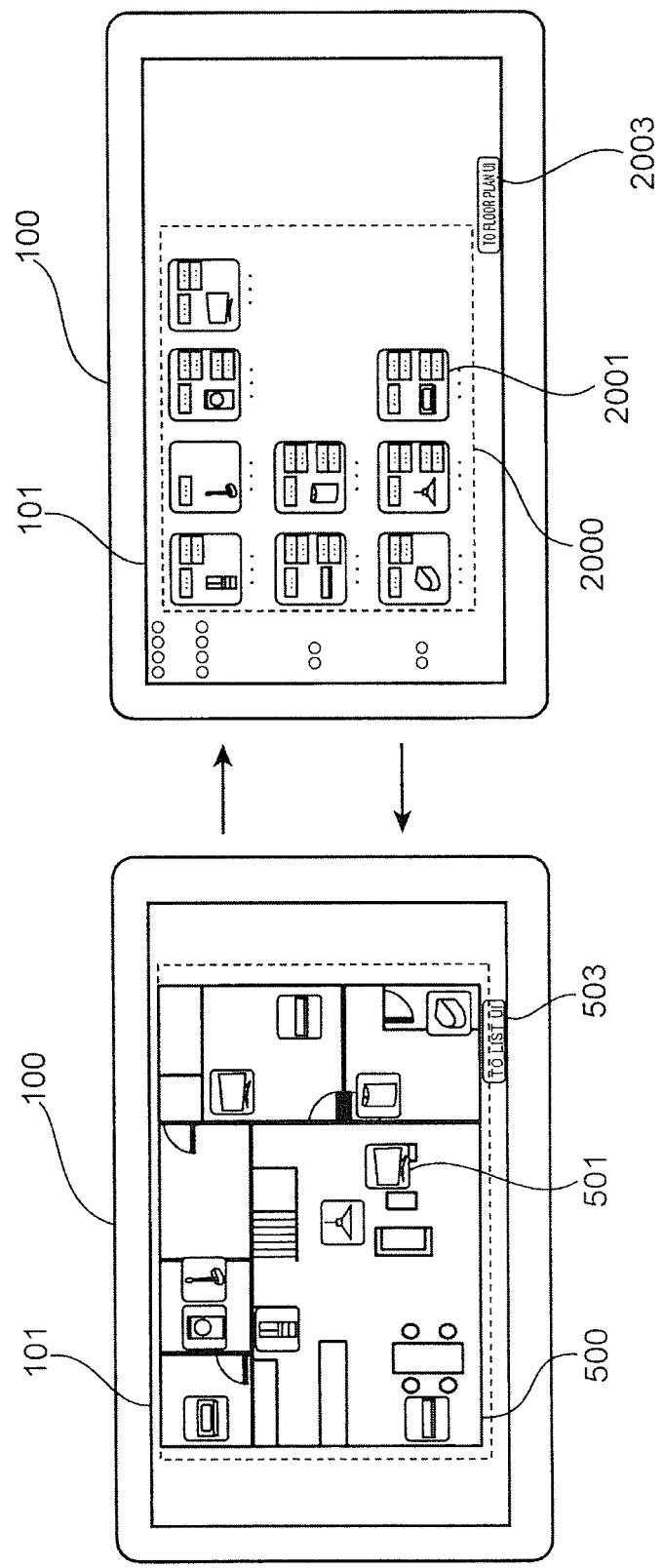
FIG. 25 is a diagram showing an example of transition between the basic screen of the home controller and the device icon list display screen according to the present disclosure.

FIG. 25 is a diagram showing screen transition between the basic screen and the device list display screen. In the basic screen shown in the left diagram of FIG. 25, when the device list display change button 503 is selected by the user, display on the display 101 is switched to the device list display screen shown in the right diagram of FIG. 25. On the other hand, in the device list display screen shown in the right diagram of FIG. 25, when the basic screen display button 2003 is selected by the user, display on the display 101 is switched to the basic screen shown in the left diagram of FIG. 25.

Specifically, when the touch panel control section 102 senses a tap on the basic screen display button 2003, the display control section 103 switches the display screen on the display 101 to the basic screen from the device list display screen. On the other hand, in the display state of the basic screen, when the touch panel control section 102 senses a tap on the device list display change button 503, the display control section 103 switches the display screen on the display 101 from the basic screen to the device list display screen.

For example, in the case where the device list display screen is selected for display, and in the case where the user attempts to operate the television set located in front of the user, the device list display screen includes only one device details icon 2001 for the television set if there is only one television set in the house. This allows the user to directly select the device details icon 2001 for the television set without an erroneous operation, and to cause the device control screen 502 corresponding to the television set to be displayed.

On the other hand, in the case where the device list display screen is selected, the device list display screen focuses on the individual devices 200, and thus the relationship between the device 200 and the location at which the device 200 is disposed is unclear, although it is possible to operate or confirm the state of the individual devices 200. Therefore, for a plurality of devices 200 installed within the same building, such as the air conditioners or the illumination devices, for example, it is unclear the air conditioner or the illumination device in which room is the control target, which may incur an erroneous operation.

Thus, in the present disclosure, the basic screen is provided in addition to the device list display screen to allow selection from the basic screen and the device list display screen.

Consequently, in the case where the basic screen is selected, the relationship between the device 200 and the location at which the device 200 is disposed is made definite. Therefore, also for a plurality of devices 200 of the same type installed in the same building, such as the air conditioners or illumination devices, for example, a discrimination as to the air conditioner or the illumination device in which room is the control target is facilitated. This prevents the air conditioner or the illumination device installed in a room that is different from the desired room from being erroneously operated.

Figure 26:
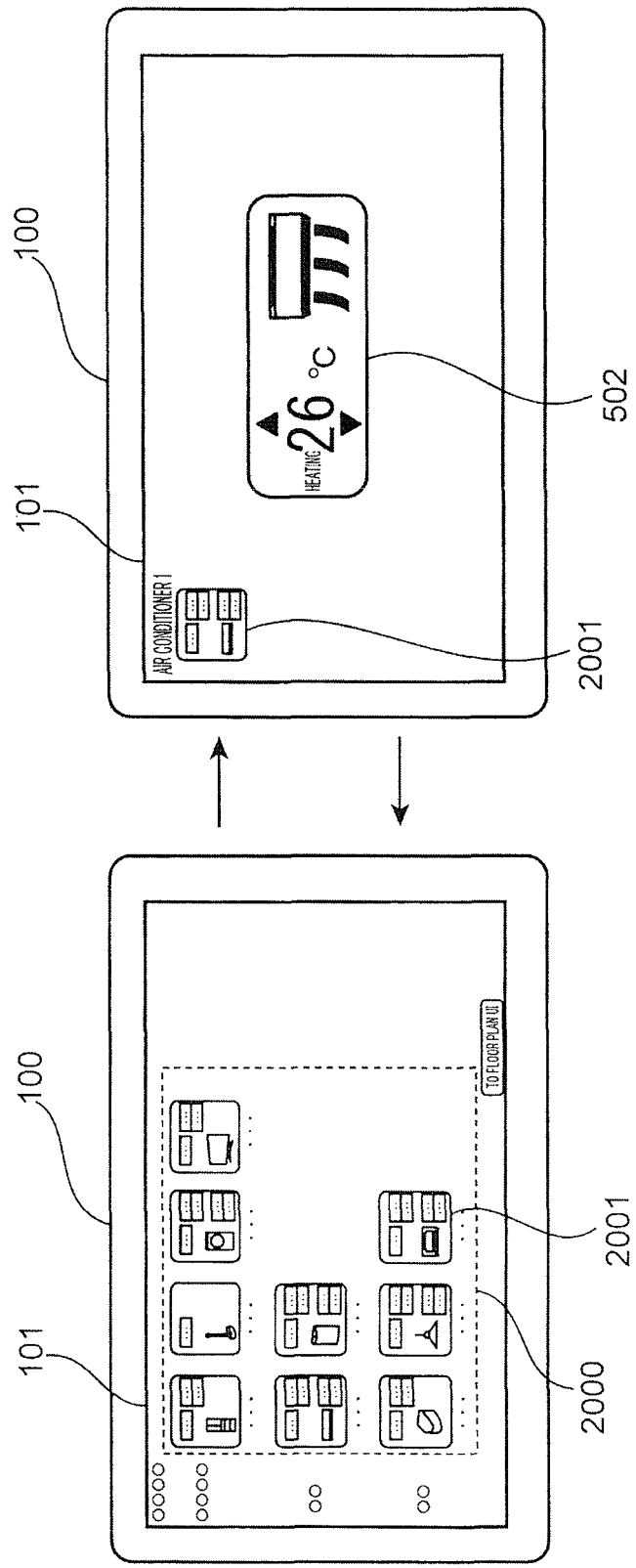
FIG. 26 is a diagram showing an example of transition between the device icon list display screen of the home controller and the display state of the device control screen according to the present disclosure.

FIG. 26 is a diagram showing screen transition between the display state of the device list display screen and the display state of the device control screen 502. In the device list display screen shown in the left diagram of FIG. 26, the user selects the device details icon 2001 for the device 200 (here, the air conditioner) that is desired to be controlled, and the touch panel control section 102 senses the selection. Then, as shown in the right diagram of FIG. 26, the display control section 103 displays the device control screen 502 for the air conditioner corresponding to the selected device details icon 2001 as overlapped on the device list display screen. This results in transition from the display state of the device list display screen to the display state of the device control screen 502.

In the example in the right drawing of FIG. 26, the display control section 103 hides the device details icons 2001 for devices other than the air conditioner selected by the user, and only the device details icon 2001 for the air conditioner is displayed at a position that is different from that in the device control screen 502. This allows the user to definitely recognize the device details icon 2001 that the user himself/ herself selected.

On the other hand, as shown in the right diagram of FIG. 26, in the display state of the device control screen 502, the user selects the device details icon 2001 for the air conditioner, and the touch panel control section 102 senses the selection. Then, as shown in the left diagram of FIG. 26, the display control section 103 erases the device control screen 502, and returns from the display state of the device control screen 502 to the display state of the device list display screen.

Although only one device details icon 2001 is displayed in the display state of the device control screen 502 shown in the right diagram of FIG. 26, other device details icons 2001 that are not selected by the user may be displayed in the same manner as in FIG. 13. In this case, the plurality of device details icons 2001 may be displayed in one line at an end of the screen as shown in FIG. 13, or may be displayed so as to surround the device control screen 502 as shown in FIG. 12.

According to the configuration, the user can successively select the device details icons 2001 in the display state of the device control screen 502 to successively display other device control screens 502. Consequently, in causing another device control screen 502 to be displayed while a certain device control screen 502 is displayed, it is no longer necessary for the user to input an operation of erasing the certain device control screen 502, and switching can be performed between the device control screens 502 with one touch operation.

Figure 27:
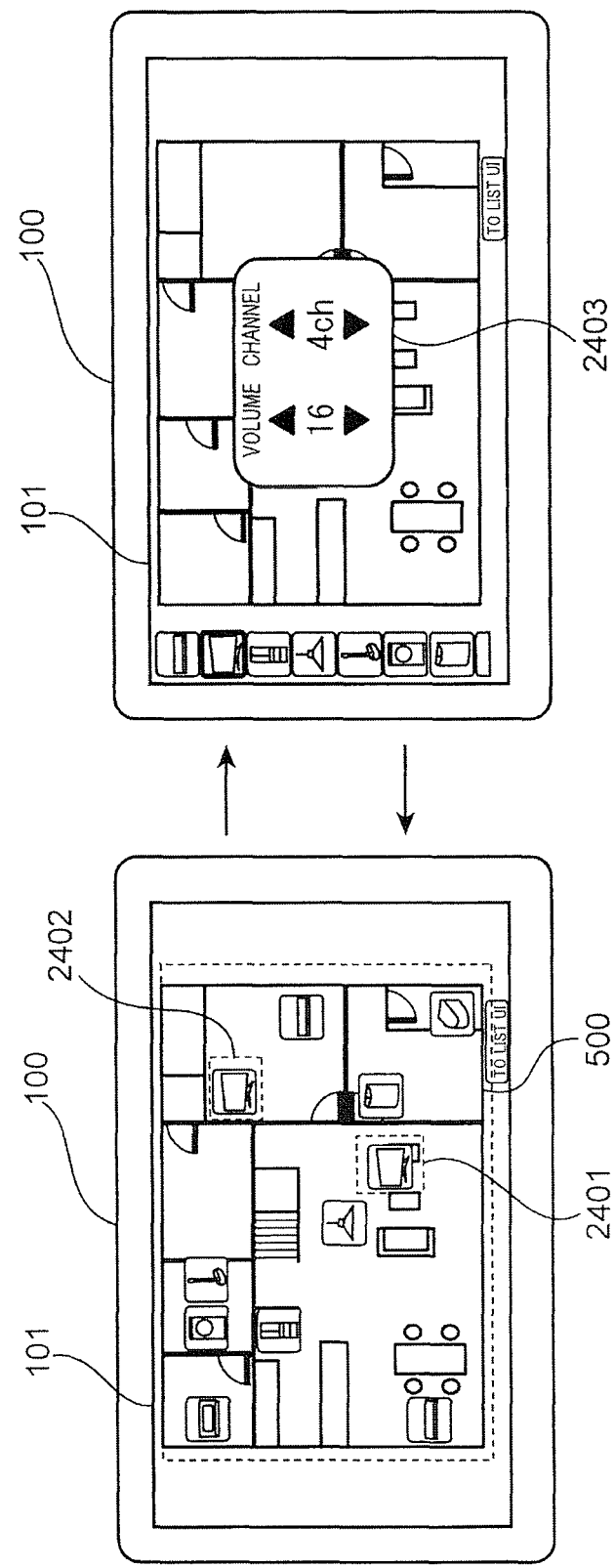
FIG. 27 is a diagram showing an example of transition between the basic screen of the home controller and the display state of the device control screen according to the present disclosure.

FIG. 27 is a diagram showing screen transition between the display state of the basic screen and the display state of the device control screen 502 performed in the case where the basic screen includes a plurality of device icons 501 representing the devices 200 of the same type. As shown in the left diagram of FIG. 27, the basic screen includes two device icons 501 for the television set. Here, the device icon 501 for a television set A is represented as a device icon 2401, and the device icon 501 for a television set B is represented as a device icon 2402. At this time, the user can intuitively select a television set that is desired to be controlled from the floor plan 500, and operate the television set.

For example, in the right diagram of FIG. 27, the device icon 2401 for the television set A is selected, and a device control screen 2403 for the television set A is displayed. Consequently, even if there are a plurality of device icons 501 for the devices 200 of the same type, each device icon 501 is disposed at a position on the floor plan 500 corresponding to the actual installation position. This allows the user to intuitively select the device icon 501 for a device 200 that is desired to be controlled in accordance with the display position on the floor plan 500, which prevents the device control screen 502 for another device 200 from being erroneously displayed.

FIG. 28 is a diagram showing screen transition performed in the case where different device icons 501 are successively selected in the display state of the device control screen 502 to successively switch between the device control screens 502. In the upper left diagram, a device control screen 2511 for the air conditioner is displayed. When the device icon 2501 for the refrigerator is selected in this state, a device control screen 2512 for the refrigerator is displayed on the display 101 as shown in the upper right diagram. When the device icon 2502 for the washing machine is selected in the upper left diagram, a device control screen 2513 for the washing machine is displayed as shown in the lower right diagram. When the device icon 2503 for the air purifier is selected in the upper left diagram, a device control screen 2514 for the air purifier is displayed as shown in the lower left diagram. Such screen transition is performed in the same manner in the upper right diagram, the lower right diagram, and the lower left diagram.

Consequently, when the user selects the device icon 501 in the display state of the device control screen 502, the device control screen 502 corresponding to the device icon 501 can be directly displayed. Therefore, in the case where another device control screen 502 is to be displayed while a certain device control screen 502 is displayed, the other device control screen 502 can be displayed with one touch operation without inputting an operation of erasing the device control screen 502 being displayed. This allows the user to smoothly switch between the device control screens 502.

Figure 29:
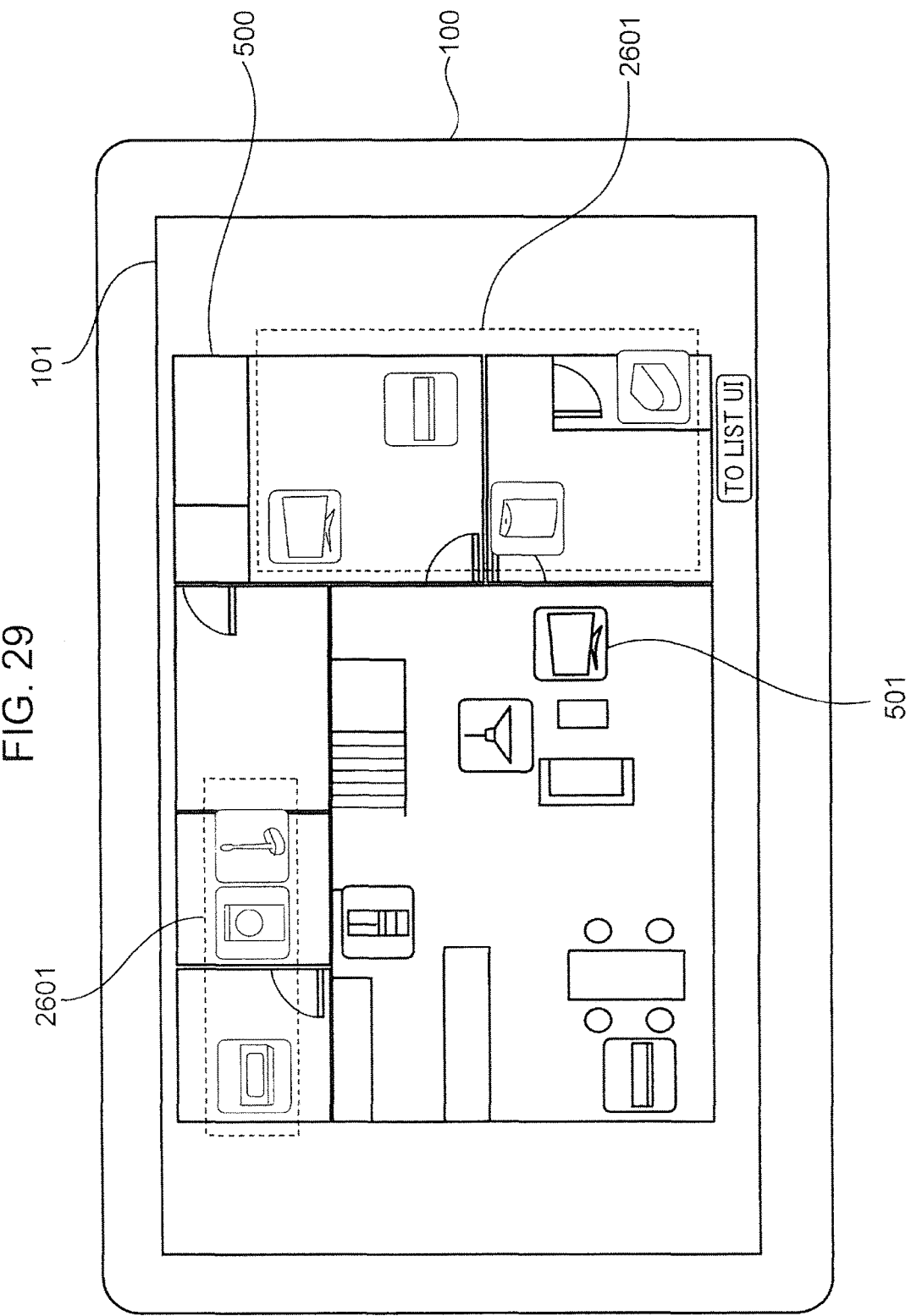
FIG. 29 is a diagram showing an example of display on the basic screen of devices that cannot be detected on a network according to the present disclosure.

FIG. 29 is a diagram showing an example of display on the basic screen of the device icons 501 for incommunicable devices 200 that cannot be detected on the network. The device management section 105 detects a device 200 that cannot be detected on the network and a device 200 that does not respond to a control command even though registered in the device list 3100 as incommunicable devices 200. Then, the display control section 103 displays the device icons 501 for the incommunicable devices 200 in a display mode that is different from that for the device icons 501 for communicable devices 200.

For example, in FIG. 29, the device icons 501 for the incommunicable devices 200 are represented as device icons 2601. The device icons 2601 are displayed translucently. This allows the user to immediately recognize that the devices 200 indicated by the device icons 2601 are currently out of order or cannot be controlled because of occurrence of a communication failure.

Although the device icons 2601 are displayed translucently in FIG. 29, the present disclosure is not limited thereto. For example, the device icons 2601 may be displayed in a fainter color or more darkly than the other device icons 501, or provided with an annotation mark.

Figure 30:
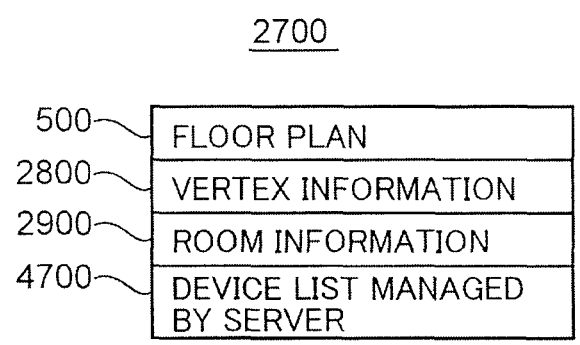
FIG. 30 is a diagram showing the configuration of home information according to the present disclosure.

FIG. 30 is a diagram showing the configuration of home information 2700. The home information 2700 is managed by the server 300 for each house, and the home controller 100 controls display on the basic screen, the device control screen 502, and so forth on the basis of the home information 2700. As shown in FIG. 30, the home information 2700 includes the floor plan 500, vertex information 2800, the room information 2900, and a device list 4700 managed by the server.

As shown in FIG. 6, the floor plan 500 is a plan view that is prepared for each floor of a house and that planarly represents the arrangement and the shape of one or more rooms forming the floor. In the present disclosure, the floor plan 500 includes a plan view formed from image data represented in a bitmap format, for example.

The vertex information 2800 is information for adapting the floor plan 500 to a two-dimensional coordinate-axis space to allow the home controller 100 to interpret the floor plan 500. The room information 2900 is information for deciding the regions of rooms from the vertex information 2800. The vertex information 2800, the room information 2900, and the device list 4700 managed by the server will be described in detail below.

FIG. 31 is a diagram showing the configuration of the vertex information 2800. As shown in FIG. 31, the vertex information 2800 includes a vertex ID 2801 and a vertex coordinate 2802. The vertex ID 2801 is an identifier that identifies a vertex on the floor plan 500. The vertex coordinate 2802 is a coordinate represented in the format of (X coordinate, Y coordinate, floor number), and indicates the position of a vertex of a partition line or the like represented on the floor plan 500. For example, the vertex with a vertex ID of B has a vertex coordinate (X20, Y0, Z1), which represents the position on the first floor (the ground floor) with an X coordinate of 20 and a Y coordinate of 0.

Figure 33:
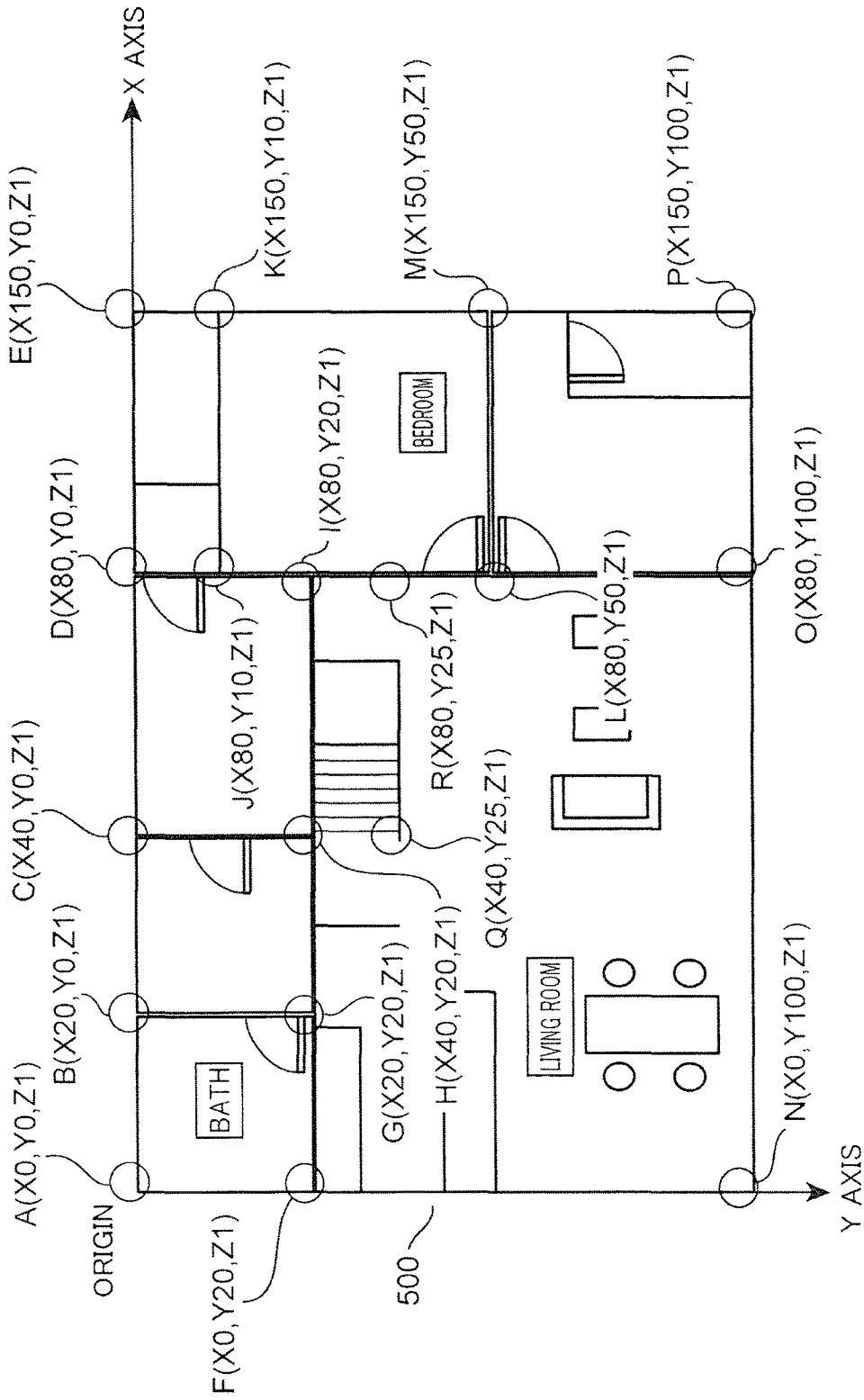
FIG. 33 is a diagram showing an example of the correspondence between the vertex information and the floor plan for the first floor according to the present disclosure.

FIG. 33 is a diagram showing the correlation between each vertex registered in the vertex information 2800 and the floor plan 500. It should be noted, however, that in FIG. 33, the upper left vertex of the floor plan 500 is the origin (with an X coordinate of 0 and a Y coordinate of 0). For example, the vertex with a vertex ID of A has a vertex coordinate (X0, Y0, Z1), and therefore is positioned at the origin. Meanwhile, the vertex with a vertex ID of B has a vertex coordinate (X20, Y0, Z1), and therefore is positioned at the upper right vertex of the bath.

FIG. 32 is a diagram showing the configuration of the room information 2900. As shown in FIG. 32, the room information 2900 includes a room ID 2901, the room type 2902, and a room coordinate 2903. The room ID 2901 is an identifier that identifies a room on the floor plan 500. The room type 2902 indicates the type of the room. The room coordinate 2903 is expressed by a set of the vertex IDs 2801, and decides the region of the room on the floor plan 500. For example, the room with a room ID of C is the bath, and indicates a region formed by connecting the vertexes with vertex IDs of A, B, G, and F sequentially in this order on the floor plan 500. The room information 2900 includes not only information on the rooms but also information on the staircase. The region with a room ID of D formed by connecting the vertexes with vertex IDs of H, 1, R, and Q sequentially in this order represents the staircase.

Consequently, with the vertex information 2800 and the room information 2900 provided, the home controller 100 can specify the regions of the rooms represented on the floor plan 500 by plotting the vertexes indicated by the vertex information 2800 on the image data for the floor plan 500 and connecting the vertexes indicated by the room coordinate 2903, and recognize the type of the rooms from the room type 2902.

The vertex information 2800 may be generated by a system administrator by causing the floor plan 500 to be displayed on a display of a personal computer, detecting vertexes from the displayed floor plan, and inputting the vertex ID and the vertex coordinate of the detected vertexes to the personal computer. The vertex information 2900 may also be generated by the system administrator by detecting rooms from the floor plan displayed on a display, and inputting the room ID, the room type, and the room coordinate of the detected rooms to a personal computer. Alternatively, the vertex information 2800 and the room information 2900 may be generated by taking in CAD data which are the original data for the floor plan 500.

FIG. 34 is a diagram showing the configuration of the device list 4700 managed by the server 300. As shown in FIG. 34, the device list 4700 includes a device ID 4701, a device type 4702, a model number 4703, an arrangement 4704, a capability information 4705, and a control command transmission destination 4706.

The device ID 4701 is the identifier of the device 200. The device type 4702 indicates the type of the device 200. The model number 4703 indicates the model number of the device 200. The arrangement 4704 is a coordinate represented in the format of (X coordinate, Y coordinate, floor number) as with the vertex coordinate 2802, and indicates the arrangement of the device icon 501 corresponding to the device 200 on the floor plan 500.

The display control section 103 can dispose the device icon 501 on the floor plan 500 on the basis of the arrangement 4704, and display the basic screen and so forth. The capability information 4705 indicates the content for control of the device 200 and the state that can be acquired from the device 200. For example, the air conditioner with a device ID of A can be controlled for the temperature, the air flow direction, and the air flow amount. The control command transmission destination 4706 indicates the transmission destination of a control command for controlling the device 200. For example, the control command transmission destination 4706 for the air conditioner with a device ID of A is the device, and therefore a control command is directly transmitted from the home controller 100 to the device 200. Meanwhile, the control command transmission destination 4706 for the refrigerator with a device ID of C is the server, and therefore a control command is transmitted from the home controller 100 to the device 200 via the server 300. The control command is a command for operating the device 200 or confirming the state of the device 200.

The current state of the device 200 may be registered in the device list 4700. This allows the server 300 to notify the home controller 100 of the state of the relevant device 200 in the case where a request for confirmation of the state of the device 200 is made from the home controller 100.

As discussed above, in order to dispose the device icon 501 on the floor plan 500 on the basis of the actual arrangement of the device 200 within the house, the user moves the device icon 501 to an appropriate position on the floor plan 500. Thus, for the device icon 501 of which the arrangement on the floor plan 500 is not specified by the user, a value that indicates an unset arrangement such as (0, 0, 0) is set as the value of the arrangement 4704. The display control section 103 displays the device icon 501 with the arrangement 4704 unset at a position on the display 101 determined in advance.

The device list 4700 managed by the server may be omitted from the home information 2700. In this case, the home controller 100 may directly acquire from the device 200 information corresponding to the device type 4702, the model number 4703, and the capability information 4705 provided in the device list 4700 managed by the server.

FIG. 35 is a diagram showing the configuration of the device list 3100 managed by the home controller 100. The home controller 100 disposes the device icons 501 on the floor plan 500 in the basic screen and controls the devices 200 on the basis of information in the device list 3100.

The device list 3100 includes the device ID 3101, the device type 3102, a model number 3103, the arrangement 3104, capability information 3105, a control command transmission destination 3106, and an IP address 3107. The device ID 3101 to the control command transmission destination 3106 are the same in content as those with the same name in FIG. 34.

In the device list 3100, the content of the device type 3102, the model number 3103, the arrangement 3104, the capability information 3105, the control command transmission destination 3106 can be acquired by the device management section 105 by transmitting the device list 4700 from the server 300. The IP address 3107 is acquired from the device 200 by the device management section 105. It should be noted, however, that the device management section 105 may give priority to the content of the device type 3102, the model number 3103, the capability information 3105, and the control command transmission destination 3106 that can be directly acquired from the device 200 in the case where such content is available.

The control command transmission destination 3106 may be determined in advance by the home controller system, may be automatically decided on the basis of the state of the network to which the home controller 100 is connected, or may be set by the user, rather than being acquired from the server 300 or the device 200.

Next, the flow of control performed on the device 200 by the home controller 100 will be described using the drawings.

FIG. 36 is a sequence diagram showing the flow of a process for the home controller 100 to acquire the home information 2700 from the server 300. The home controller 100 acquires the home information 2700 from the server 300 at desired timing such as when the home controller 100 is initially utilized or started, and generates the basic screen shown in FIG. 5 on the basis of the acquired home information 2700.

First, the device management section 105 of the home controller 100 transmits a home information request to the server 300 (S3201). Here, the home information request includes at least a home controller ID that indicates a user or a home that utilizes the home controller 100. The home information management section 301 of the server 300 which receives the home information request searches the storage section 304 for the home information 2700 corresponding to the home controller ID (S3202), and transmits the home information 2700 to the home controller 100 (S3203). The device management section 105 of the home controller 100 stores the home information 2700 received from the server 300 in the storage section 104, and the display control section 103 generates a basic screen on the basis of the home information 2700, and displays the basic screen on the display 101 (S3204).

Next, the flow of a process for the home controller 100 to detect the device 200 on the network after the home controller 100 is connected to the network will be described using FIG. 37.

Figure 37:
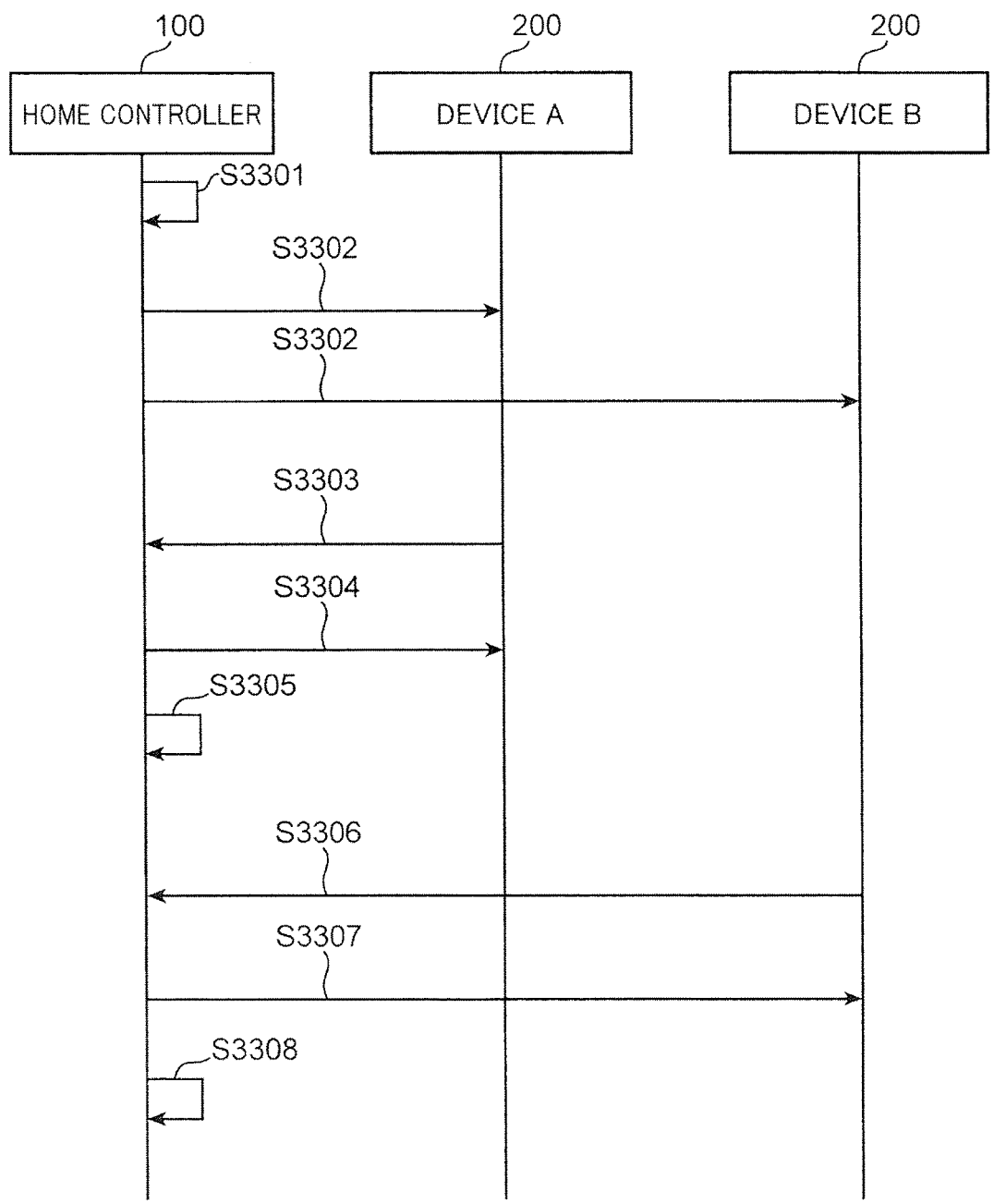
FIG. 37 is a sequence diagram showing the flow of a process for the home controller to detect a device on a network when the home controller is connected to the network according to the present disclosure.

In FIG. 37, a device A 200 with a device ID of A and a device B 200 of a device ID of B shown in FIG. 34 are connected to the network.

When the home controller 100 is connected to the network when the home controller 100 is initially utilized or turned on (S3301), the device management section 105 of the home controller 100 broadcasts a device search request to all the devices 200 on the network (S3302). The device A 200 which receives the device search request returns a device search response to the home controller 100 (S3303). The home controller 100 which receives the device search response acquires device information from the device A 200 (S3304), and updates the display screen (S3305).

Similarly, the device B 200 which receives the device search request returns a device search response to the home controller 100 (S3306). The home controller 100 which receives the device search response acquires device information from the device B 200 (S3307), and updates the display screen (S3308). Here, the device information is information that represents the device type, the model number, the capability information, and so forth of the device 200. The device management section 105 of the home controller 100 generates the device list 3100 (see FIG. 35) on the basis of the device information.

Figure 38:
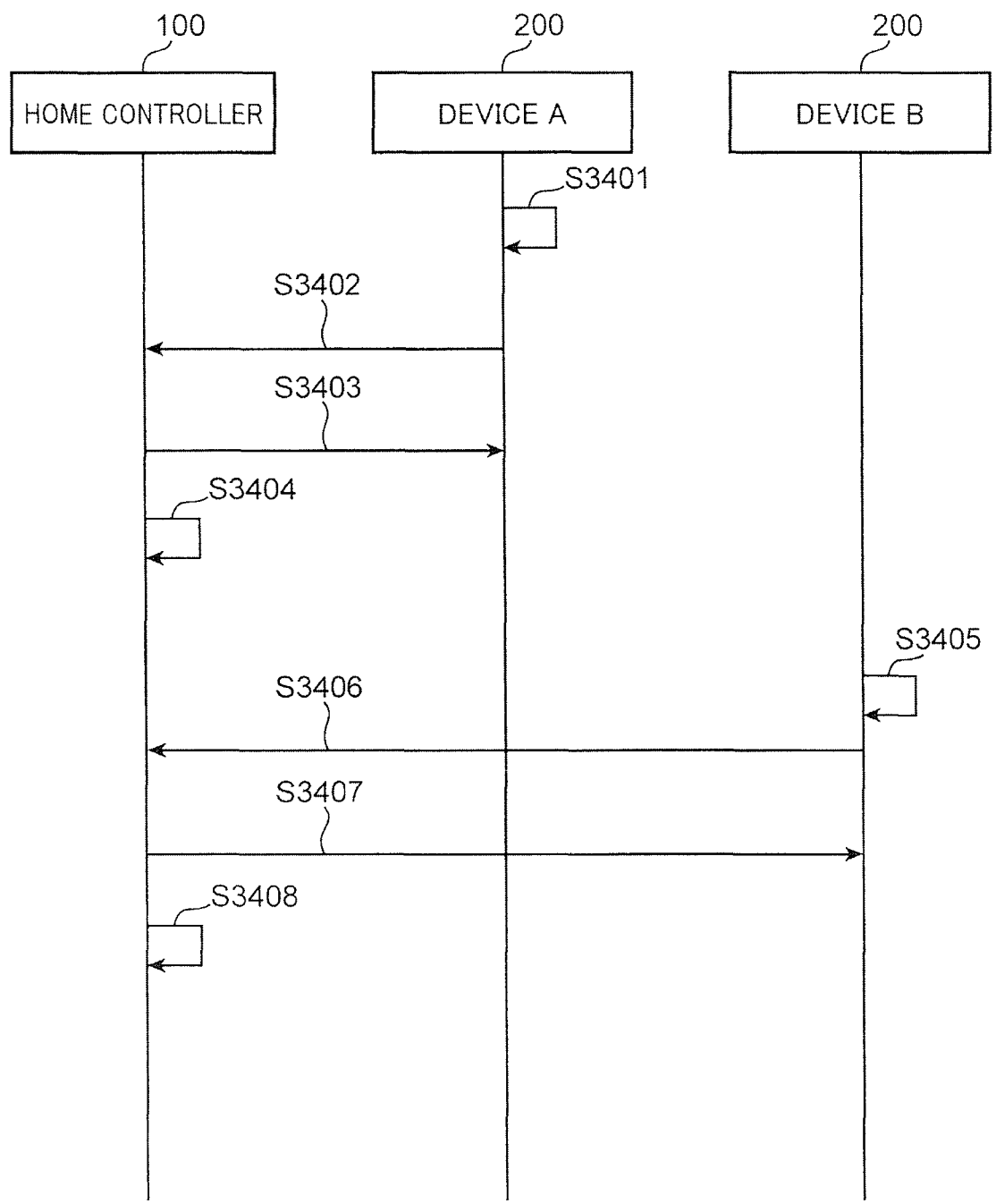
FIG. 38 is a sequence diagram showing the flow of a process for the home controller to detect a device on a network when the device is connected to the network according to the present disclosure.

Next, the flow of a process for the home controller 100 to detect the device 200 on the network when the device 200 is connected to the network will be described using FIG. 38. When the device A 200 is connected to the network when the device A 200 is initially utilized or turned on (S3401), a network connection notification is broadcast to all the home controllers 100 on the network (S3402). In the home controller 100 which receives the network connection notification, the device management section 105 acquires device information from the device A 200 (S3403), and the display control section 103 updates the display screen (S3404). When the device B 200 is connected to the network, the same process as for the device A 200 is performed (S3405 to S3408).

Here, the update of the display screen of the home controller 100 in FIGS. 37 and 38 (S3305, S3308, S3404, and S3408) will be described. The home controller 100 hides the device icon 501 corresponding to the device 200 until the device search response or the network connection notification is received from the device 200, that is, until the device 200 is detected on the network. Then, the home controller 100 which receives the device search response displays the device icon 501 for the corresponding device 200 on the screen. Alternatively, the home controller 100 displays the device icon 501 for the undetected device 200 in a faint color (for example, translucently) compared to the device icon 501 for the detected device 200. Then, the home controller 100 which receives the device search response changes the color of the device icon 501 for the undetected device 200 to the same color as the color of the device icon 501 for the detected device 200.

Figure 39A:
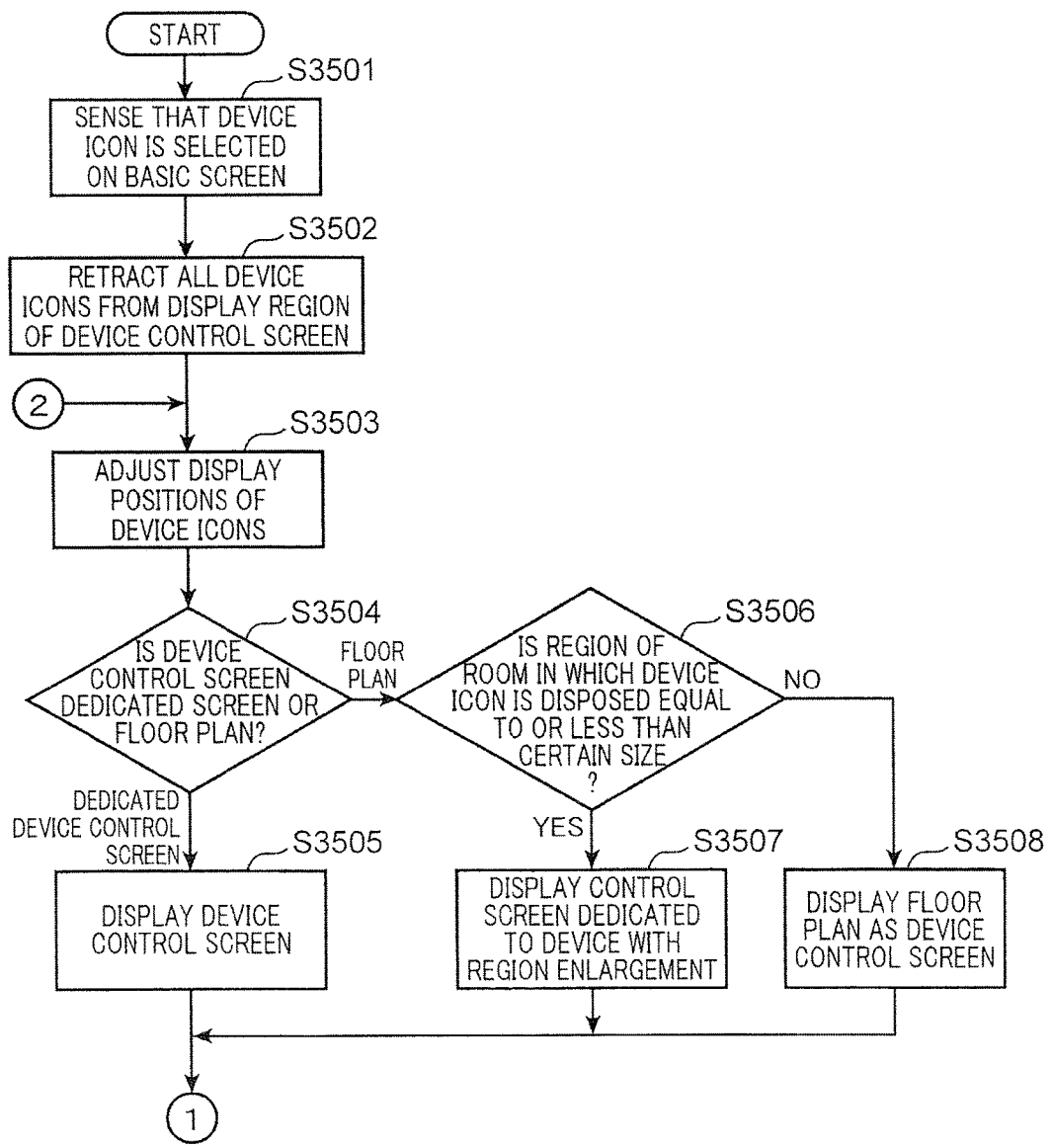
FIG. 39A is a flowchart showing the flow of a process for the home controller to control a device according to the present disclosure.
Figure 39B:
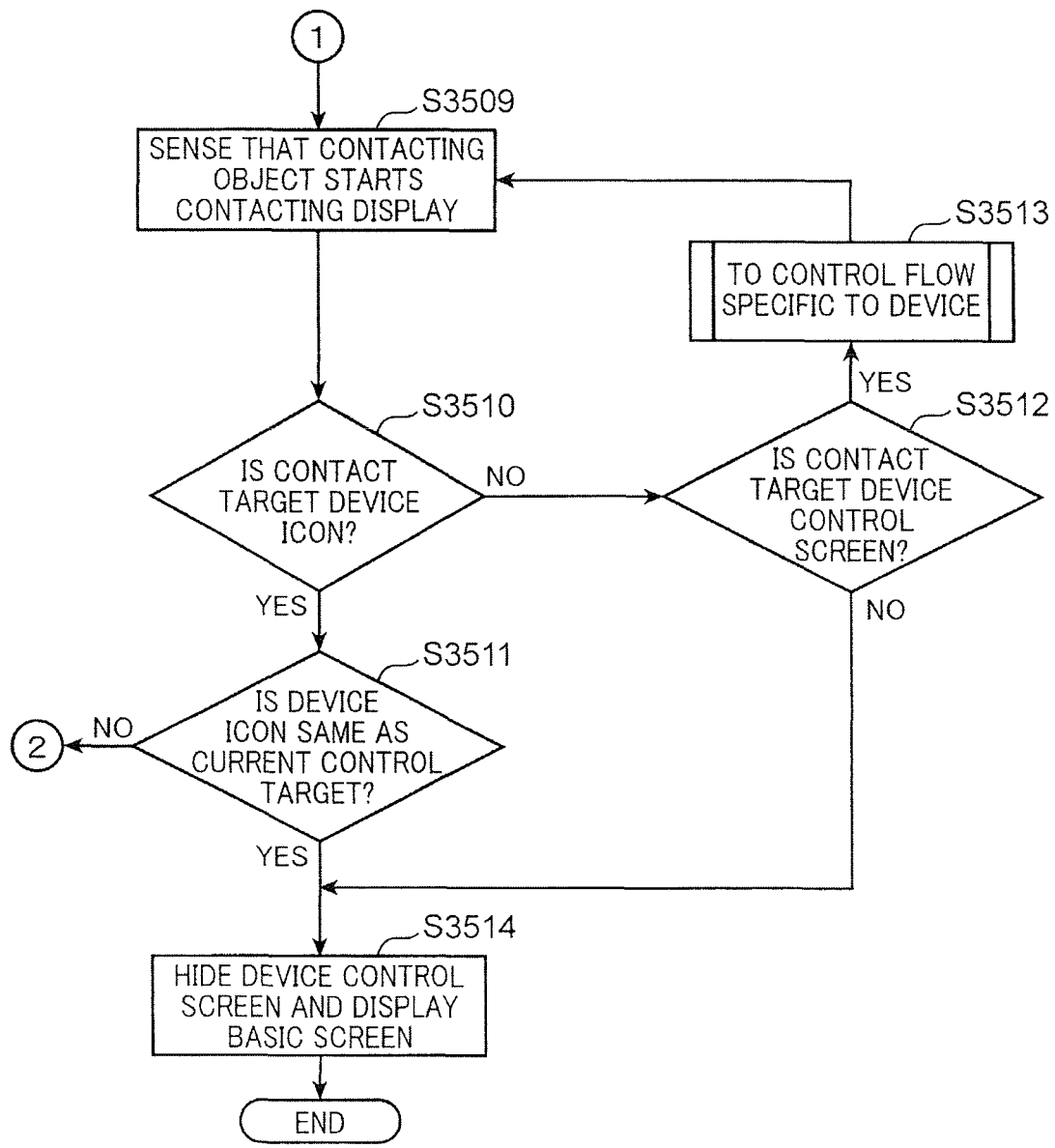
FIG. 39B is a flowchart showing the flow of a process for the home controller to control a device according to the present disclosure.

FIGS. 39A and 39B are each a flowchart showing the flow of a process for the home controller 100 to control the device 200 according to the present disclosure.

First, the touch panel control section 102 senses that the device icon 501 representing a certain device 200 is selected by the user on the basic screen (S3501). Next, the display control section 103 retracts all the device icons 501 out of the display region of the device control screen 502 (S3502). In this case, the device icons 501 are retracted as shown in FIGS. 11 and 13.

Next, the display control section 103 adjusts the display positions of the retracted device icons 501 (S3503). For example, the selected device icons 501 are adjusted so as to be displayed at particular positions as shown in FIGS. 12 and 14.

Next, the display control section 103 judges whether the device control screen 502 corresponding to the device icon 501 selected by the user is a dedicated screen or a floor plan (S3504).

Here, the device control screen 502 which is a dedicated screen refers to the device control screen 502 prepared separately from the floor plan and displayed as overlapped on the floor plan as shown in FIG. 13. On the other hand, the device control screen 502 which is a floor plan refers to the device control screen 502 which is the floor plan itself.

For example, if the illumination device can be turned on and off or adjusted for the brightness by the user by directly tapping on the region of a room on the floor plan in which the illumination device is disposed, the illumination device can be operated with presence. In the case where the user attempts to operate a plurality of illumination devices installed in the living room at the same time, meanwhile, the entire screen is covered by the device control screens 502 dedicated to the illumination devices if the device control screens 502 dedicated to the individual illumination devices are displayed on the floor plan at the same time, which lowers the viewability.

Thus, in the following description, it is assumed that the device control screen 502 for the illumination device is a floor plan. Specifically, when the user selects the device icon 501 for the illumination device installed in a certain room in the basic screen, all the device icons 501 are retracted out of the display region of the floor plan, and the floor plan becomes ready to receive an operation for the illumination device in the room. Then, when the user taps on the region of the room on the floor plan in which the selected illumination device is installed, one or more illumination devices within the room can be operated at the same time.

For example, when the user taps on the region of a room with the illumination devices in the room turned off, one or more illumination devices in the room are turned on at the same time. Next, when the user taps on the region, the one or more illumination devices are turned off at the same time.

In the case where the device control screen 502 is a floor plan in S3504, and if the region of the room in which the device icon 501 is disposed is equal to or less than a certain size (YES in S3506), the display control section 103 causes the device control screen 502 dedicated to the device in which the region of the room is displayed as enlarged to be displayed as overlapped on the floor plan (S3507). Here, for example, a floor plan formed by clipping the floor plan of the relevant room from the floor plan for the entire floor and enlarging the clipped floor plan is displayed as overlapped on the floor plan for the entire floor.

If the region of the room in which the device icon 501 is disposed is not equal to or less than the certain size (NO in S3506), on the other hand, the display control section 103 displays the floor plan as the device control screen 502 (S3508).

Information as to whether a dedicated screen or a floor plan is adopted as the device control screen 502 for each device 200 is stored in advance in the storage section 104. Thus, the display control section 103 may reference the information to determine whether the device control screen 502 is a dedicated screen or a floor plan.

In addition, the display control section 103 may calculate the size of the relevant room by specifying the vertexes of the relevant room from the room information 2900, specifying the coordinates of the specified vertexes from the vertex information 2800, and calculating the area of a region surrounded by the specified coordinates of the vertexes. Then, the result of determination in S3506 may be NO if the size of the room is not equal to or less than the certain size determined in advance, and the result of determination in S3506 may be YES if the size of the room is equal to or less than the certain size.

In the case where the device control screen 502 is a dedicated screen in S3504, on the other hand, the display control section 103 displays the dedicated screen as overlapped on the floor plan (S3505).

In S3509, the touch panel control section 102 senses that a contacting object (here, a finger of the user) starts contacting the display 101.

Next, the touch panel control section 102 determines whether or not the contact target is the device icon 501 (S3510).

If it is determined that the device icon 501 is contacted (YES in S3510), the touch panel control section 102 determines whether or not the contacting object contacts the same device icon 501 as the device icon 501 selected in S3501 (S3511). In the case where it is determined that the contacting object contacts the same device icon 501 as the device icon 501 selected in S3501 (YES in S3511), the display control section 103 hides the device control screen 502 being displayed to display the basic screen (S3514).

In the case where the touch panel control section 102 determines that the device icon 501 is not contacted (NO in S3510), the touch panel control section 102 further determines whether or not the contact target is the device control screen 502 (S3512). In the case where it is determined that the contact target is not the device control screen 502 (NO in S3512), the display control section 103 hides the device control screen 502 being displayed, and the basic screen is displayed (S3514).

If the touch panel control section 102 determines that the contacting object contacts a button or the like within the device control screen 502 (YES in S3512), on the other hand, the process is advanced to S3513, where a control flow that is specific to the device is executed (S3513).

Figure 40:
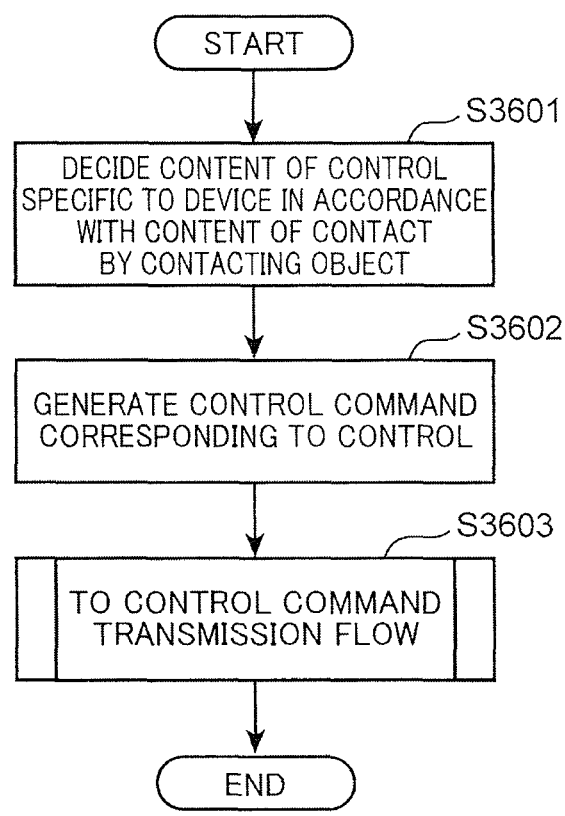
FIG. 40 is a flowchart showing the flow of a process for the home controller to generate a control command for a device in accordance with the content of a contact by a contacting object according to the present disclosure.

Next, the control flow that is specific to the device executed in S3513 will be described in detail using FIG. 40. First, the device control section 106 decides the content of control that is specific to the device in accordance with the content of a contact by the contacting object (S3601). Next, the device control section 106 generates a control command according to the content of control (S3602). It is assumed that the user taps on the button for raising the temperature with the device control screen 502 for the air conditioner displayed as shown in FIG. 11 and the touch panel control section 102 senses the tap. Then, the device control section 106 generates a control command for raising the temperature of the air conditioner. Next, the device control section 106 advances the process to S3603, where a control command transmission flow is executed.

Figure 41:
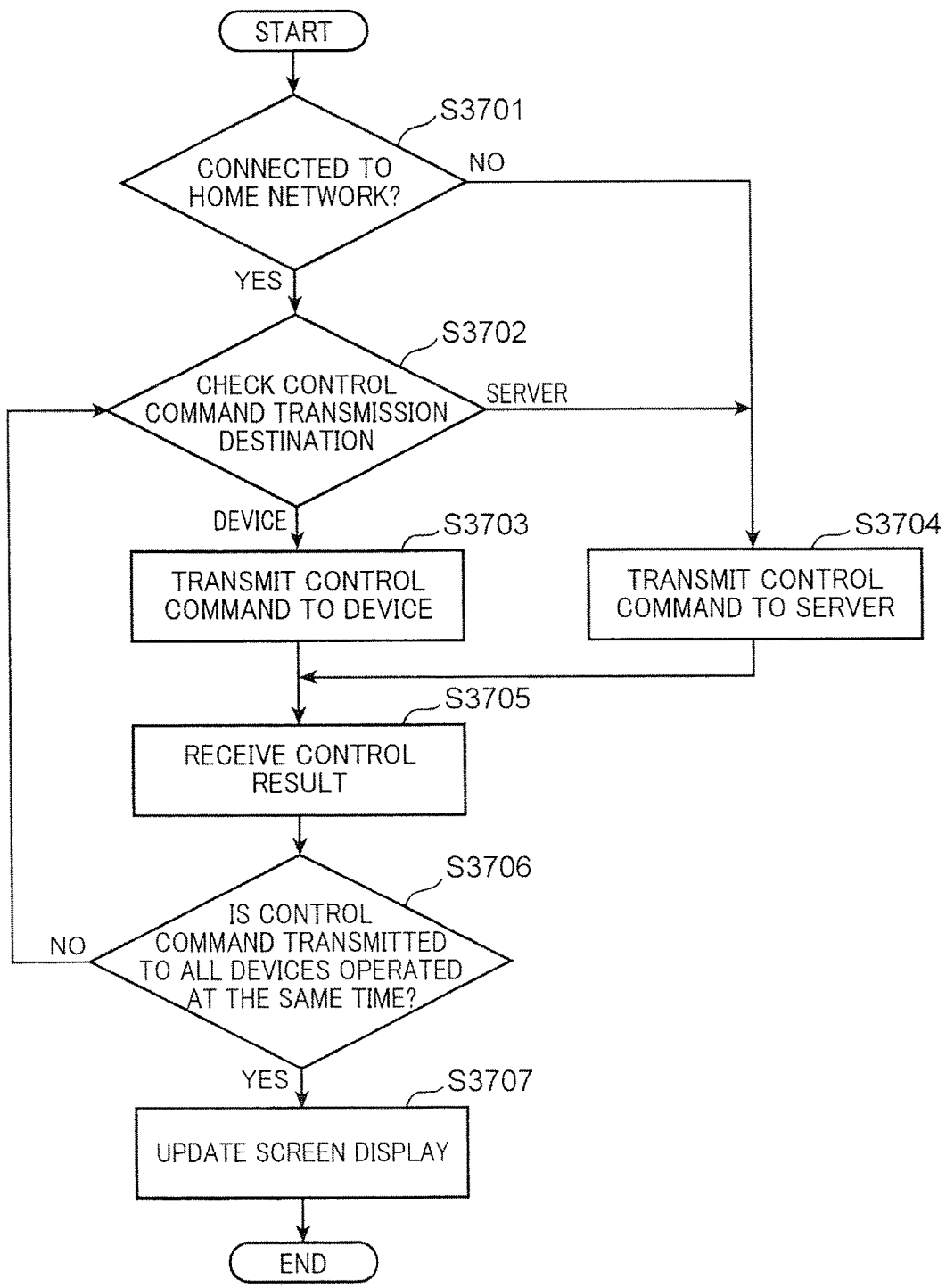
FIG. 41 is a flowchart showing the flow of a process for the home controller to transmit a control command according to the present disclosure.

Next, the control command transmission flow executed in S3603 will be described in detail using FIG. 41. First, the device control section 106 determines whether or not the home controller 100 is connected to the home network (S3701). If the home controller 100 is connected to the home controller (YES in S3701), the device control section 106 checks the transmission destination of a control command in accordance with the content of the control command transmission destination 3106 of the device list 3100 (S3702). Here, the home network is a network provided within the home of the user. Thus, the result of determination in S3701 is NO if the user operates the home controller 100 from a location away from the home, and the result of determination in S3701 is YES if the user operates the home controller 100 from a location within the home.

If the transmission destination of a control command is "DEVICE" in S3702, the device control section 106 transmits a control command to the relevant device 200 (S3703). If the transmission destination of a control command is "SERVER" in S3702, on the other hand, the device control section 106 transmits a control command to the server 300 (S3704).

For example, in the device list 3100, the control command transmission destination 3106 of the air conditioner is "DEVICE", and therefore the device control section 106 transmits a control command to the air conditioner. On the other hand, in the device list 3100, the control command transmission destination 3106 of the refrigerator is "SERVER", and therefore the device control section 106 transmits a control command to the server 300.

Meanwhile, in the case where it is judged in S3701 that the home controller 100 is not connected to the home network (NO in S3701), the process in S3704 is performed.

In S3705, the device control section 106 receives the control result from the device 200. Next, in the case where transmission of a control command to all the devices 200 that are operated at the same time is completed (YES in S3706), the device control section 106 advances the process to S3707. In the case where transmission of a control command to all the devices 200 that are operated at the same time is not completed (NO in S3706), on the other hand, the device control section 106 returns the process to S3702, and repeats the processes in and after S3702.

For example, in the case where two illumination devices are installed in the same room and the two illumination devices are set in advance to be operated at the same time, the device control section 106 transmits a control command to each of the two illumination devices. The result of determination in S3706 is NO for devices 200 that are not operated at the same time as other devices 200.

Next, the display control section 103 updates the screen displayed on the display 101 (S3707). For example, if the set temperature of the air conditioner is changed, the device control screen 502 is updated such that the temperature display is flashed on and off, for example, until the set temperature of the air conditioner is changed by a control command and the temperature display stops flashing when the set temperature of the air conditioner is changed by a control command. In the example of the illumination device, the screen is updated such that the region on the floor plan of a room in which the illumination device is installed becomes brighter than other regions in the case where the illumination device is turned on.

Figure 42:
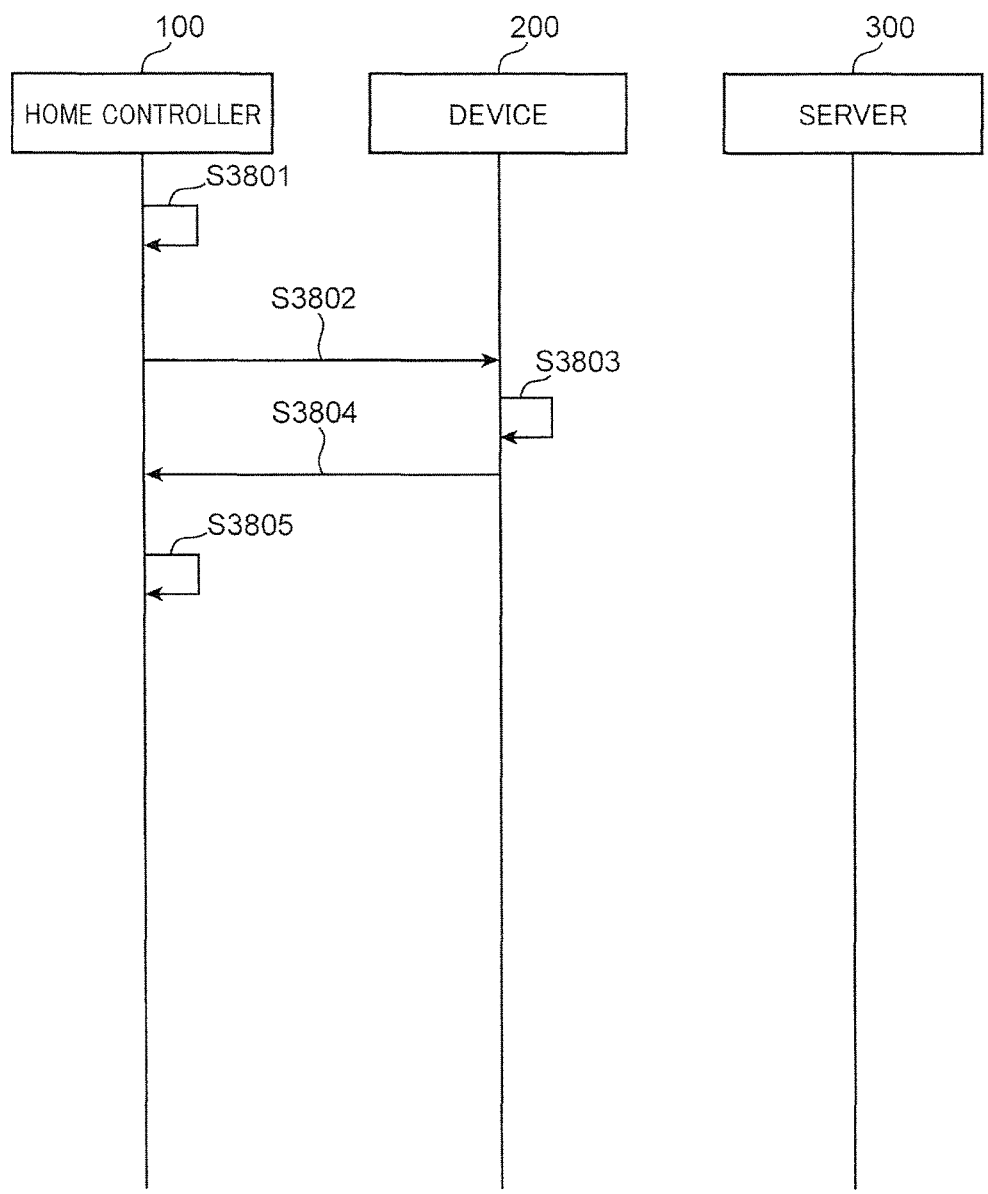
FIG. 42 is a sequence diagram showing the flow of a process for the home controller to directly control a device according to the present disclosure.

Next, the flow of a process for the home controller 100 to directly control the device 200 will be described using FIG. 42. First, the touch panel control section 102 of the home controller 100 senses a user operation on the device control screen 502 (S3801). Next, the device control section 106 of the home controller 100 generates a control command according to the user operation, and transmits the control command to the device 200 (S3802).

The device 200 which receives the control command executes the control command (S3803), and transmits the control result to the home controller 100 (S3804). The display control section 103 of the home controller 100 which receives the control result updates the display screen in accordance with the control result (S3805).

Figure 43:
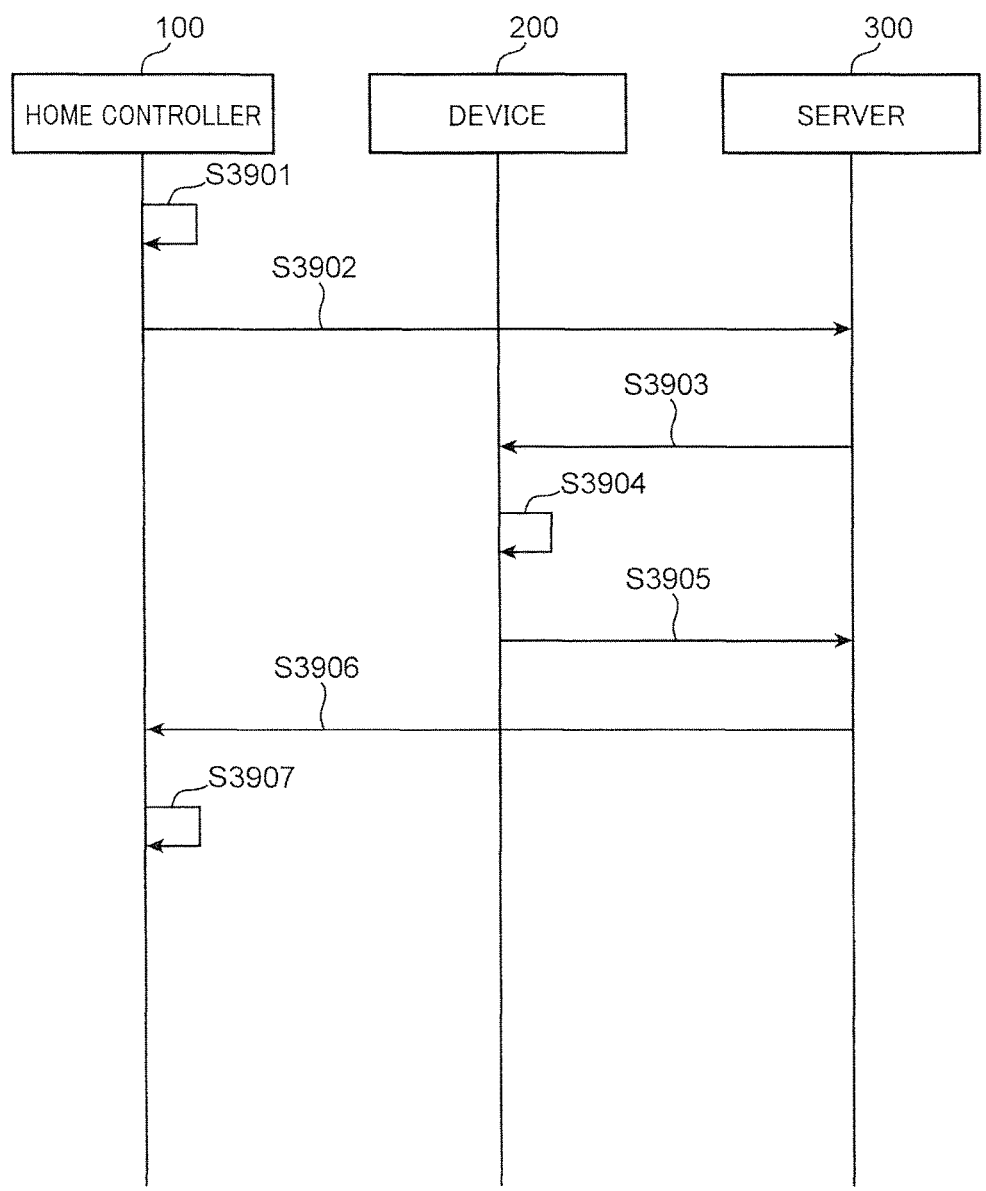
FIG. 43 is a sequence diagram showing the flow of a process for the home controller to control a device by way of the server according to the present disclosure.

Next, the flow of a process for the home controller 100 to control the device 200 by way of the server 300 will be described using FIG. 43. First, the touch panel control section 102 of the home controller 100 senses a user operation on the device control screen 502 (S3901). Next, the device control section 106 of the home controller 100 generates a control command according to the user operation, and transmits the control command to the server 300 (S3902).

The server 300 which receives the control command transmits the relevant control command to the device 200 (S3903). The device 200 which receives the control command executes the control command (S3904), and transmits the control result to the server 300 (S3905). The server 300 which receives the control result transmits the control result to the home controller 100 (S3906). The display control section 103 of the home controller 100 which receives the control result updates the display screen in accordance with the control result (S3907).

Figure 44:
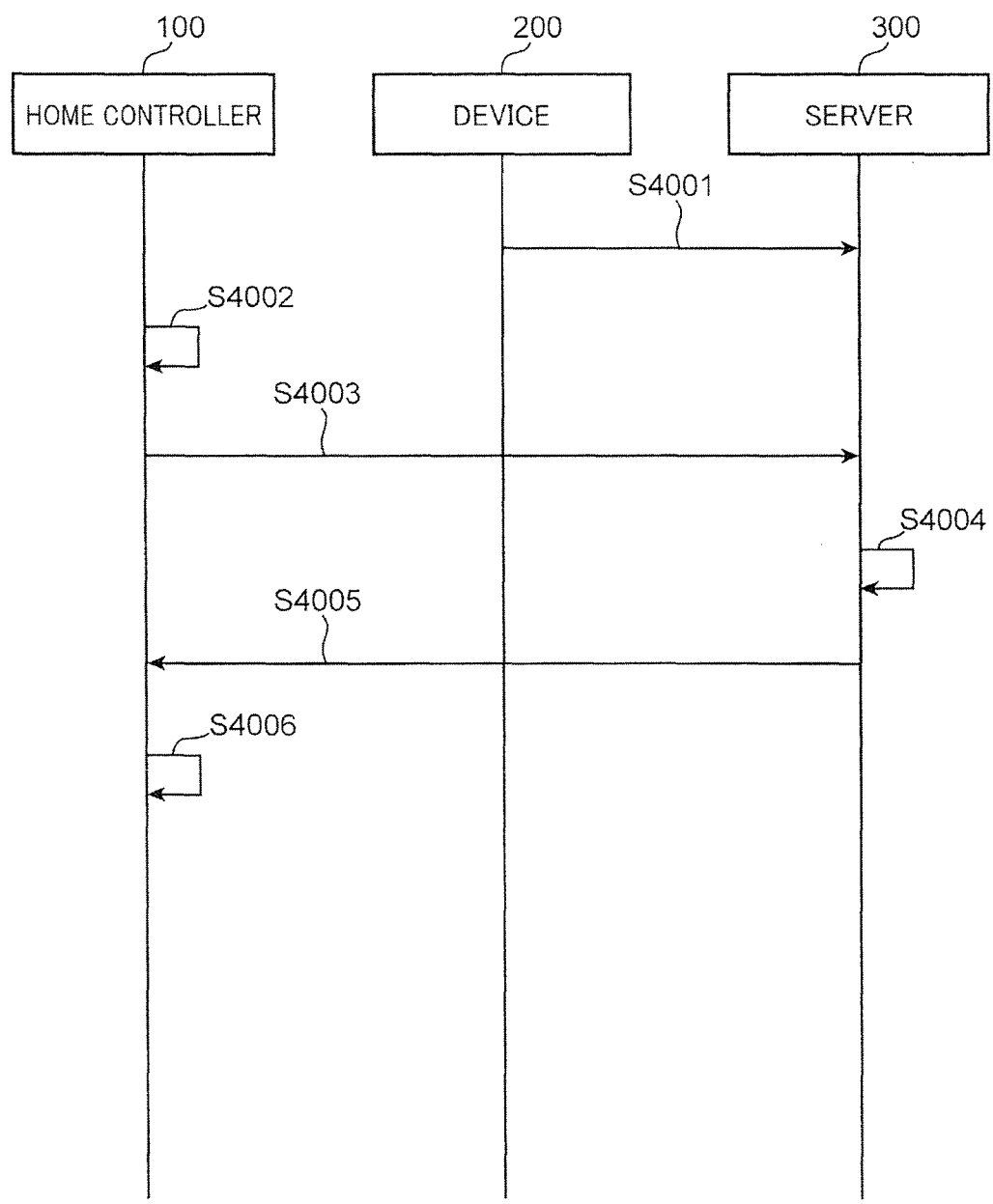
FIG. 44 is a sequence diagram showing the flow of a process for the home controller to acquire the state of a device from the server according to the present disclosure.

Next, the flow of a process for the home controller 100 to confirm the device state of the device 200 by way of the server 300 will be described using FIG. 44. First, the device 200 transmits the current device state to the server 300 (S4001). Here, the device 200 transmits the device state to the server 300 when the device 200 is turned on, when the device 200 is turned off, when the device state is changed, or regularly to cause the server 300 to store the device state. The process in S4001 may be executed asynchronously with the processes in S4002 to S4006.

Next, the touch panel control section 102 of the home controller 100 senses a user operation on the device control screen 502 (S4002). Next, the device control section 106 of the home controller 100 generates a control command according to the user operation, and transmits the control command to the server 300 (S4003). Here, a control command for confirming the device state of the device 200 is generated.

The server 300 which receives the control command searches for the current device state of the relevant device 200 (S4004), and transmits the device state of the relevant device 200 to the home controller 100 as the control result (S4005). The display control section 103 of the home controller 100 which receives the control result updates the display screen in accordance with the control result (S4006). For example, if the device control screen 502 for the device 200 is displayed on the display 101, the content of the device control screen 502 for the device 200 is updated in accordance with the control result.

Figure 45:
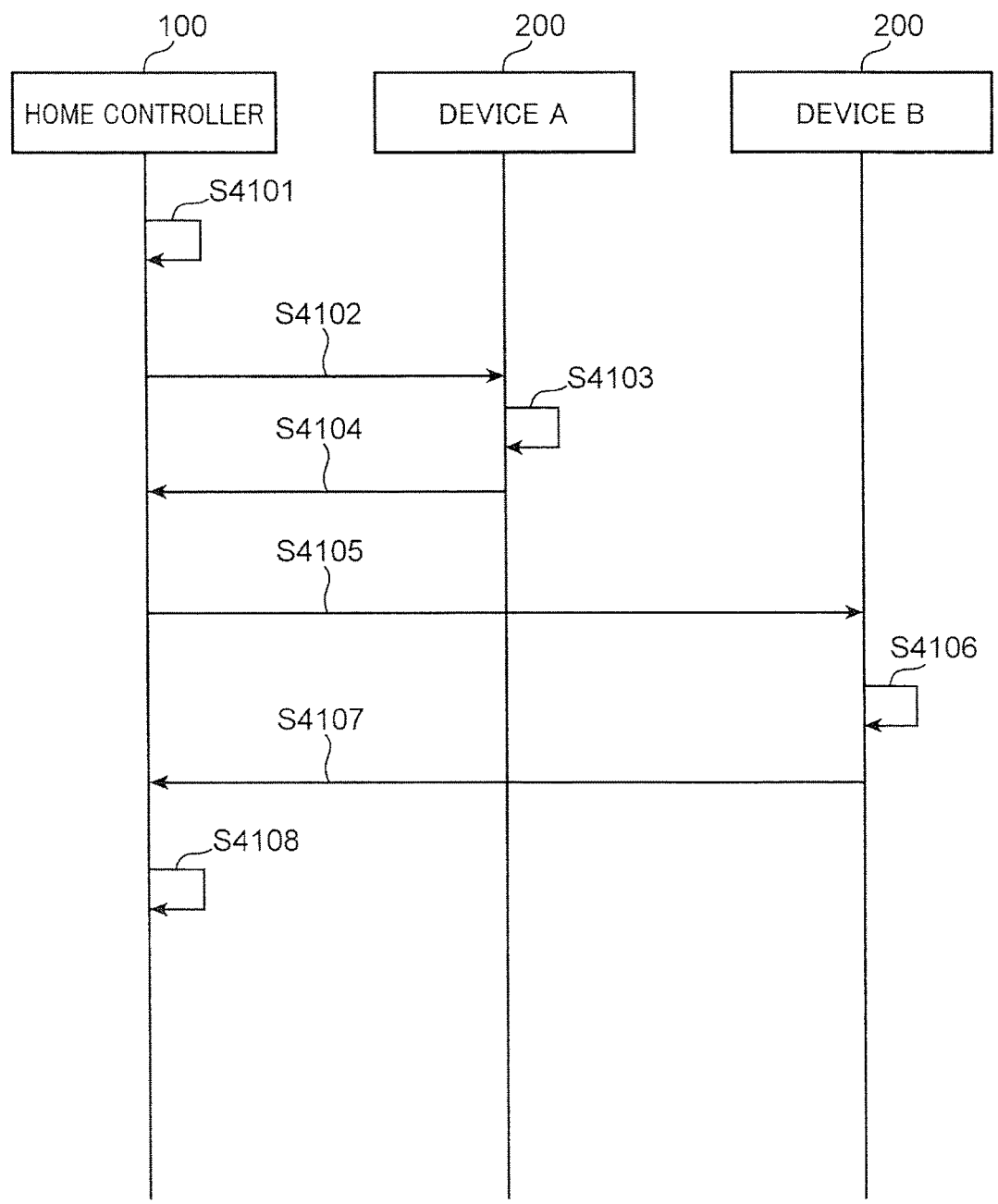
FIG. 45 is a sequence diagram showing the flow of a process for the home controller to directly control devices in the case where the home controller controls a plurality of devices with one operation according to the present disclosure.

Next, the flow of a process for the home controller 100 to directly control the devices 200 in the case where the home controller 100 controls a plurality of devices 200 with one operation will be described using FIG. 45. Here, a case where the home controller 100 controls the device A 200 and the device B 200 is described as an example.

First, the touch panel control section 102 of the home controller 100 senses a user operation on the device control screen 502 (S4101). Next, the device control section 106 of the home controller 100 generates a control command according to the user operation, and transmits the control command to the device A 200 (S4102).

The device A 200 which receives the control command executes the control command (S4103), and transmits the control result to the home controller 100 (S4104).

Next, the device control section 106 of the home controller 100 transmits to the device B 200 a control command that is the same as the control command transmitted to the device A 200 (S4105). The device B 200 which receives the control command executes the control command (S4106), and transmits the control result to the home controller 100 (S4107).

The display control section 103 of the home controller 100 which receives the control result updates the display screen in accordance with the control result (S4108). In this case, for example, if the device control screens 502 for the devices A 200 and B 200 are displayed on the display 101, the content of the device control screens 502 for the devices A 200 and B 200 is updated in accordance with the control result.

Figure 46:
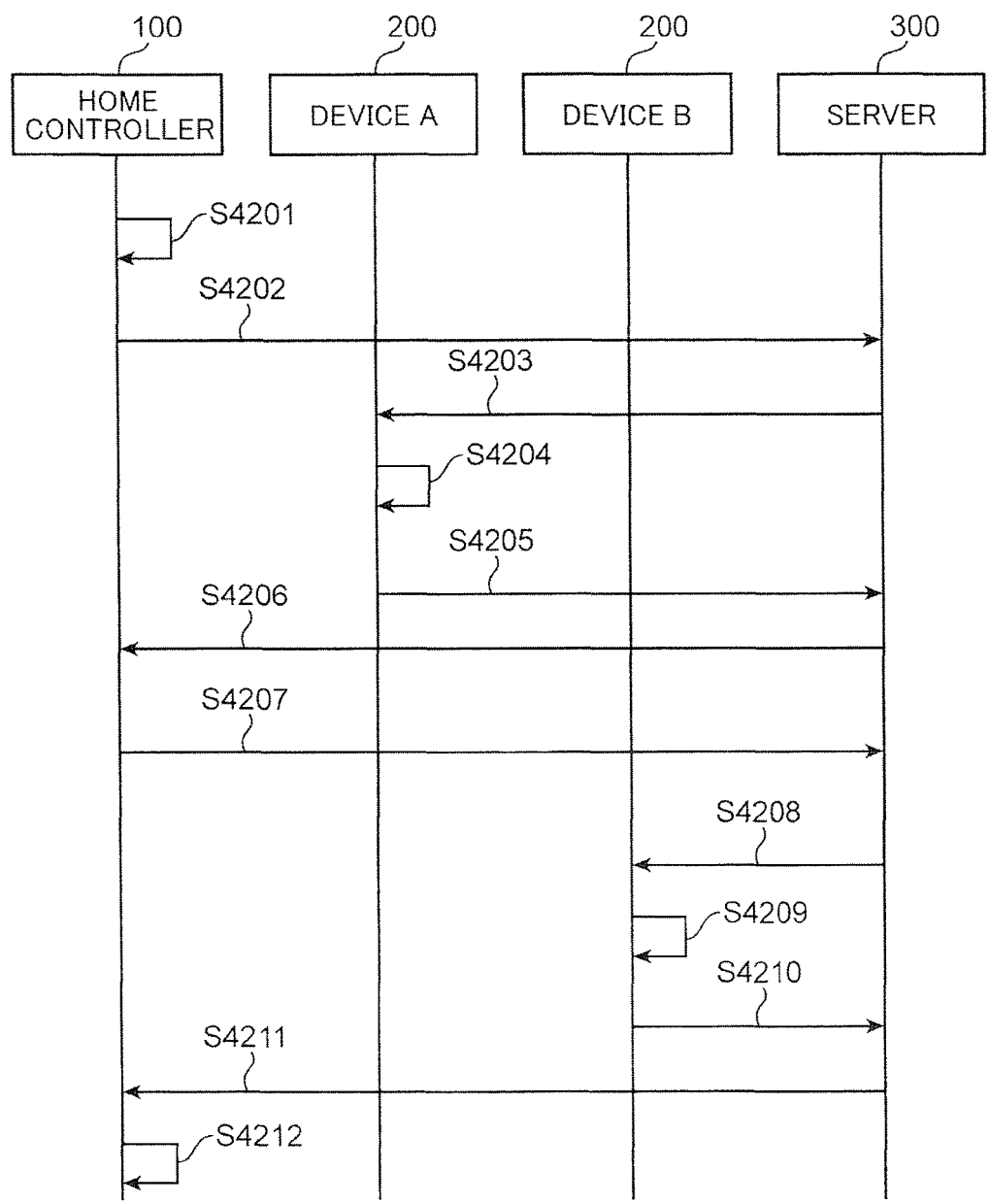
FIG. 46 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 46. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4201).

Next, the device control section 106 of the home controller 100 generates a control command for the device A 200 according to the user operation, and transmits the control command to the server 300 (S4202).

The server 300 which receives the control command for the device A 200 transmits the control command to the device A 200 (S4203). The device A 200 which receives the control command executes the control command (S4204), and transmits the control result to the server 300 (S4205). The server 300 which receives the control result transmits the control result to the home controller 100 (S4206).

Similarly, the device control section 106 of the home controller 100 generates a control command for the device B 200 according to the user operation, and transmits the control command to the server 300 (S4207).

The server 300 which receives the control command transmits the control command to the device B 200 (S4208). The device B 200 which receives the control command executes the control command (S4209), and transmits the control result to the server 300 (S4210). The server 300 which receives the control result transmits the control result to the home controller 100 (S4211).

Then, the display control section 103 of the home controller 100 updates the display screen in accordance with the control result (S4212).

Figure 47:
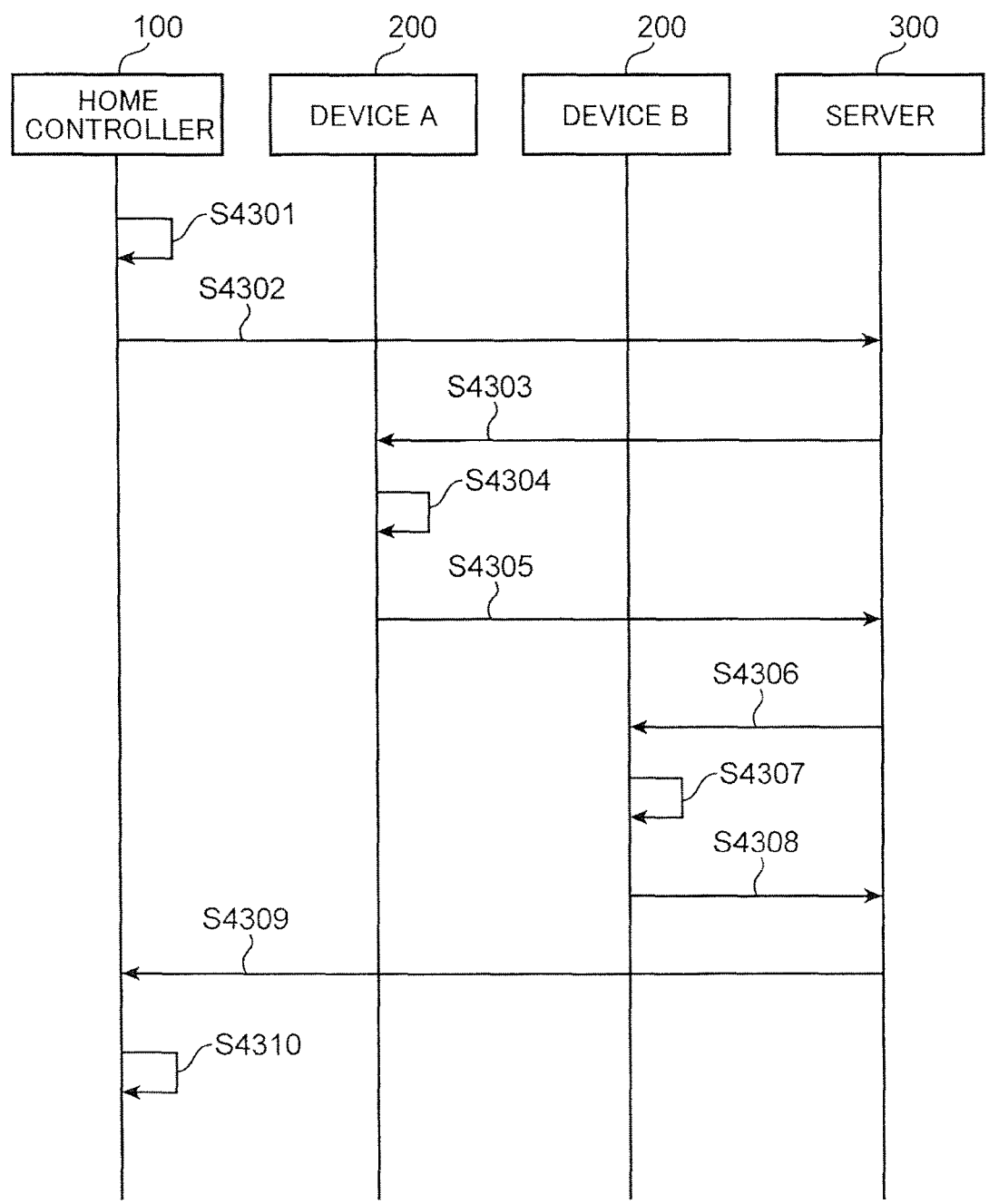
FIG. 47 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 47. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4301).

Next, the device control section 106 of the home controller 100 generates a control command for the device A 200 and the device B 200 in accordance with the user operation, and transmits the control command to the server 300 (S4302).

The server 300 which receives the control command transmits the control command to the device A 200 (S4303). The device A 200 which receives the control command executes the control command (S4304), and transmits the control result to the server 300 (S4305).

Similarly, the server 300 transmits the control command to the device B 200 (S4306). The device B 200 which receives the control command executes the control command (S4307), and transmits the control result to the server 300 (S4308). The server 300 which receives the control result for the device A 200 and the device B 200 transmits the control result to the home controller 100 (S4309).

Then, the display control section 103 of the home controller 100 updates the display screen in accordance with the control result (S4310).

Figure 48:
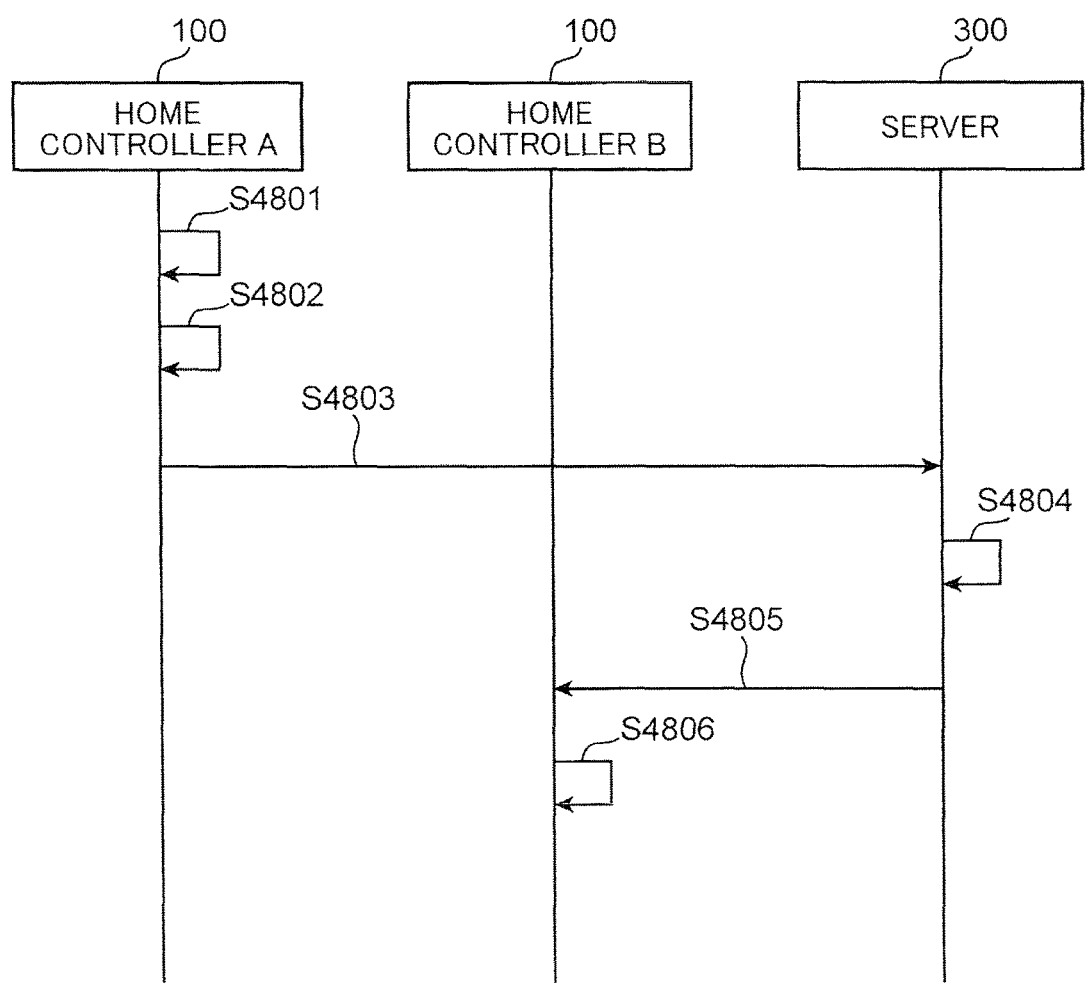
FIG. 48 is a sequence diagram showing the flow of a process for a case where a device icon is moved in the home controller according to the present disclosure.

Next, the flow of a process for a case where the device icon 501 is moved in the home controller 100 will be described using FIG. 48. Here, it is assumed that the user owns two home controllers A 100 and B 100.

When the touch panel control section 102 of the home controller A 100 senses movement of the device icon 501 (S4801), the display control section 103 updates the display screen (S4802). Here, the display control section 103 displays the device icon 501 moved in accordance with the amount of a drag performed on the device icon 501 by the user.

The device management section 105 of the home controller A 100 transmits to the server 300 a device list update notification including the coordinate on the floor plan 500 after the drag (S4803). Here, the device management section 105 of the home controller A 100 updates the content of the arrangement 3104 of the relevant device 200 in the device list 3100 managed by the device management section 105 itself with the coordinate after the drag.

The server 300 which receives the device list update notification updates the device list 4700 (S4804). In this case, the home information management section 301 of the server 300 updates the content of the arrangement 4704 of the relevant device 200 in the device list 4700 with the coordinate included in the device list update notification.

Subsequently, the server 300 transmits the device list update notification to the home controller B 100 (S4805). The home controller B 100 which receives the device list update notification updates the display screen (S4806). Here, the device management section 105 of the home controller B 100 updates the content of the arrangement 3104 of the relevant device 200 in the device list 3100 managed by the device management section 105 itself with the coordinate included in the device list update notification.

The device icon 501 is disposed at an appropriate position on the floor plan 500 through the process described above. Because the home controller B 100 is notified of the update of the arrangement position of the device icon 501 performed by the home controller A 100 by way of the server 300, the arrangement position of the device icon 501 after the update is shared among the home controllers A 100 and B 100 and the server 300. Therefore, it is possible to avoid trouble in which the arrangement position of the device icon 501 is different between the home controller A 100 and the home controller B 100.

Figure 49:
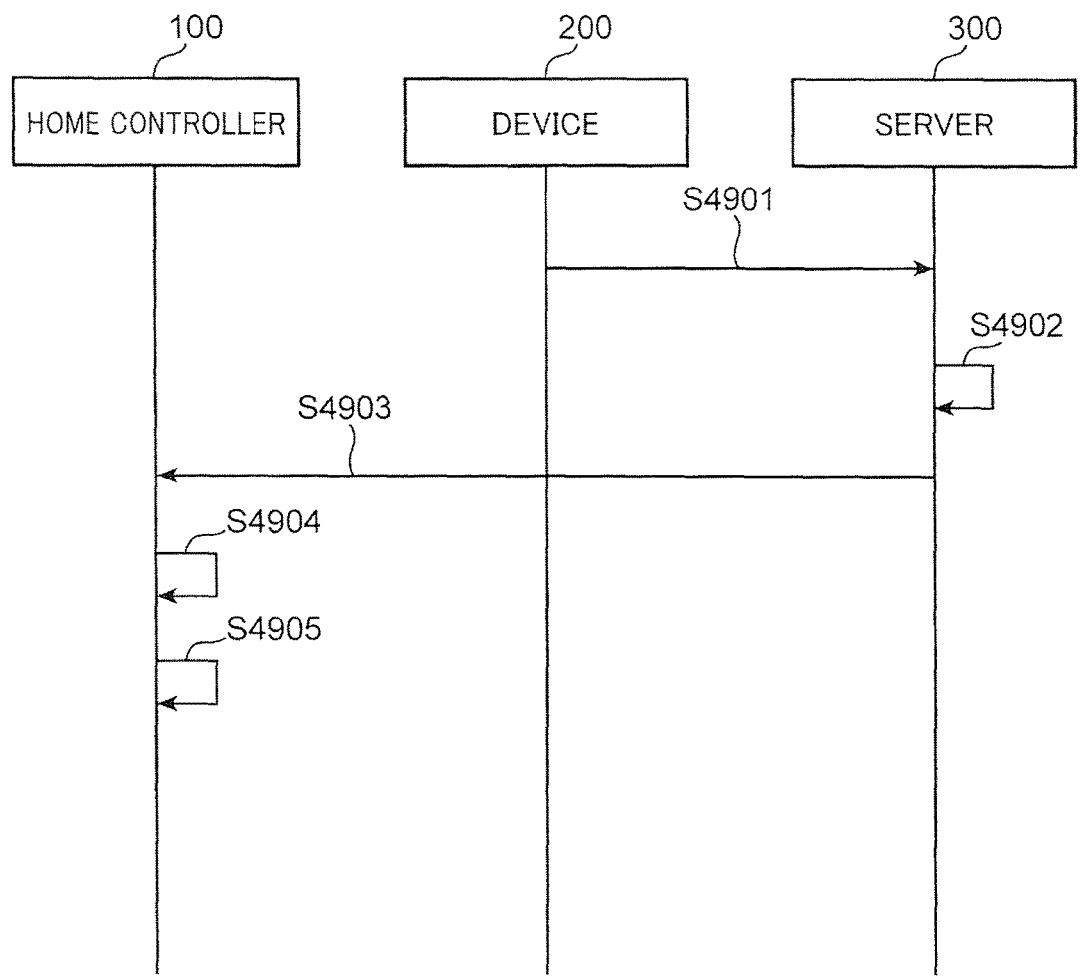
FIG. 49 is a sequence diagram showing the flow of a process for updating the device lists of the home controller and the server according to the present disclosure.

Next, an example of a process for updating the device lists of the home controller 100 and the server 300 will be described using FIG. 49. The device 200 transmits the device state indicating the current state of the device 200 itself to the server 300 (S4901). Here, the device 200 may regularly transmit the device state, or may transmit the device state when the state is varied. The server 300 updates the device list 4700 in accordance with the content of the received device state (S4902). Here, in the case where the device list 4700 does not contain information on the device 200, the server 300 adds information on the device 200 as a new device. Then, the server 300 transmits a device list update notification to the home controller 100 (S4903). The device management section 105 of the home controller 100 updates the device list 3100 in accordance with the content of the received device list update notification (S4904). Here, in the case where the device list 3100 does not contain information on the device 200, the device management section 105 adds information on the device 200 as a new device. Then, the display control section 103 of the home controller 100 updates the display screen (S4905).

Consequently, the server 300 is notified of variation in state of the device 200, which allows the server 300 to monitor variation in state of the device 200. The server 300 to which the device state is transmitted from the device 200 notifies the home controller 100 of variation in state of the device 200, which allows the home controller 100 to recognize the current state of the device 200. In the case where a new device 200 is connected to the home network, the server 300 and the home controller 100 can add the new device. Hence, it is possible to prevent occurrence of deviation between the actual state of the device 200 and the state of the device 200 recognized by the home controller 100.

Figure 50:
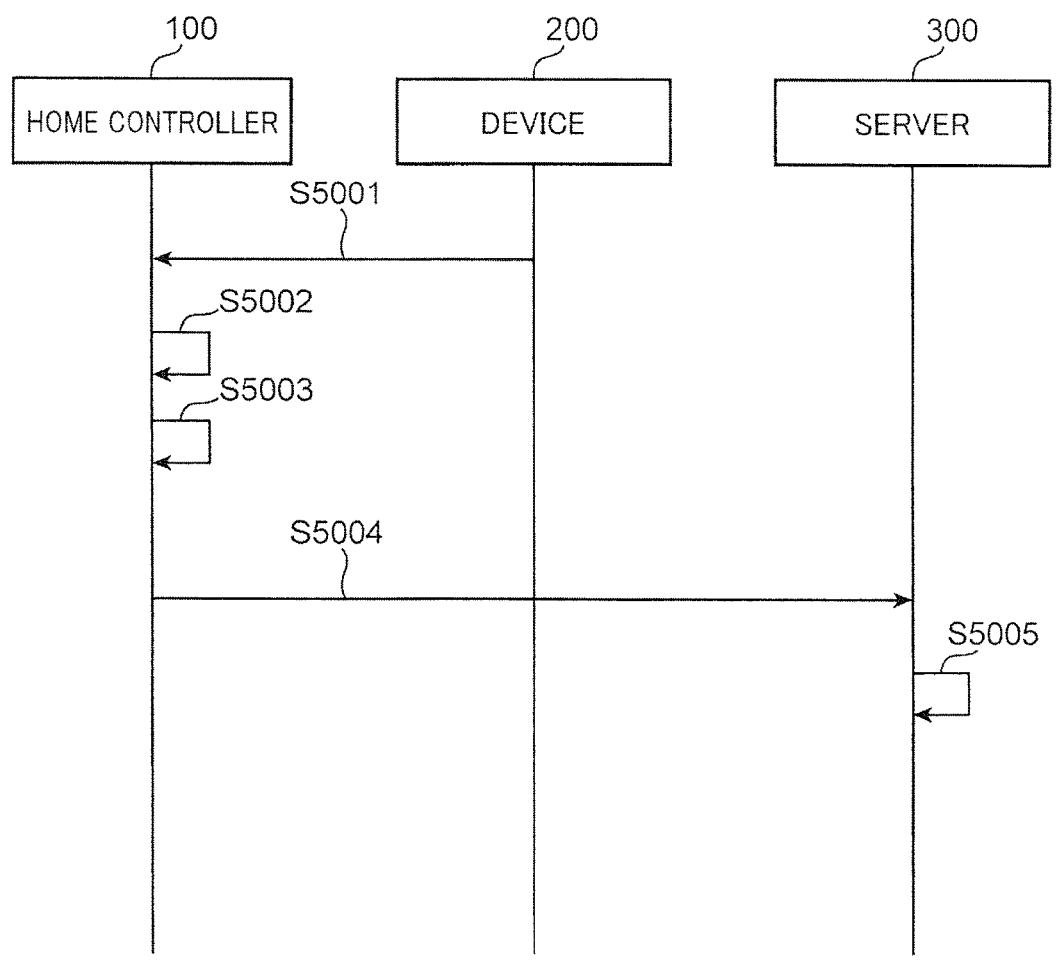
FIG. 50 is a sequence diagram showing the flow of a process for updating the device lists of the home controller and the server according to the present disclosure.

Next, another example of the process for updating the device lists of the home controller 100 and the server 300 will be described using FIG. 50. The device 200 transmits the device state to the home controller 100 (S5001). Here, the device 200 may regularly transmit the device state, or may transmit the device state when the state is varied.

The device management section 105 of the home controller 100 updates the device list 3100 in accordance with the content of the received device state (S5002). Here, in the case where the device list 3100 does not contain information on the device 200, the device management section 105 adds information on the device 200 as a new device. Then, the display control section 103 updates the display screen (S5003). Then, the device management section 105 of the home controller 100 transmits a device list update notification to the server 300 (S5004). The server 300 updates the device list 4700 in accordance with the received device list update notification (S5005). Here, in the case where the device list 4700 does not contain information on the device 200, the server 300 adds information on the device 200 as a new device.

Figure 51:
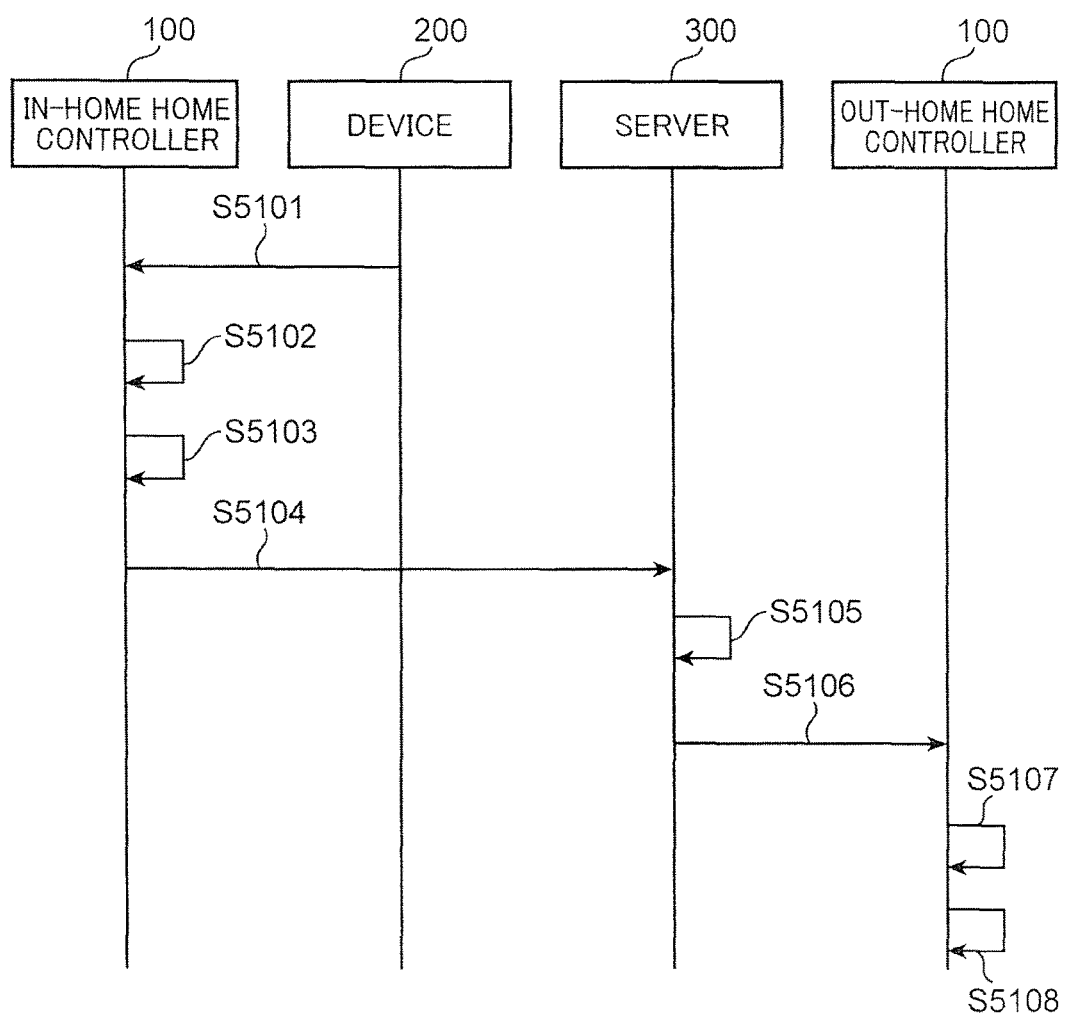
FIG. 51 is a sequence diagram showing the flow of a process for updating the device lists of the home controller and the server according to the present disclosure.

Next, still another example of a process in which the home controller 100 and the server 300 update the device list will be described using FIG. 51. In FIG. 51, a case where the user owns two home controllers 100, namely an in-home home controller 100 and an out-home home controller 100, is described as an example. Here, the out-home home controller 100 is a home controller 100 taken away from the home by the user, and the in-home home controller 100 is a home controller 100 kept at the home by the user.

The device 200 transmits the device state to the in-home home controller 100 (S5101). The in-home home controller 100 updates the device list 3100 in accordance with the content of the received device state (S5102). Here, in the case where the device list 3100 does not contain information on the device 200, the device management section 105 adds information on the device 200 as a new device. Then, the display screen is updated (S5103). Then, the in-home home controller 100 transmits a device list update notification to the server 300 (S5104).

The server 300 updates the device list 4700 in accordance with the content of the received device list update notification (S5105). Here, in the case where the device list 4700 does not contain information on the device 200, the server 300 adds information on the device 200 as a new device. Then, the server 300 transmits a device list update notification to the out-home home controller 100 (S5106). The out-home home controller 100 updates the device list 3100 in accordance with the content of the received device list update notification (S5107). Here, in the case where the device list 3100 does not contain information on the device 200, the device management section 105 of the out-home home controller 100 adds information on the device 200 as a new device. Then, the display screen is updated (S5108).

According to the example, even in the case where one home controller 100 is located away from the home and the other home controller 100 is located in the home, it is possible to prevent occurrence of deviation between the states of the device 200 recognized by the two home controllers 100.

The sequences and the process flows described above are merely exemplary, and the order of the steps may be changed and some of the steps may be omitted as long as the intended process may be embodied. For example, a control command may be transmitted to the device A 200 and the device B 200 asynchronously.

In the foregoing description, a plan view that planarly represents the position and the shape of rooms forming each floor is adopted as the floor plan 500. However, the present disclosure is not limited thereto, and a diagram that schematically shows how many rooms of what type are located on each floor may be adopted as the floor plan.

Figure 52:
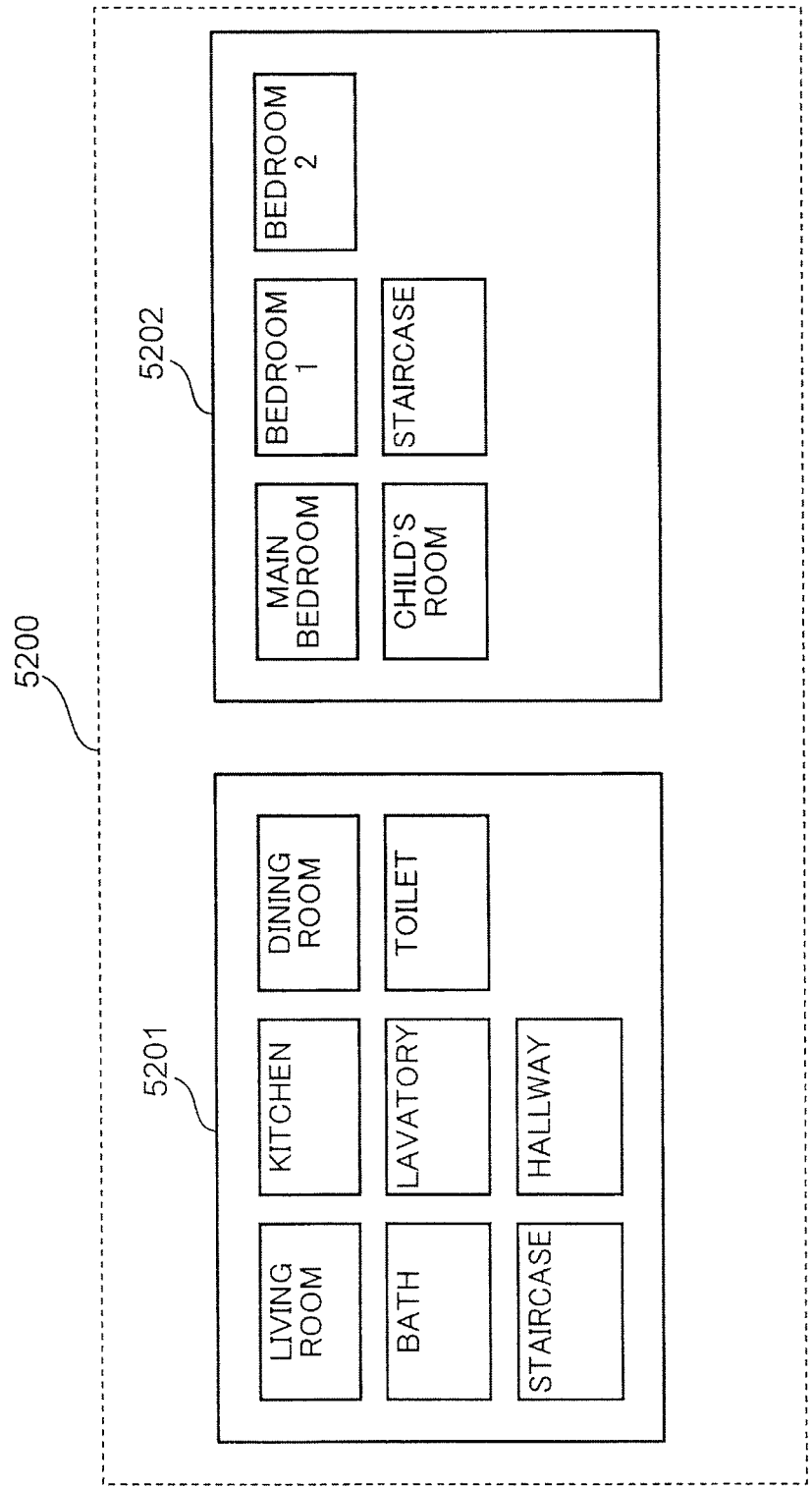
FIG. 52 is a diagram showing a floor plan in another pattern according to the present disclosure.

Floor plans in other patterns will be specifically described below. FIG. 52 is a diagram showing a floor plan 5200 in another pattern. In the floor plan 5200, rooms forming one floor are each represented by one rectangular block, and the rooms on the one floor are disposed in a matrix. The blocks have the same size, and are each provided with the name of the room.

In the floor plan 5200, the name and the number of the rooms forming each floor are indicated, but the relative size and the position in the floor of the rooms are not represented. In the present disclosure, such a diagram is treated as the floor plan 5200. That is, in the present disclosure, any diagram that represents at least what rooms are provided on each floor are treated as the floor plan.

For example, it is seen that a floor plan 5201 for the first floor includes rooms such as a living room, a kitchen, a dining room, a bath, a lavatory, a toilet, a staircase, and a hallway. Meanwhile, it is seen that a floor plan 5202 for the second floor includes rooms such as a main bedroom, a bedroom 1, a bedroom 2, a child's room, and a staircase.

The user can drag and move a desired room on the floor plan 5200 to change the position of the room on the floor plan 5200. In the case where a large number of devices 200 are disposed within a room and all the device icons 501 cannot be displayed within the room on the floor plan 5200 using a default room size, the display control section 103 may increase the size of the room such that all the device icons 501 can be accommodated within the room.

Figure 53:
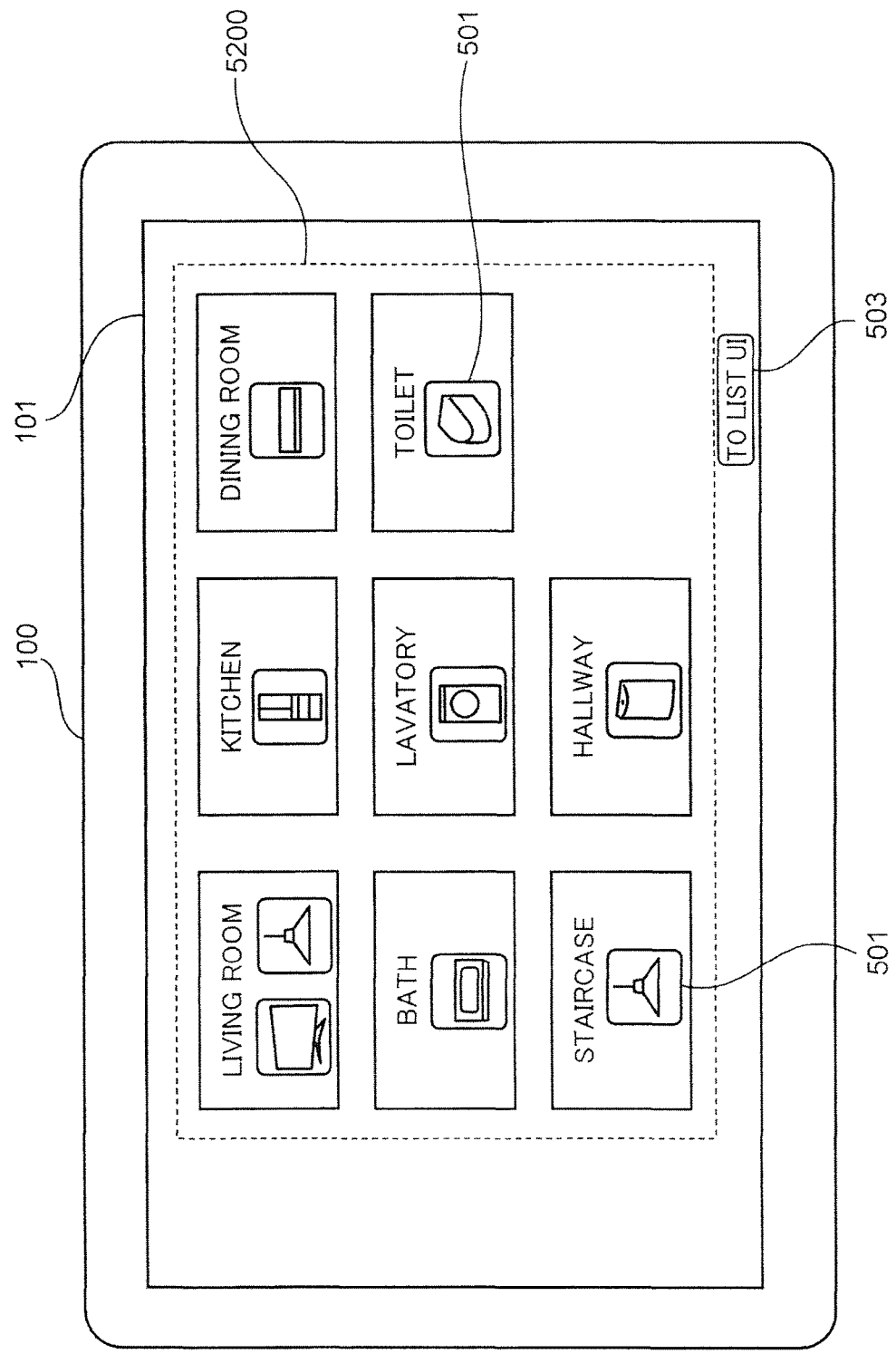
FIG. 53 is a diagram showing the configuration of a basic screen that adopts the floor plan shown in FIG. 52.

FIG. 53 is a diagram showing the configuration of a basic screen that adopts the floor plan 5200. The floor plan 5200 is displayed on the basic screen. In addition, the device icons 501 for the devices 200 actually disposed are displayed within each room.

For example, the device icons 501 for the television set and the illumination device are displayed in the living room, and therefore it is seen that the television set and the illumination device are installed in the living room.

The device list display change button 503 is a button for switching the screen display from the basic screen to the device list display screen discussed earlier (see FIG. 24).

Figure 54:
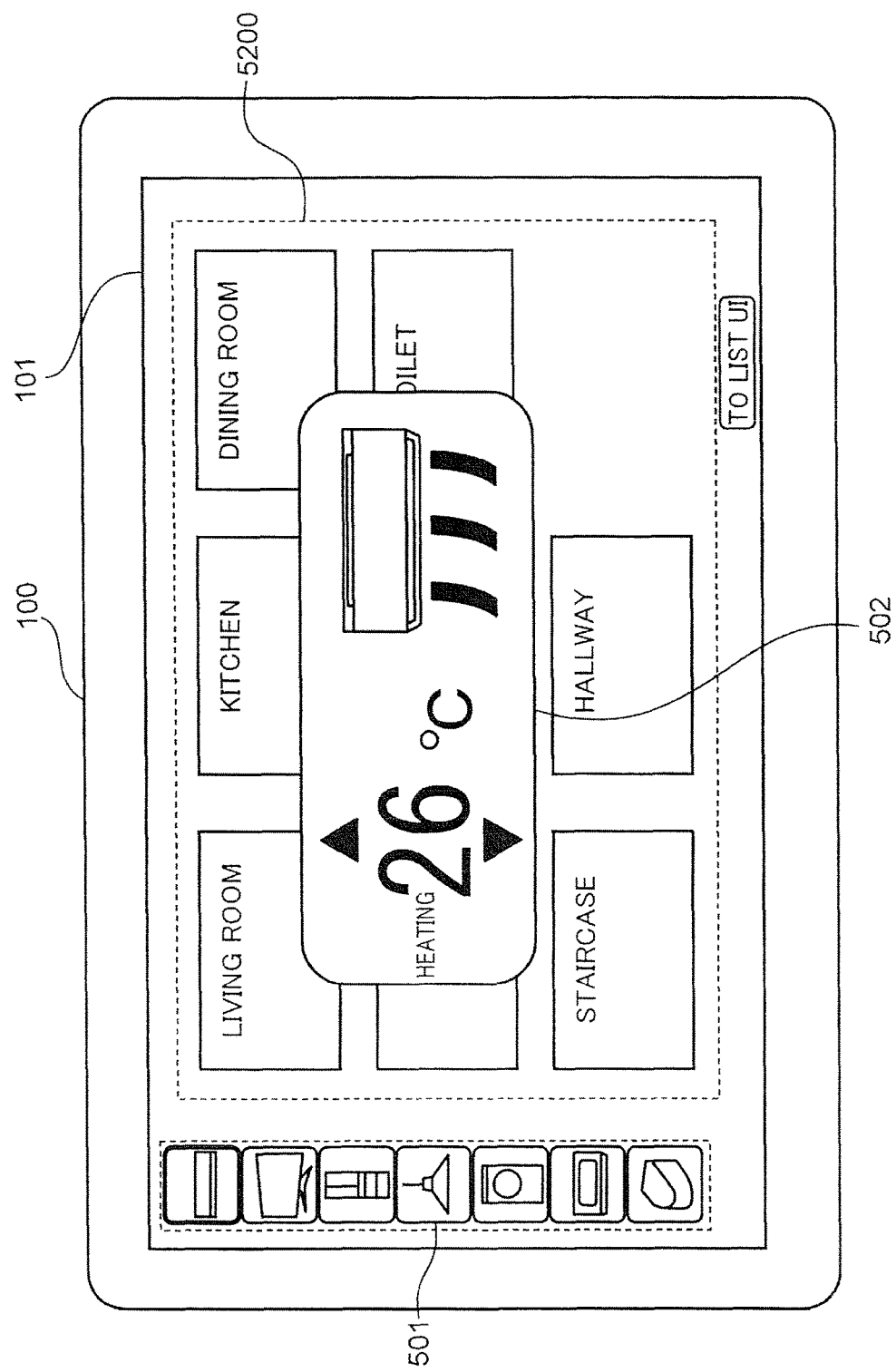
FIG. 54 is a diagram showing the display state of a device control screen for a case where the floor plan shown in FIG. 52 is adopted.

FIG. 54 is a diagram showing the display state of the device control screen 502 for a case where the floor plan 5200 shown in FIG. 52 is adopted. In the basic screen shown in FIG. 53, when the touch panel control section 102 senses that the user selects the device icon 501, the display control section 103 causes the display 101 to display the device control screen 502 corresponding to the selected device icon 501. In FIG. 54, the device icon 501 for the air conditioner is selected, and therefore the device control screen 502 for the air conditioner is displayed as overlapped on the floor plan 5200.

In displaying the device control screen 502, the display control section 103 disposes the device icons 501 displayed on the floor plan 5200 outside the display region of the device control screen 502. In the example of FIG. 54, all the device icons 501 are disposed in one vertical line on the left side of the floor plan 5200.

In disposing the device icons 501 in one vertical line on the left side of the floor plan 5200, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 54, the device icons 501 are disposed on the left side of the floor plan 5200. However, the device icons 501 may be disposed in one vertical line on the right side of the floor plan 5200, or may be disposed in one horizontal line on the upper or lower side of the floor plan 5200.

In the case where all the device icons 501 cannot be displayed on the left side of the floor plan 5200, the display control section 103 may scroll the device icons 501 upward or downward in accordance with a swipe operation performed upward or downward on the device icons 501 disposed in one line on the left side to cause the device icons 501, which have been hidden, to be displayed within the display 101.

In disposing the device icons 501 in one vertical line on the left side of the floor plan 5200, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the top, middle, or bottom position) in the line of icons.

In displaying the device control screen 502, the display control section 103 may dispose all the device icons 501 on the outer periphery of an ellipse as shown in FIG. 12.

Next, transition between the display state of the basic screen and the display state of the device control screen 502 will be described using FIG. 55.

Figure 55:
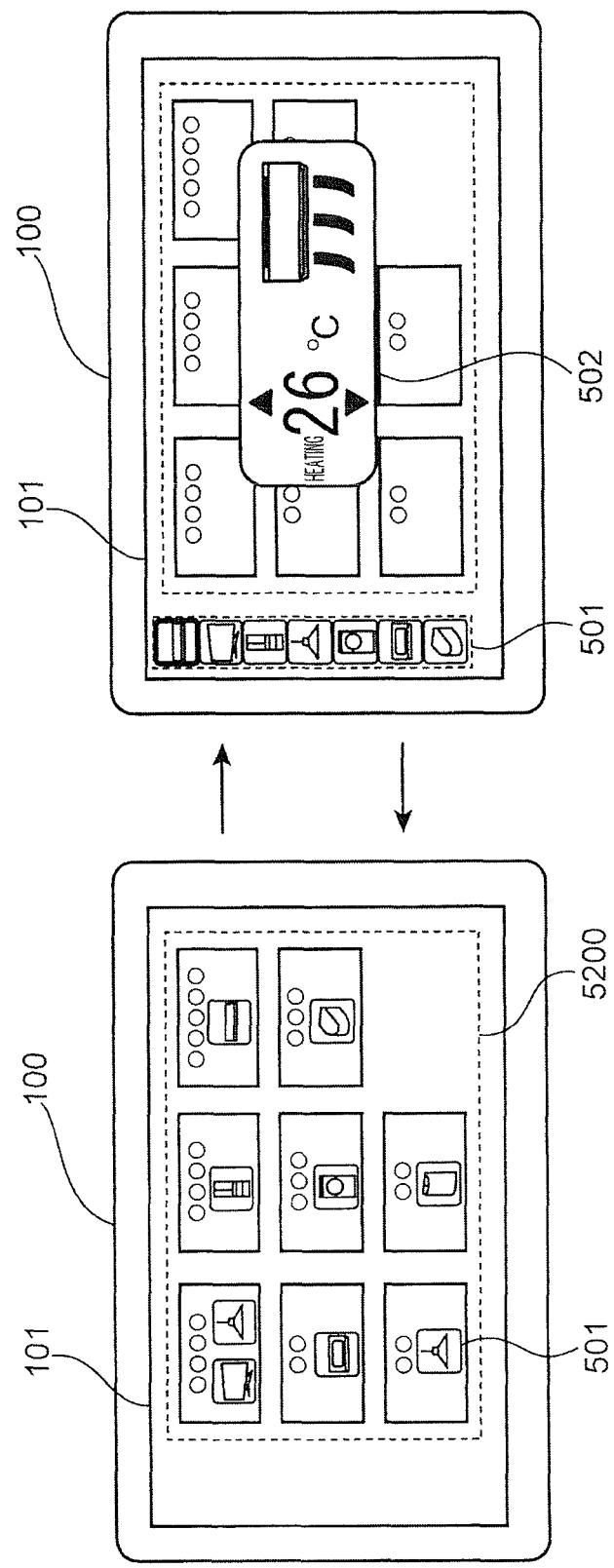
FIG. 55 is a diagram illustrating transition between the display state of the basic screen and the display state of the device control screen.

In the basic screen shown in the left diagram of FIG. 55, the user selects the device icon 501 for the device 200 (here, the air conditioner) that is desired to be controlled, and the touch panel control section 102 senses the selection. Then, as shown in the right diagram of FIG. 55, the display control section 103 displays the device control screen 502 corresponding to the selected device icon 501 as overlapped on the floor plan 5200. This results in transition from the display state of the basic screen to the display state of the device control screen 502.

On the other hand, as shown in the right diagram of FIG. 55, in the display state of the device control screen 502, the user selects the device icon 501 for the air conditioner corresponding to the device control screen 502 or a location outside the display region of the device control screen 502 (for example, the display region of the floor plan 5200 outside the display region of the device control screen 502), and the touch panel control section 102 senses the selection. Then, as shown in the left diagram of FIG. 55, the display control section 103 erases the device control screen 502, and returns from the display state of the device control screen 502 to the display state of the basic screen.

Figure 56:
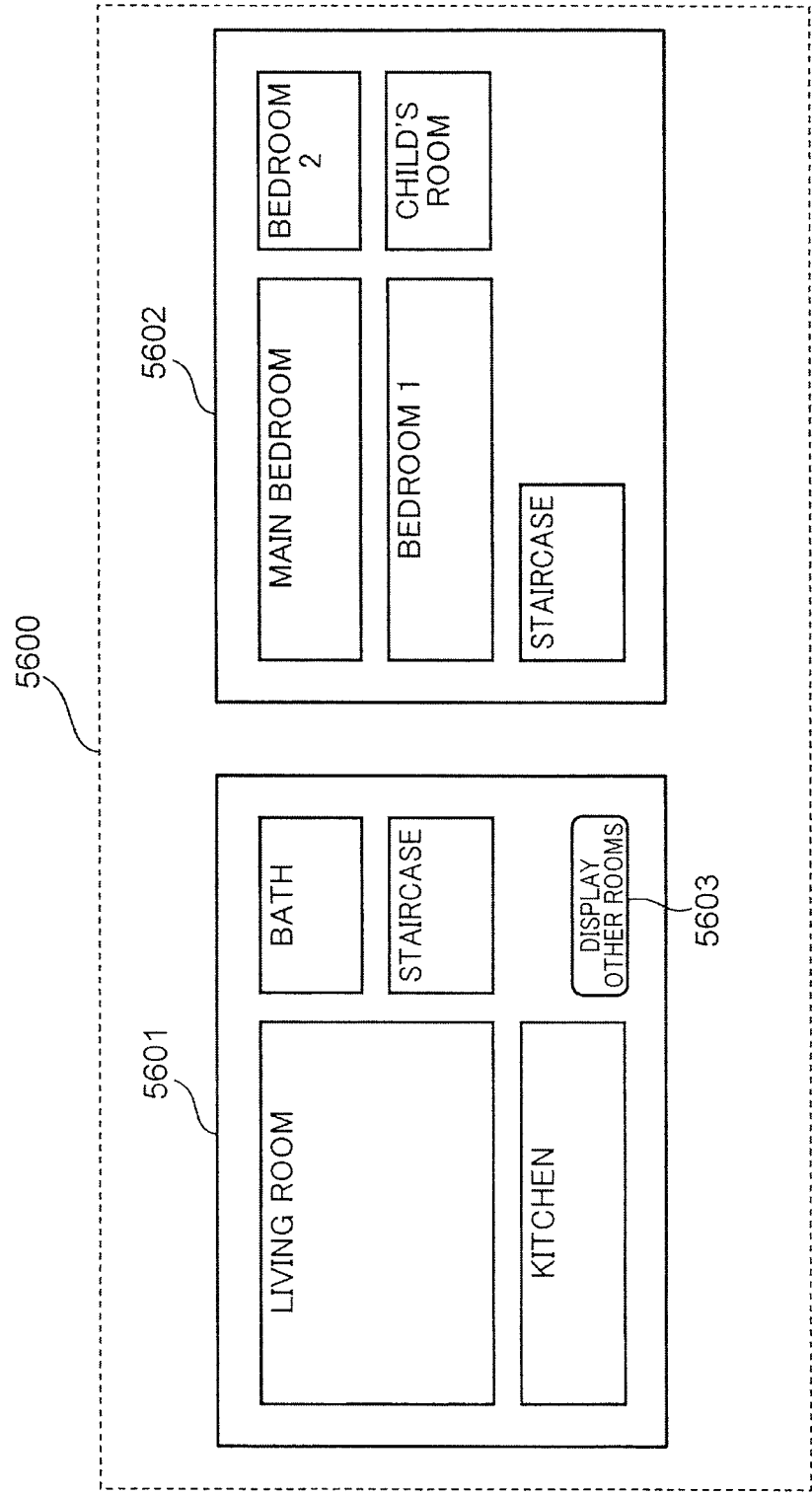
FIG. 56 is a diagram showing the configuration of a floor plan in which the size of each room is varied in accordance with the actual room size in the floor plan shown in FIG. 52.

FIG. 56 is a diagram showing the configuration of a floor plan 5600 for a case where the size of each block is varied in accordance with the actual room size in the floor plan 5200 shown in FIG. 52.

In the left diagram of FIG. 56, a floor plan 5601 for the first floor is shown. In the right diagram of FIG. 56, a floor plan 5602 for the second floor is shown.

In the floor plan 5601 for the first floor, the living room is the largest in terms of the room size, and is followed by the kitchen, the bath, and the staircase. Therefore, the sizes of the rooms are displayed in this order. Also in the floor plan 5602 for the second floor, the rooms are represented in accordance with the actual room size. In this case, information that indicates the actual room size may be registered in advance in room information 6800 to be discussed later, and the display control section 103 may decide the size of each room in accordance with the information.

Figure 57:
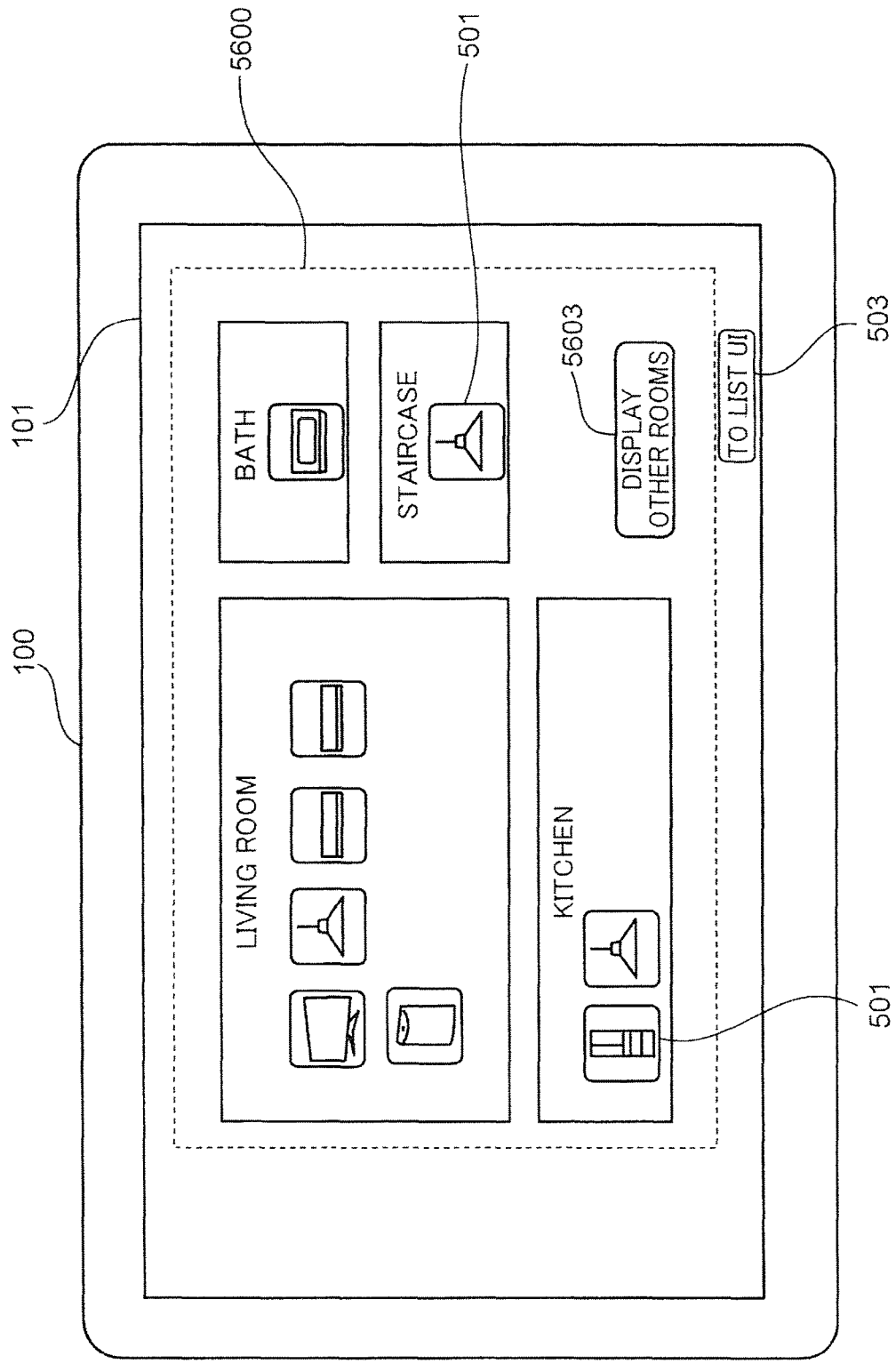
FIG. 57 is a diagram showing the configuration of a basic screen that adopts the floor plan shown in FIG. 56.

FIG. 57 is a diagram showing the configuration of a basic screen that adopts the floor plan 5600 shown in FIG. 56. In the floor plan 5600, each room is displayed with a size matching the actual size. In addition, the device icons 501 for the devices 200 actually disposed are displayed in each room.

In the case where the mode in which each room is represented with a size matching the actual room size on the floor plan 5600 is adopted, displaying all the rooms within the display 101 may result in small display of the rooms to make a user operation difficult. Thus, a room display button 5603 with a text "DISPLAY OTHER ROOMS" is provided in FIG. 57.

When the user selects the room display button and the touch panel control section 102 senses the selection, the display control section 103 switches the screen display to the floor plan 5600 which displays the remaining rooms.

In the example of FIG. 57, the floor plan 5600 is partitioned into the floor plan 5601 for the first floor and the floor plan 5602 for the second floor. Therefore, when the room display button 5603 is selected, the display control section 103 switches display on the display 101 to the floor plan 5602 for the second floor. In this case, the room display button 5603 is also provided on the floor plan 5602 for the second floor. Therefore, when the room display button 5603 is selected, the display control section 103 switches display on the display 101 to the floor plan 5601 for the first floor.

Although the floor plan is provided for each floor in the example of FIG. 57, the present disclosure is not limited thereto. For example, in the case where the floor plan 5601 for the first floor cannot be displayed on the display 101 at the same time, the display control section 103 may divide the floor plan 5601 for the first floor, and display a divided portion of the floor plan 5601 on the display 101. In this case, when the room display button 5603 is selected, a hidden portion of the floor plan 5601 for the first floor may be displayed.

In the case where the floor plan 5601 for the first floor and the floor plan 5602 for the second floor can be displayed on the display 101 at the same time, the display control section 103 may display the floor plan 5601 for the first floor and the floor plan 5602 for the second floor on the display 101 at the same time. In this case, the room display button 5603 is omitted from the floor plan 5600.

In the case where the staircase is tapped on the floor plan 5600, the display control section 103 may switch between the floor plan 5601 for the first floor and the floor plan 5602 for the second floor.

Figure 58:
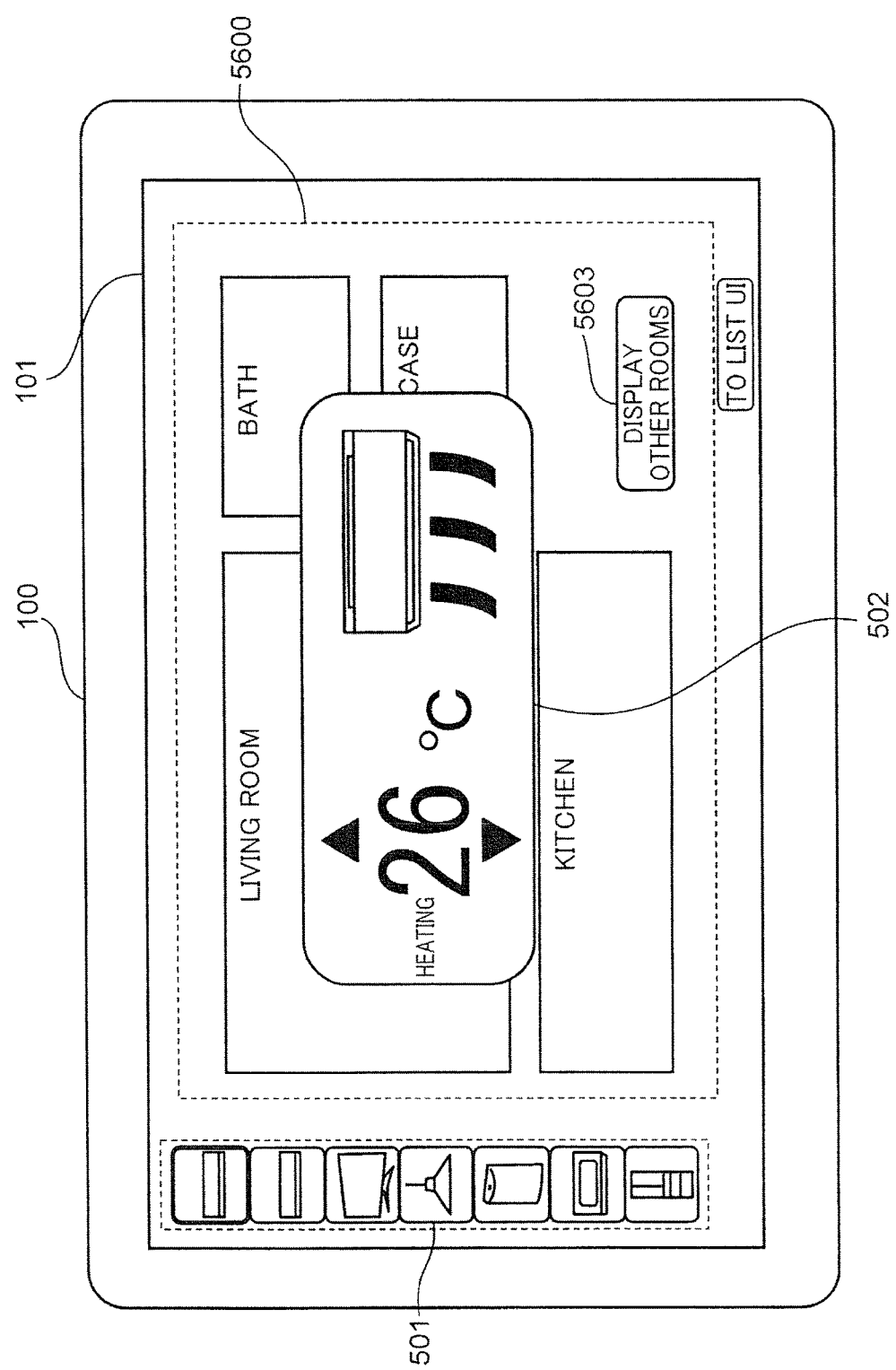
FIG. 58 is a diagram showing the display state of a device control screen for a case where the floor plan shown in FIG. 56 is adopted as the floor plan.

FIG. 58 is a diagram showing the display state of the device control screen 502 for a case where the floor plan 5600 shown in FIG. 56 is adopted as the floor plan. In FIG. 58, as in FIG. 54, the device control screen 502 for the air conditioner is displayed. FIG. 58 is otherwise the same as FIG. 54, and therefore is not described.

Figure 59:
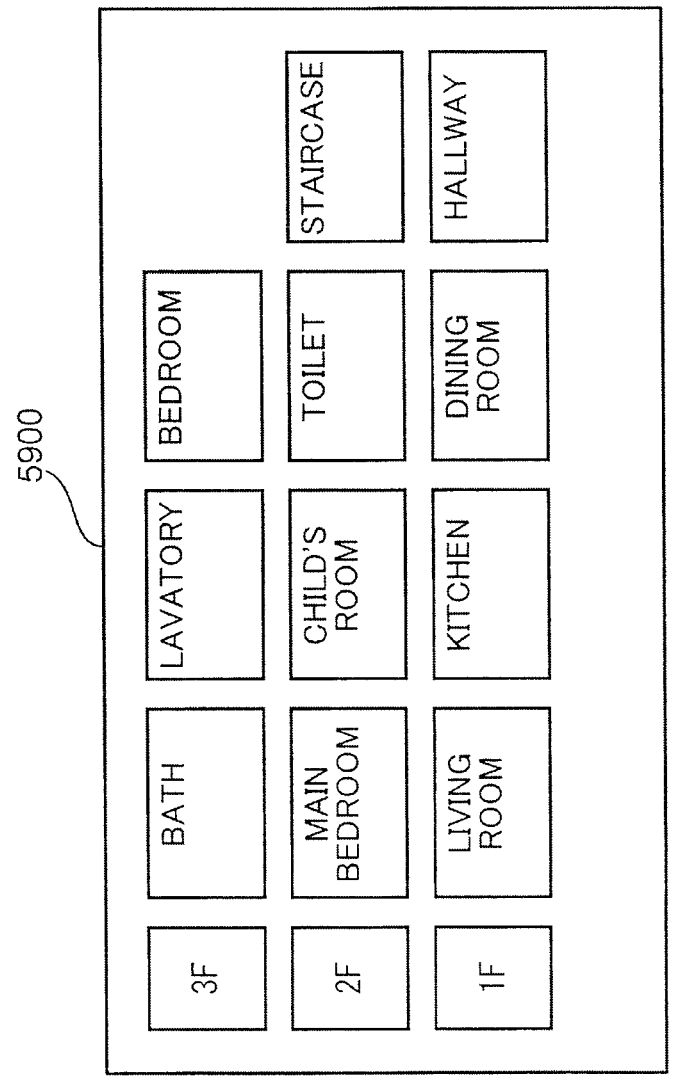
FIG. 59 is a diagram showing a floor plan in still another pattern according to the present disclosure.

FIG. 59 is a diagram showing a floor plan 5900 in still another pattern according to the present disclosure. The floor plan 5900 of FIG. 59 is the same as the floor plan 5200 in that rooms are represented by blocks of the same size, but is different from the floor plan 5200 in arrangement of the rooms. Specifically, in the floor plan 5900, the floor numbers are displayed in the vertical direction, and the rooms forming the same floor are arranged in one horizontal line. In the example of FIG. 59, the house has three floors, namely the first floor to the third floor, and therefore the rooms forming the third floor are disposed in the first line, the rooms forming the second floor are disposed in the second line, and the rooms forming the first floor are disposed in the third line. The floor number such as 1F, 2F, and 3F is indicated at the left end of each line. It is seen at a glance from the floor plan 5900 on which floor each room is disposed.

Also in the floor plan 5900, the size of each room may be varied in accordance with the actual room size. In the floor plan 5900, in addition, in the case where all the rooms cannot be displayed within the display region of the display 101, the floor plan 5900 may be scrolled in the horizontal direction so that a desired room can be displayed on the display 101.

For example, in the case where there are further rooms on the second floor, when the touch panel control section 102 senses that the user performs a swipe operation from the left to the right, the display control section 103 may scroll the rooms forming the second floor, or the rooms forming the first floor to the third floor, from the left to the right in accordance with the amount of the swipe operation.

Figure 60:
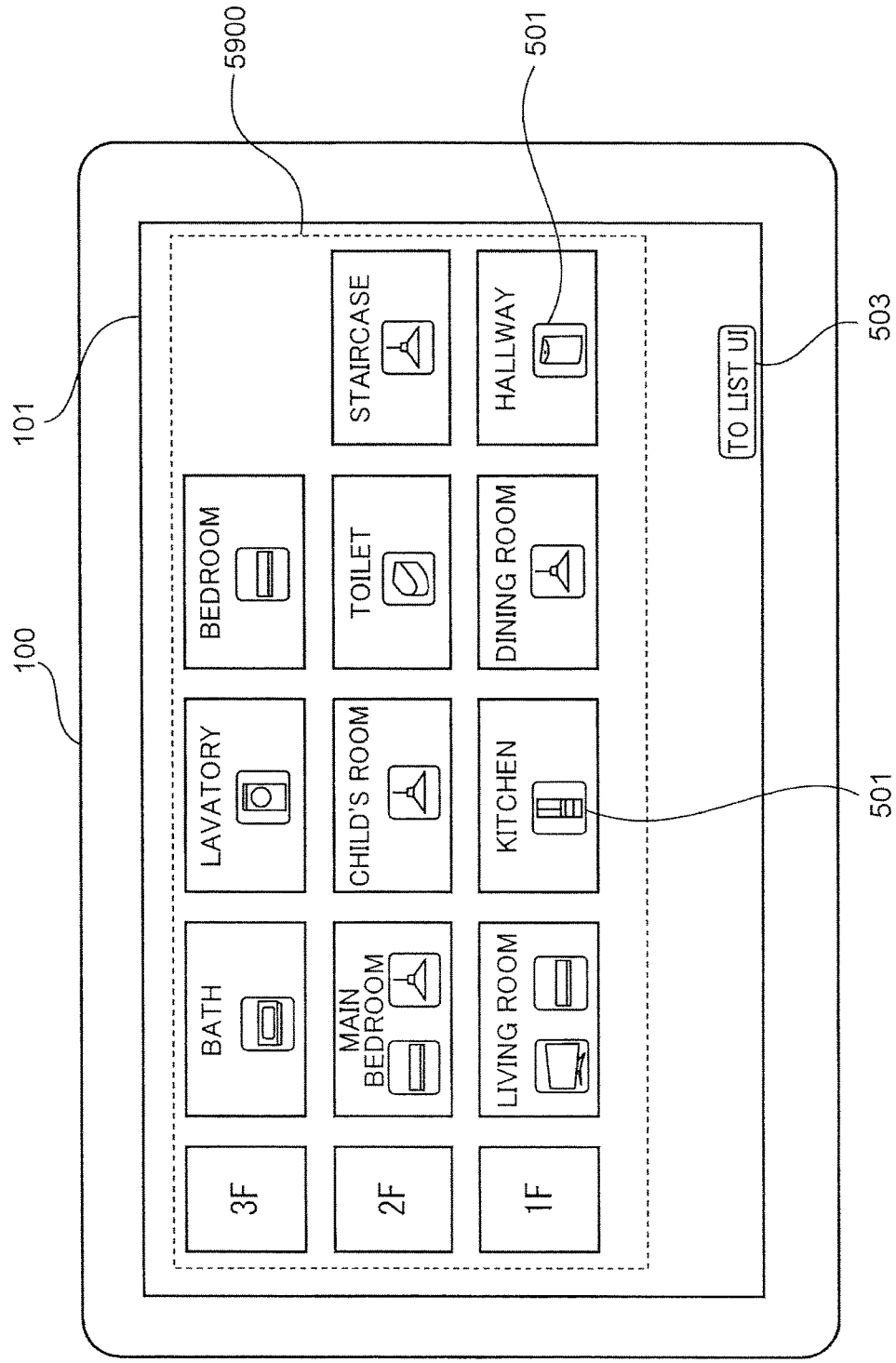
FIG. 60 is a diagram showing the configuration of a basic screen that adopts the floor plan shown in FIG. 59.

FIG. 60 is a diagram showing the configuration of a basic screen that adopts the floor plan 5900 shown in FIG. 59. The floor plan 5900 is displayed on the basic screen. In addition, the device icons 501 for the devices 200 actually disposed are displayed within each room. The device list display change button 503 is a button for switching the screen display from the basic screen to the device list display screen discussed earlier (see FIG. 24).

Figure 61:
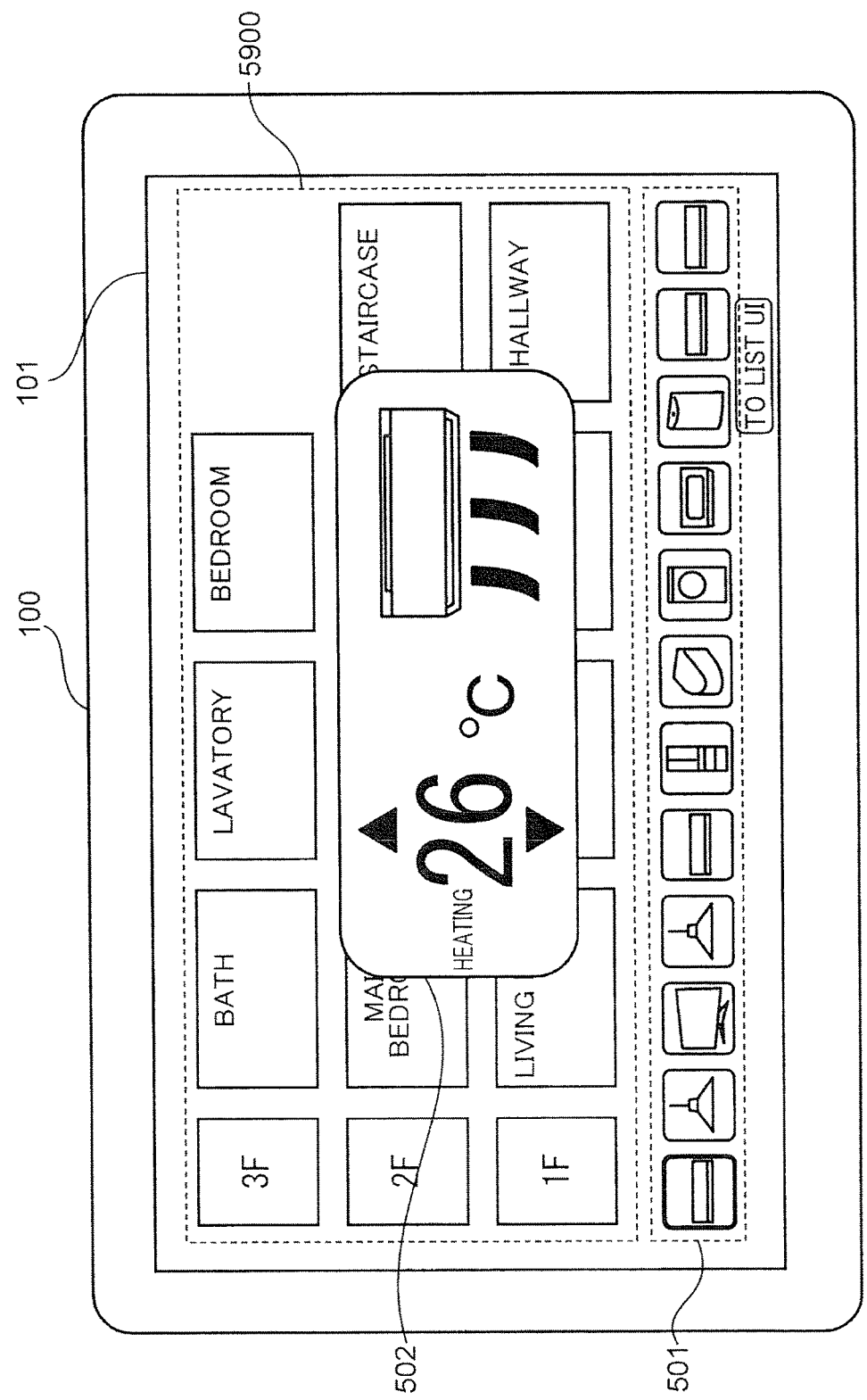
FIG. 61 is a diagram showing the display state of a device control screen for a case where the floor plan shown in FIG. 59 is adopted.

FIG. 61 is a diagram showing the display state of the device control screen 502 for a case where the floor plan 5900 shown in FIG. 59 is adopted. In the basic screen shown in FIG. 60, when the touch panel control section 102 senses that the user selects the device icon 501, the display control section 103 causes the display 101 to display the device control screen 502 corresponding to the selected device icon 501. In FIG. 61, the device icon 501 for the air conditioner is selected, and therefore the device control screen 502 for the air conditioner is displayed as overlapped on the floor plan 5900. In displaying the device control screen 502, the display control section 103 disposes the device icons 501 displayed on the floor plan 5900 outside the display region of the device control screen 502. In the example of FIG. 61, all the device icons 501 are disposed in one horizontal line on the lower side of the floor plan 5900.

In disposing the device icons 501 in one vertical line on the lower side of the floor plan 5900, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 61, the device icons 501 are disposed on the lower side of the floor plan 5900. However, the device icons 501 may be disposed in one horizontal line on the upper side of the floor plan 5900, or may be disposed in one vertical line on the left or right side of the floor plan 5900.

In the case where all the device icons 501 cannot be disposed on the lower side of the floor plan 500, the display control section 103 may scroll the device icons 501 leftward or rightward in accordance with a swipe operation performed leftward or rightward on the device icons 501 disposed in one horizontal line on the lower side to cause the device icons 501, which have been hidden, to be displayed within the display 101.

In disposing the device icons 501 in one horizontal line on the lower side of the floor plan 5900, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the leftmost, middle, or rightmost position) in the line of icons.

In displaying the device control screen 502, the display control section 103 may dispose all the device icons 501 on the outer periphery of an ellipse as shown in FIG. 12.

In the floor plan 5900, the rooms on all the floors are displayed on the display 101 at the same time, which may result in small display of the rooms to make a user operation difficult. Thus, the display control section 103 may display the floor plan 5900 as enlarged in accordance with the user operation. Specifically, when the user performs an operation of pinching out on a certain room in the floor plan 5900 and the touch panel control section 102 senses the operation, the display control section 103 may display the room on the display 101 as enlarged at an enlargement scale matching the amount of the pinch out.

Figure 62:
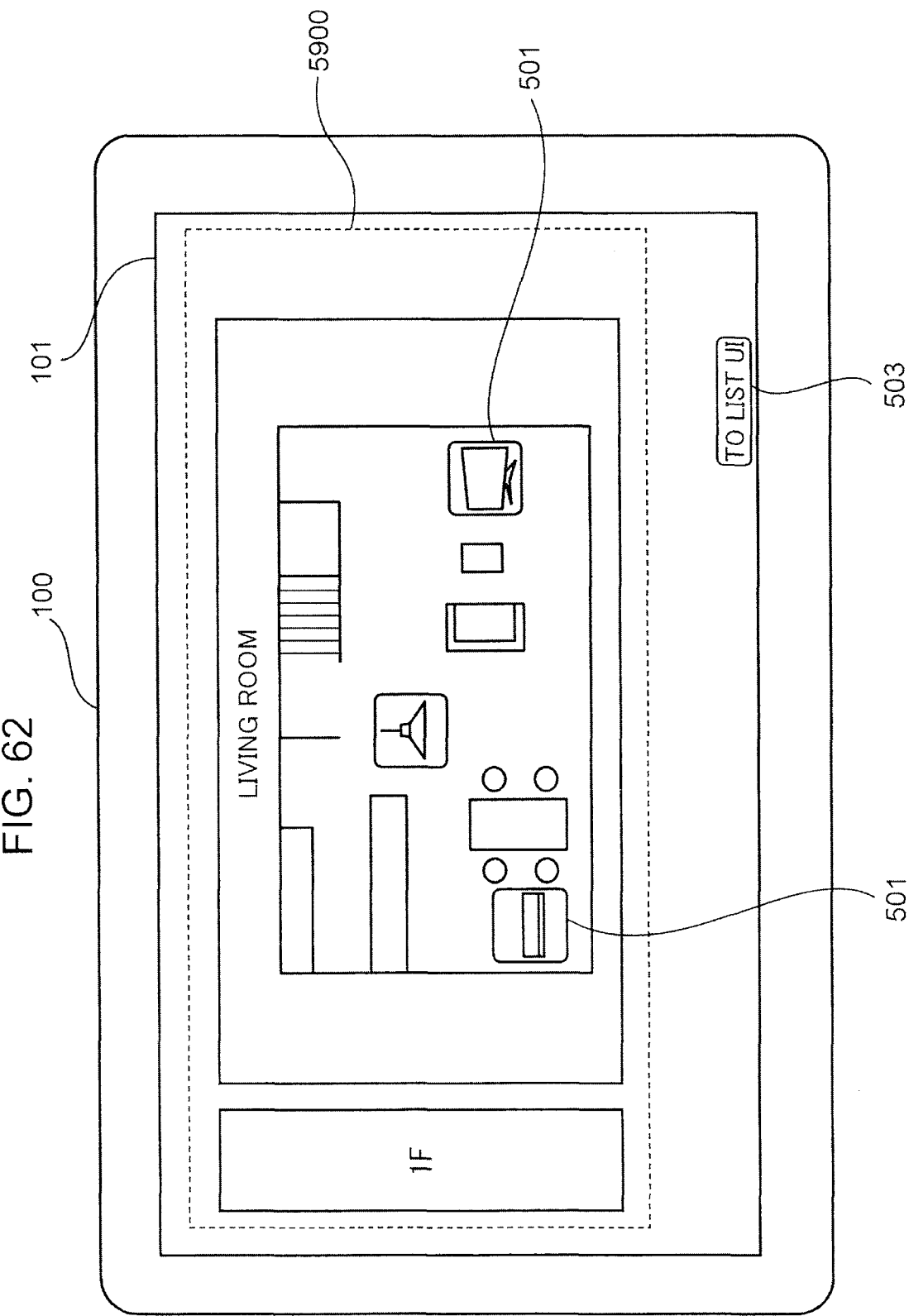
FIG. 62 is a diagram showing a floor plan displayed on a display in the case where a user performs a pinch-out operation on a room in the floor plan shown in FIG. 59.

FIG. 62 is a diagram showing a floor plan that displays a certain room in the floor plan 5900 as enlarged. As shown in FIG. 62, the display control section 103 may display a plan view that planarly represents the shape of the relevant room as overlapped on the floor plan 5900. Alternatively, the display control section 103 may switch to displaying the plan view. This allows the user to grasp the configuration of the rooms in the house and the devices 200 disposed in each room on the floor plan 5900 shown in FIG. 60, and to grasp the actual arrangement position of the devices 200 in the enlarged room on the floor plan 5900 shown in FIG. 62.

In the floor plan 5900 not displayed as enlarged shown in FIG. 60, it is not necessary for the display control section 103 to display the device icons 501 for all the devices 200 disposed within the rooms, and the display control section 103 may display only some of the device icons 501.

In this case, the display control section 103 may display one or a plurality of (for example, two) device icons 501 frequently used by the user on the floor plan 5900. Alternatively, the display control section 103 may not display the device icons 501 on the floor plan 5900 not displayed as enlarged. This prevents the viewability of the floor plan 5900 from being lowered because of an increased number of the device icons 501 displayed on the floor plan 5900 not displayed as enlarged.

Figure 63:
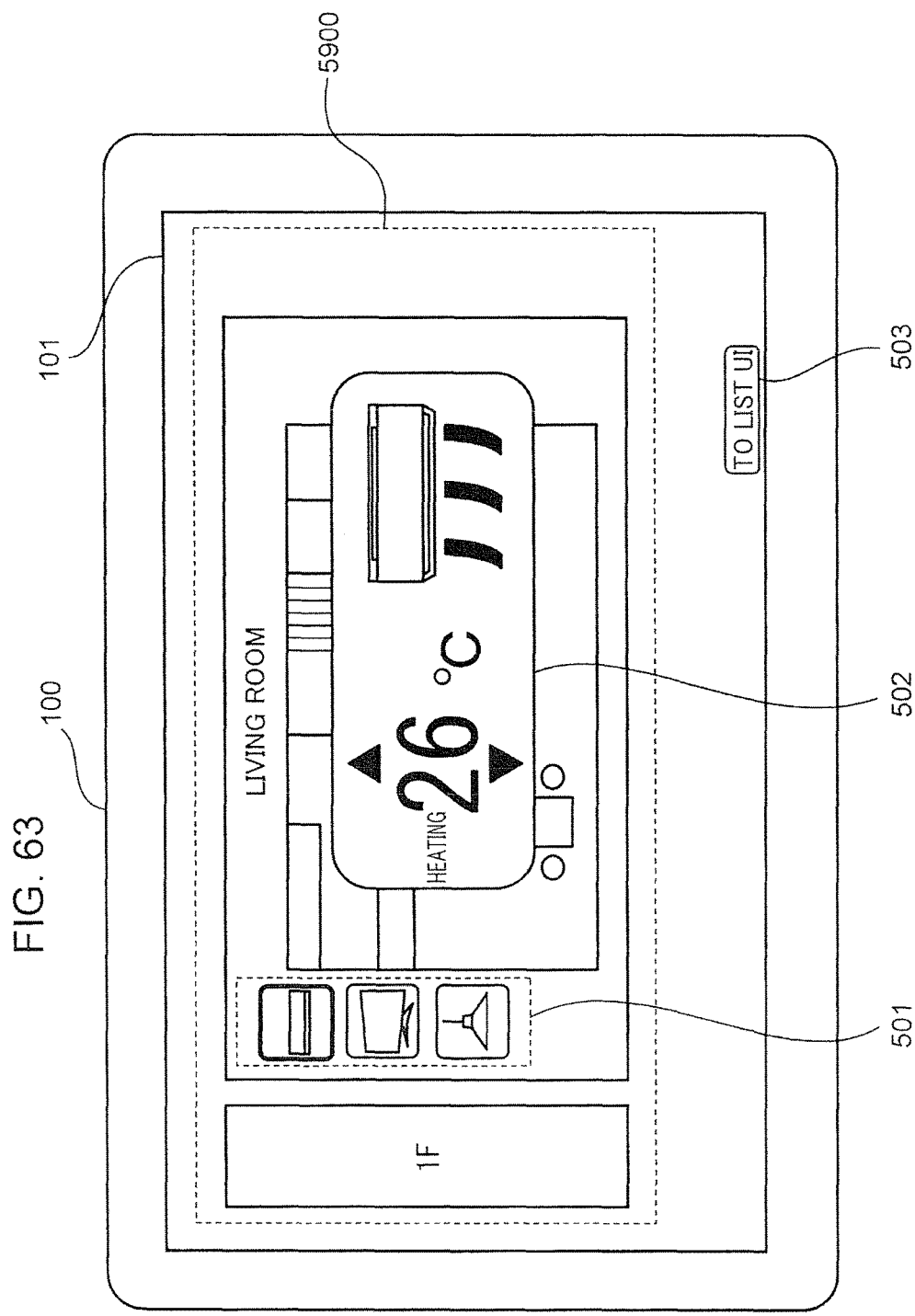
FIG. 63 is a diagram showing the display state of a device control screen in the floor plan displayed as enlarged shown in FIG. 62.

FIG. 63 is a diagram showing the display state of the device control screen 502 in the floor plan 5900 displayed as enlarged shown in FIG. 62. In FIG. 63, as in FIG. 54, the device control screen 502 for the air conditioner is displayed. In FIG. 63, only the device icons 501 disposed in the room (living room) displayed as enlarged are displayed on the left side of the plan view and in the block of the living room. In the example of FIG. 62, the device icons 501 for the air conditioner, the illumination device, and the television set are displayed in the living room within the plan view, and the device icon 501 for the air conditioner is selected by the user. Therefore, the device icons 501 are displayed in one vertical line on the left side of the plan view.

In the case where a certain room is displayed as enlarged, it is highly likely that the user operates the device 200 disposed within the room. In the case where a certain room is displayed as enlarged, in addition, the device icons 501 for devices in the other rooms are not displayed on the display 101. Therefore, if the device icons 501 for devices disposed in the other rooms are displayed on the left side of the plan view when the user selects a certain device icon 501, the user may be given a sense of wrongness.

Figure 64:
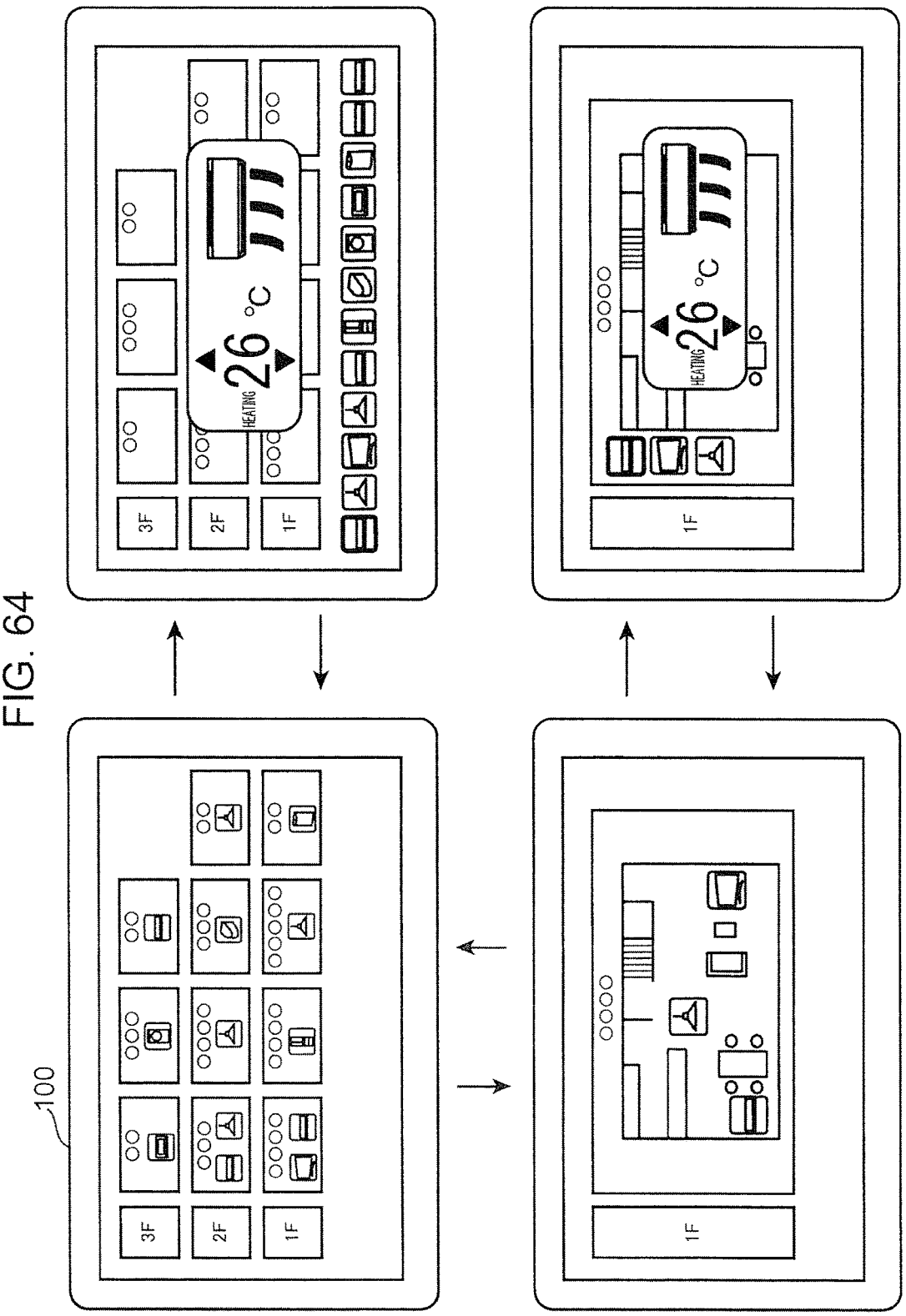
FIG. 64 is a diagram showing screen transition from the display state of the basic screen to the display state of the device control screen.

Thus, in the case where a certain room is displayed as enlarged, the display control section 103 causes only the device icons 501 for the devices 200 disposed in the room to be displayed in one vertical line on the left side of the plan view. In the example of FIG. 64, the device icons 501 are displayed on the left side of the plan view. However, the device icons 501 may be displayed in one vertical line on the right side of the plan view, or may be displayed in one horizontal line on the upper or lower side of the plan view.

FIG. 64 is a diagram showing screen transition from the display state of the basic screen to the display state of the device control screen 502. It is assumed that the user taps on the device icon 501 for the air conditioner, for example, in the basic screen which displays the floor plan 5900 not displayed as enlarged as shown in the upper left diagram of FIG. 64. Then, as shown in the upper right diagram of FIG. 64, the display control section 103 displays the device control screen 502 for the air conditioner as overlapped on the basic screen. In the screen shown in the upper right diagram of FIG. 64, on the other hand, when the user taps on a region on the floor plan 5900 other than the device control screen 502 or taps on the device icon 501 for the air conditioner, the display control section 103 returns the screen display to the basic screen shown in the upper left diagram of FIG. 64.

It is assumed that the user pinches out on the living room in the basic screen shown in the upper left diagram of FIG. 64. Then, as shown in the lower left diagram of FIG. 64, the display control section 103 enlarges the block of the living room, and at the same time displays the plan view of the living room having a size matching the size of the enlarged block as overlapped on the enlarged block. It is assumed that the user pinches in on the living room in the lower left diagram of FIG. 64. Then, the display control section 103 returns the screen display to the basic screen shown in the upper left diagram of FIG. 64.

When the device icon 501 for the air conditioner, for example, is selected in the basic screen shown in the lower left diagram of FIG. 64, the display control section 103 displays the device control screen 502 for the air conditioner as overlapped on the plan view as shown in the lower right diagram of FIG. 64. In the lower right diagram of FIG. 64, when the user taps on a region on the floor plan 5900 other than the device control screen 502 or on the device icon 501 for the air conditioner, the display control section 103 returns the screen display to the screen shown in the lower left diagram of FIG. 64.

Figure 65:
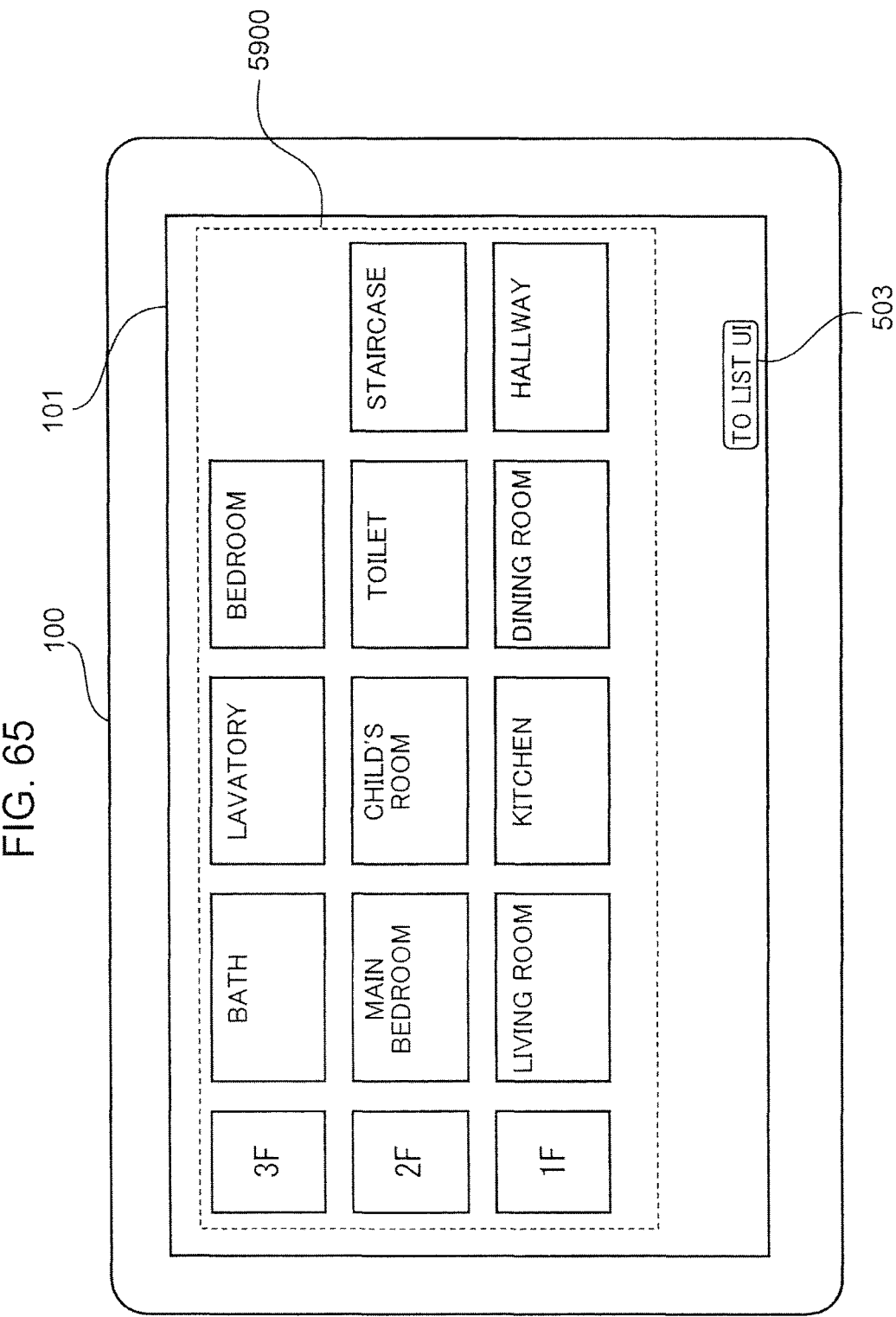
FIG. 65 is a diagram showing the configuration of a basic screen which adopts the floor plan shown in FIG. 59 and in which device icons are not displayed.

FIG. 65 is a diagram showing the configuration of a basic screen 5900 which adopts the floor plan shown in FIG. 59 and in which device icons 501 are not displayed. In the mode shown in FIG. 65, only rooms forming each floor are displayed, and the device icons 501 are not displayed.

Figure 66:
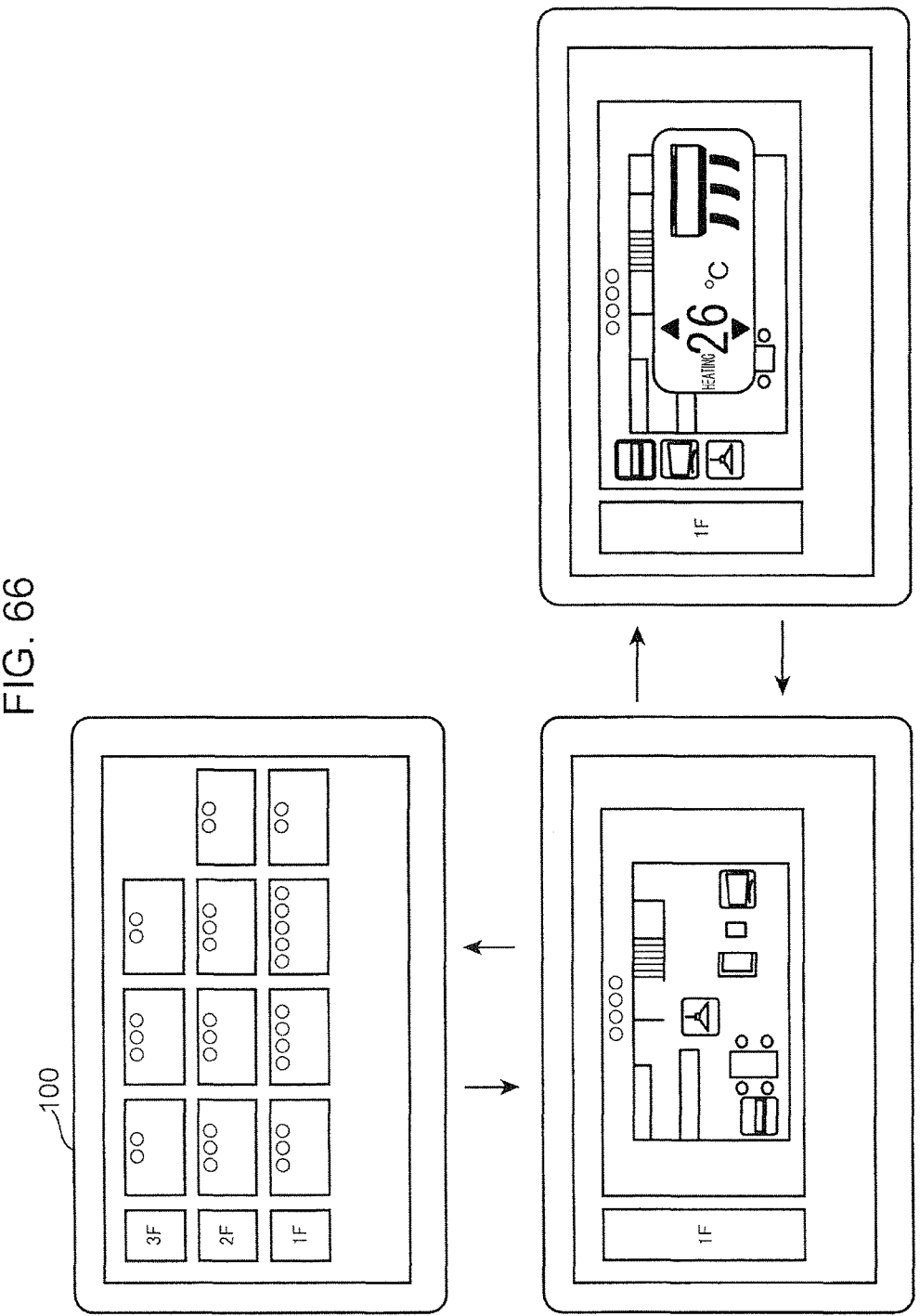
FIG. 66 is a diagram showing screen transition from the display state of the basic screen to the display state of the device control screen for a case where the basic screen in which device icons are not displayed is adopted.

FIG. 66 is a diagram showing screen transition from the display state of the basic screen to the display state of the device control screen 502 for a case where the basic screen in which device icons 501 are not displayed is adopted. It is assumed that the user pinches out on the living room, for example, in the basic screen shown in the upper left diagram of FIG. 66. Then, as shown in the lower left diagram of FIG. 66, the display control section 103 displays the block of the living room as enlarged, and displays the plan view of the living room as overlapped on the block displayed as enlarged. It is assumed that the user taps on the device icon 501 for the air conditioner, for example, in the screen shown in the lower left diagram of FIG. 66. Then, as shown in the lower right diagram of FIG. 66, the display control section 103 displays the device control screen 502 for the air conditioner as overlapped on the plan view of the living room, and disposes the device icons 501 for the living room in one vertical line on the left side of the plan view of the living room. In the lower right diagram of FIG. 66, when the user taps on a region on the floor plan 5900 and outside the display region of the device control screen 502, the display control section 103 returns the display screen to the screen shown in the lower left diagram of FIG. 66.

Figure 67:
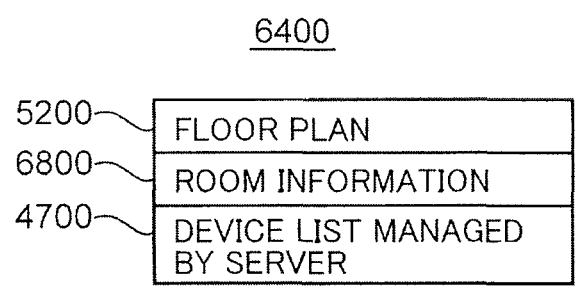
FIG. 67 is a diagram showing the configuration of the home information for a case where the floor plan shown in FIG. 52 is adopted.

FIG. 67 is a diagram showing the configuration of the home information 2700 for a case where the floor plan 5200 shown in FIG. 52 is adopted. As shown in FIG. 67, the home information 6400 includes the floor plan 5200, the room information 6800, and the device list 4700 managed by the server. In the floor plan 5200, the display positions of the rooms are determined in advance. Therefore, the vertex information 2800 included in the home information 2700 is omitted from the home information 6400.

The floor plan 5200 is image data obtained by representing the floor plan 5200 shown in FIG. 52 in a bitmap format, for example. Alternatively, the floor plan 5200 may be information that prescribes the color, the shape, the size, and so forth for displaying the floor plan 5200. The room information 6800 is information for deciding the regions of rooms from the floor plan 5200.

FIG. 68 is a diagram showing the configuration of room information 6800 shown in FIG. 67. As shown in FIG. 68, the room information 6800 includes a room ID 6801, a room type 6802, a floor level 6803, and a display position 6804. The room ID 6801 is an identifier that identifies a room on the floor plan 5200. The room type 6802 indicates the type of the room. The floor level 6803 indicates the floor level (floor) on which the room is disposed. The display position 6804 indicates the arrangement position of the room on the floor plan 5200.

Figure 69:
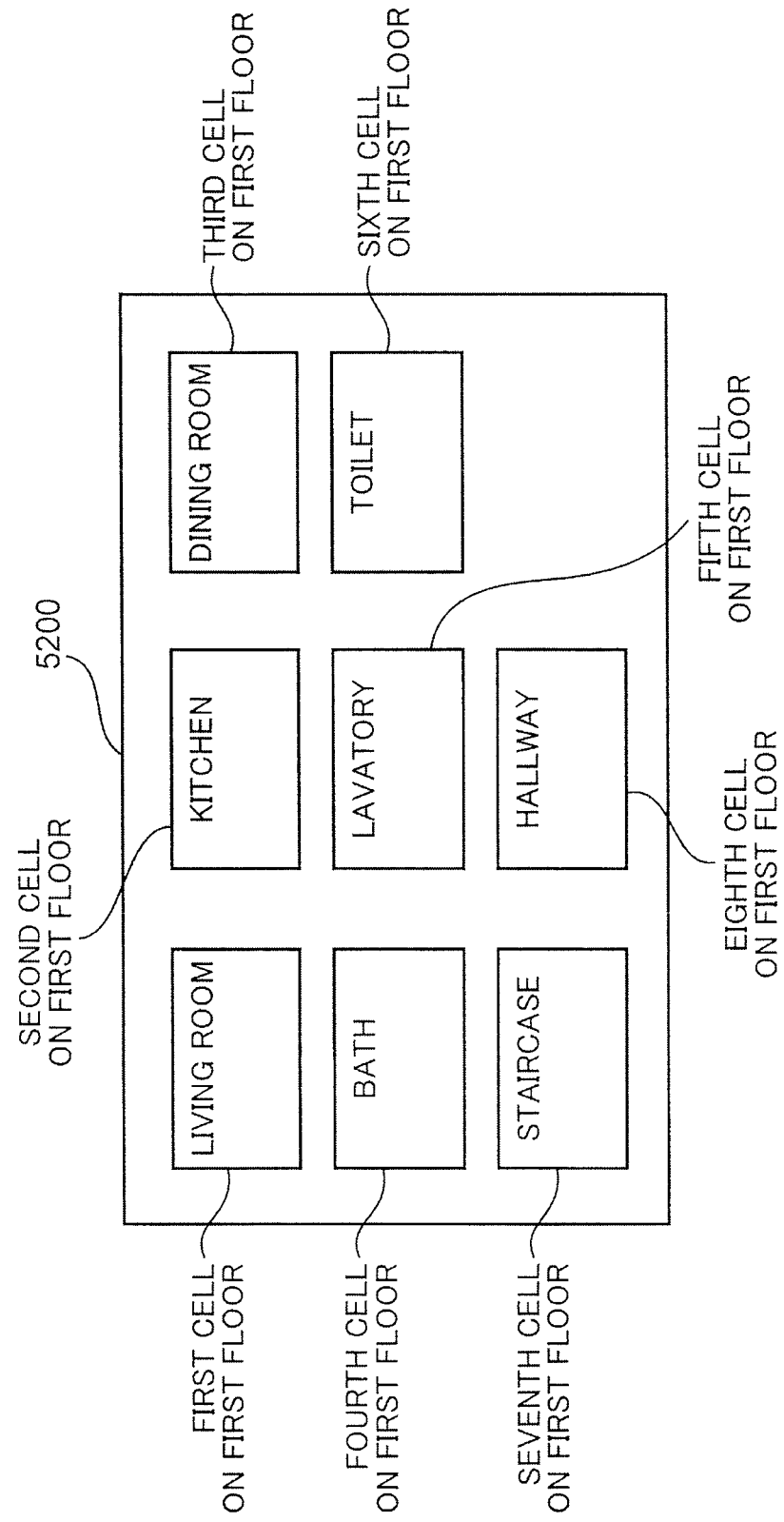
FIG. 69 is a diagram showing an example of the correspondence between the display position in the room information shown in FIG. 67 and the floor plan.

FIG. 69 is a diagram showing an example of the correspondence between the display position 6804 in the room information 6800 and the floor plan 5200. As shown in FIG. 69, the order of the blocks on the floor plan 5200 is prescribed such that the block in the first row and the first column corresponds to the first cell, the block in the first row and the second column corresponds to the second cell, the block in the first row and the third column corresponds to the third cell, the block in the second row and the first column corresponds to the fourth cell, and so forth.

For example, the room with a room ID 6801 of A has a display position 6804 of "FIRST CELL ON FIRST FLOOR". Therefore, as shown in FIG. 69, the display control section 103 interprets the block in the first cell (in the first row and the first column) on the floor plan 5201 for the first floor as the living room.

In the example of FIG. 69, the blocks are disposed in three horizontal lines, and therefore the cell in the second row and the first column corresponds to the fourth cell, and the cell in the third row and the first column corresponds to the seventh cell. It should be noted, however, that this is merely exemplary. For example, in the case where the cells are arranged in four columns in the horizontal direction, the correlation between the order of the cells and the arrangement positions of the blocks is changed as appropriate in accordance with the number of blocks in the horizontal direction, and the cell in the second row and the first column corresponds to the fifth cell, and the cell in the third row and the first column corresponds to the ninth cell.

FIG. 70 is a diagram showing the configuration of a device list 4700 managed by the server 300 for a case where the floor plan 5200 shown in FIG. 52 is adopted. It is not necessary for the floor plan 5200 to indicate the arrangement position of the device 200 in the room. Therefore, in the device list 4700 shown in FIG. 70, unlike FIG. 34, the room type 6802 is registered in the arrangement 4704. The device list 4700 shown in FIG. 70 is otherwise the same as the device list 4700 shown in FIG. 34. For example, the air conditioner with a device ID 4701 of A is disposed in the living room, and therefore "LIVING ROOM" is registered in the arrangement 4704. In the example of FIG. 70, the room type 6802 is adopted as the arrangement 4704. However, any other information that specifies a room may be registered. For example, the room ID 6801 may be adopted as the arrangement 4704.

FIG. 71 is a diagram showing the configuration of a device list 3100 managed by the home controller 100 for a case where the floor plan 5200 shown in FIG. 52 is adopted. Also in the device list 3100 of FIG. 71, for the same reason as that for the device list 4700 of FIG. 70, the room type 6802 is registered in the arrangement 3104. The device list 3100 of FIG. 71 is otherwise the same as the device list 3100 shown in FIG. 35. Also in FIG. 71, the room ID 6801 may be adopted as the arrangement 3104.

Next, the device list 3100 for a case where the plan view of a certain room is displayed in the case where a pinch-out operation is performed on the room on the basic screen of the floor plan 5900 as shown in FIG. 62 will be described. In this case, the room information 6800 shown in FIG. 68 may include an item of the plan view of the room. Then, image data for the plan view of the relevant room may be registered in the item of the plan view of the room. For the plan view of the room, as shown in FIG. 33, the origin may be set at the left end of the room, for example, the X axis and the Y axis may be set in the horizontal direction and the vertical direction, respectively, and the position of the room may be represented by the X and Y coordinates.

Meanwhile, not only the room type 6802 but also the coordinate in the room is registered in the arrangement 3104 of the device list 3100 shown in FIG. 71. This allows the display control section 103 to discriminate from the content of the arrangement 3104 at what position on the plan view representing the room the device icon 501 is to be disposed.

In the present disclosure, the server 300 is not an essential constituent element, and various types of information managed by the server 300 (such as the home information 2700 and the state of the devices 200) may be managed by the home controller 100. This allows the present disclosure described above to be embodied without the server 300. In this case, it is not necessary for the home controller 100 to manage information on the entire house, and it is only necessary to manage information related to the devices 200 controlled by the home controller 100 and the house in which the devices 200 are disposed.

(Controlling the Air Conditioner)

The above has described the present disclosure in which the types of the target devices are not limited. The following describes in detail the present disclosure in which the target devices are air conditioners.

As shown in FIG. 2, the air conditioner 201 is an example of the device 200. In a control example of the air conditioner 201, the home controller 100 and the server 300 use room information 33100 shown in FIG. 101 in place of the room information 2900 shown in FIG. 32. The home controller also uses device lists 33200A, 33200B shown in FIG. 102 in place of the device list 3100 shown in FIG. 35.

The control execution section 211 of the air conditioner 201 receives a control command for the air conditioner 201 from the home controller 100 or the server 300, and controls the air conditioner 201 in accordance with the received control command. A command for setting the air flow amount, the air flow direction, the operating mode (cooling or heating), the set temperature, and the like of the air conditioner 201 is adopted as the control command. In addition, the control execution section 211 transmits the result of execution of the control command and the state of the air conditioner 201 to the home controller 100 or the server 300.

A state management section 212 manages the state of the air conditioner 201. The state management section 212 manages, for example, the on/off state, the set temperature, the air flow direction, the air flow amount, the operating mode (e.g., heating, cooling, ventilation, dehumidification), and the like of the air conditioner 201 as the states of the air conditioner 201. A storage section 214 stores information related to the state of the air conditioner 201 managed by the state management section 212. A communication control section 217 controls communication between the air conditioner 201 and the home controller 100 and communication between the device 200 and the server 300.

FIG. 72 is a diagram showing transition between a display state of the basic screen and a display state of an air conditioner control screen 30102 which is the device control screen 502 of the air conditioner 201. The left diagram of FIG. 72 shows the basic screen. The basic screen is the same as the one shown in FIG. 5. In the basic screen shown in the left diagram of FIG. 72, the user taps on an air conditioner icon 30101, which is the device icon 501 of the air conditioner 201, and the touch panel control section 102 senses the tap. Then, as shown in the right diagram of FIG. 72, the display control section 103 displays an air conditioner control screen 30102 as overlapped on the floor plan 500.

In addition, the display control section 103 displays an air flow direction mark 30105 representing the currently set horizontal air flow direction of the air conditioner 201 as overlapped on a control target region 30103. Here, the horizontal air direction indicates an air flow direction of the air conditioner 201 obtained when viewing the control target region 30103 from directly above.

In the example shown in the right diagram of FIG. 72, because the horizontal air flow direction of the air conditioner 201 is directed diagonally right downward, the shape of arrows directed diagonally right downward is displayed as the air flow direction mark 30105. This can allow the user to intuitively recognize the currently set horizontal air flow direction of the air conditioner 201.

Also, the display control section 103 displays the gray layer as overlapped on a region on the floor plan 500 other than the control target region 30103. As a result, the control target region 30103 can be emphasized over the other regions, so that the floor plan of the control target region 30103 strongly attracts attention of the user, enabling operation with presence.

In addition, the display control section 103 displays the air conditioner control screen 30102 as overlapped on a region on the floor plan 500 other than the control target region 30103. This prevents the air flow direction mark 30105 from being hidden by the air conditioner control screen 30102. Consequently, the user can avoid not being able to check the horizontal air flow direction of the air conditioner 201 or performing erroneous operation.

Moreover, when displaying the air conditioner control screen 30102, the display control section 103 retracts all the device icons 501 out of the display region of the device 101, which is the region of the floor plan 500, the device icons 501 being disposed on the floor plan 500 in the left diagram of FIG. 72. In the example shown in FIG. 72, the device icons 501 are displayed in one vertical line on the left side of the floor plan 500. This can prevent the device icons 501 from being hidden under the air conditioner control screen 30102, reducing the number of operations and process steps to be performed when selecting the next device icon 501.

Note, in the example in the right diagram of FIG. 72, that the selected air conditioner icon 30101 is displayed at the top and positioned where it can easily be seen by the user.

On the other hand, in the case where the user taps on a region on the floor plan 500 other than the air conditioner control screen 30102 in the right diagram of FIG. 72, and the touch panel control section 102 senses the tap, the display control section 103 switches the display screen shown in the right diagram of FIG. 72 to the basic screen shown in the left diagram of FIG. 72. Alternatively, in the case where the user taps on the air conditioner icon 30101 in the right diagram of FIG. 72, and the touch panel control section 102 senses the tap, the display control section 103 switches the display screen shown in the right diagram of FIG. 72 to the basic screen shown in the left diagram of FIG. 72.

Figure 73:
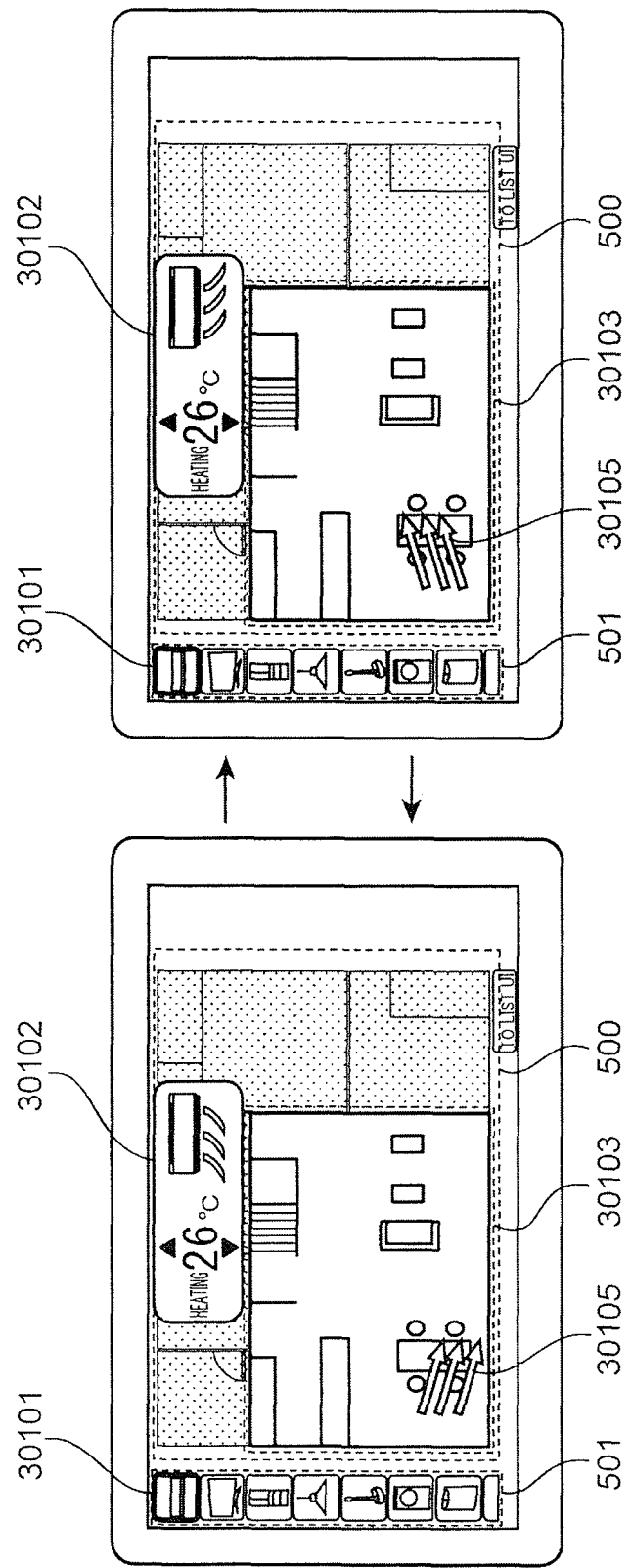
FIG. 73 is a diagram showing screen transition performed in the case where an operation of changing the horizontal air flow direction of the air conditioner is input, according to the present disclosure.

FIG. 73 is a diagram showing screen transition performed in the case where an operation of changing the horizontal air flow direction of the air conditioner 201 is input. The left diagram of FIG. 73 is the same as the right diagram of FIG. 72. It is assumed that the user inputs an operation of changing the horizontal air flow direction of the air conditioner 201 by operating the air conditioner control screen 30102 and that the touch panel control section 102 senses the operation. Then, the display control section 103 changes the direction of the air flow direction mark 30105 in response to the level of the operation. Next, the device control section 106 generates a control command for changing the horizontal air flow direction to a direction complying with the level of the operation, and transmits this control command to the network.

In the example shown in the right diagram of FIG. 73, the horizontal air flow direction of the air conditioner 201 in the control target region 30103 has been changed from the diagonally right downward direction to the diagonally right upward direction. Thus, the display control section 103 changes the direction of the air flow direction mark 30105 to the diagonally right upward direction.

When, on the other hand, the horizontal air flow direction of the air conditioner 201 in the control target region 30103 is changed from the diagonally right upward direction to the diagonally right downward direction, the display control section 103 changes the direction of the air flow direction mark 30105 to the diagonally right downward direction, as shown in the left diagram of FIG. 73.

Because the air flow direction mark 30105 representing the horizontal air flow direction of the air conditioner 201 is displayed in the control target region 30103, the user can be prevented from erroneously operating the devices installed in the rooms other than the control target region 30103.

As shown in FIG. 102, a front direction 33209 of the air conditioner 201 is registered in the device list 33200B beforehand. Here, the front direction 33209 indicates the direction in which the front side of the air conditioner faces in the floor plan 500. In the example of the device list 33200B, the front direction 33209 is defined by the angle formed by the horizontal direction (X axis) and the normal line of the front side of the air conditioner 201 in the floor plan 500. When the touch panel control section 102 senses the operation of changing the horizontal air flow direction, the device control section 106 determines the level of change in the horizontal air flow direction in accordance with the level of the operation, generates a control command for changing the currently set horizontal air flow direction by the determined level of change, and transmits the control command to the network.

On the other hand, the device management section 105 registers the horizontal air flow direction, changed by the device control section 106, in an air flow direction 33210 of the device list 33200B. Then, the display control section 103 changes the direction of the air flow direction mark 30105 to the registered air flow direction 33210.

For example, it is assumed that, in the control target region 30103 shown in the left diagram of FIG. 73, the front direction of the air conditioner 201 is 0 degrees (parallel to the horizontal direction), and that the current horizontal air flow direction is set at −45 degrees. It is also assumed that an operation of changing the horizontal air flow direction of the air conditioner 201 to +45 degrees is input by the user. Here, the horizontal air flow direction increases to a positive value as the counterclockwise angle with respect to the X axis increases, and increases to a negative value as the clockwise angle with respect to the X axis increases. Then, the display control section 103 changes the direction of the air flow direction mark 30105 to the direction of ±45 degrees, as shown in the right diagram of FIG. 73.

Note that the display control section 103 may provide the air flow direction mark 30105 with a function of reporting the air flow amount in addition to the horizontal air flow direction. In the example shown in FIG. 73, the air flow direction mark 30105 is expressed by three arrows of the same length that are directed in the same direction and parallel to each other. The display control section 103 may adopt a display mode in which, for example, the number of arrows is gradually increased as the air flow amount of the air conditioner 201 increases, and gradually reduced as the air flow amount drops.

The air flow direction mark 30105 can allow the user to immediately recognize both the horizontal air flow direction and the air flow amount. Providing the air flow direction mark 30105 with a function of reporting the air flow amount, can eliminate the need to display on the display screen a mark for reporting the air flow amount in addition to the air flow direction mark 30105, improving the viewability of the display screen and at the same time reducing the process steps for display control.

FIG. 74 is a diagram showing screen transition between a display state of the basic screen and a display state of the air conditioner control screen 30102 in which information on the operation state of the air conditioner 201 is displayed in the control target region 30103. In the case where the user selects the air conditioner icon 30101 in the basic screen shown in the left diagram of FIG. 74, and the touch panel control section 102 senses the selection, the display control section 103 switches the screen display to the display state of the air conditioner control screen 30102 shown in the right diagram of FIG. 74.

In this case, the display control section 103 displays, in the control target region 30103, the information complying with the operation state of the air conditioner 201. Here, the set temperature of the air conditioner, for example, is adopted as the operation state. The display control section 103 then displays the information on the operation state by displaying the control target region 30103 in a color complying with the set temperature.

On the other hand, in the case where the user selects a region on the floor plan 500 other than the air conditioner control screen 30102 in the right diagram of FIG. 74, the display control section 103 switches the display state of the air conditioner control screen 30102 shown in the right diagram of FIG. 74 to the display sate of the basic screen shown in the left diagram of FIG. 74. Alternatively, in the case where the user taps on the air conditioner icon 30101 shown in the right diagram of FIG. 74, and the touch panel control section 102 senses the tap, the display control section 103 switches the display screen shown in the right diagram of FIG. 74 to the basic screen shown in the left diagram of FIG. 74.

FIG. 75 is a diagram showing the configuration of a display state of the air conditioner control screen 30102 obtained when the temperature of the air conditioner is set high. FIG. 76 is a diagram showing the configuration of a display state of the air conditioner control screen 30102 obtained when the temperature of the air conditioner is set low.

As shown in FIGS. 75 and 76, the display control section 103 displays the control target region 30103 in different colors, depending on whether the set temperature of the air conditioner 201 is high or low.

Here, the display control section 103 may change the color of the control target region 30103 in such a manner that the grade of a warm color (e.g., red, orange) becomes stronger as the set temperature becomes higher. When the set temperature drops below a certain temperature, the display control section 103 switches the color of the control target region 30103 to a cool color (e.g., blue, light blue), in order to change the color of the control target region 30103 in such a manner that the grade of the cool color becomes stronger as the set temperature becomes lower.

Alternatively, the display control section 103 may display the control target region 30103 in a warm color in the case where the operating mode of the air conditioner 201 is set at "heating," and in a cool color in the case where the operating mode is set at cooling. The display control section 103 may display the control target region 30103 in a neutral color (e.g., green) between a warm color and a cool color in the case where the operating mode of the air conditioner 201 is set at normal.

Alternatively, in the case where the operating mode of the air conditioner 201 is set at "heating," the display control section 103 may display a translucent warm color layer as overlapped on the control target region 30103, set the degree of transparency of the warm color layer to be low as the set temperature becomes higher, and set the degree of transparency of the warm color layer to be high as the set temperature becomes lower. In the case where the operating mode of the air conditioner 201 is set at cooling, the display control section 103 may display a translucent cool color layer as overlapped on the control target region 30103, set the degree of transparency of the cool color layer to be high as the set temperature becomes higher, and set the degree of transparency of the cool color layer to be low as the set temperature becomes lower.

Further, during a normal mode, the display control section 103 may display a translucent green layer as overlapped on the control target region 30103, set the degree of transparency of the green layer to be low as the set temperature becomes higher, and set the degree of transparency of the green layer to be high as the set temperature becomes lower. The normal mode is a mode in which only ventilation is used.

Because the color of the control target region 30103 is switched depending on the operating mode and the set temperature, the user can check the change in the operating mode and set temperature of the air conditioner 201 without approaching the air outlet of the air conditioner 201 to feel the air output therefrom in order to check the change in the operating mode and set temperature.

FIG. 77 are diagrams showing an example of operating a vertical air flow direction of the air conditioner 201 using the air conditioner control screen 30102. The air conditioner control screen 30102 has a screen 30701 showing a vertical air flow direction. The vertical air flow direction here means the direction of air viewed from the side of the air conditioner 201.

An image showing the side of the air conditioner 201 with respect to the front direction of the air conditioner 201 is displayed on the screen 30701. The screen 30701 also displays an air flow direction indicator 30702. The air flow direction indicator 30702 is in an elongated shape that slightly expands radially from the vicinity of the air outlet of the air conditioner. The air flow direction indicator 30702 shows the currently set vertical air flow direction of the air conditioner 201 based on a longitudinal direction.

When the user swipes on the screen 30701 in the vertical direction with a contacting object 30603 (e.g., a finger), the display control section 103 changes the direction of the air flow direction indicator 30702 in response to the swipe distance. Examples of the swipe distance here include the distance between the position of the contacting object 30603 on the display 101 that is obtained at certain measurement timing during the swipe operation, and the position of the contacting object 30603 on the display 101 that is obtained when the swipe operation is started. The expression "in response to the swipe distance" means that the level of change in the air flow direction becomes large as the swipe distance increases, and becomes small as the swipe distance drops.

Figure 77A:
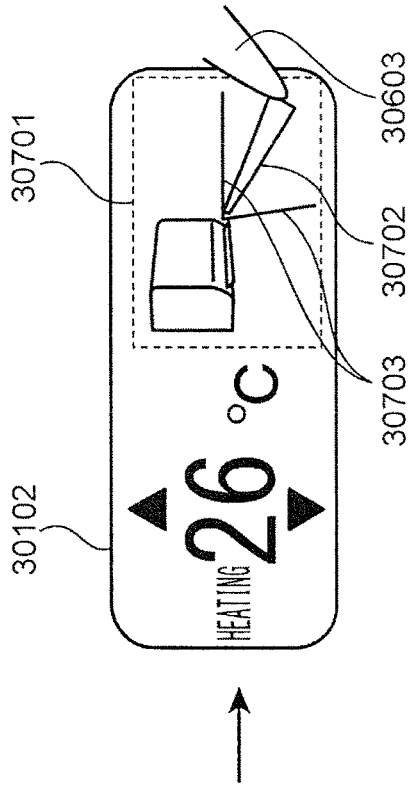
FIG. 77A to 77D are diagrams showing an example of operating a vertical air flow direction of the air conditioner using the air conditioner control screen, according to the present disclosure.
Figure 77B:
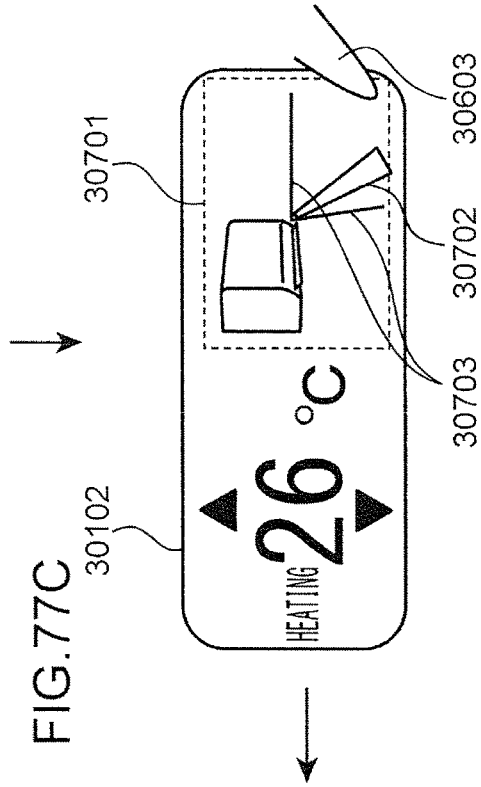
Figure 77C:
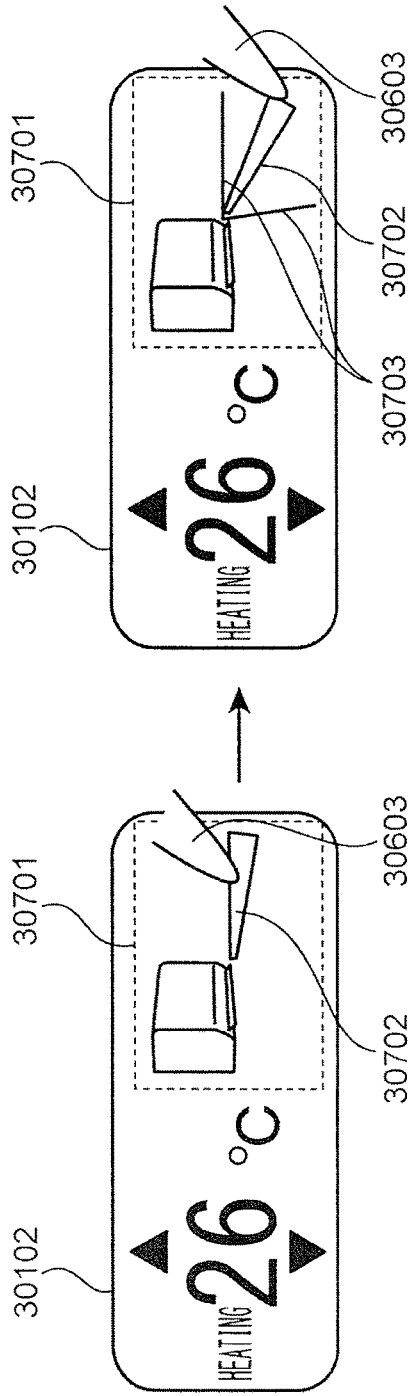
Figure 77D:
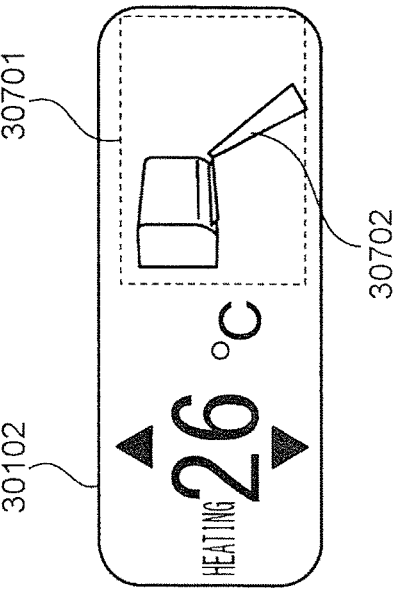

In the example shown in FIG. 77, the contacting object 30603 is moved downward within the screen 30701 as shown from FIG. 77A to FIG. 77B to FIG. 77C, and then to FIG. 77D. The air flow direction indicator 30702 is turned clockwise in accordance with the swipe distance, to turn downward.

When the user starts swiping on the screen 30701 with the contacting object 30603, the display control section 103 displays an air flow direction adjustable range 30703 on the screen 30701, as shown in FIG. 77B. The adjustable range 30703 includes an upper limit line and a lower limit line. The upper limit line represents the upper adjustable limit of the vertical air flow direction. The lower limit line represents the lower adjustable limit of the vertical air flow direction. In the example shown in FIG. 77B, the upper limit line is directed in the horizontal direction, whereas the lower limit line is directed substantially in the vertical direction. The adjustable range 30703 is displayed in such a manner that the air outlet and the starting point of the air flow direction indicator 30702 are located at the point where the upper limit line and the lower limit line intersect. In addition, the air flow direction indicator 30702 is displayed between the upper limit line and the lower limit line.

With the adjustable range 30703 displayed in this manner, the user can intuitively recognize how much he/she can adjust the vertical air flow direction. Furthermore, because the adjustable range 30703 is displayed only when swiping the air flow direction indicator 30702, it can allow the user can to feel the operation of setting vertical air flow direction. Note that although the adjustable range 30703 is displayed as described above, in the present disclosure the adjustable range 30703 can be hidden.

When the user swipes on the screen 30701 with the contacting object 30603 further downward in FIG. 77B, the air flow direction indicator 30702 further turns clockwise in accordance with the swipe distance, and further turns downward, as shown in FIG. 77C. When the user releases the contacting object 30603 from the screen 30701, the vertical air flow direction is determined. The device control section 106 then determines the level of change in the vertical air flow direction in accordance with the swipe distance obtained between the beginning of the swipe operation and the end of the swipe operation, generates a control command for changing the currently set vertical air flow direction by the determined level of change, and transmits the control command to the network.

In order to manage the vertical air flow direction, the device list 33200B shown in FIG. 102 may be provided with a field for registering the vertical slopes. Once the device control section 106 determines the vertical air flow direction, the device management section 105 may register the vertical slope thereof in the registration field. For example, the angle of the vertical air flow direction based on the lower or upper adjustable limit may be employed as the vertical air flow direction.

FIG. 78 are diagrams showing an example of operating the horizontal air flow direction of the air conditioner 201 using the air conditioner control screen 30102. The air conditioner control screen 30102 has a screen 30801 showing the horizontal air flow direction. An image of the front side of the air conditioner 201 is displayed on the screen 30801. An air flow direction indicator 30802 is also displayed on the screen 30801. The air flow direction indicator 30802 is expressed by a plurality of (e.g., three) curved lines extending downward from the air output of the air conditioner 201. In FIG. 78, the horizontal air flow direction of the air conditioner 201 is set to be directed towards the left in relation to the front side of the air conditioner 201. Therefore, the air flow direction indicator 30802 faces to the left.

When the user swipes the contacting object 30603 to the left or right on the screen 30801, the display control section 103 changes the direction of the air flow direction indicator 30802 in accordance with the swipe distance. In the example shown in FIG. 78, the contacting object 30603 is moved from left to right within the screen 30801 as shown from FIG. 78A to FIG. 78B to FIG. 78C, and then to FIG. 78D, and consequently the air flow direction indicator 30802 turns counterclockwise with respect to the air outlet in the image of the air conditioner 201 in response to the swipe operation, changing its direction from left to right.

When the user starts swiping the contacting object 30603 the screen 30801, the display control section 103 displays a set state display section 30803 on the screen 30801, as shown in FIG. 78B. The set state display section 30803 is a line displayed in the lower part of the screen 30801 and is parallel to the horizontal direction. The set state display section 30803 notifies the user of the receipt of an operation of changing the horizontal air flow direction. Note that the display of the set state display section 30803 may be omitted.

When the user swipes on the screen 30801 with the contacting object 30603 to the right in FIG. 78B, the air flow direction indicator 30802 further turns counterclockwise with respect to the air outlet in the image of the air conditioner 201 in accordance with the swipe distance, changing its direction to the right, as shown in FIG. 78C. When the user releases the contacting object 30603 from the screen 30801, the level of change in the horizontal air flow direction is determined in accordance with the swipe distance obtained from the beginning of the swipe operation and the end of the swipe operation. The device control section 106 then generates a control command for changing the current horizontal air flow direction by the determined level of change, and transmits the control command to the network.

FIG. 79 are diagrams showing an example of operating the air flow amount of the air conditioner 201 using the air conditioner control screen 30102. The air conditioner control screen 30102 has a screen 30901 showing the air flow amount. An image of the front side of the air conditioner 201 is displayed on the screen 30901. An air flow amount indicator 30902 is also displayed on the screen 30901. The air flow amount indicator 30902 is expressed by a plurality of (e.g., three) gently curved lines extending downward from the air outlet of the air conditioner 201.

When the user pinches out on the screen 30901 using the contacting object 30603, the display control section 103 gradually increases the number of lines of the air flow amount indicator 30902 in accordance with the pinched-out distance. When, on the other hand, the user pinches in on the screen 30901 using two contacting objects 30603, the display control section 103 gradually reduces the number of lines of the air flow amount indicator 30902 in accordance with the pinched-in distance. The expression "in accordance with the pinched-in/out distance" here means that the level of change in the air flow amount becomes large as the pinched-in/out distance increases, and becomes small as the pinched-in/out distance drops.

In the example shown in FIG. 79, the contacting object 30603 is pinched out on the screen 30901 as shown from FIG. 79A to FIG. 79B and then to FIG. 79C, wherein the number of lines of the air flow amount indicator 30902 gradually increases from two to three and then to five in accordance with the pinched-out distance. For example, the difference between the distance between the two contacting objects 30603 on the display 101 at certain measurement timing during the pinch-out operation, and the distance between the two contacting objects 30603 on the display 101 at the beginning of the pinch-out operation, is employed as the pinched-out distance.

When the user releases the two contacting objects 30606 from the screen 30901, the device control section 106 determines the level of change in the air flow amount in accordance with the pinched-out distance obtained between the beginning of the pinch-out operation and the end of the pinch-out operation, generates a control command for changing the current air flow amount to the determined level of change, and transmits the control command to the network.

When, on the other hand, the contacting objects 30603 are pinched in on the screen 30901 in FIG. 79C, the number of lines of the air flow amount indicator 30902 gradually decreases from five to three and then to two in accordance with the pinched-in distance, as shown from FIG. 79C to FIG. 79B and then FIG. 79A. For example, the difference between the distance between the two contacting objects 30603 on the display 101 at certain measurement timing during the pinch-in operation and the distance between the two contacting objects 30603 on the display 101 at the beginning of the pinch-in operation, is employed as the pinched-in distance.

The air flow amount increases at the time of the pinch-out operation and drops at the time of the pinch-in operation, as described above; however, the present disclosure is not limited thereto. Thus, the air flow amount may drop at the time of the pinch-out operation and increase at the time of the pinch-in operation. In this case, the display control section 103 may gradually reduces the number of lines of the air flow amount indicator 30902 as the pinched-out distance increases, and increases the number of lines of the air flow amount indicator 30902 as the pinched-in distance increases.

The air flow amount indicator 30902 may be provided with the functions of the air flow direction indicator 30802. In other words, when the air flow amount indicator 30902 is swiped from left to right or from right to left, the display control section 103 may change the direction of the air flow amount indicator 30902 from left to right or from right to left in accordance with the swipe distance.

As a result, the air flow amount indicator 30902 and the air flow direction indicator 30802 are consolidated into one indicator, eliminating the need of the operation of switching from the air flow amount indicator 30902 to the air flow direction indicator 30802 or the operation of switching from the air flow direction indicator 30802 to the air flow amount indicator 30902, and reducing the number of operations and process steps.

Figure 80A:
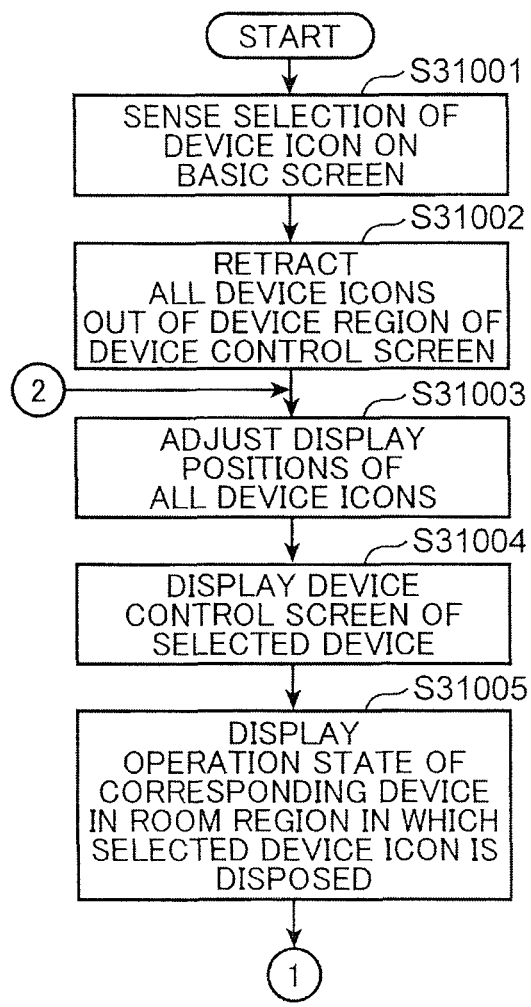
FIG. 80A is a flowchart showing the flow of a process for the home controller to control a device, according to the present disclosure.
Figure 80B:
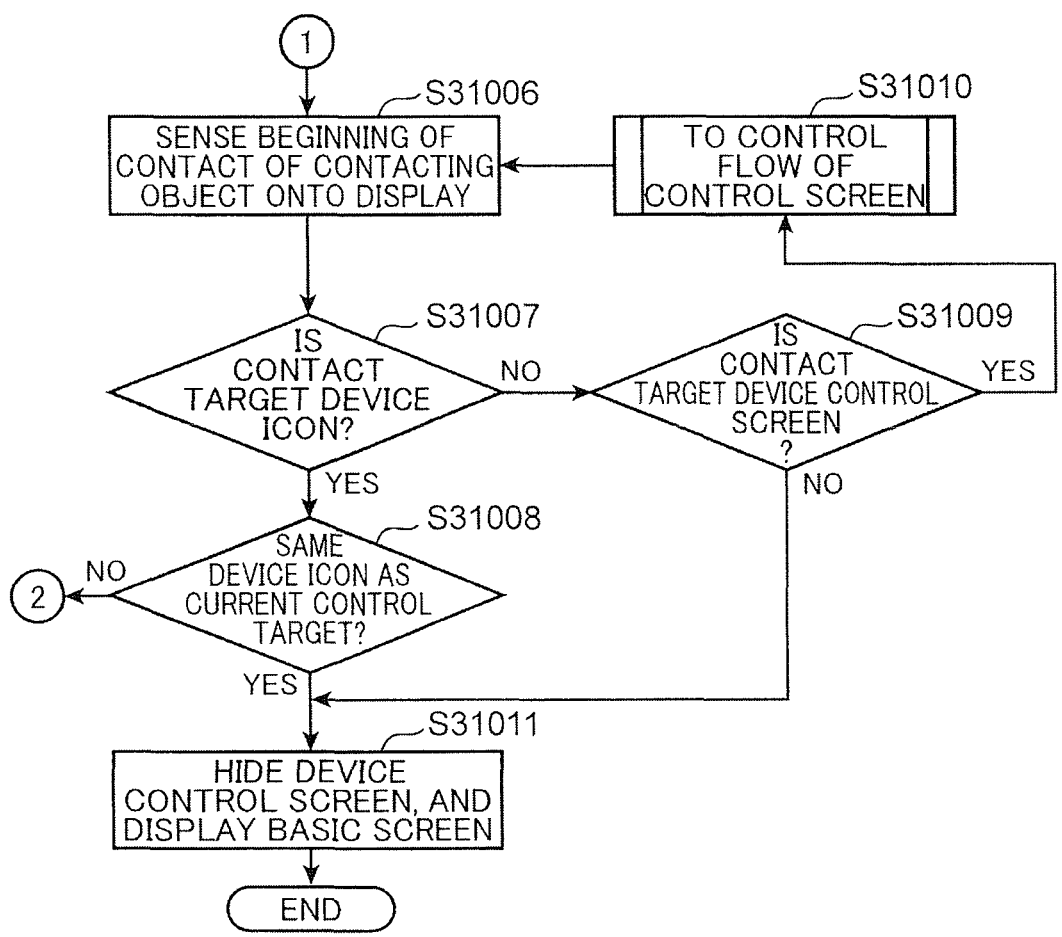
FIG. 80B is a flowchart showing the flow of a process for the home controller to control a device, according to the present disclosure.

FIGS. 80A and 80B are each a flowchart showing the flow of a process for the home controller 100 to control the device 200, according to the present disclosure.

First, the touch panel control section 102 senses that the device icon 501 representing a certain device 200 is selected by the user on the basic screen (S31001). In this case, it is assumed that the air conditioner icon 30101 is selected. Next, the display control section 103 retracts all the device icons 501 out of the display region of the device control screen 502 (S31002). In this case, all the device icons 501 are retracted out of the display region of the floor plan 500, as shown in FIG. 72.

Next, the display control section 103 adjusts the display positions of the retracted device icons 501 (S31003). For example, the display positions of the retracted device icons 501 are adjusted in such a manner that the selected air conditioner icon 30101 is displayed at a specific position, as shown in FIG. 72. Note that the device icons 501 may be retracted so as to surround the device control screen 502, as shown in FIG. 12. In this case, the display control section 103 may dispose the air conditioner icon 30101 at a particular position (for example, the uppermost position, the lowermost position, the rightmost position, or the leftmost position) on the outer periphery of an ellipse.

Next, the display control section 103 displays the device control screen 502 of the selected device 200 (S31004). In this case, the air conditioner control screen 30102 is displayed as the device control screen 502, as shown in FIG. 72.

The display control section 103 then displays the operation state of the device 200 corresponding to the room region where the selected device icon 501 is disposed (S31005). In this case, the air flow direction mark 30105 is displayed as the operation state in the control target region 30103, as shown in FIG. 72.

Subsequently, the touch panel control section 102 senses the start of contact made to the display 101 by the contacting object 30603 (S31006). Next, the touch panel control section 102 determines whether or not the contact target of the contacting object 30603 is the device icon 501 (S31007).

If it is determined that the contact target is the device icon 501 (YES in S31007), the touch panel control section 102 determines whether or not the device icon 501, the contact target, is the same device icon 501 (air conditioner icon 30101) as the device 200 selected currently as the control target (S31008). If the device icon 501, the contact target, is the same device icon 501 as the device 200 selected currently as the control target (YES in S31008), the display control section 103 hides the device control screen 502 (air conditioner control screen 30102) being displayed, and displays the basic screen (S31011).

On the other hand, in the case where the device icon 501, the contact target, is not the same device icon 501 (air conditioner icon 30101) as the device 200 selected currently as the control target (NO in S31008), the process is returned to S31003. In this case, the display control section 103 adjusts the arrangement positions of all the device icons 501 that are retracted so that the device icon 501 corresponding to the contact target is disposed at a particular position, and displays the device control screen 502 of the device 200 corresponding to the device icon 501 which is the control target.

However, in the case where the contact target is not the device icon 501 (NO in S31007), the touch panel control section 102 determines whether or not the contact target is the device control screen 502 (S31009). If the contact target is the device control screen 502 (YES in S31009), a control flow of the device control screen 502 (S31010) is executed, and the process is returned to S31006.

If the contact target is not the device control screen 502 (NO in S31009), the display control section 103 hides the device control screen 502 being displayed, and displays the basic screen (S31011). For example, when a region on the floor plan 500 outside the display region of the air conditioner control screen 30102 is tapped on in the right diagram of FIG. 72, the result of S31009 is determined as NO, and then display on the display 101 is switched to the basic screen shown in the left diagram of FIG. 72.

FIG. 81 is a flowchart showing S31010 of FIG. 80B, and control flow of the device control screen 502. FIG. 81 is also a flowchart for adjusting the air flow direction or air flow amount in the device control screen 502. First, when the touch panel control section 102 senses an operation performed on the screen showing the air flow direction or air flow amount (YES in S31101), the process is advanced to S31102, but when the touch panel control section 102 does not sense this operation (NO in S31101), the process is ended. For instance, in the case where the touch panel control section 102 senses an upward, downward, rightward or leftward swipe operation or a pinch-in/out operation performed on the screens 30701, 30801, 30901 using the contacting object 30603 while any of the air conditioner control screens 30102 of FIGS. 77 to 79 is displayed, the result of S31101 is determined as YES.

Next, in the case where the sensed operation is an operation of moving the contacting object 30603 up or down (YES in S31102), the display control section 103 displays the screen 30701 showing the vertical air flow direction (S31103). For example, when the contacting object 30603 is swiped up or down on the screen 30801 showing the horizontal air flow direction or the screen 30901 showing the air flow amount, the display control section 103 switches the screen 30801 showing the horizontal air flow direction or the screen 30901 showing the air flow amount to the screen 30701 showing the vertical air flow direction. Note that, in the case where the screen 30701 showing the vertical air flow direction is displayed from the first place, the display control section 103 continues to display the screen 30701 showing the vertical air flow direction, even when the contacting object 30603 is swiped up or down.

On the other hand, in the case where the sensed operation is an operation of moving the contacting object 30603 to the left or right (NO in S31102 and YES in S31105), the display control section 103 displays the screen 30801 showing the horizontal air flow direction (S31106). For example, when the contacting object 30603 is swiped to the left or right in the screen 30701 showing the vertical air flow direction or the screen 30901 showing the air flow amount, the display control section 103 switches the screen 30701 showing the vertical air flow direction or the screen 30901 showing the air flow amount to the screen 30801 showing the horizontal air flow direction. Note that, in the case where the screen 30801 showing the horizontal air flow direction is displayed from the first place, the display control section 103 continues to display the screen 30801 showing the horizontal air flow direction, even when the contacting object 30603 is swiped to the left or right.

In the case where the sensed operation is a pinch-in/out operation (NO in S31102, NO in S31105, and YES in S31108), the display control section 103 displays the screen 30901 showing the air flow amount (S31109). For instance, when the contacting object 30603 is pinched in or out on the screen 30701 showing the vertical air flow direction or the screen 30801 showing the horizontal air flow direction, the display control section 103 switches the screen 30701 showing the vertical air flow direction or the screen 30801 showing the horizontal air flow direction to the screen 30901 showing the air flow amount. Note that, in the case where the screen 30901 showing the air flow amount is displayed from the first place, the display control section 103 continues to display the screen 30901 showing the air flow amount, even when the contacting object 30603 is pinched in or out.

However, in the case where the sensed operation is neither the operation of moving the contacting object upward, downward, leftward or downward nor the pinch-in/out operation (NO in S31108), the process is ended.

When, in S31104, the touch panel control section 102 senses the level of the operation resulting from moving the contacting object 30603 up or down on the screen 30701 showing the vertical air flow direction, the device control section 106 decides the content of control on the vertical air flow direction in accordance with the level of the operation.

When, in S31107, the touch panel control section 102 senses the level of the operation resulting from moving the contacting object 30603 up or down on the screen 30801 showing the horizontal air flow direction, the device control section 106 decides the content of control on the horizontal air flow direction in accordance with the level of the operation.

When, in S31110, the touch panel control section 102 senses the level of the operation resulting from pinching in/out the contacting object 30603 on the screen 30901 showing the air flow amount, the device control section 106 decides the content of control on the air flow amount in accordance with the level of the operation.

Next, the display control section 103 shows display complying with the settings on the control target region 30103 (S31111). For example, in the case where the horizontal air flow direction is changed as shown in FIG. 73, the display control section 103 directs the air flow direction mark 30105 in the changed horizontal air flow direction. In the case where the air flow amount is changed, the display control section 103 changes the number of lines of the air flow direction mark 30105 in accordance with the changed air flow amount. Note in the example shown in FIG. 73 that only the air flow direction mark 30105 representing the horizontal air flow direction is displayed in the control target region 30103; however, an air flow direction mark representing a vertical air flow direction may additionally be displayed. In such a case, when the vertical air flow direction is changed, the display control section 103 directs the air flow direction mark representing a vertical air flow direction in the changed vertical air flow direction. In this case, for example, one arrow representing the vertical air flow direction may be employed as the air flow direction representing a vertical air flow direction.

In S31112, the device control section 106 generates a control command corresponding to the determined content of control. Subsequently, a control command transmission flow (see FIG. 41) is executed (S31113).

FIG. 82 is a diagram showing an example of operating a set temperature 31203 of the air conditioner 201 using the air conditioner control screen 30102. The air conditioner control screen 30102 has a temperature setting screen 31201. In the example shown in FIG. 82, the temperature setting screen 31201 consists the left half of the air conditioner control screen 30102. The set temperature 31203 or the air conditioner 201 is displayed in the middle of the temperature setting screen 31201, and a run mode 31202 on the left-hand side of the set temperature 31203. In FIGS. 82A and 82B, because the run mode of the air conditioner 201 is set at "heating," the run mode 31202 is displayed as "heating."

In the example shown in FIG. 82, when the set temperature 31203 of the air conditioner 201 is set based on operation on the temperature setting screen 31201, the mode of the air conditioner 201 is switched to the operating mode corresponding to the set temperature 31203.

In the example shown in FIG. 82, the set temperature of the air conditioner 201 is lowered as shown from FIG. 82A to FIG. 82B to FIG. 82C, and then to FIG. 82D. The set temperature 31203 is lowered from 26 degrees to 23 degrees as shown from FIG. 82B to FIG. 82C. For instance, it is assumed that the air conditioner 201 is set beforehand in such a manner that the run mode 31202 is set at "heating" when the set temperature 31203 is higher than 25 degrees and that the run mode 31202 is set at a normal mode when the set temperature 31203 is equal to or lower than 25 degrees. Therefore, the device control section 106 transmits, to the network, a control command for setting the set temperature 31203 at 23 degrees and switching the run mode 31202 of the air conditioner 201 from "heating" to "normal."

As shown from FIGS. 82C to 82D, the set temperature 31203 is switched from 23 degrees to 19 degrees. In this case, for example, it is assumed that the air conditioner 201 is set beforehand in such a manner that the run mode 31202 is set at "normal" when the set temperature 31203 is higher than 20 degrees, and that the run mode 31202 is set at "cooling" when the set temperature is equal to or lower than 20 degrees. Therefore, the device control section 106 transmits, to the network, a control command for setting the set temperature 31203 at 19 degrees and switching the run mode 31202 of the air conditioner 201 to "cooling."

How to change the run mode 31202 in accordance with the set temperature 31203 is not limited to these examples. For instance, the device control section 106 may determine the operating mode by comparing the set temperature 31203 with outdoor temperature or indoor temperature. For example, the device control section 106 obtains the difference between the outdoor or indoor temperature (T1) with the set temperature (T2) ($\Delta T = T1 - T2$). In the case where $\Delta T$ is greater than $+n1$, the run mode 31202 may be set at "cooling." In the case where $\Delta T$ is equal to or greater than $-n2$ but equal to or less than $+n1$, the run mode 31202 may be set at "normal." In the case where $\Delta T$ is less than $-n2$, the operating mode may be set at "heating." Here, the terms "n1" and "n2" are predetermined constants.

When changing the set temperature 31203, the device control section 106 may acquire the outdoor or indoor temperature by transmitting the outdoor or indoor temperature to the air conditioner 201. The air conditioner 201 generally has a temperature sensor provided in an outdoor unit or the like for measuring the outdoor temperature, or a temperature sensor provided in an indoor unit or the like for measuring the indoor temperature. Therefore, the air conditioner 201 may measure the outdoor and indoor temperatures using the temperature sensors.

Next, operations on the set temperature 31203 are described in detail. In the example shown in FIG. 82A, the contacting object 30603 is swiped downward on the temperature setting screen 31201. Consequently, the display control section 103 lowers the set temperature 31203 in response to the downward swipe distance, as shown in FIG. 82B. In the example shown in FIG. 82B, the set temperature 31203 is lowered from 27 degrees to 26 degrees; thus, the set temperature 31203 is displayed as "26 degrees." The expression "in response to the swipe distance" means that the level of change in the set temperature becomes large as the swipe distance increases, and becomes small as the swipe distance drops.

In FIG. 82B, the contacting object 30603 is swiped further downward on the temperature setting screen 31201. Therefore, the display control section 103 lowers the set temperature 31203 from 26 degrees to 23 degrees in response to the downward swipe distance, as shown in FIG. 82C.

Similarly, as shown from FIGS. 82C to 82D, the set temperature 31203 is lowered from 23 degrees to 19 degrees in response to the downward swipe distance.

However, when the contacting object 30603 is swiped upward, the display control section 103 raises the set temperature 31203 in response to the upward swipe distance.

In the case where the vertical coordinate of a swipe starting point in the temperature setting screen 31201 is located below the vertical coordinate of the contact point of the contacting object 30603 obtained at certain measurement timing during the swipe operation, the touch panel control section 102 may determine that the contacting object 30603 is swiped upward. On the other hand, in the case where the vertical coordinate of the swipe starting point is above the vertical coordinate of the contact point of the contacting object 30603 obtained at certain measurement timing during the swipe operation, the touch panel control section 102 may determined that the contacting object 30603 is swiped downward.

When the touch panel control section 102 senses that the upward swipe operation is ended, the device control section 106 determines the level of change in the set temperature 31203 in response to the swipe distance between the swipe starting point and the swipe end point, generates a control command for increasing the current set temperature 31203 to the determined level of change, and transmits the control command to the network.

When the touch panel control section 102 senses that the downward swipe operation is ended, the device control section 106 determines the level of change in the set temperature 31203 in response to the swipe distance between the swipe starting point and the swipe end point, generates a control command for reducing the current set temperature 31203 to the determined level of change, and transmits the control command to the network.

In the case where the contacting object 30603 is moved to the outside of the region corresponding to the temperature setting screen 31201, the display control section 103 and the device control section 106 may treat the point where the temperature setting screen 31201 intersects with the trajectory of the swiped contacting object 30603 as a swipe end point, or may treat the actual swipe end point outside the region corresponding to the temperature setting screen 31201, as the swipe end point.

In case of changing the set temperature 31203 significantly, the user may repeatedly swipe the contacting object 30603 a number of times. The device control section 106, therefore, does not determine that the set temperature 31203 is immediately determined even after the end of swiping the contacting object 30603, and may generate a control command based on the fact that the set temperature 31203 is determined, if the contacting object is not swiped again for a certain period of time after the end of the first swipe operation. This configuration can prevent transmission of the control command each time when swiping is ended, and reduce the communication traffic and processing load on the home controller 100 and air conditioner 201.

The display control section 103, on the other hand, may change display of the set temperature 31203 as needed in response to a swipe operation, whether the set temperature 31203 is determined or not. This can allow the user to know the level of change in the set temperature 31203 in accordance with a swipe operation.

The example in FIG. 82 shows both the operations on the set temperature 31203 and the operations on the operating mode. Thus, the number of process steps of the home controller 100 and the number of operations by the user can be reduced.

In the example shown in FIG. 82, the set temperature 31203 is changed in accordance with the swipe distance; however, the present disclosure is not limited thereto, and the set temperature 31203 may be changed in accordance with a swipe direction. For example, in FIG. 82A, in the case where the contacting object 30603 is swiped upward on the temperature setting screen 31201, the display control section 103 increases the set temperature 31203 by a predetermined temperature. In the case where the contacting object 30603 is swiped downward on the temperature setting screen 31201, the display control section 103 drops the set temperature 31203 by a predetermined temperature.

It is assumed that the set temperature 31203 is changed by, for example, 0.5 degrees as a result of one swipe operation. In this case, when the contacting object 30603 is swiped downward twice on the temperature setting screen 31201 shown in FIG. 82A, the set temperature 31203 is changed from 27 degrees to 26 degrees, as shown in FIG. 82B. When, on the other hand, the contacting object 30603 is swiped upward twice in FIG. 82B, the set temperature 31203 is changed from 26 degrees to 27 degrees, as shown in FIG. 82A.

In the case where the contacting object 30603 is not swiped for a certain period of time since the last upward or downward swipe input, the device control section 106 determines the level of change in the set temperature 31203 in response to the number of swipe operations, generates a control command for changing the current set temperature 31203 to the determined level of change, and transmits the control command to the network.

The level of change 0.5 degrees, the temperature by which the set temperature is changed as a result of a single swipe operation, is merely an example; thus, the set temperature may be changed by 1 degree, 2 degrees, and the like other than 0.5 degrees.

In the case of changing the set temperature in accordance with the swipe direction, the level of change in the set temperature 31203 may be determined in view of the swipe direction and distance. In this case, when the swipe direction is an upward direction the set temperature 31203 is increased, and when the swipe direction is a downward direction the set temperature 31203 is lowered. The level of change in the set temperature 31203 may be determined in accordance with the swipe distance.

In this case, when the contacting object 30603 is moved past the temperature setting screen 31201, the level of change in the set temperature 31203 may be determined by additionally considering the part beyond which the contacting object 30603 is moved, or without taking the part into consideration.

FIG. 83 is a flowchart showing S31010 of FIG. 80B, the control flow corresponding to the device control screen 502. Note that FIG. 83 is a flowchart for adjusting the temperature using the device control screen 502.

First, when the touch panel control section 102 senses the operation performed on the temperature setting screen 31201 (YES in S31301), the process is advanced to S31302. When the operation is not sensed (NO in S31301), the process is ended.

For example, when the touch panel control section 102 senses contact of the contacting object 30603 made to the temperature setting screen 31201 while the air conditioner control screen 30102 shown in FIG. 82 is displayed, the result of S31301 is determined as YES.

Next, when the touch panel control section 102 senses an operation of moving the contacting object 30603 up and down (YES in S31302), the device control section 106 determines the content of control of the set temperature 31203 in response to the upward/downward distance in which the contacting object 30603 is moved (S31303). For instance, when the contacting object 30603 is swiped upward or downward on the temperature setting screen 31201 shown in FIG. 82, the device control section 106 determines the changed set temperature in response to the swipe distance and swipe direction.

In the case where the touch panel control section 102 senses an operation other than the operation of moving the contacting object 30603 up and down (NO in S31302), the process is ended. For example, when the touch panel control section 102 senses a tapping or pinch-in/out operation, the result of S31302 is determined as NO.

Next, the display control section 103 shows display complying with the settings of the control target region 30103 (S31304). For example, when the operating mode is switched from "heating" to "cooling" as a result of a change in the set temperature 31203, the display control section 103 changes the color of the control target region 30103 from its warm color to a cool color, as shown in FIG. 75, to display the control target region 30103 in accordance with the set temperature 31203.

Next, the device control section 106 generates a control command corresponding to the content of control (S31305). For instance, in the case where the operating mode is switched from "heating" to "cooling" as a result of dropping the set temperature from 26 degrees to 19 degrees, as shown in FIG. 82, the device control section 106 generates a control command for setting the operating mode to "cooling" and the set temperature at 19 degrees. Subsequently, the control command transmission flow (see FIG. 41) is executed (S31306).

Figure 84:
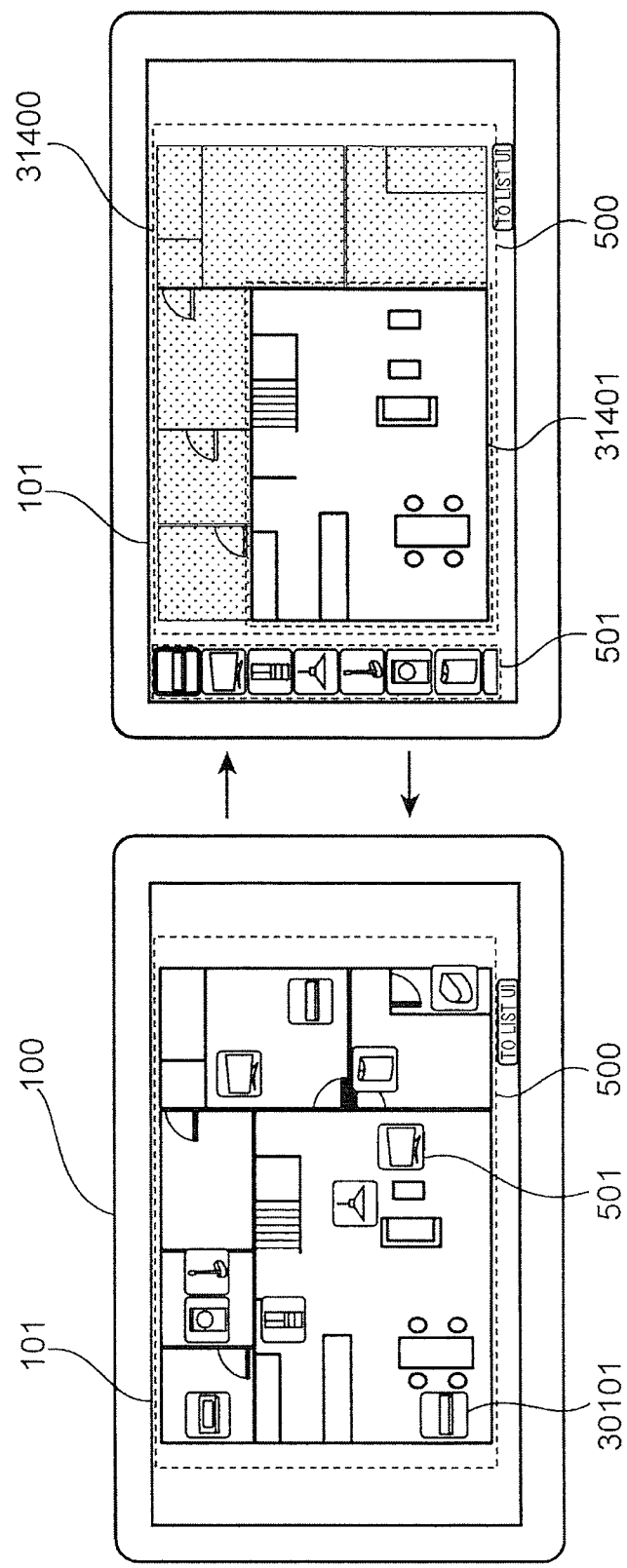
FIG. 84 is a diagram showing another example of the transition between a display state of the basic screen and a display state of the air conditioner control screen, according to the present disclosure.

FIG. 84 is a diagram showing another example of the transition between a display state of the basic screen and a display state of an air conditioner control screen 31400. The left diagram of FIG. 84 shows the basic screen. This basic screen is the same as the one shown in FIG. 5. The user taps on the air conditioner icon 30101 on the basic screen shown in the left diagram of FIG. 84, and the touch panel control section 102 senses the tap. Consequently, the display control section 103 switches the display state of the basic screen to the display state of the air conditioner control screen 31400 shown in the right diagram of FIG. 84. The air conditioner control screen 31400 is configured by the floor plan 500, in which an adjustment region 31401 is used as the device control screen 502 of the air conditioner 201. The adjustment region 31401 is a region on the floor plan 500 that corresponds to a room with the air conditioner 201 to be adjusted, and is used for adjusting the set temperature of the air conditioner 201.

As with the configuration shown in FIG. 72, all the device icons 501 displayed on the floor plan 500 in the basic screen are retracted out of the display region of the floor plan 500 in FIG. 84 as well.

Figure 85:
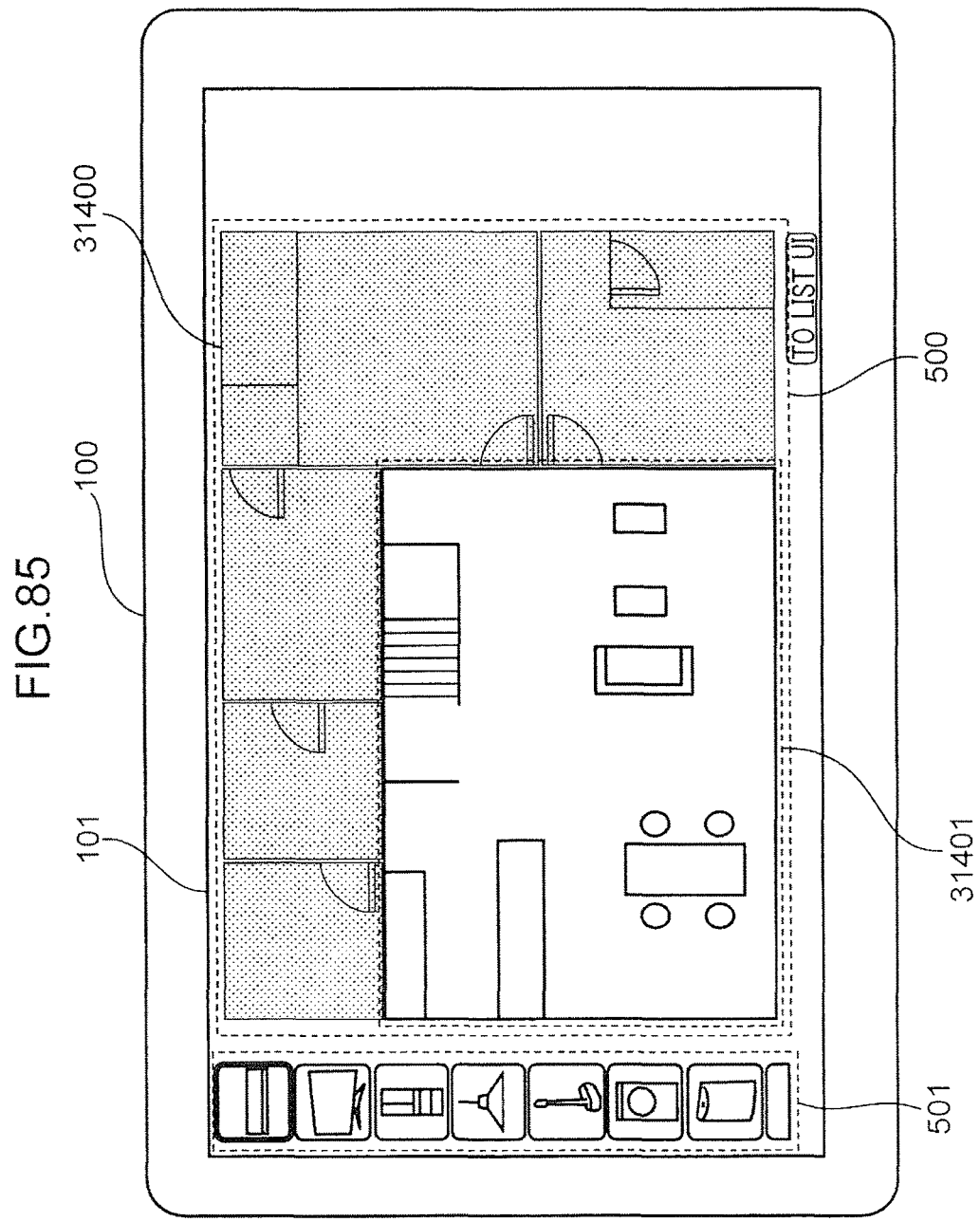
FIG. 85 is a diagram showing the configuration of a display state of an adjustment region, according to the present disclosure.

FIG. 85 is a diagram showing the configuration of the display state of the adjustment region 31401. The display control section 103 displays a gray layer in a region on the floor plan 500 other than the adjustment region 31401, to emphasize the adjustment region 31401 over the other regions, so that the region in the room with the air conditioner 201 strongly attracts attention of the user. Although the example in FIG. 85 illustrates an aspect in which a gray layer is displayed in a region other than the adjustment region 31401 to emphasize the adjustment region 31401 over the other regions, the present disclosure is not limited to this aspect; thus, the brightness of the adjustment region 31401 may be set to be higher than that of the other regions, to emphasize the adjustment region 31401.

Figure 86:
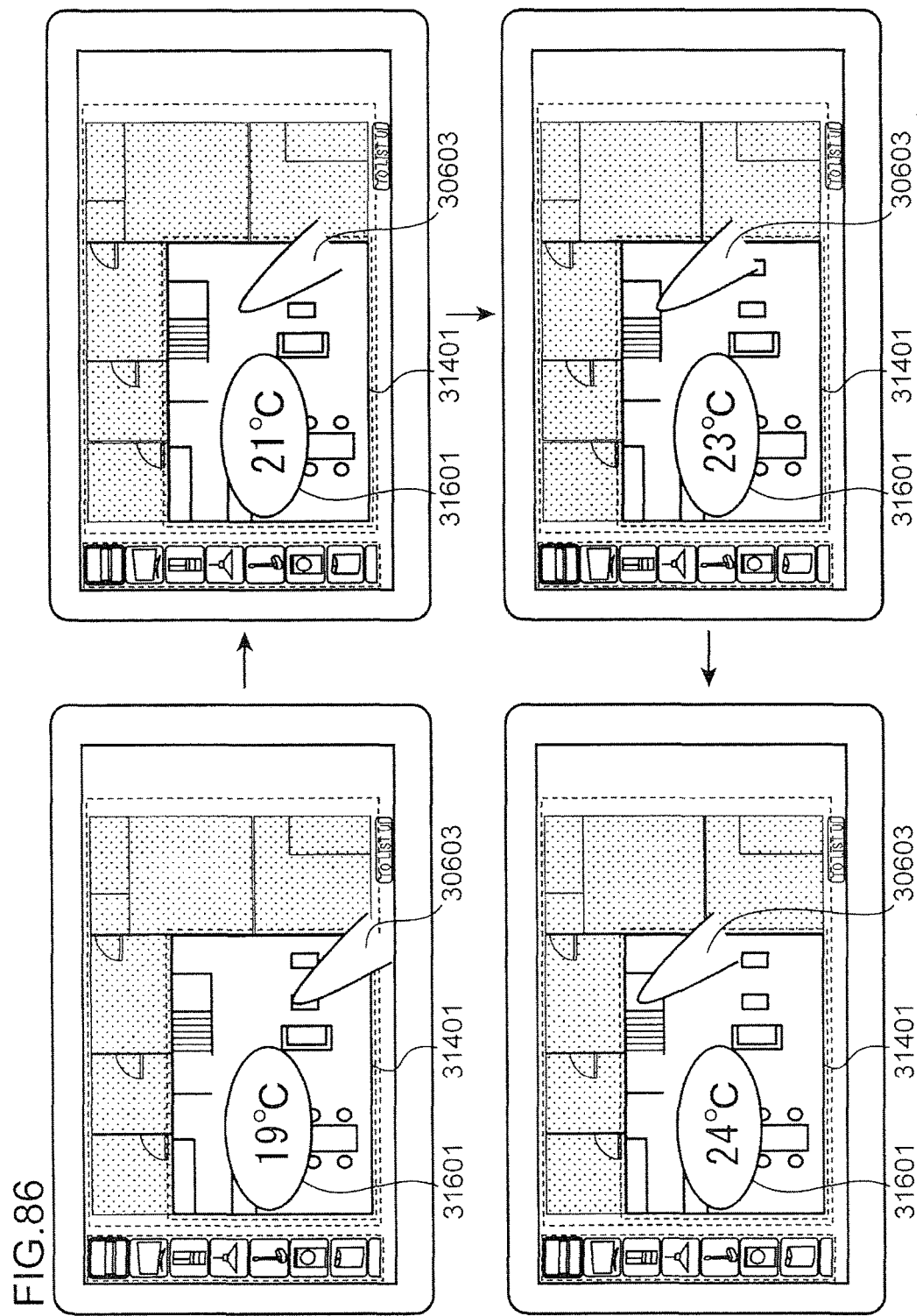
FIG. 86 is a diagram showing an example of operating a set temperature of the air conditioner using the adjustment region, according to the present disclosure.

FIG. 86 is a diagram showing an example of operating a set temperature of the air conditioner 201 using the adjustment region 31401. A set temperature 31601 is displayed in the adjustment region 31401. It is assumed that the touch panel control section 102 senses an upward swipe operation of the contacting object 30603 in the adjustment region 31401. Then, the display control section 103 raises the set temperature 31601 in response to the upward swipe distance. From the example shown in the upper left diagram of FIG. 86 to the one shown in the upper right diagram, the set temperature 31601 increases from 19 degrees to 21 degrees in response to the upward swipe distance. In the same manner, the set temperature 31601 is increased from 21 degrees to 23 degrees and then to 24 degrees as shown in the upper right diagram, the lower right diagram, and the lower left diagram in FIG. 86 respectively.

However, when the contacting object 30603 is swiped downward in the adjustment region 31401, the set temperature 31601 is lowered, for example, from 24 degrees to 23 degrees to 21 degrees, and then to 19 degrees as shown in the lower left diagram, the lower right diagram, the upper right diagram, and the upper left diagram in FIG. 86 respectively.

Although the example in FIG. 86 shows how the set temperature 31601 is changed in response to how much the contacting object 30603 is swiped in the adjustment region 31401, the present disclosure is not limited thereto. Thus, the set temperature 31601 may be changed in accordance with the direction in which the contacting object 30603 is swiped in the adjustment region 31401. Changing the set temperature 31601 in accordance with the swipe direction was already described in detail with reference to FIG. 82; thus, the same explanation is omitted here.

In some cases a room corresponding to the adjustment region 31401 has two or more air conditioners 201. In such a case, it would be convenient for the user if the user could adjust the set temperatures 31601 of the plurality of air conditioners 201 at once. In the present disclosure, therefore, when a plurality of air conditioners 201 are installed in a room corresponding to the adjustment region 31401, the adjustment region 31401 is used as the device control screen 502 for adjusting the set temperatures 31601 of the plurality of air conditioners 201 at once.

Figure 87:
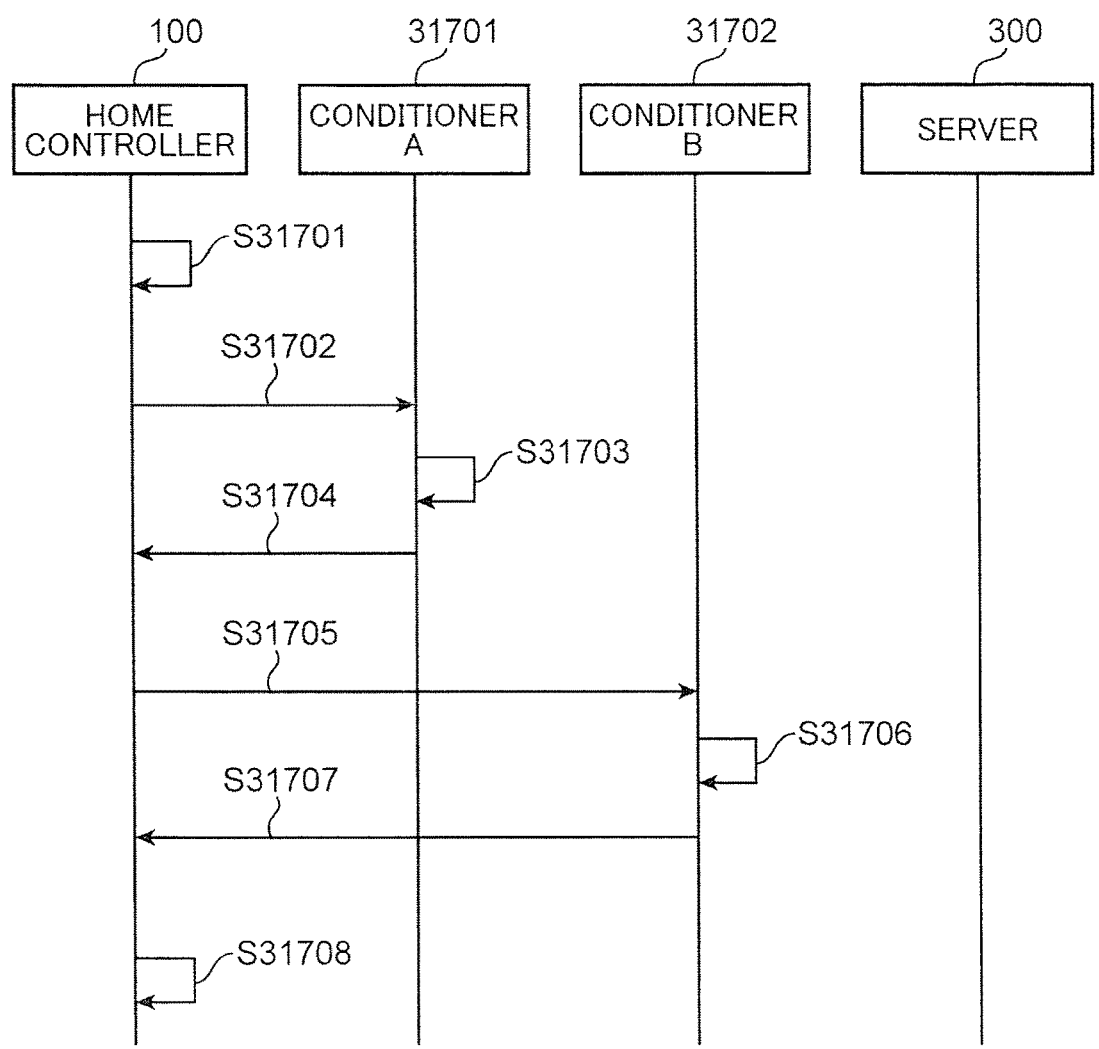
FIG. 87 is a diagram showing a device control sequence performed in the case where a plurality of air conditioners are installed in a room corresponding to the adjustment region, according to the present disclosure.

FIG. 87 is a diagram showing a device control sequence performed in the case where a plurality of air conditioners 201 are installed in a room corresponding to the adjustment region 31401. Note, in FIG. 87, that air conditioners A31701 and B31702 are the air conditioners to be controlled.

First, the touch panel control section 102 of the home controller 100 receives an operation performed on the device control screen 502 (S31701). In this case, the touch panel control section 102 receives an operation of swiping the contacting object 30603 in the adjustment region 31401.

Next, the device control section 106 transmits a control command to the air conditioner A31701 (S31702). In this case, the device control section 106 transmits a command for changing the set temperature 31601 of the air conditioner A31701 as the control command.

Next, upon receipt of the control command, the air conditioner A31701 executes the control command (S31703). In this case, the air conditioner A31701 changes the set temperature 31601 in accordance with the control command. Next, the air conditioner A31701 transmits the control result to the home controller 100 (S31704).

Next, the device control section 106 of the home controller 100 transmits a control command to the air conditioner B31702 as well in the same manner as done to the air conditioner A31701 (S31705), and thereby steps S31706 and S31707 are executed.

Next, the display control section 103 updates the display screen (S31708). In this case, assuming that the set temperature 31601 is changed from 19 degrees to 21 degrees as shown in FIG. 86, the set temperature 31601 displayed in the adjustment region 31401 is changed from 19 degrees to 21 degrees.

Figure 88:
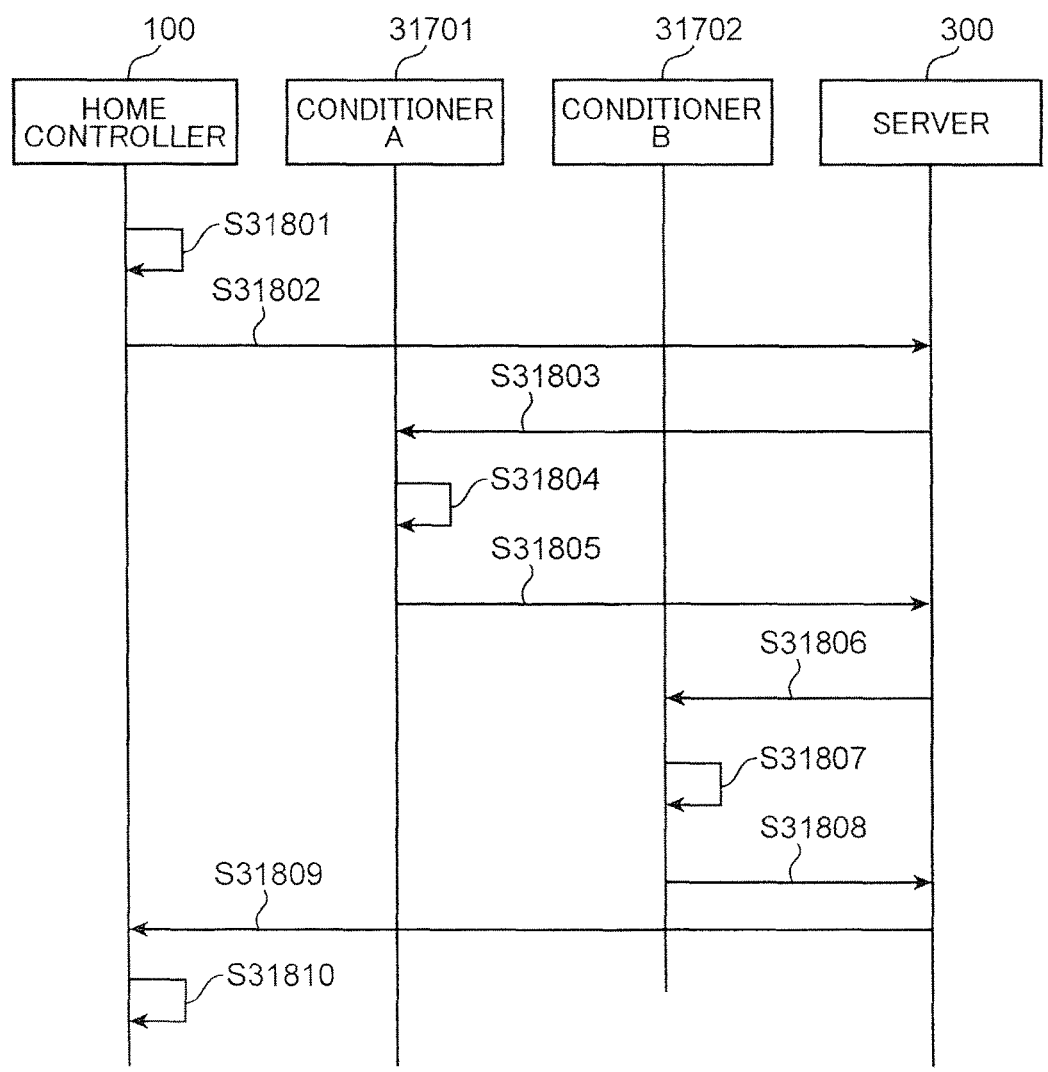
FIG. 88 is a diagram showing another example of the device control sequence performed in the case where a plurality of air conditioners are installed in a room corresponding to the adjustment region, according to the present disclosure.

FIG. 88 is a diagram showing another example of the device control sequence performed in the case where a plurality of air conditioners 201 are installed in a room corresponding to the adjustment region 31401. In FIG. 88, a control command is transmitted to the air conditioner A31701 and B31702 via the server 300.

The process S31801 is the same as the process S31701 shown in FIG. 87. Subsequently, the device control section 106 of the home controller 100 transmits a control command to the server 300 (S31802). Upon receipt of the control command, the server 300 transmits the control command to the air conditioner A31701 (S31803). Then, the air conditioner A31701 executes the received control command (S31804). The air conditioner A31701 then transmits the control result to the server 300 (S31805). Upon receipt of the control result, the server 300 transmits the control command to the air conditioner B31702 next (S31806). Upon receipt of the control command, the air conditioner B31702 executes the control command (S31807). The air conditioner B31702 then transmits the control result to the server 300 (S31808). Next, the server 300 transmits the received control results to the home controller 100 (S31809). Subsequently, the display control section 103 updates the display screen in the same manner as done in the process S31708 shown in FIG. 87 (S31810).

In the case where a plurality of air conditioners 201 are installed in a room corresponding to the adjustment region 31401 as described above, the adjustment region 31401 functions as the device control screen 502 shared by the plurality of air conditioners 201. Thus, the user can change the set temperatures of the plurality of air conditioners 201 at once.

Figure 89:
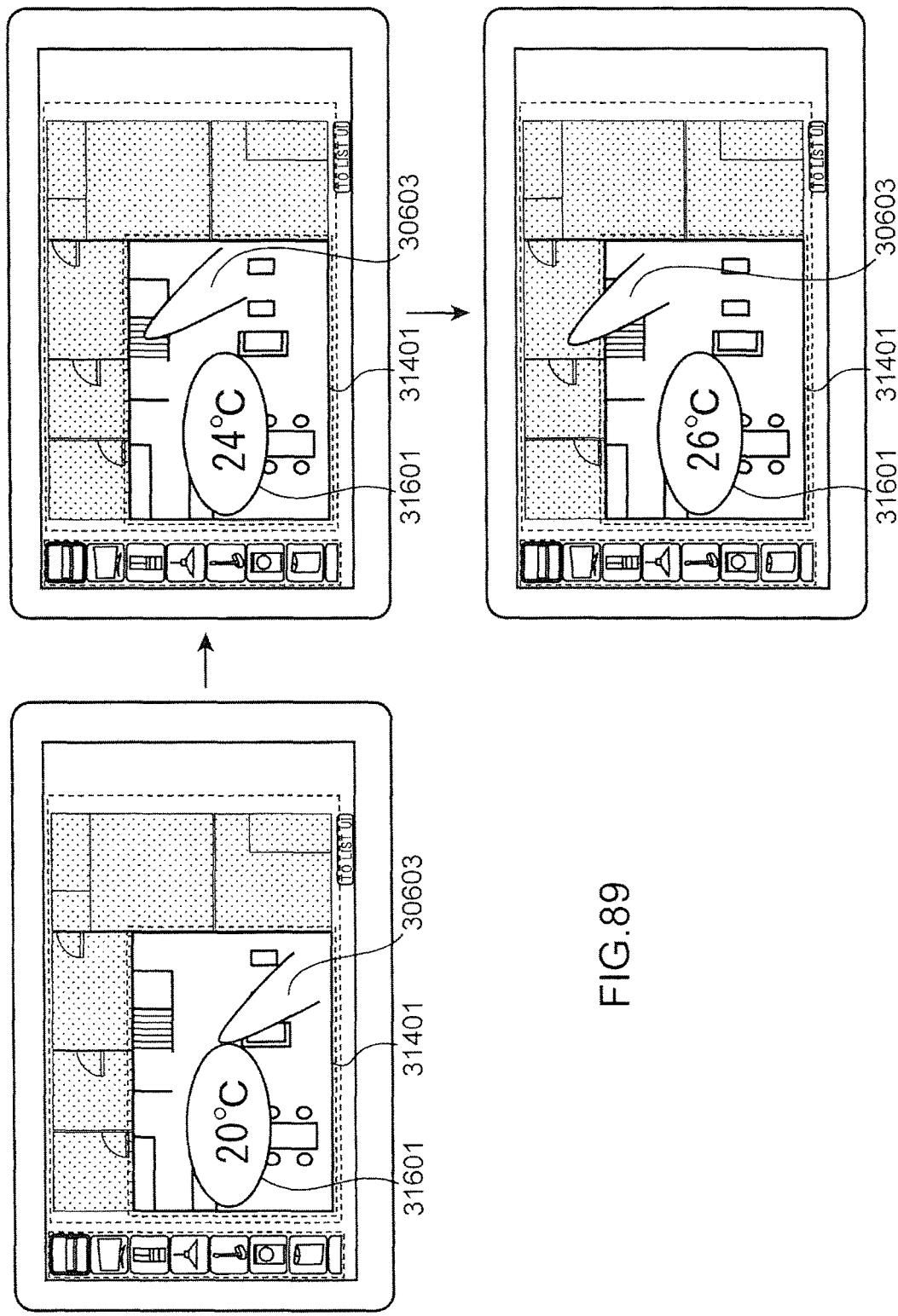
FIG. 89 is a diagram showing an example of operating the set temperature of the air conditioner using the adjustment region, according to the present disclosure.

FIG. 89 is a diagram showing an example of operating the set temperature 31601 of the air conditioner 201 using the adjustment region 31401. In the example shown in FIG. 89, the contacting object 30603 is swiped upward in the adjustment region 31401, as shown from the upper left diagram to the upper right diagram and then to the lower right diagram. In the upper right diagram the contacting object 30603 is located within the adjustment region 31401, whereas in the lower right diagram the contacting object 30603 is located outside the adjustment region 31401. In the example shown in FIG. 89, even when the contacting object 30603 is moved to the outside of the adjustment region 31401, the level of change in the set temperature 31601 is determined by additionally considering the swipe distance at the part beyond which the contacting object 30603 is moved. Therefore, as shown from the upper right diagram to the lower right diagram, the set temperature 31601 is increased from 24 degrees to 26 degrees.

Specifically, the touch panel control section 102 determines that, if the swipe starting point is located within the adjustment region 31401, swiping of the contacting object 30603 in the adjustment region 31401 has been started. Then, the display control section 103 and the device control section 106 considers the swipe distance outside the adjustment region 31401 as valid, even when the contacting object 30603 is swiped to the outside of the adjustment region 31401, and determines the level of change in the set temperature 31601.

The example shown in FIG. 89 illustrates how the temperature is increased. However, even when lowering the temperature, the touch panel control section 102 lowers the temperature by additionally considering the swipe distance at the part of the adjustment region 31401 beyond which the contacting object is moved, in the same manner done when increasing the temperature. Note, as with the configuration shown in FIG. 86, when the contacting object 30603 is swiped upward in the adjustment region 31401 the set temperature 31601 is increased, but when the contacting object 30603 is swiped downward the set temperature 31601 is lowered.

Figure 90:
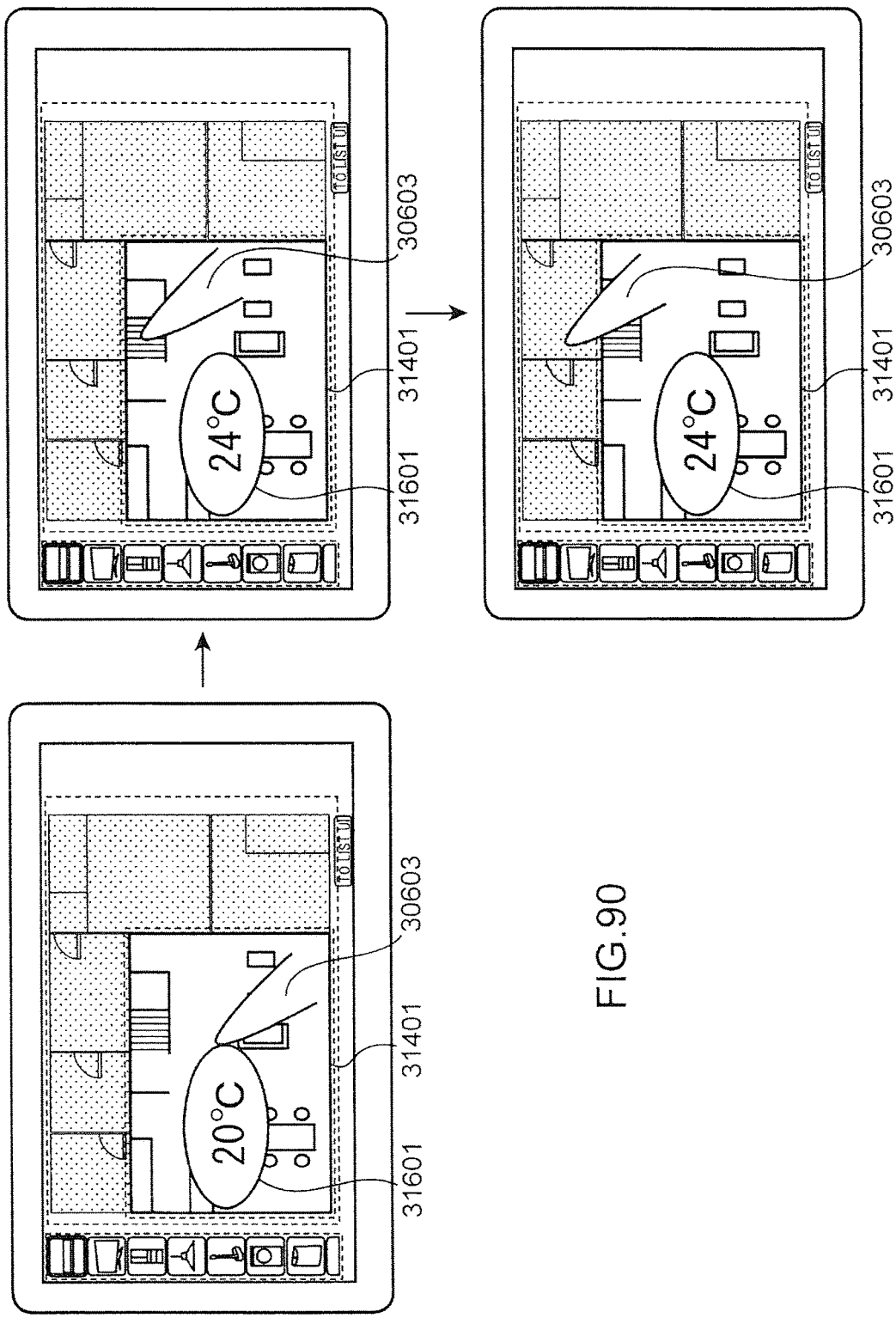
FIG. 90 is a diagram showing an example of operating the set temperature of the air conditioner using the adjustment region, according to the present disclosure.

FIG. 90 is a diagram showing an example of operating the set temperature of the air conditioner 201 using the adjustment region 31401. The difference with FIG. 89 is that, in FIG. 90, the operation of changing the set temperature 31601 is not taken into consideration in a part of the adjustment region 31401 beyond which the contacting object 30603 is moved.

In the upper right diagram of FIG. 90 the contacting object 30603 is located within the adjustment region 31401, whereas in the lower right diagram the contacting object 30603 is located outside the adjustment region 31401. In the example shown in FIG. 90, the swipe distance at the part of the adjustment region 31401 beyond which the contacting object 30603 is moved, is not considered as the swipe distance based on which the set temperature 31601 is to be changed. Therefore, the set temperature 31601 is kept at 24 degrees throughout the upper right diagram and the lower right diagram.

Specifically, when the contacting object 30603 is moved past the adjustment region 31401, the display control section 103 and the device control section 106 obtain the distance between the point where the swipe trajectory intersects with the outer periphery of the adjustment region 31401 and the swipe starting point as the swipe distance, and then determine the level of change in the set temperature 31601 in accordance with this swipe distance. Note that FIG. 90 illustrates a case where the set temperature 31601 is increased. However, even when lowering the set temperature 31601, the set temperature 31601 is changed without taking into consideration a part of the adjustment region 31401 beyond which the contacting objects is moved, in the same manner as done when increasing the set temperature.

Figure 91A:
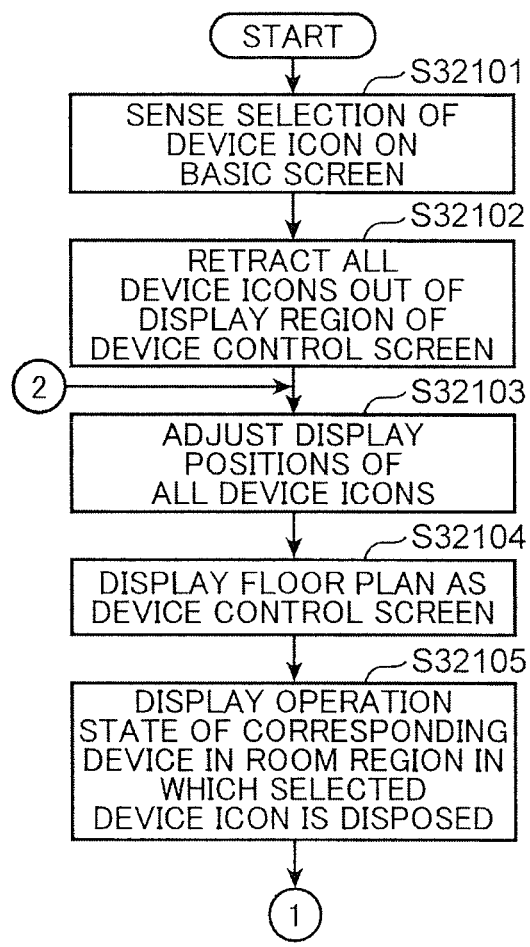
FIG. 91A is a flowchart showing another example of the process for the home controller to control a device, according to the present disclosure.
Figure 91B:
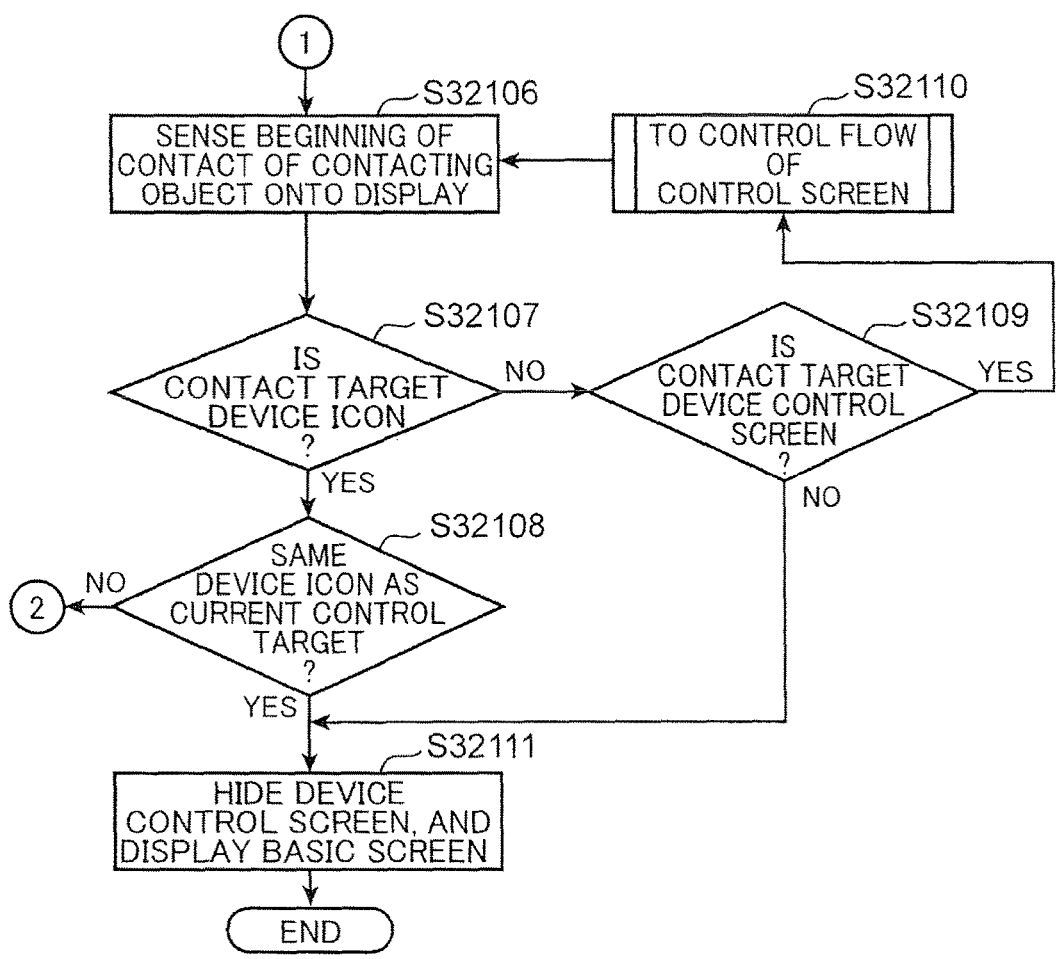
FIG. 91B is a flowchart showing another example of the process for the home controller to control a device, according to the present disclosure.

FIGS. 91A and 91B are each a flowchart showing another example of the process for the home controller 100 to control the device 200, according to the present disclosure.

Steps S32101 to S32103 are the same as steps S31001 to S31003 shown in FIG. 80A. In step S32104, the display control section 103 displays the floor plan 500 as the device control screen 502 (S32104). In this case, the floor plan 500 having the adjustment region 31401 thereon is displayed as the air conditioner control screen 31400, the adjustment region 31401 corresponding to a room that is installed with the air conditioner 201 selected as a target of operation, as shown in FIG. 85.

Next, the display control section 103 displays the operation state of the device 200 corresponding to the room region where the selected device icon 501 is disposed (S32105). In this case, the set temperature 31601 is displayed in the adjustment region 31401, as shown in FIG. 86.

Steps S32106 to S32108 are the same as steps S31006 to S31008 shown in FIG. 80B. In step S32109, when the contact target is the device control screen 502 (YES in S32109), the control flow of the device control screen 502 (see FIG. 41) is executed (S32110), and the process is returned to S32106. Here, in the case where the adjustment region 31401 is contacted by the contacting object 30603 in FIG. 86, the result of S32109 is determined as YES, but in the case where the adjustment region 31401 is not contacted by the contacting object 30603, the result of S32109 is determined as NO. Step S32111 is the same as step S31011 shown in FIG. 80B.

Figure 92:
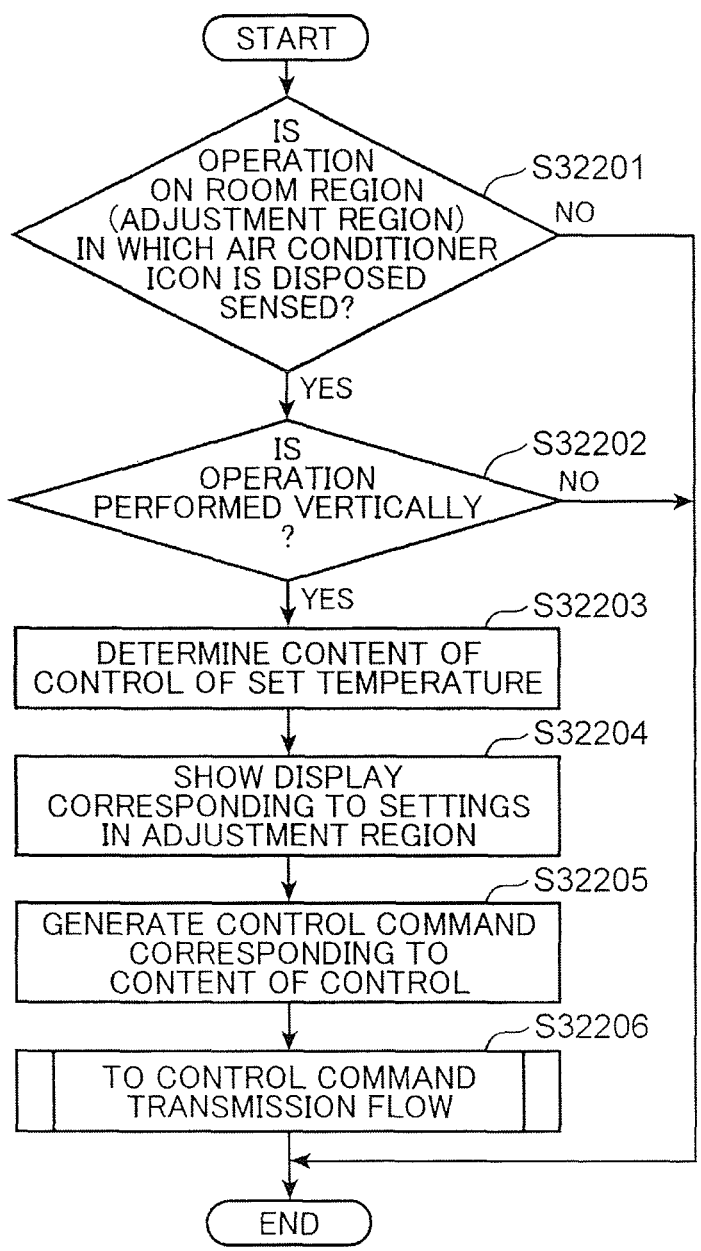
FIG. 92 is a flowchart showing S32110 of FIG. 91B, a control flow of the device control screen, according to the present disclosure.

FIG. 92 is a flowchart showing S32110 of FIG. 91B, the control flow of the device control screen 502. First, in the case where the touch panel control section 102 senses an operation performed on a region on the floor plan 500 (the adjustment region 31401) that corresponds to a room in which the air conditioner icon 30101 is disposed (YES in S32201), the process is advanced to S32202. When the touch panel control section 102 does not sense the operation (NO in S32201), the process is ended.

When the operation sensed by the touch panel control section 102 is the operation of moving the contacting object up and down (YES in S32202), the process is advanced to S32203. When the operation sensed by the touch panel control section 102 is an operation other than the operation of moving the contacting object 30603 up and down (NO in S32202), the process is ended. Here, in the case where the contacting object 30603 is swiped upward or downward in the adjustment region 31401, the result of S32202 is determined as YES.

Next, the device control section 106 determines the content of control of the set temperature 31601 (S32203). Here, in the case where the contacting object 30603 is swiped upward in the adjustment region 31401, the device control section 106 determines, as the content of control, the content indicating that the current set temperature 31601 is changed based on the level of change in the set temperature 31601 in accordance with the swipe distance.

Next, the display control section 103 shows display complying with the settings of the adjustment region 31401 (S32204). In this case, the set temperature 31601 is displayed in the adjustment region 31401, as shown in FIG. 86.

Subsequently, the device control section 106 generates a control command corresponding to the content of control (S32205). In this case, the device control section 106 generates a control command for changing the current set temperature 31601 based on the level of change corresponding to the swipe distance of the contacting object 30603 in the adjustment region 31401, as shown in FIG. 86. Next, the control command transmission flow (see FIG. 41) is executed (S32206).

Figure 93:
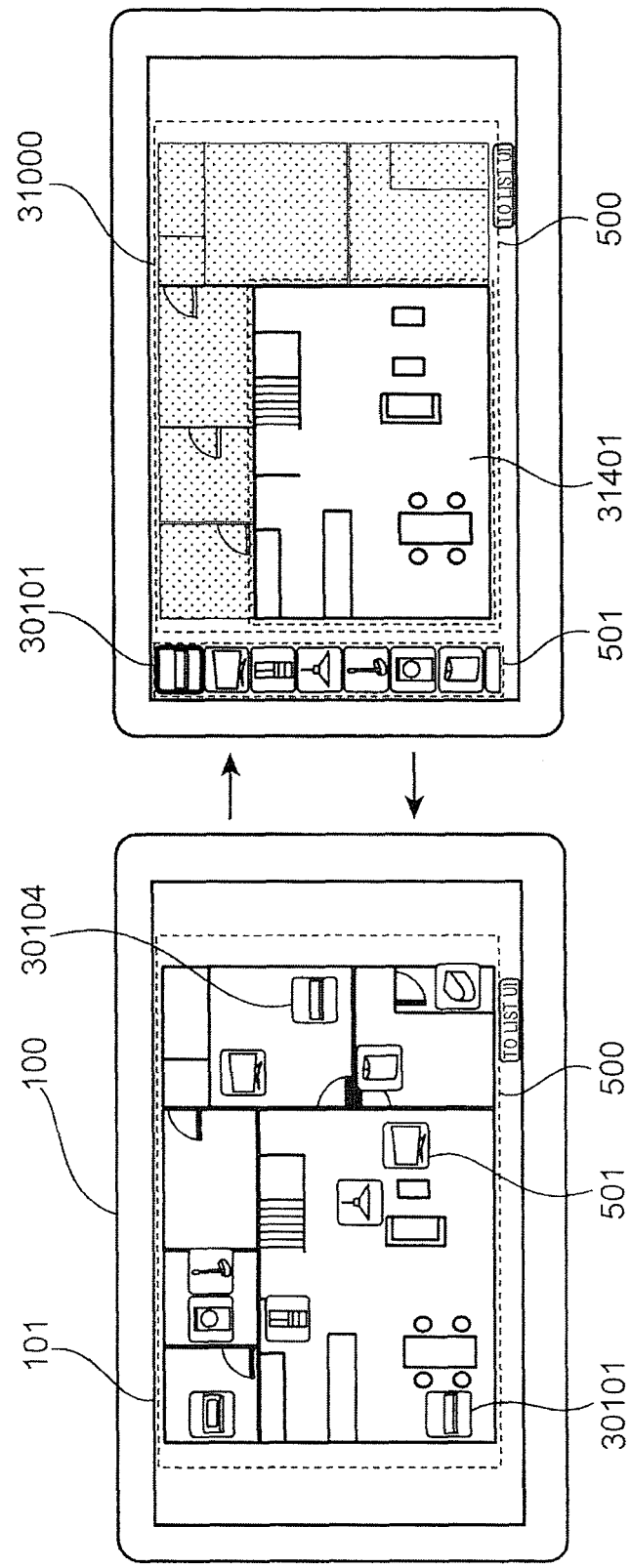
FIG. 93 is a diagram showing another example of the transition between a display state of the basic screen and a display state of the air conditioner control screen, according to the present disclosure.
Figure 94:
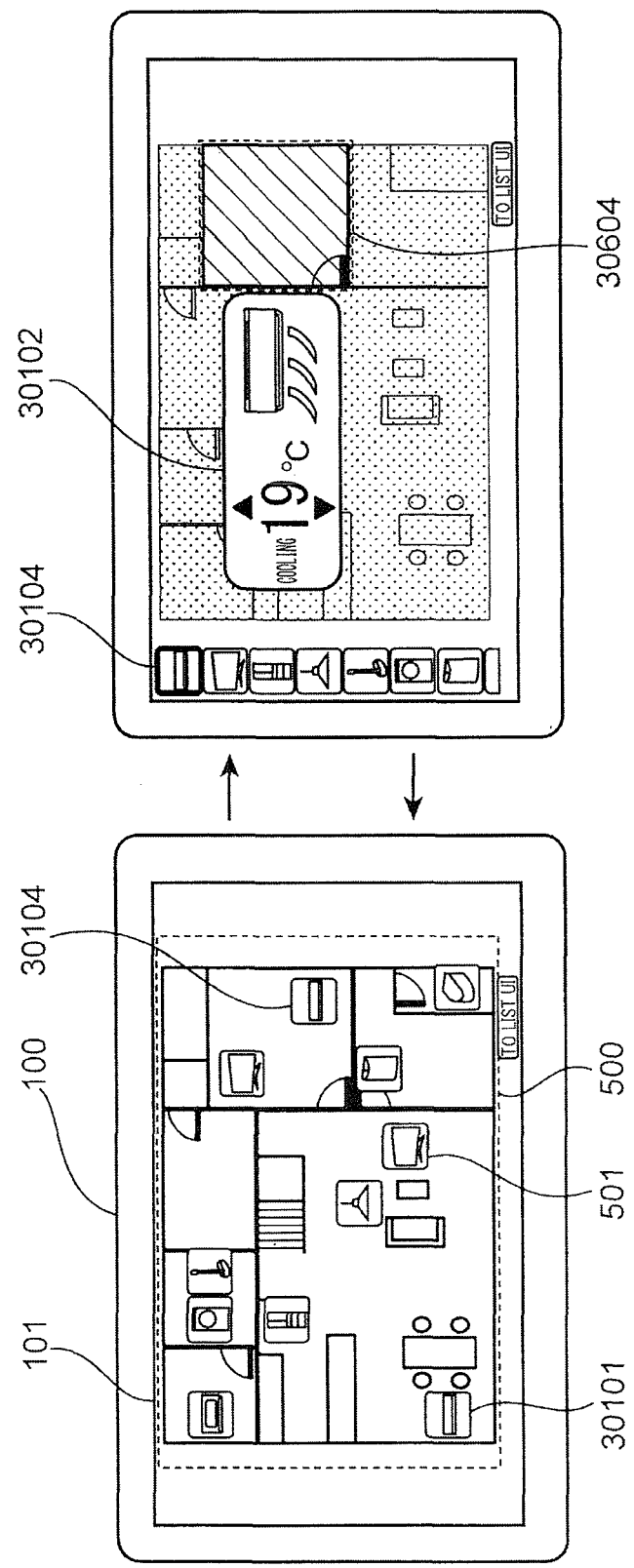
FIG. 94 is a diagram showing another example of the transition between a display state of the basic screen and a display state of the air conditioner control screen, according to the present disclosure.

FIGS. 93 and 94 are each a diagram showing another example of the transition between a display state of the basic screen and a display state of the air conditioner control screen 30102. In the basic screen shown in the left diagram of FIG. 93, the user taps on the air conditioner icon 30101, and then the touch panel control section 102 senses the tap. Consequently, the display control section 103 switches the floor plan 500 to an air conditioner control screen 31000. The air conditioner control screen 31000 is the same as the air conditioner control screen 31400 shown in FIG. 84, and includes the adjustment region 31401 for adjusting the set temperature of the air conditioner 201. In this case, because the area of a room region on the floor plan 500 in which the air conditioner icon 30101 is disposed is larger than a certain size, the display control section 103 switches the floor plan 500 to the air conditioner control screen 31000.

When, on the other hand, the user taps on an air conditioner icon 30104 shown in FIG. 94 and the touch panel control section 102 senses the tap, the display control section 103 displays the air conditioner control screen 30102 (an example of the adjustment screen) as overlapped on the floor plan 500. The air conditioner control screen 30102 is a dedicated screen prepared separately from the floor plan 500 in order to control the air conditioner 201.

Because the area of a room region in which the air conditioner icon 30104 is disposed is equal to or less than a certain size, the display control section 103 displays the air conditioner control screen 30102 in place of the air conditioner control screen 31000. A control target region 30604 is the room region in which the air conditioner icon 30104 is disposed.

As long as the area of a room region corresponding to the room installed with the air conditioner 201 to be operated is greater than a certain size, the room region is set as the adjustment region 31401, as shown in FIG. 93. As a result, the floor plan 500 that is already displayed can be applied to the adjustment screen for the air conditioner 201, minimizing the use of another operation screen.

However, in the case where the area of a room region corresponding to the room installed with the air conditioner 201 is equal to or less than a certain size, and when this room region is set as the adjustment region 31401, such small area of the adjustment region 31401 makes a user operation difficult. For this reason, in the example shown in FIG. 94, the air conditioner control screen 30102 is displayed when the area of a room region corresponding to the room installed with the air conditioner 201 is equal to or less than a certain size. In this case, the air conditioner control screen 30102 is in a certain size in view of user operability, preventing deterioration of the operability. Note that the area that is too small for the user to sufficiently perform a swipe operation is employed as the certain size.

Here, the display control section 103 may refer to the device list 33200A shown in FIG. 102 and the room information 33100 shown in FIG. 101, to calculate the area on the floor plan 500 that corresponds to a room in which the air conditioner icon 30101 selected by the user is disposed. For instance, when the device ID 33201 of the air conditioner 201 that corresponds to the air conditioner icon 30101 is "A," the display control section 103 specifies the arrangement position of the air conditioner icon 30101 (X10, Y80, Z1) from arrangement 33204. Next, the display control section 103 refers to the room information 33100 shown in FIG. 101 and the vertex information 2800 shown in FIG. 31, to specify a room region to which the specified arrangement position (X10, Y80, Z1) belongs. It is assumed here that a living room region is specified. Then, the display control section 103 determines the area of the room region in which the air conditioner icon 30101 is disposed, from area 33104 of the specified room region. In this case, because the areas of actual rooms are registered in the area 33104, the area of the living room region, 24.3 square meters, is determined. In the case where the area 33104 is not registered in the room information 33100, the display control section 103 may calculate the area of a room region based on the vertices of the room region registered in space coordinate 33103. As shown in the example shown in FIG. 101, the living room is surrounded by the vertices F, G, H, I, L, O and N. Therefore, the display control section 103 may specify the coordinates of each of these vertices from the vertex information 2800 shown in FIG. 31, to obtain the area of the living room region by using the specified coordinates of each vertex.

In FIG. 101, the actual area of a room is adopted as the area 33104. In this case, the display control section 103 may convert the actual area into the area on the floor plan 500, to determine whether the area of the relevant room region is equal to or less than a certain size. Alternatively, the display control section 103 may store, as the certain size, the area corresponding to an actual room beforehand, compare this certain size with the area 33104, and determine whether the area of the relevant room region is equal to or less than the certain size.

Figure 95:
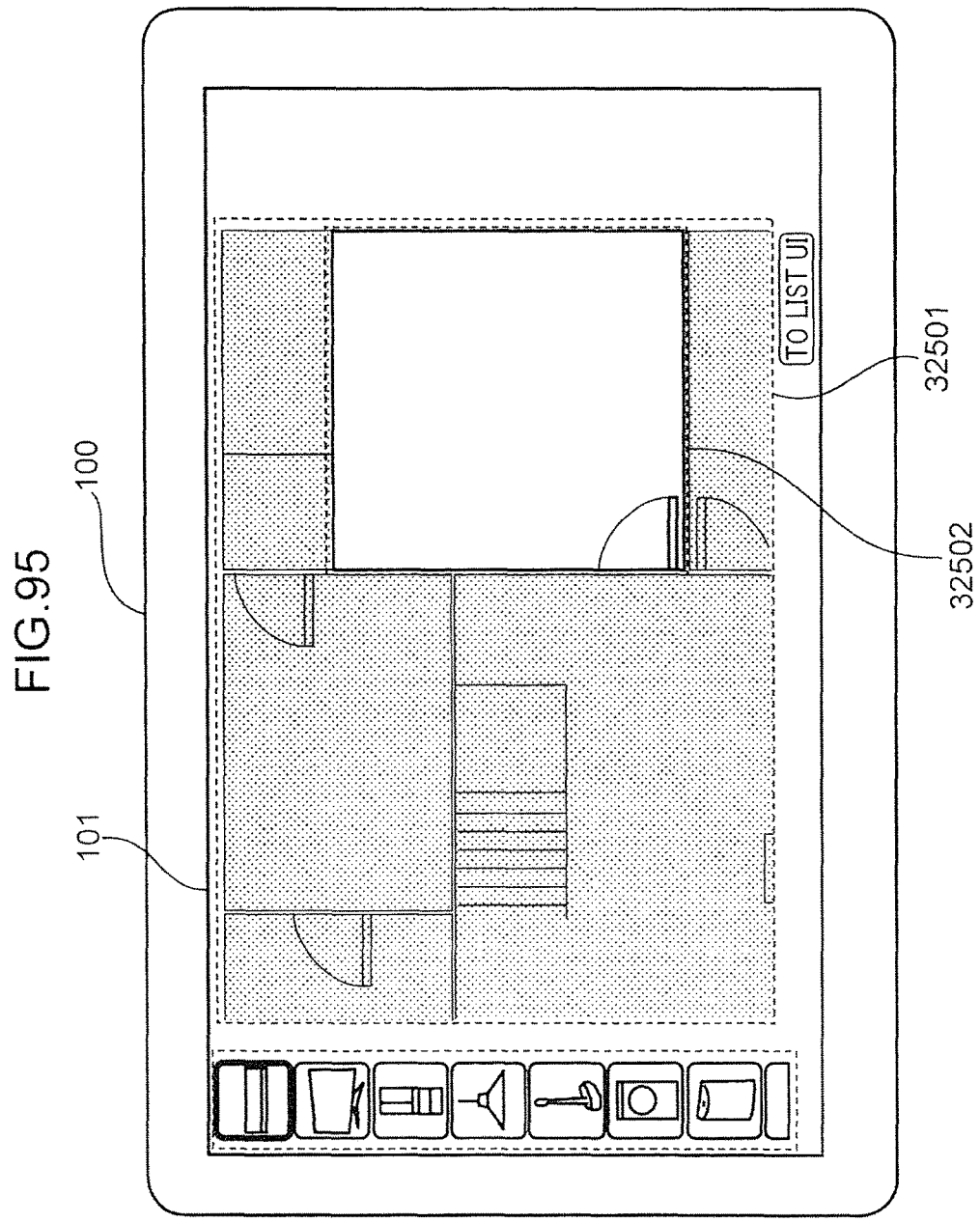
FIG. 95 is a diagram showing another example of the adjustment region displayed when an air conditioner icon disposed in a room region of certain size or smaller is selected, according to the present disclosure.

FIG. 95 is a diagram showing another example of an adjustment region 32502 displayed when the air conditioner icon 30104 disposed in a room region of certain size or smaller is selected.

The example in FIG. 95 shows, in place of the air conditioner control screen 30102, the control target region 30604 included in an expanded floor plan 32501, as the adjustment region 32502 for adjusting the air conditioner 201. In this case, even when the area of a room region is equal to or less than a certain size, the user can operate the air conditioner 201 with the same operation performed when the room region is greater than the certain size.

Here, the display control section 103 sets an enlargement scale of the floor plan 500 so that the control target region 30604 is enlarged up to the area in which the user can sufficiently perform a swipe operation. The display control section 103 then obtains the floor plan 500 enlarged at the set enlargement scale as the floor plan 32501 and displays this floor plan 32501 on the display 101.

For example, a value at which the control target region 30604 is enlarged up to a predetermined size in which the user can sufficiently perform a swipe operation, may be adopted as the enlargement scale.

Figure 96:
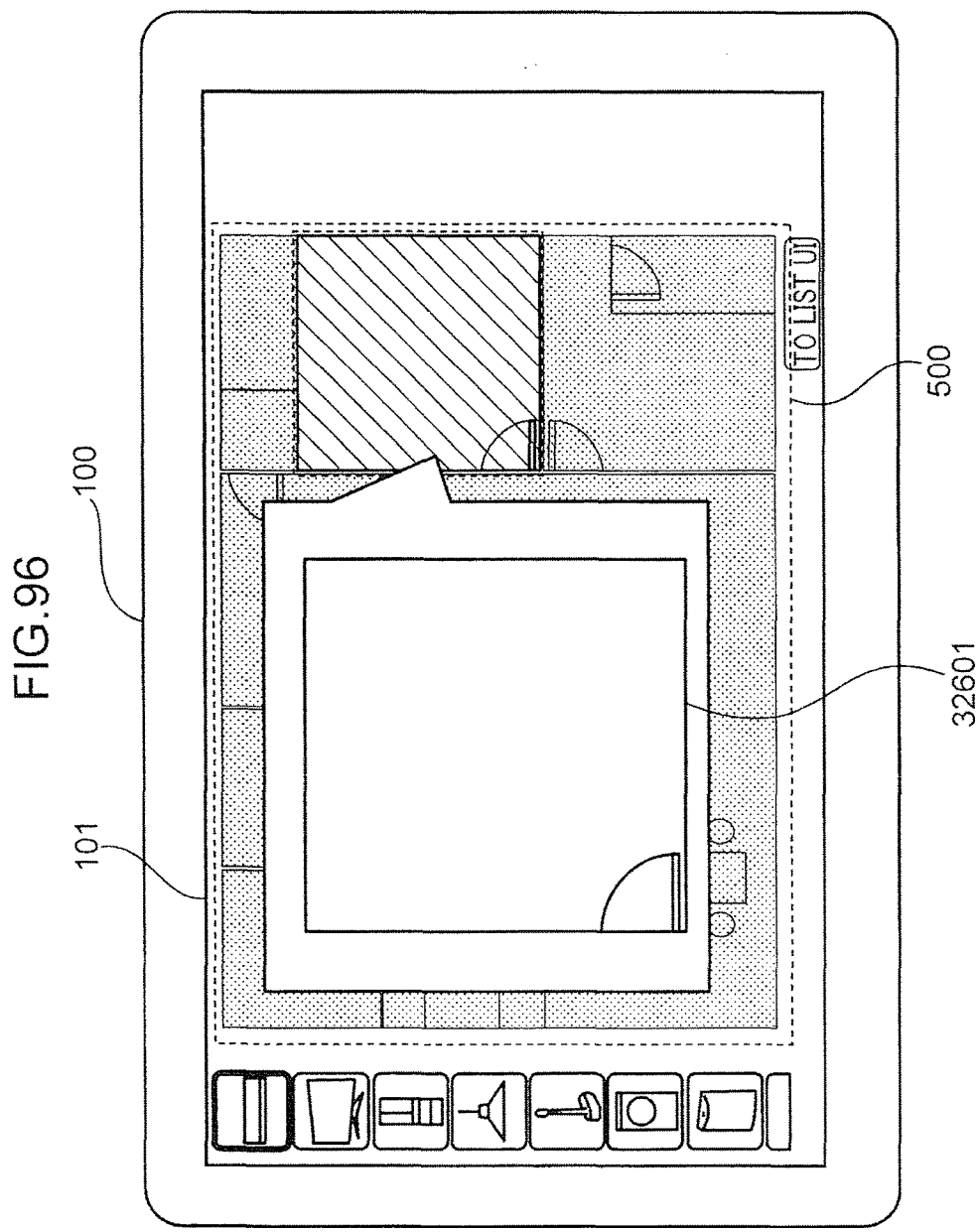
FIG. 96 is a diagram showing yet another example of the adjustment region displayed when an air conditioner icon disposed in a room region of certain size or smaller shown in FIG. 94 is selected, according to the present disclosure.

FIG. 96 is a diagram showing yet another example of an adjustment region 32601 displayed when the air conditioner icon 30104 disposed in a room region of certain size or less shown in FIG. 94 is selected.

In case of FIG. 96, the display control section 103 cuts out a room region in which the air conditioner icon 30104 is disposed, enlarges this room region at a predetermined enlargement scale, generates the resultant region as the adjustment region 32601, and displays the generated adjustment region 32601 as overlapped on the floor plan 500. In the example shown in FIG. 96, the adjustment region 32601 is displayed in such a manner as to not overlap with a corresponding room region. Therefore, the enlargement scale applied for generating the adjustment region 32601 may employ, for example, a value that allows the adjustment region 32601 to be displayed as large as possible within the range of the floor plan 500 but prevents the adjustment region 32601 from overlapping with the room region in which the air conditioner icon 30104 is disposed. The enlargement scale applied for generating the adjustment region 32601 may also employ, for example, a value at which the area of the room region in which the air conditioner icon 30104 is disposed is expanded to a predetermined size.

Here, the adjustment region 32601 may be displayed in such a manner that, for example, the center thereof is positioned at the center of the display region of the display 101 or at the center of the floor plan 500. This allows the adjustment region 32601 to be displayed at a conspicuous position within the display region of the display 101, enabling easy user operations.

The room region in which the air conditioner icon 30104 is disposed has the color complying with the set temperature, as with the configuration shown in FIG. 75. Furthermore, a gray layer is displayed in a region on the floor plan 500 other than the room region in which the air conditioner icon 30104 is disposed. As a result, the room region in which the air conditioner icon 30104 is disposed can be emphasized over the other regions, enabling user operation with presence.

In the example shown in FIG. 96, the background of the adjustment region 32601 is displayed in a bright color (e.g., white). This background is in the shape of a balloon mark blowing out of the relevant room region. This allows the user to promptly recognize the room region represented by the adjustment region 32601.

Figure 97:
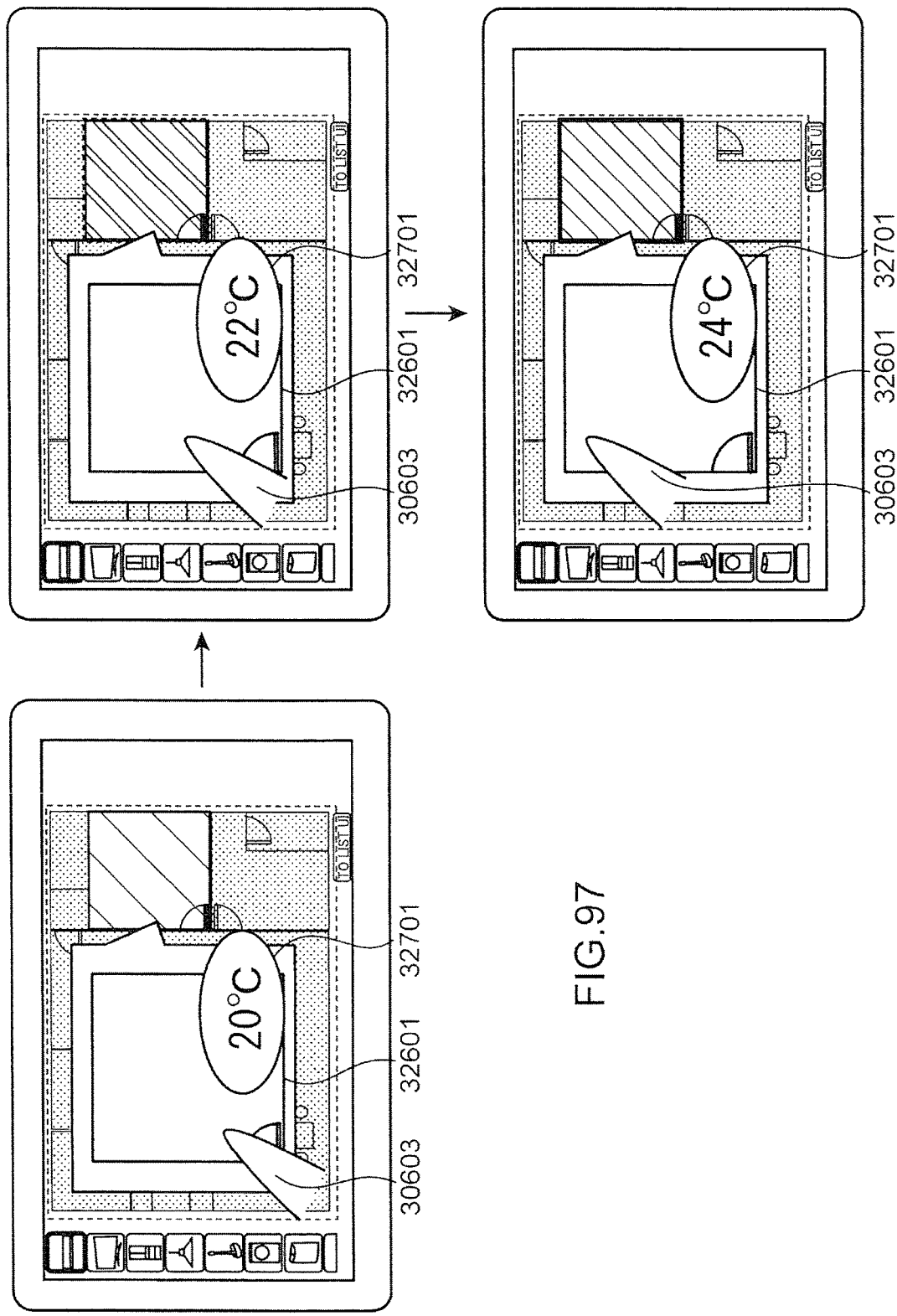
FIG. 97 is a diagram showing an operation example in which the adjustment region shown in FIG. 96 is used, according to the present disclosure.

FIG. 97 is a diagram showing an operation example in which the adjustment region 32601 shown in FIG. 96 is used. A set temperature 32701 is displayed in the adjustment region 32601. It is assumed that the touch panel control section 102 senses an upward swipe operation of the contacting object 30603 in the adjustment region 32601. Then, the display control section 103 raises the set temperature 32701 in response to the upward swipe distance. As shown in the examples in the upper left diagram and the upper right diagram of FIG. 97, the set temperature 32701 is increased from 20 degrees to 22 degrees in response to the upward swipe distance. Similarly, as shown in the examples in the upper right diagram and the lower right diagram of FIG. 97, the set temperature 32701 is increased from 22 degrees to 24 degrees. In addition, the color of the room region corresponding to the adjustment region 32601 changes as the set temperature 32701 changes over the course from the upper left diagram to the upper right diagram and then to the lower right diagram. Because the set temperature 32701 is increased in the example shown in FIG. 97, the color of the room region is changed to a dark color.

When, on the other hand, the contacting object 30603 is swiped downward in the adjustment region 32601, the set temperature 31601 is dropped from 24 degrees to 22 degrees and then to 20 degrees over the course from the lower right diagram to the upper right diagram and then to the upper left diagram in FIG. 97.

In the case where two or more of the air conditioners 201 are installed in the room corresponding to the adjustment region 32601, the adjustment region 32601 is used as the device control screen 502 for adjusting the set temperatures 32701 of the plurality of air conditioners 201 at once.

Also, in the ease where the contacting object 30603 in the adjustment region 32601 is moved past the adjustment region 32601, the display control section 103 and the device control section 106 may or may not consider that the part beyond which the contacting object is moved is valid, and change the set temperature 32701.

Although, in the example shown in FIG. 97, the set temperature 32701 is changed in accordance with the swipe distance of the contacting object 30603 in the adjustment region 32601, the present disclosure is not limited thereto, and thus the set temperature 32701 may be changed in accordance with the direction in which the contacting object 30603 is swiped in the adjustment region 32601. Changing the set temperature 32701 in accordance with the swipe direction was described in detail with reference to FIG. 82; thus, the overlapping explanation is omitted here. In addition, when changing the set temperature 32701 in accordance with the swipe direction, the level of change in the set temperature 32701 may be determined by additionally considering the part of the adjustment region 32601 beyond which the contacting object is moved. The level of change in the set temperature 32701 may also be determined without taking into consideration the part of the adjustment region 32601 beyond which the contacting object is moved.

Figure 98A:
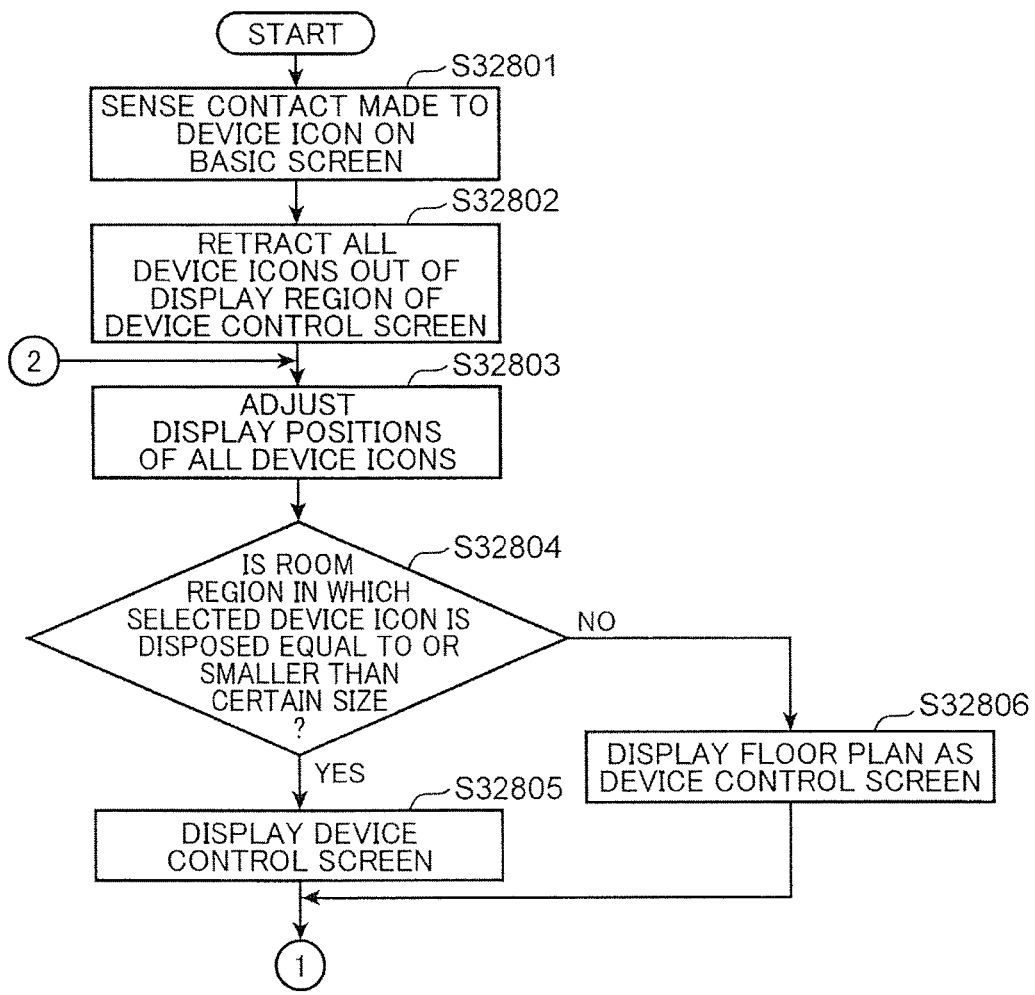
FIG. 98A is a flowchart showing yet another example of the process for the home controller to control a device, according to the present disclosure.
Figure 98B:
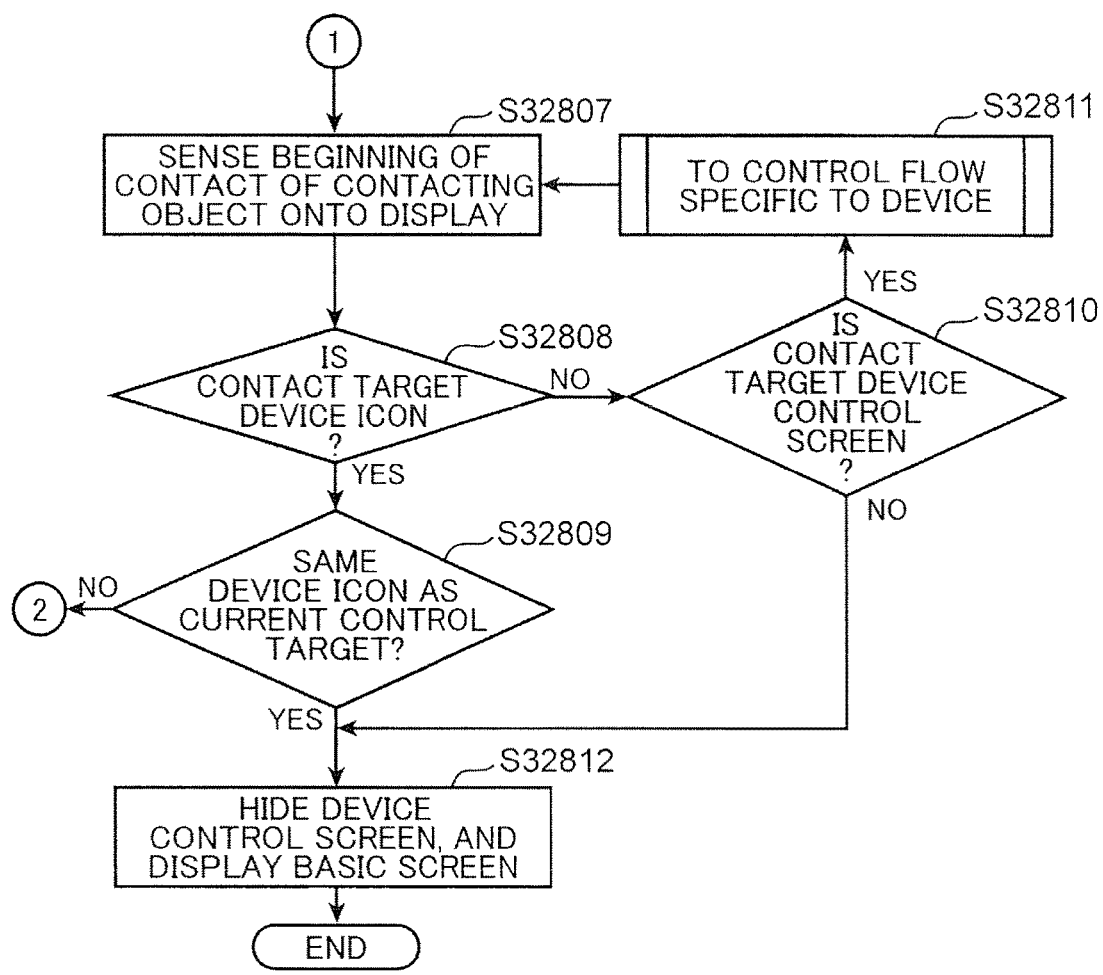
FIG. 98B is a flowchart showing yet another example of the process for the home controller to control a device, according to the present disclosure.

FIGS. 98A and 98B are each a flowchart showing yet another example of the process for the home controller 100 to control the device 200, according to the present disclosure.

Steps S32801 to S32803 are the same as steps S31001 to S31003 shown in FIG. 80A. In S32804, when the area of the room region in which the selected device icon 501 is disposed is equal to or less than a certain size (YES in S32804), the device control section 103 displays the device control screen 502 (S32805). In this case, the air conditioner control screen 30102 shown in the right diagram of FIG. 94 is displayed.

When, on the other hand, the area of the room region in which the selected device icon 501 is disposed is larger than the certain size (NO in S32804), the device control section 103 displays the floor plan 500 as the device control screen 502 (S32806).

Here, the air conditioner control screen 31000 that includes the adjustment region 31401 shown in the right diagram of FIG. 93 is displayed as the device control screen 502. Steps S32807 to S32809 are the same as steps S31006 to S31008 shown in FIG. 80B.

In S32810, if the contact target is the device control screen 502 (YES in S32810), a control flow that is specific to the device is executed (S32811), and the process is returned to S32807. Here, in the case where the adjustment region 31401 shown in the right diagram of FIG. 93 or the air conditioner control screen 30102 shown in the right diagram of FIG. 94 is contacted by the contacting object 30603, the result of S32810 is determined as YES. In the case where the adjustment region 31401 or the air conditioner control screen 30102 is not contacted by the contacting object 30603, the result of S32810 is determined as NO. Next, the control flow that is specific to the device is executed (S32811). This step S32811 corresponds to the flows shown in FIGS. 81, 83 and 92.

Figure 99B:
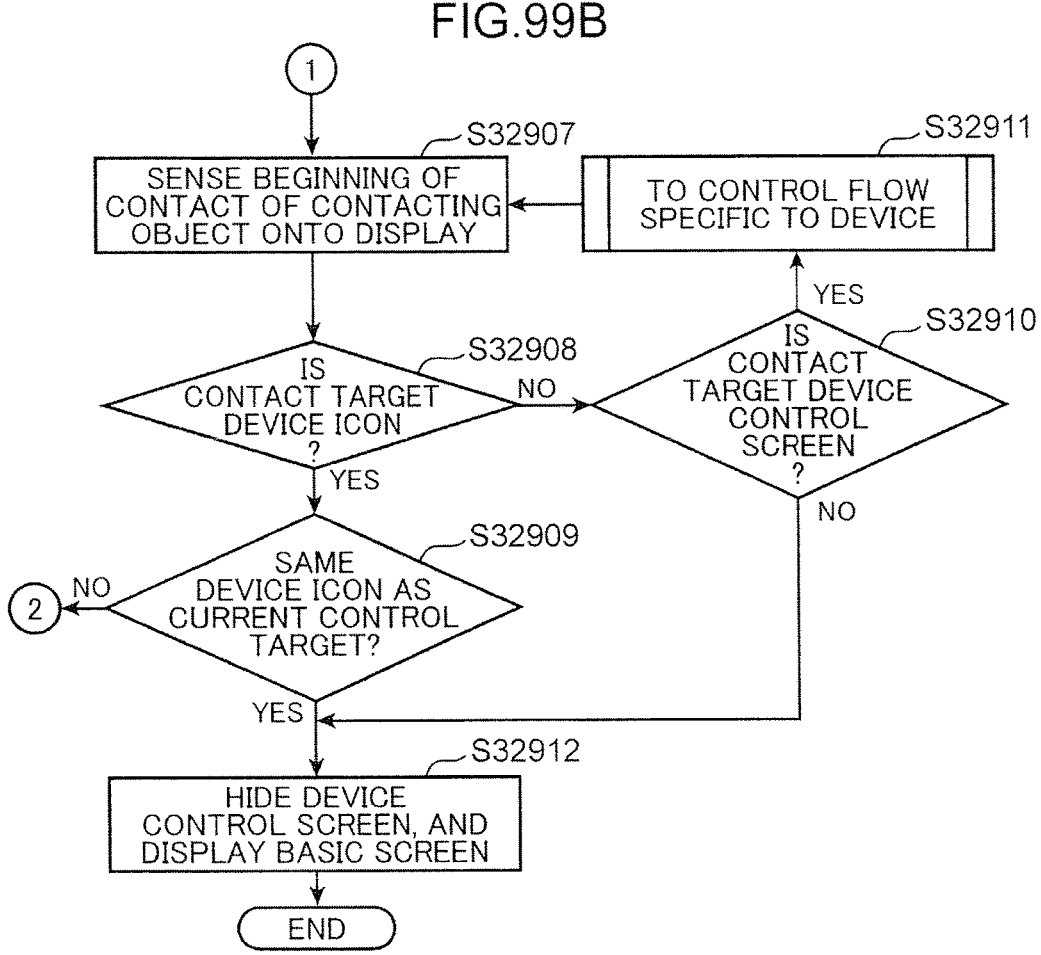
FIG. 99B is a flowchart showing yet another example of the process for the home controller to control a device, according to the present disclosure.

FIGS. 99A and 99B are each a flowchart showing yet another example of the process for the home controller 100 to control the device 200, according to the present disclosure.

Steps S32901 to S32903 are the same as steps S31001 to S31003 shown in FIG. 80A. In S32904, when the area of the room region in which the selected device icon 501 is disposed is equal to or less than a certain size (YES in S32904), the device control section 103 enlarges the room region and displays it as an adjustment region (S32905). In this case, the expanded floor plan 32501 shown in FIG. 95 or the expanded room region shown in FIG. 96 is set as the adjustment region 32601, and the floor plan 500 overlapped with this adjustment region 32601 is displayed.

When, on the other hand, the area of the room region in which the selected device icon 501 is disposed is larger than the certain size (NO in S32904), the display control section 103 displays the floor plan 500 as the device control screen 502 (S32906). In this case, the air conditioner control screen 31000 in which the adjustment region 31401 shown in the right diagram of FIG. 93 is set as the device control screen 502, is displayed. Steps S32907 to S32909 are the same as steps S31006 to S31008 shown in FIG. 80B.

In S32910, if the contact target is not the device control screen 502 (NO in S32910), the process is advanced to S32912. Step S32921 is the same as step S31011 shown in FIG. 80B. Here, in the case where the adjustment region 31401 shown in the right diagram of FIG. 93, the adjustment region 32502 shown in FIG. 95, or the adjustment region 32601 shown in FIG. 96 is contacted by the contacting object 30603, the result of S32910 is determined as YES, but in other cases, the result of S32910 is determined as NO.

Next, a control flow that is specific to the device is executed (S32911). This step S32911 corresponds to the flows shown in FIGS. 81, 83 and 92.

Figure 100:
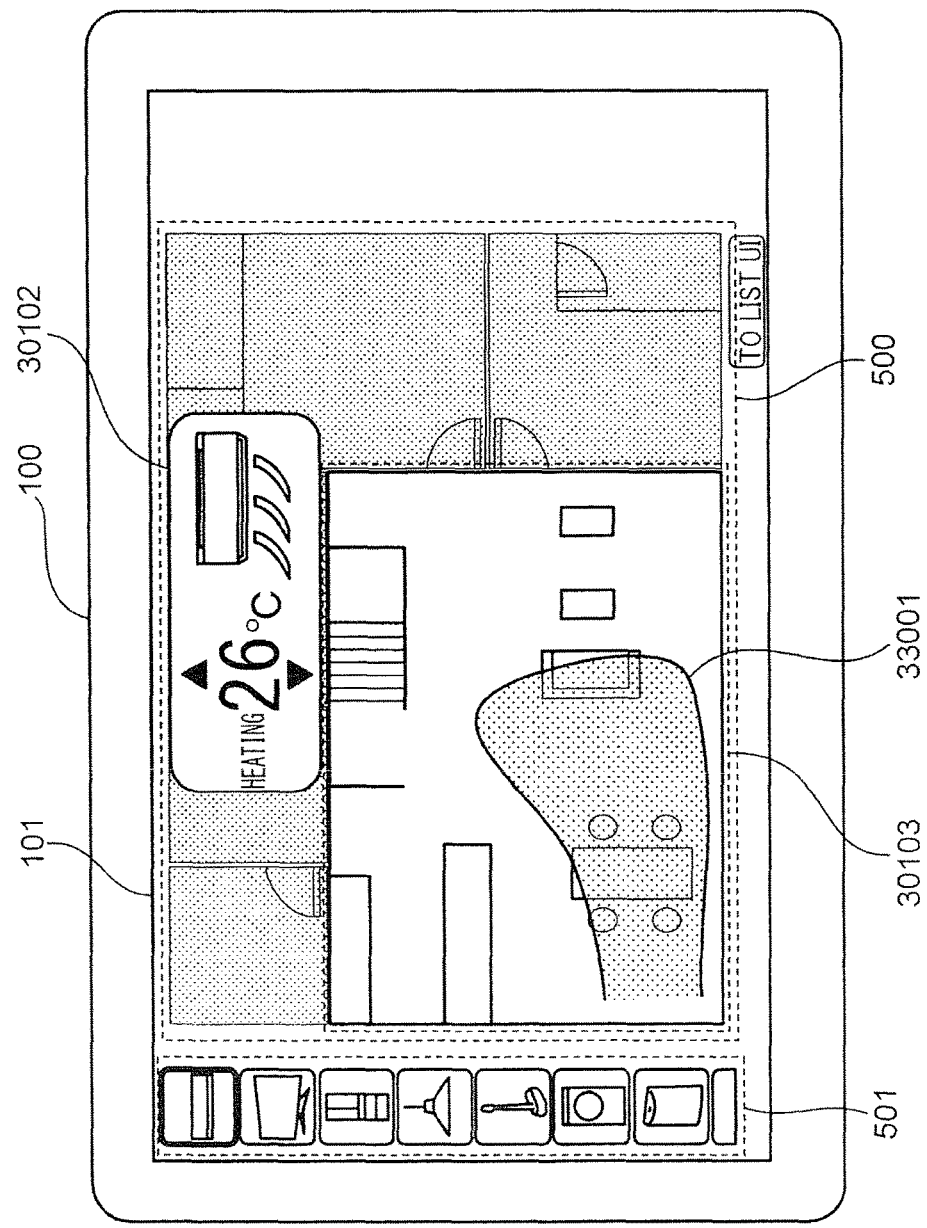
FIG. 100 is a diagram showing the configuration of a display state of the air conditioner control screen in which an effect range is displayed in the control target region, according to the present disclosure.

FIG. 100 is a diagram showing the configuration of a display state of the air conditioner control screen 30102 in which an effect range 33001 is displayed in the control target region 30103. The display screen shown in FIG. 100 is displayed by the display control section 103 when, for example, the air conditioner icon 30101 is tapped on in the basic screen shown in FIG. 72 and the touch panel control section 102 senses the tap. In FIG. 100, the room region in which the air conditioner icon 30101 is disposed is set as the effect range 33001.

The effect range 33001 represents the range that is displayed as overlapped on the control target region 30103 and shows the effect of the operation of the air conditioner 201 to be adjusted. Specifically, the effect range 33001 is an image schematically showing the directivity of air output from the air conditioner 201, and represents the range reached by the air that is output from the currently set air conditioner 201 in the air flow amount and air flow direction.

Note that the display control section 103 displays a gray layer in a region on the floor plan 500 other than the control target region 30103. As a result, the control target region 30103 is emphasized over the other regions. The display control section 103 also displays the air conditioner control screen 30102 in a region on the floor plan 500 other than the control target region 30103. This prevents the effect range 33001 from being hidden by the air conditioner control screen 30102.

In addition, when displaying the display screen shown in FIG. 100, the display control section 103 retracts the device icon 501 disposed on the floor plan 500 out of the display region of the floor plan 500.

FIG. 101 is a diagram showing the configuration of the room information 33100 used in the example of controlling the air conditioner 201. The room information 33100 includes a room ID 33101, a room type 33102, the space coordinates 33103, and the area 33104. The room ID 33101, room type 33102, and space coordinates 33103 are the same in information as those of the room information 2900. The area of the room with the room ID 33101 is registered in the area 33104. Here, although the area of an actual room is registered in the area 33104, the present disclosure is not limited thereto, and therefore the area of a room region on the floor plan 500 may be registered.

FIG. 102 is a diagram showing the configurations of the device lists 33200A, 33200B used in the example of controlling the air conditioner 201. The device lists 33200A, 33200B are retained at least in the home controller 100.

The device list 33200A includes the device ID 33201, a device type 33202, a model number 33203, the arrangement 33204, a capability information 33205, a control command transmission destination 33206, and a corresponding area 33207.

The device ID 33201, device type 33202, model number 33203, arrangement 33204, capability information 33205, and control command transmission destination 33206 are the same in information as those of the device list 4700. The corresponding area 33207 represents the area of the effect range output by the device 200. For instance, the air conditioner 201 with the device ID 33201 "A" has its output effect ranging up to 22.7 square meters. Therefore, value "22.7" is registered in the corresponding area 33207. This air conditioner 201 also has the output capability of 4.0 kW. Therefore, value "4.0 kW" is also registered in the corresponding area 33207.

An illumination device with a device ID "B" has its output range of 16.2 square meters. Therefore, value "16.2" is registered in the corresponding area 33207. Also, this illumination device is capable of outputting light with 73 W and 5000 lm. Therefore, "5000 lm·73 W" is also registered in the corresponding area 33207.

The device list 33200B includes a device ID 33208, the front direction 33209, and the air flow direction 33210. The device ID 33208 is an identifier provided to the air conditioner 201. The device list 33200B and the device list 33200A are associated with each other by the device ID 33208 and the device ID 33201.

The front direction 33209 represents the direction in which the front side of the air conditioner 201 faces in the floor plan 500. Here, the front direction 33209 indicates the angle formed by the horizontal direction (X axis) of the floor plan 500 and the normal line of the front side of the air conditioner 201.

The air flow direction 33210 represents the relative angle of the currently set air flow direction of the air conditioner 201 relative to the 0-degree front direction.

The lower right graph of FIG. 102 shows the relationship between the air flow direction and the front direction, wherein the abscissa represents an angle of 0 degrees with respect to the X axis of the floor plan 500, and the ordinate represents an angle of 90 degrees with respect to the X axis of the floor plan 500. In the example of the device list 33200B, the front direction 33209 of the air conditioner 201 with a device ID "A" is 0 degrees, and the air flow direction 33210 of the same is 45 degrees. Thus, as shown in the graph, the air flow direction of the air conditioner 201 in the floor plan 500 is calculated as 45 degrees (=0 degrees+45 degrees).

FIG. 103 is a diagram showing the effect range 33001 obtained when the air flow direction is changed. For example, it is assumed that the air flow direction is changed to the counterclockwise direction on the floor plan 500 by operating the air conditioner control screen 30102 while the effect range 33001 shown in FIG. 100 is displayed. Then, the display control section 103 deforms the shape of the effect range 33001 in such a manner that the directivity is directed in the resultant air flow direction, as shown in FIG. 103.

On the other hand, it is assumed that the air flow direction is returned to its original direction by operating the air conditioner control screen 30102 while the effect range 33001 shown in FIG. 103 is displayed. In this case, the shape of the effect range 33001 is deformed in such a manner that the directivity is directed in the original direction, as shown in FIG. 100.

Specifically, it is assumed that the touch panel control section 102 senses that the air flow direction indicator is swiped rightward on the air conditioner control screen 30102. In this case, the display control section 103 obtains the level of change in the air flow direction in response to the amount of the rightward swipe, turns the air flow direction 33210 registered in the device list 33200B counterclockwise by the level of change, and obtains the changed air flow direction on the floor plan 500 by adding the level of change to the front direction 33209. The display control section 103 then deforms the effect range 33001 in such a manner that the directivity is directed toward the changed air flow direction. Note, in the case where the air flow direction indicator is swiped leftward, the display control section 103 may turn the air flow direction 33210 clockwise by the level of change corresponding to the swipe distance and obtain the changed air flow direction on the floor plan 500 by adding the level of change to the front direction 33209.

Displaying the effect range 33001 in this manner can visually demonstrate to the user the range of the effect of air that is output in the currently set air flow direction from the air conditioner 201. This can help the user determine whether to move from the current place to a place within the effect range 33001 or to change the air flow direction so that the effect range 33001 extends to the current place of the user.

Figure 104:
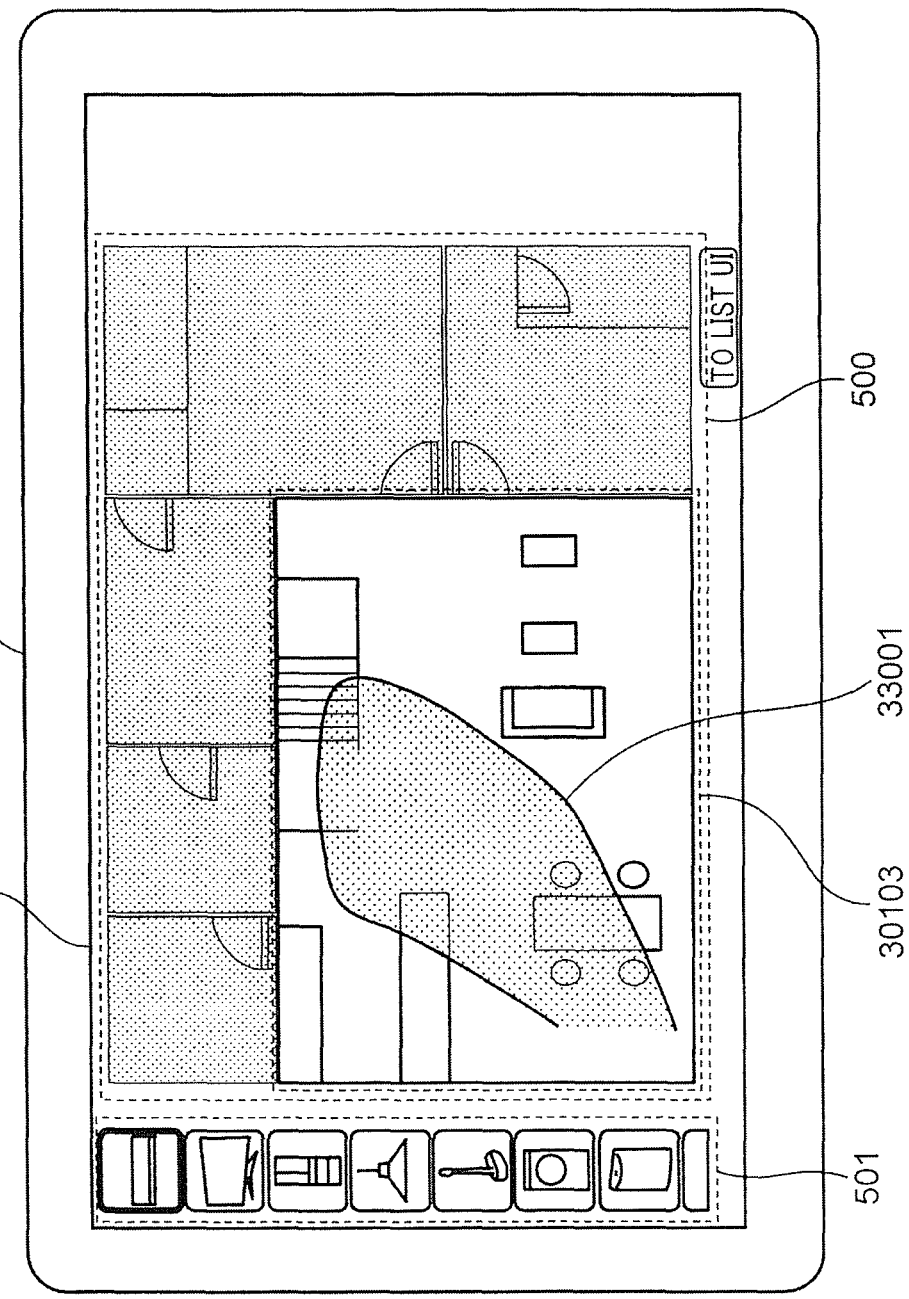
FIG. 104 is a diagram showing a floor plan from which the air conditioner control screen is erased, according to the present disclosure.

FIG. 104 is a diagram showing the floor plan 500 from which the air conditioner control screen 30102 is erased. In the display screen shown in FIG. 103, when the air conditioner icon retracted to the outside of the region of the floor plan 500 is tapped on, the display control section 103 erases the air conditioner control screen 30102, as shown in FIG. 104. In this case, erasing the air conditioner control screen 30102 from the floor plan 500 can strongly make the user aware of the presence of the effect range 33001.

Figure 105:
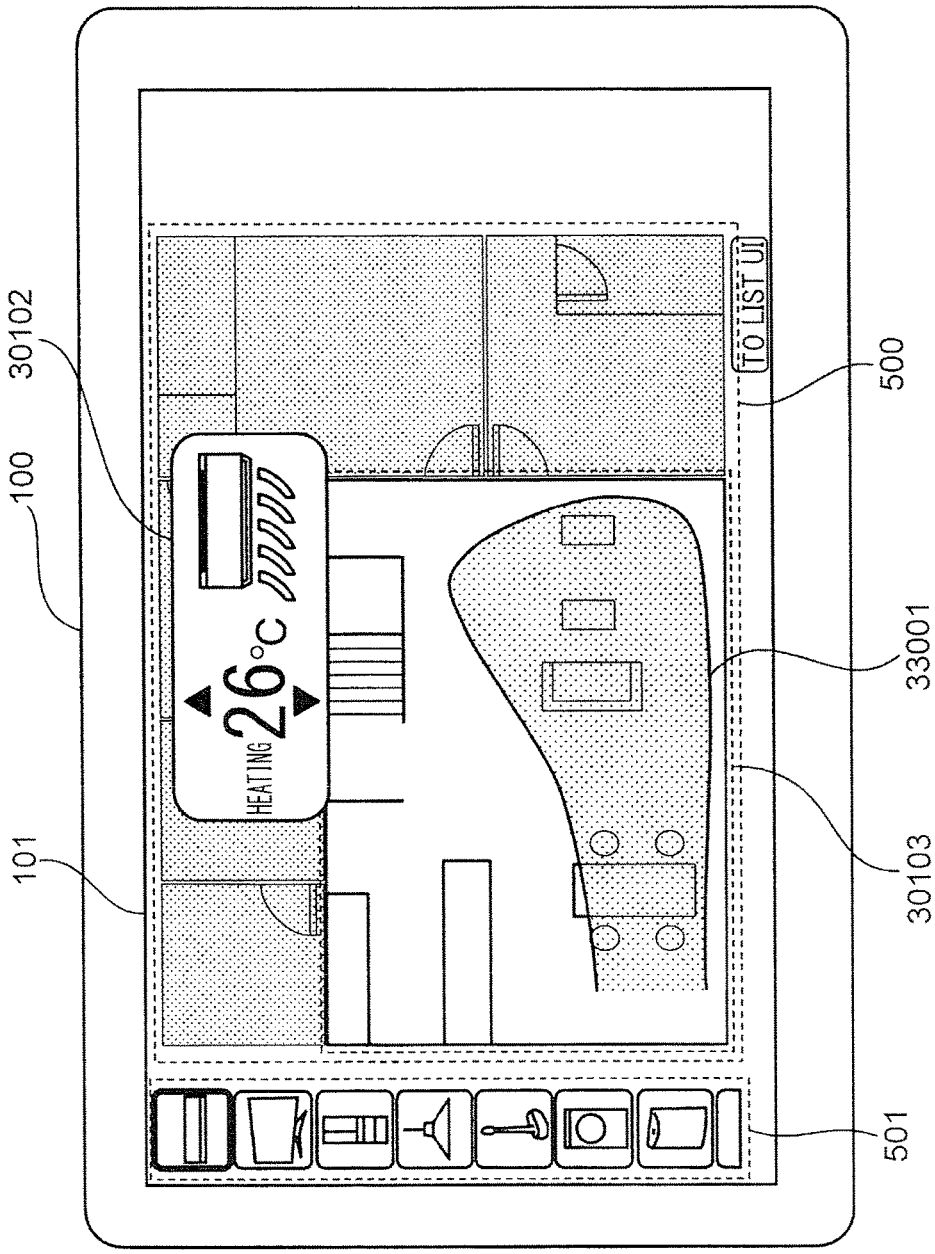
FIG. 105 is a diagram showing the effect range obtained when the air flow amount is changed, according to the present disclosure.

FIG. 105 is a diagram showing the effect range 33001 obtained after the air flow amount is changed. For example, it is assumed that the air flow amount is changed by operating the air conditioner control screen 30102 while the effect range 33001 shown in FIG. 100 is displayed. Then, the display control section 103 deforms the shape of the effect range 33001 into a size corresponding to the changed air flow amount, as shown in FIG. 105. In the example shown in FIG. 105, because the air flow amount is increased, the effect range 33001 is expanded by the increased amount. In this case, the screen representing the air flow direction is pinched out on the air conditioner control screen 30102 in order to increase the air flow amount. Consequently, the number of lines of the air direction indicator is increased. When reducing the air flow amount, the screen indicating the air flow direction is pinched in on the air conditioner control screen 30102.

Furthermore, it is assumed that the air flow amount is reduced by operating the air conditioner control screen 30102 while the effect range 33001 shown in FIG. 105 is displayed. Then, the effect range 33001 is narrowed by the reduced amount, as shown in FIG. 100.

Specifically, it is assumed that the touch panel control section 102 senses the pinch-in operation of the air flow direction indicator. Then, the display control section 103 obtains the level of change in the air flow amount in accordance with the pinched-in distance, reduces the level of change from the currently set air flow amount, and obtains the changed air flow amount. The display control section 103 then deforms the effect range 33001 into an area corresponding to the changed air flow amount. When, on the other hand, the air flow direction indicator is pinched out, the display control section 103 may obtain the level of change in the air flow amount in accordance with the pinched-out distance, add the level of change to the currently set air flow amount, and obtain the changed air flow amount.

Displaying the effect range 33001 in this manner can visually demonstrate to the user the range of the effect of air that is output in the currently set air flow amount from the air conditioner 201. This can help the user determine to change the air flow amount when moving from the current place of the user to a place within the effect range 33001 or so that the effect range 33001 extends to the current place of the user.

FIG. 106 is a diagram showing the effect range 33001 that represents the levels of effects in a step-like manner. In the example shown in FIG. 106, the effect range 33001 includes an inner region and an outer region surrounding the inner region. The inner region is a range with high effects, whereas the outer region is a region with low effects. The inner region is displayed in, for example, a color darker than that displaying the outer region and shows two levels of effects. This allows the user to identify the region of higher effect at a glance. Note in the example shown in FIG. 106 that the effect range 33001 displays two levels of effects; however, the present disclosure is not limited thereto. Therefore, the effect range 33001 may display three or four levels of effects in addition to two levels of effect. In this case, the display control section 103 may display the effect range 33001 in such a manner that the color becomes darker as the effect becomes stronger. When displaying the effect range 33001 with three or more levels, the display control section 103, as with when there are two levels of effects, may divide the effect range 33001 into a plurality of regions in such a manner that the outer region surrounds the adjacent inner region, and display the effect range 33001 in such a manner that the color becomes darker toward the inner region. In this case, the display control section 103 may set the transparency of each of the regions configuring the effect range 33001, and then display the effect range 33001 in such a manner that the transparency becomes lower toward the inner region. Alternatively, the display control section 103 may display all the regions in the same color phase to display the effect range 33001 in such a manner that the color intensity becomes higher toward the inner region. The display control section 103 may also determine the color phase of each region in such a manner that the color becomes redder toward the inner region, and then display the effect range 33001.

The display control section 103 obtains a default shape of the effect range 33001 of the corresponding air conditioner 201 by increasing or reducing, for example, a predetermined basic shape of the effect range 33001 in accordance with the corresponding area 33207 registered in the device list 33200A. The display control section 103 then generates the effect range 33001 to be displayed on the display 111 by deforming the default shape in accordance with the currently set air flow amount and air flow direction of the air conditioner 201.

Also when the generated effect range 33001 sticks out of the control target region 30103, the display control section 103 may deform the shape of the effect range 33001 so that it fits into the control target region 30103. In this case, the display control section 103 may deform the effect range 33001 in such a manner that the area of the effect range 33001 is maintained before and after deformation.

FIGS. 107A and 107B are each a flowchart showing yet another example of the process for the home controller 100 to control the device 200, according to the present disclosure. Steps S33701 to S33704 shown in FIG. 107A are the same as steps S31001 to S31004 shown in FIG. 80A.

In S33705, the display control section 103 displays the effect range of the corresponding device 200 in the room region in which the selected device icon 501 is disposed. Here, the effect range 33001 is displayed on the control target region 30103, as shown in FIG. 100.

Steps S33706 to S33711 shown in FIG. 107B are the same as steps S31006 to S31011 shown in FIG. 80A.

Figure 108:
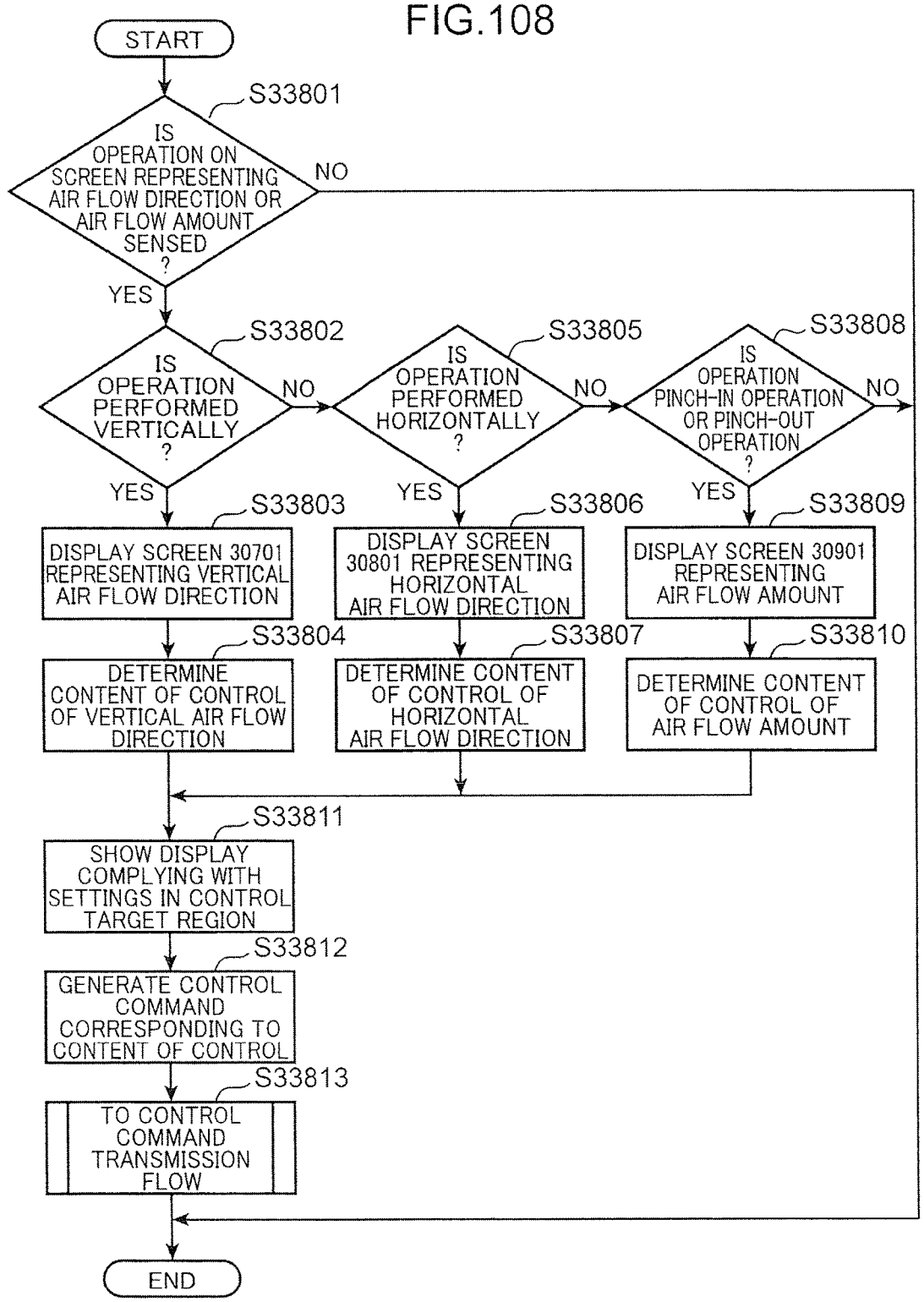
FIG. 108 is a flowchart showing S33710 of FIG. 107B, a control flow of the device control screen, according to the present disclosure.

FIG. 108 is a flowchart showing S33710 of FIG. 107B, a control flow of the device control screen 502. Note that FIG. 108 is a flowchart for adjusting the air flow direction and air flow amount in the device control screen 502. Steps S33801 to S33810 are the same as steps S31101 to S31110 shown in FIG. 81.

In S33811, the display control section 103 displays in the control target region 30103 the effect range 33001 corresponding to the settings. Here, the effect range 33001 that is deformed in accordance with the air flow direction as shown in FIG. 103 or the effect range 33001 that is deformed in accordance with the air flow amount as shown in FIG. 105 is displayed.

Steps S33812 and S33813 are the same as steps S31112 and S31113 shown in FIG. 81.

Although the effect range 33001 represents the air flow direction and the air flow amount in the foregoing description, the present disclosure is not limited thereto; thus, the effect range 33001 may be provided with a function for representing set temperatures. In this case, the display control section 103 may display the effect range 33001 more densely as the set temperature increases. The display control section 103 may also display the effect range 33001 less densely as the set temperature drops.

Figure 109:
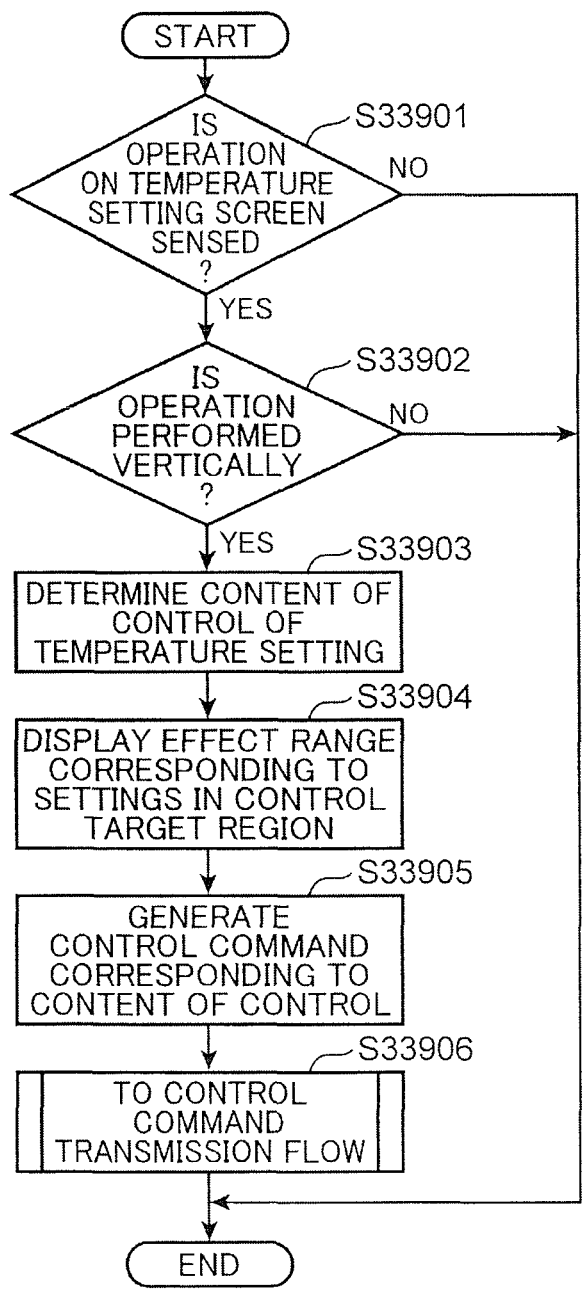
FIG. 109 is a flowchart showing S33710 of FIG. 107B, the control low of the device control screen, according to the present disclosure.

FIG. 109 is a flowchart showing S33710 of FIG. 107B, the control low of the device control screen 502. FIG. 109 is a flowchart for adjusting the temperature on the device control screen 502.

Steps S33901 to S33903 are the same as steps S31301 to S31303 shown in FIG. 83. In S33904, the display control section 103 displays in the control target region 30103 the effect range 33001 corresponding to the settings. Steps S33905 and S33906 are same as steps S31305 and S31306 shown in FIG. 83.

FIG. 110 are diagrams showing an example of operating the effect range 33001 using the contacting object 30603. It is assumed that the contacting object 30603 is swiped in the direction of the directivity of the effect range 33001 (direction away from the image of the air conditioner 201), as shown from FIG. 110A to FIG. 110B. More specifically, it is assumed that the swipe operation sensed by the touch panel control section 102 is performed in a direction that is parallel to the currently set air flow direction and extends to the outside of the effect range 33001, on the floor plan 500. In this case, the display control section 103 deforms the effect range 33001 in accordance with the swipe distance in such a manner that it extends in the direction of the directivity.

Then, when the end of swiping the contacting object 30603 is sensed by the touch panel control section 102, the device control section 106 generates a control command for increasing the currently set air flow amount in accordance with the swipe distance, and transmits the control command to the network.

Figure 110A:
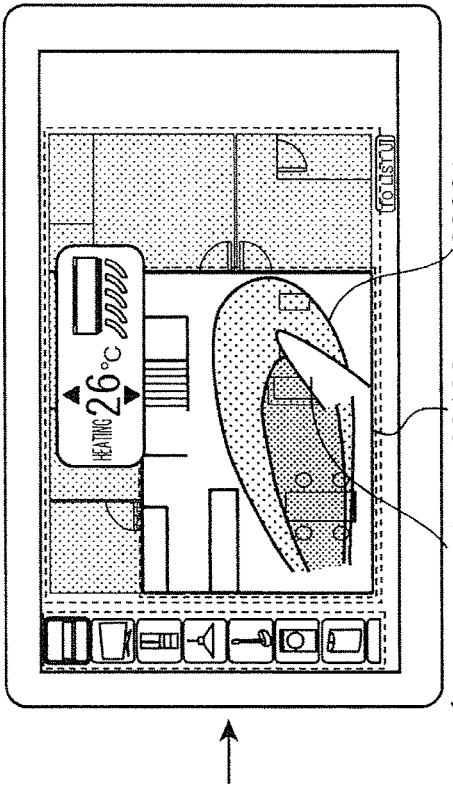
FIG. 110A to 110D are diagrams showing an example of operating the effect range using a contacting object, according to the present disclosure.
Figure 110B:
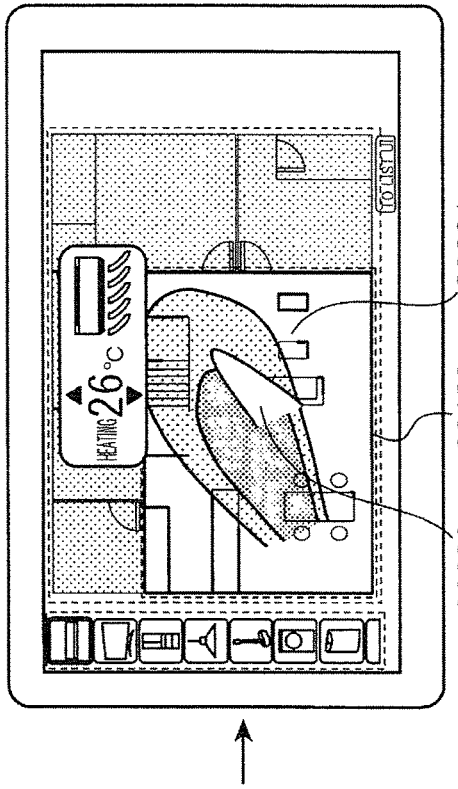

On the other hand, it is assumed that the contacting object 30603 is swiped in a direction in which the direction of the directivity of the effect range 33001 is reduced (direction approaching the image of the air conditioner 201), as shown from FIG. 110B to FIG. 110A. More specifically, it is assumed that the swipe operation sensed by the touch panel control section 102 is performed in a direction that is parallel to the currently set air flow direction and is directed toward the inside of the effect range 33001, on the floor plan 500. In this case, the display control section 103 deforms the effect range 33001 in accordance with the swipe distance in such a manner that the it shrinks in the direction of the directivity.

Then, when the end of swiping the contacting object 30603 is sensed by the touch panel control section 102, the device control section 106 generates a control command for reducing the currently set air flow amount in accordance with the swipe distance, and transmits the control command to the network.

Furthermore, it is assumed that the contacting object 30603 is swiped counterclockwise, as shown from FIG. 110A to FIG. 110D. In this case, the display control section 103 deforms the effect range 33001 in such a manner that the direction of the current directivity of the effect range 33001 is changed in accordance with the swipe rotation amount.

Then, when the end of swiping the contacting object 30603 is sensed by the touch panel control section 102, the device control section 106 generates a control command for changing the currently set air flow direction to a direction corresponding to the swipe rotation amount, and transmits the control command to the network.

Figure 110C:
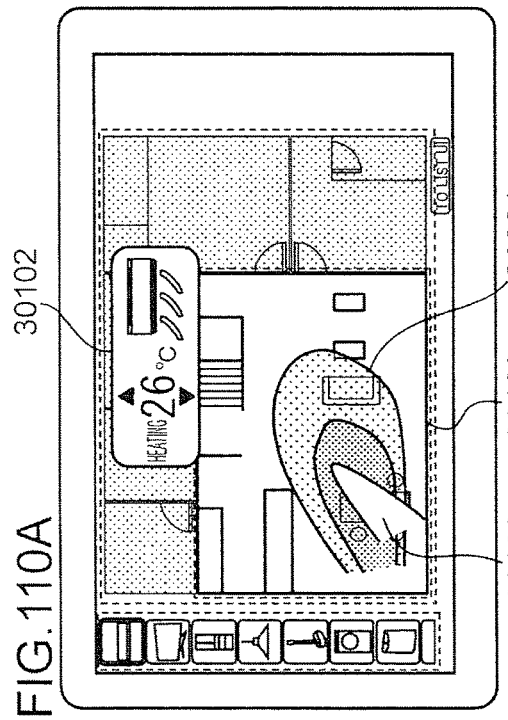
Figure 110D:
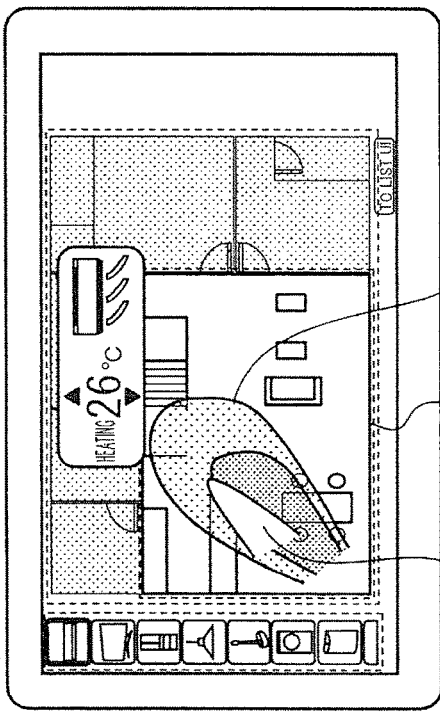

On the other hand, it is assumed that the contacting object 30603 is swiped clockwise, as shown from FIG. 110D to FIG. 110A. In this case, the display control section 103 deforms the effect range 33001 in such a manner that the direction of the current directivity of the effect range 33001 is changed in accordance with the swipe rotation amount.

Then, when the end of swiping the contacting object 30603 is sensed by the touch panel control section 102, the device control section 106 generates a control command for changing the currently set air flow direction to a direction corresponding to the swipe rotation amount, and transmits the control command to the network.

It is also assumed that the contacting object 30603 is swiped diagonally right upward with respect to the direction of the directivity of the effect range 33001, as shown from FIG. 110A to FIG. 110C. Specifically, it is assumed that the swipe operation sensed by the touch panel control section 102 is performed in a diagonally right upward direction on the floor plan 500 with respect to the currently set air flow direction. In this case, the display control section 103 deforms the effect range 33001 in such a manner that the direction of the current directivity of the effect range 33001 is changed in accordance with the swipe rotation amount, and at the same time deforms the effect range 33001 so that it is stretched in the direction of the directivity in accordance with the swipe distance.

Then, when the end of swiping the contacting object 30603 is sensed by the touch panel control section 102, the device control section 106 generates a control command for changing the currently set air flow direction to an angle corresponding to the swipe rotation amount and increasing the currently set air flow amount to an air flow amount corresponding to the swipe distance, and transmits the control command to the network.

On the other hand, in the case where the contacting object 30603 is swiped diagonally left downward with respect to the direction of the directivity of the effect range 33001, as shown from FIG. 110C to FIG. 110A, the display control section 103 deforms the effect range 33001 in such a manner that the direction of the directivity of the effect range 33001 is changed in accordance with the swipe rotation amount, and at the same time deforms the effect range 33001 so that it shrinks in the direction of the directivity in accordance with the swipe distance.

Figure 111:
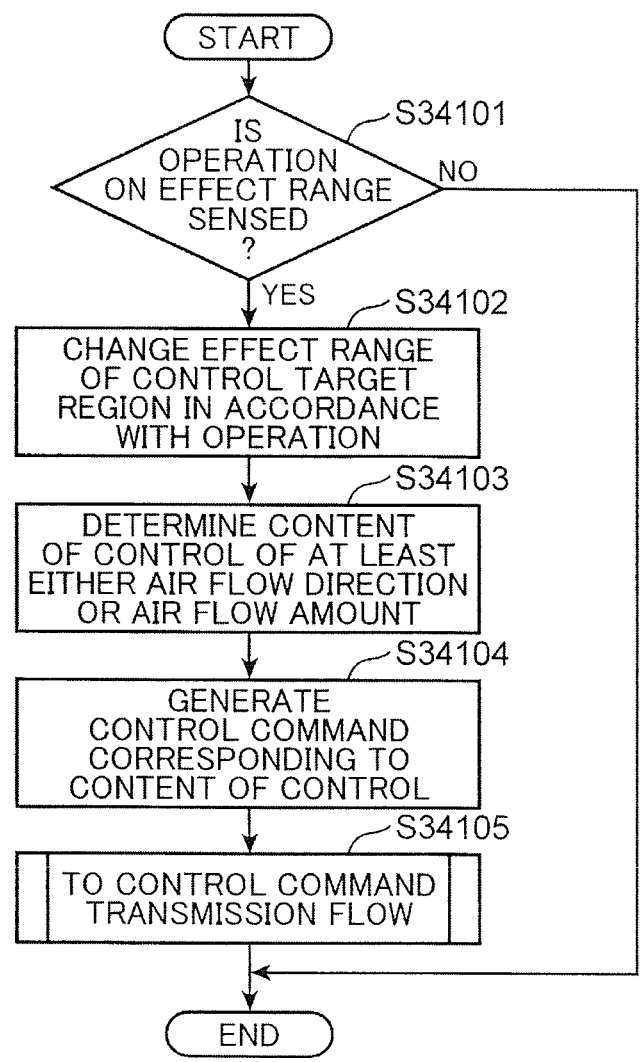
FIG. 111 is a flowchart showing the flow of a process performed by the home controller when the effect range is operated, according to the present disclosure.

FIG. 111 is a flowchart showing the flow of a process performed by the home controller 100 when the effect range 33001 is operated. First, when the touch panel control section 102 senses an operation performed on the effect range 33001 (YES in S34101), the display control section 103 changes the effect range 33001 displayed in the control target region 30103, in response to the sensed operation (S34102).

However, in the case where the touch panel control section 102 does not sense an operation performed on the effect range 33001 (NO in S34101), the process is ended.

Next, the device control section 106 determines the content of control for changing at least either the air flow direction or the air flow amount in response to the sensed operation (S34103). The device control section 106 then generates a control command corresponding to the content of control (S34104). Subsequently, the device control section 106 advances the process to the control command transmission flow (see FIG. 41) (S34105).

As a result of inputting the operation of changing the shape of the effect range 33001 as described above, at least either the direction or the air flow amount is changed in response to the operation. This allows the user to operate the air conditioner 201 as if operating invisible air.

In the foregoing example of controlling the air conditioner 201, the user inputs an operation for the air conditioner 201 by swiping the contacting object 30603; however, the present disclosure is not limited thereto. Thus, an operation for the air conditioner 201 may be input by dragging a mouse. Furthermore, although the user inputs an operation of selecting the device icon 501 by tapping on the icon, the operation of selecting the device icon 501 by clicking the mouse.

INDUSTRIAL APPLICABILITY

According to the present disclosure, the adjustment region and the adjustment region are displayed alternately in accordance with the area of the region corresponding to a room on the floor plan. Therefore, such a configuration is useful in the case where an information apparatus is used as a remote controller for an air conditioner.

The invention claimed is:

1. A method of controlling an information apparatus, the information apparatus having a touch-panel display and being connected to a network, over which one or more target devices are controlled, the method causing a computer of the information apparatus to:

display a display screen showing a floor plan of a building on the touch-panel display, the floor plan having a first room region having an area greater than a predetermined area and representing a first room and a second room region having an area less than or equal to the predetermined area and representing a second room;

display in the first room region of the floor plan on the display screen, a first air-conditioner icon representing a first air conditioner for the first room as one of the target devices;

display in the second room region of the floor plan on the display screen, a second air-conditioner icon representing a second air conditioner for the second room as another of the target devices;

detect a first room selection input when a user contacts the first air conditioner icon in the first room region, and display an indicator of the first room's temperature and change the first room region to an adjustment region for adjusting the temperature of the first air conditioner in response to detecting the first room selection input;

detect a first adjustment input for adjusting a set temperature of the first air conditioner, after detecting the first room selection input, when the user contacts the display in the first room region that was changed to the adjustment region, and in response to detecting the first adjustment input,
the temperature on the indicator changes,
a first control command for changing the set temperature of the first air conditioner is transmitted to the network in accordance with a movement amount of the contact, and
the first air conditioner receives the first control command over the network and changes the set temperature of the first air conditioner;

detect a second room selection input when the user contacts the second air conditioner icon in the second room region, and display a separate adjustment screen, with temperature setting controls, spaced from and not overlapping the second room region, to receive an input for adjusting a set temperature of the second air conditioner in response to detecting the second room selection input;

detect a second adjustment input for adjusting the set temperature of the second air conditioner, after detecting the second room selection input, when the user contacts the temperature setting controls of the separate adjustment screen, and in response to detecting the second adjustment input,
a second control command for changing the set temperature of the second air conditioner is transmitted to the network in accordance with a movement amount of the contact, and
the second air conditioner receives the second control command over the network and changes the set temperature of the second air conditioner.

2. The method according to claim 1, wherein
the adjustment screen is displayed in an enlarged view.

3. The method according to claim 1, wherein
the adjustment screen is displayed in the middle of the display screen on the display screen.

4. The method according to claim 1, wherein
in a case where a movement starting point of the contact is within a range of the adjustment screen, and a movement ending point of the contact is beyond the adjustment screen, a control command for changing the set temperature of the second air conditioner in accordance with the movement amount in which the contact moves, including an extra movement amount beyond the adjustment screen, is transmitted to the network.

5. The method according to claim 1, wherein
in a case where the contact moves beyond the adjustment screen, the set temperature of the second air conditioner is not changed in accordance with an extra movement amount beyond the adjustment screen.

6. The method according to claim 1, wherein
the set temperature of the first air conditioner that is changed is proportional to the movement amount of the contact.

7. The method according to claim 1, wherein
in a case where a movement starting point of the contact is within a range of the adjustment region, and a movement ending point of the contact is beyond the adjustment region, a control command for changing the set temperature of the first air conditioner in accordance with the movement amount in which the contact moves, including an extra movement amount beyond the adjustment region, is transmitted to the network.

8. The method according to claim 1, wherein
in a case where the contact moves beyond the adjustment region, the set temperature of the first air conditioner is not changed in accordance with an extra movement amount beyond the adjustment region.

9. A method of controlling an information apparatus, the information apparatus having a touch-panel display and being connected to a network, over which one or more target devices are controlled, the method causing a computer of the information apparatus to:

display a display screen showing a floor plan of a building on the touch-panel display, the floor plan having a first room region having an area greater than a predetermined area and representing a first room and a second room region having an area less than or equal to the predetermined area and representing a second room;

display in the first room region of the floor plan on the display screen, a first air-conditioner icon representing a first air conditioner for the first room as one of the target devices;

display in the second room region of the floor plan on the display screen, a second air-conditioner icon representing a second air conditioner for the second room as another of the target devices;

detect a first room selection input when a user contacts the first air conditioner icon in the first room region, and display an indicator of the first room's temperature in response to detecting the first room selection input;

detect a first adjustment input for adjusting a set temperature of the first air conditioner, after detecting the first room selection input, when the user contacts the display in the first room region which comprises an adjustment region for adjusting the set temperature of the first air conditioner, and in response to detecting the first adjustment input,
the temperature on the indicator changes,
a first control command for changing the set temperature of the first air conditioner is transmitted to the network in accordance with a movement direction of the contact, and
the first air conditioner receives the first control command over the network and changes the set temperature of the first air conditioner;

detect a second room selection input when the user contacts the second air conditioner icon in the second room region, and display a separate adjustment screen, with temperature setting controls, spaced from and not overlapping the second room region, to receive an input for adjusting a set temperature of the second air conditioner in response to detecting the second room selection input;

detect a second adjustment input for adjusting the set temperature of the second air conditioner, after detecting the second room selection input, when the user contacts the temperature setting controls of the separate adjustment screen, and in response to detecting the second adjustment input,
a second control command for changing the set temperature of the second air conditioner is transmitted to the network in accordance with a movement direction amount of the contact, and
the second air conditioner receives the second control command over the network and changes its set temperature of the second air conditioner.

10. The method according to claim 9, wherein
the adjustment screen is displayed in an enlarged view.

11. The method according to claim 9, wherein
the adjustment screen is displayed in the middle of the display screen on the display screen.

12. The method according to claim 9, wherein
in a case where a movement starting point of the contact is within a range of the adjustment screen, and a movement ending point of the contact is beyond the adjustment screen, a control command for changing the set temperature of the second air conditioner in accordance with the movement direction in which the contact moves, including an extra movement direction beyond the adjustment screen, is transmitted to the network.

13. The method according to claim 9, wherein
in a case where the contact moves beyond the adjustment screen, the set temperature of the second air conditioner is not changed in accordance with an extra movement direction beyond the adjustment screen.

14. The method according to claim 9, wherein
in a case where the contact moves upward on the display screen, the set temperature of the second air conditioner is increased, and in the case where the contact moves downward on the display screen, the set temperature of the second air conditioner is decreased.

15. The method according to claim 9, wherein
in a case where a movement starting point of the contact is within a range of the adjustment region, and a movement ending point of the contact is beyond the adjustment region, a control command for changing the set temperature of the first air conditioner in accordance with the movement distance in which the contact moves, including an extra movement direction beyond the adjustment region, is transmitted to the network.

16. The method according to claim 9, wherein
in a case where the contact moves beyond the adjustment region, the set temperature of the second air conditioner is not changed in accordance with an extra movement distance beyond the adjustment region.

17. A non-transitory computer-readable recording medium which stores a program that is executed by an information apparatus having a touch-panel display and being connected to a network, over which one or more target devices are controlled, the program causing a computer of the information apparatus to:
display a display screen showing a floor plan of a building on the touch-panel display, the floor plan having a first room region having an area greater than a predetermined area and representing a first room and a second room region having an area less than or equal to the predetermined area and representing a second room;
display in the first room region of the floor plan on the display screen, a first air-conditioner icon representing a first air conditioner for the first room as one of the target devices,
display in the second room region of the floor plan on the display screen, a second air-conditioner icon representing a second air conditioner for the second room as another of the target devices;
detect a first room selection input when a user contacts the first air conditioner icon in the first room region, and display an indicator of the first room's temperature and change the first room region to an adjustment region for adjusting the temperature of the first air conditioner in response to detecting the first room selection input;
detect a first adjustment input for adjusting a set temperature of the first air conditioner, after detecting the first room selection input, when the user contacts the display in the first room region that was changed to the adjustment region, and
in response to detecting the first adjustment input,
the temperature on the indicator changes,
a first control command for changing the set temperature of the first air conditioner is transmitted to the network in accordance with a movement amount of the contact, and
the first air conditioner receives the first control command over the network and changes the set temperature of the first air conditioner;
detect a second room selection input when the user contacts the second air conditioner icon in the second room region, and display a separate adjustment screen, with temperature setting controls, spaced from and not overlapping the second room region, to receive an input for adjusting a set temperature of the second air conditioner in response to detecting the second room selection input;
detect a second adjustment input for adjusting the set temperature of the second air conditioner, after detecting the second room selection input, when the user contacts the temperature setting controls of the separate adjustment screen, and
in response to detecting the second adjustment input,
a second control command for changing the set temperature of the second air conditioner is transmitted to the network in accordance with a movement amount of the contact, and
the second air conditioner receives the second control command over the network and changes the set temperature of the second air conditioner.

18. A non-transitory computer-readable recording medium which stores a program that is executed by an information apparatus having a touch-panel display and being connected to a network, over which one or more target devices are controlled, the program causing a computer of the information apparatus to:
display a display screen showing a floor plan of a building on the touch-panel display, the floor plan having a first room region having an area greater than a predetermined area and representing a first room and a second room region having an area less than or equal to the predetermined area and representing a second room;
display in the first room region of the floor plan on the display screen, a first air-conditioner icon representing a first air conditioner for the first room as one of the target devices;
display in the second room region of the floor plan on the display screen, a second air-conditioner icon representing a second air conditioner for the second room as another of the target devices;
detect a first room selection input when a user contacts the first air conditioner icon in the first room region, and display an indicator of the first room's temperature in response to detecting the first room selection input;
detect a first adjustment input for adjusting a set temperature of the first air conditioner, after detecting the first room selection input, when the user contacts the display in the first room region, and
in response to detecting the first adjustment input,
the temperature on the indicator changes,
a first control command for changing the set temperature of the first air conditioner is transmitted to the network in accordance with a movement direction of the contact, and
the first air conditioner receives the first control command over the network and changes the set temperature of the first air conditioner;
detect a second room selection input when the user contacts the second air conditioner icon in the second room region, and display a separate adjustment screen, with temperature setting controls, spaced from and not overlapping the second room region, to receive an input for adjusting a set temperature of the second air conditioner in response to detecting the second room selection input;
detect a second adjustment input for adjusting the set temperature of the second air conditioner, after detecting the second room selection input, when the user contacts the temperature setting controls of the separate adjustment screen, and in response to detecting the second adjustment input,
- a second control command for changing the set temperature of the second air conditioner is transmitted to the network in accordance with a movement direction amount of the contact, and
- the second air conditioner receives the second control command over the network and changes the set temperature of the second air conditioner.

* * * * *